US011203654B2

(12) United States Patent
Goryunov et al.

(10) Patent No.: US 11,203,654 B2
(45) Date of Patent: *Dec. 21, 2021

(54) BIS(ARYL PHENOLATE) LEWIS BASE CATALYSTS AND METHODS THEREOF

(71) Applicant: ExxonMobil Chemical Patents Inc., Baytown, TX (US)

(72) Inventors: Georgy P. Goryunov, Moscow (RU); Vladislav A. Popov, Moscow (RU); Dmitry V. Uborsky, Moscow (RU); Alexander Z. Voskoboynikov, Moscow (RU); John R. Hagadorn, Houston, TX (US); Irene C. Cai, Webster, TX (US); Hua Zhou, Missouri City, TX (US); Jo Ann M. Canich, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/788,088

(22) Filed: Feb. 11, 2020

(65) Prior Publication Data

US 2020/0254431 A1 Aug. 13, 2020

Related U.S. Application Data

(60) Provisional application No. 62/804,372, filed on Feb. 12, 2019.

(51) Int. Cl.
| | |
|---|---|
| *C08F 4/76* | (2006.01) |
| *C08F 4/64* | (2006.01) |
| *C07F 7/00* | (2006.01) |
| *C08F 210/16* | (2006.01) |
| *B01J 31/22* | (2006.01) |
| *C08F 10/02* | (2006.01) |
| *C08F 10/06* | (2006.01) |

(52) U.S. Cl.
CPC ......... *C08F 210/16* (2013.01); *B01J 31/2295* (2013.01); *C07F 7/00* (2013.01); *C08F 4/64158* (2013.01); *C08F 10/02* (2013.01); *C08F 10/06* (2013.01); *B01J 2531/0225* (2013.01); *B01J 2531/0244* (2013.01); *B01J 2531/48* (2013.01); *B01J 2531/49* (2013.01)

(58) Field of Classification Search
CPC ..... C08F 4/64158; C08F 4/65908; C07F 7/00
See application file for complete search history.

(56) References Cited

U.S. PATENT DOCUMENTS

| | | | |
|---|---|---|---|
| 6,333,423 B1* | 12/2001 | Koi .......................... C08F 4/545 556/56 |
| 6,825,296 B2* | 11/2004 | Chan ....................... C07F 7/003 526/161 |
| 7,030,256 B2 | 4/2006 | Boussie et al. ................. 556/54 |
| 8,153,544 B2* | 4/2012 | Nagy ....................... C08F 10/00 502/152 |
| 8,158,733 B2* | 4/2012 | Nagy ....................... C08F 10/00 526/172 |
| 8,519,070 B2* | 8/2013 | Carpentier ................ C07F 7/00 526/172 |
| 9,394,387 B2* | 7/2016 | Hlavinka ............. C07D 213/30 |
| 9,745,327 B2* | 8/2017 | Atienza ..................... C07F 7/00 |
| 10,252,967 B2* | 4/2019 | Faler ....................... C07C 43/23 |
| 10,611,857 B2* | 4/2020 | Atienza .................... C08F 10/02 |
| 2004/0005984 A1 | 1/2004 | Boussie et al. ............... 502/150 |
| 2008/0177020 A1* | 7/2008 | Agapie .................... C08F 10/00 528/9 |
| 2015/0166690 A1 | 6/2015 | Evans et al. ............... C08F 4/76 |
| 2015/0329652 A1 | 11/2015 | Hlavinka .............. C08F 110/02 |
| 2016/0289351 A1 | 10/2016 | Hlavinka .............. C08F 110/02 |
| 2018/0134817 A1* | 5/2018 | Crowther ............ C08F 4/64182 |
| 2018/0194872 A1 | 7/2018 | Holtcamp et al. ... C08F 4/65912 |

FOREIGN PATENT DOCUMENTS

| | | | | |
|---|---|---|---|---|
| KR | 10-2018-0022137 | 3/2018 | .......... | C07D 213/06 |
| KR | 2018/022137 | 3/2018 | .............. | B01J 23/00 |
| KR | 20180022137 | * 3/2018 | .............. | B01J 23/00 |
| WO | 2016/172110 | 10/2016 | ................ | C07F 7/00 |

(Continued)

OTHER PUBLICATIONS

Baier, M. et al. (2014) "Post-Metallocenes in the Industrial Production of Poly-Olefins," *Angew. Chem. Int. Ed.*, v.53(37), pp. 9722-9744.

Agapie, T et al. (2008) Zirconium and Titanium Complexes Supported by Tridentate LX2 Ligands Having Two Phenolates Linked to Furan, Thiophene, and Pyridine Donors: Precatalysts for Propylene Polymerization and Oligomerization, *Organometallics, Amer. Chem. Soc.*, v.27(23), pp. 6245-6256.

Carpentier, J. et al. (2010) "Metal Phenolates as Polymerization Catalysts," *PATAI'S Chem. of Functional Groups*, pp. 1-74.

Golisz, S. R. et al. (2009) "Synthesis of Early Transition Metal Bisphenolate Complexes and Their Use as Olefin Plymerization Catalysts," *Macromolecules*, v. 42(22), pp. 8751-8762.

(Continued)

*Primary Examiner* — Rip A Lee

(57) ABSTRACT

The present disclosure relates to bis(aryl phenolate) Lewis base catalysts. Catalysts, catalyst systems, and processes of the present disclosure can provide high temperature ethylene polymerization, propylene polymerization, or copolymerization as the bis(aryl phenolate) Lewis base catalysts are stable at high polymerization temperatures and have good activity at the high polymerization temperatures. The stable catalysts with good activity can provide formation of polymers having high molecular weights and the ability to make an increased amount of polymer in a given reactor, as compared to conventional catalysts. Hence, the present disclosure demonstrates highly active catalysts capable of operating at high reactor temperatures while producing polymers with controlled molecular weights and or robust isotacticity.

50 Claims, No Drawings

(56) References Cited

FOREIGN PATENT DOCUMENTS

WO WO2019/027575 2/2019 .............. C07F 7/00

OTHER PUBLICATIONS

Lein, Matthias et al. (2013) "Identification of Non-Classical C-H . . . M Interactions in Early and Late Transition Metal Complexes Containing CH(Ar0)$_3$ Ligand," *Dalton Transactions*, v.42(30), p. 10939-10951.

Tarafder, d. T. H et al. (2010) "Synthesis and Reactivity of Some Peroxi Complexes of Zirconium (IV) Thorium (IV) and Uranium (VI) Ions Containing a Quadridentate, Quadrinegative Ligand and a Pentadentate Dinegative Schiff Base," *Biological Sciences-PJSIR*, v.53(2), pp. 63-67.

\* cited by examiner

BIS(ARYL PHENOLATE) LEWIS BASE CATALYSTS AND METHODS THEREOF

PRIORITY

This invention claims priority to and the benefit of U.S. Ser. No. 62/804,372, filed Feb. 12, 2019, the disclosure of which is incorporated in its entirety.

CROSS REFERENCE TO RELATED APPLICATIONS 1) concurrently filed U.S. Ser. No. 16/788,022, entitled "Lewis Base Catalysts and Methods Thereof", which claims priority to 62/804,353, filed Feb. 12, 2019;
2) concurrently filed U.S. Ser. No. 16/787,909, entitled "Transition Metal Bis(Phenolate) Complexes and Their Use as Catalysts for Olefin Polymerization", which claims priority to 62/804,372, filed Feb. 12, 2019;
3) concurrently filed U.S. Ser. No. 16/788,124, entitled "Lewis Base Catalysts and Methods Thereof", which claims priority to 62/804,389, filed Feb. 12, 2019;
4) concurrently filed U.S. Ser. No. 16/787,837, entitled "Supported Transition Metal Bis(Phenolate) Complexes and Their Use as Catalysts for Olefin Polymerization", which claims priority to 62/804,372, filed Feb. 12, 2019;
5) concurrently filed U.S. Ser. No. 62/972,962 entitled "Propylene Copolymers Obtained Using Transition Metal Bis(Phenolate) Catalyst Complexes and Homogeneous Process for Production Thereof";
6) concurrently filed U.S. Ser. No. 62/972,953 entitled "Propylene Polymers Obtained Using Transition Metal Bis(Phenolate) Catalyst Complexes and Homogeneous Process for Production Thereof";
7) concurrently filed U.S. Ser. No. 62/972,943 entitled "Ethylene-Alpha-Olefin-Diene Monomer Copolymers Obtained Using Transition Metal Bis(Phenolate) Catalyst Complexes and Homogeneous Process for Production Thereof"; and
8) concurrently filed U.S. Ser. No. 62/972,936 entitled "Polyethylene Compositions Obtained Using Transition Metal Bis(Phenolate) Catalyst Complexes and Homogeneous Process for Production Thereof".

FIELD

The present disclosure relates to bis(aryl phenolate) Lewis base transition metal complexes, catalyst systems including bis(aryl phenolate) Lewis base transition metal complexes, and polymerization processes to produce polyolefin polymers such as polyethylene based polymers and polypropylene based polymers.

BACKGROUND

Olefin polymerization catalysts are of great use in industry and polyolefins are widely used commercially because of their robust physical properties. Hence, there is interest in finding new catalyst systems that increase the marketing value of the catalyst and allow the production of polymers having improved properties.

Polyolefins, such as polyethylene, typically have a comonomer, such as hexene, incorporated into the polyethylene backbone. These copolymers provide varying physical properties compared to polyethylene alone and are typically produced in a low pressure reactor, utilizing, for example, solution, slurry, or gas phase polymerization processes. Polymerization may take place in the presence of catalyst systems such as those using a Ziegler-Natta catalyst, a chromium based catalyst, or a metallocene catalyst.

Additionally, pre-catalysts (neutral, unactivated complexes) should be thermally stable at and above ambient temperature, as they are often stored for weeks before being used. The performance of a given catalyst is closely influenced by the reaction conditions, such as the monomer concentrations and temperature. For instance, the solution process, which benefits from being run at temperatures above 120° C., is particularly challenging for catalyst development. At such high reactor temperatures, it is often difficult to maintain high catalyst activity and high molecular weight capability as both attributes quite consistently decline with an increase of reactor temperature. With a wide range of polyolefin products desired, from high density polyethylene (HDPE) to elastomers (e.g., thermoplastic elastomers (TPE); ethylene-propylene-diene (EPDM)), many different catalyst systems may be needed, as it is unlikely that a single catalyst will be able to address all the needs for the production of these various polyolefin products. The strict set of requirements needed for the development and production of new polyolefin products makes the identification of suitable catalysts for a given product and production process a highly challenging endeavor.

There is a need for new and improved catalysts, catalyst systems, and processes for the polymerization of olefins in order to achieve polymer properties such as narrow polydispersity indices and high molecular weights. Furthermore, there is still a need to develop highly active catalysts capable of operating at high reactor temperatures while producing polymers with high molecular weights (e.g., catalysts with high stability and good activity at high polymerization temperatures). In the case of polypropylenes, there is further a need for catalysts and processes that provide isotactic polypropylenes having one or more of the aforementioned properties.

References for citing in an Information Disclosure Statement (37 CFR 1.97(h)): U.S. Pat. No. 7,030,256; Baier, M. et al. (2014) "Post-Metallocenes in the Industrial Production of Poly-Plefins,"*Angew. Chem. Int. Ed.*, v.53, pp. 9722-9744; KR 2018/022137; WO 2016/172110.

SUMMARY

This invention relates to a transition metal compound comprising a tridentate dianionic ligand chelated to a group 4 transition metal, wherein the tridentate ligand coordinates to the metal with two anionic oxygen donors and one neutral heterocyclic nitrogen donor to form a pair of eight-membered metallocycle rings.

The present disclosure also relates to catalyst compounds represented by Formula (I):

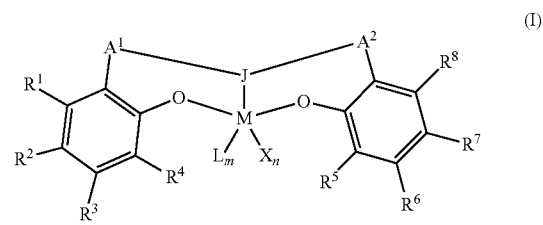

wherein:

M is a group 3, 4, or 5 metal;

$A^1$ and $A^2$ are independently an aromatic group;

J is a heterocyclic Lewis base, preferably having six ring atoms;

L is a Lewis base;

X is an anionic ligand;

n is 1, 2 or 3;

m is 0, 1, or 2;

n+m is not greater than 4;

each of $R^1$, $R^2$, $R^3$, $R^4$, $R^5$, $R^6$, $R^7$, and $R^8$ is independently hydrogen, $C_1$-$C_{40}$ hydrocarbyl, $C_1$-$C_{40}$ substituted hydrocarbyl, a heteroatom or a heteroatom-containing group, or one or more of $R^1$ and $R^2$, $R^2$ and $R^3$, $R^3$ and $R^4$, $R^5$ and $R^6$, $R^6$ and $R^7$, or $R^7$ and $R^8$ may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings;

any two L groups may be joined together to form a bidentate Lewis base;

an X group may be joined to an L group to form a monoanionic bidentate group; and any two X groups may be joined together to form a dianionic ligand group.

In yet another embodiment, the present disclosure provides a catalyst system comprising an activator and a catalyst of the present disclosure.

In still another embodiment, the present disclosure provides a polymerization process comprising a) contacting one or more olefin monomers with a catalyst system comprising: i) an activator and ii) a catalyst of the present disclosure.

In still another embodiment, the present disclosure provides a polyolefin formed by a catalyst system and or method of the present disclosure.

In another class of embodiments, the present disclosure provides for a process for the production of an ethylene alpha-olefin copolymer comprising polymerizing ethylene and at least one $C_3$-$C_{20}$ alpha-olefin by contacting the ethylene and the at least one $C_3$-$C_{20}$ alpha-olefin with a catalyst system in at least one continuous stirred tank reactor or loop reactor.

In another class of embodiments, the present disclosure provides for a process for the production of a propylene alpha-olefin copolymer comprising polymerizing propylene and at least one ethylene and/or $C_4$-$C_{20}$ alpha-olefin by contacting the propylene and the at least one ethylene and/or at least one $C_4$-$C_{20}$ alpha-olefin with a catalyst system in at least one continuous stirred tank reactor or loop reactor.

In at least one embodiment the catalyst compounds represented by Formula (I) feature two eight-membered metallocycle rings. The first of these eight-membered metallocycle rings contains the atoms from the metal M, a phenolate oxygen, two carbons of the phenolate aryl group, two atoms of the aryl group $A^1$, and two atoms from the bridging Lewis base group J. The second of these eight-membered metallocycle rings contains the atoms from the metal M, a phenolate oxygen, two carbons of the phenolate aryl group, two atoms of the aryl group $A^2$, and two atoms from the bridging Lewis base group J.

DETAILED DESCRIPTION

The present disclosure provides catalyst compounds including a bis(aryl phenolate) Lewis base tridentate ligand which coordinates to a transition metal center, forming two eight-membered rings, catalyst systems including such catalyst compounds, and uses thereof. Catalyst compounds of the present disclosure can be zirconium or hafnium-containing compounds having one or more aryl and/or heteroaryl ligand(s) substituted and linked with bis(aryl phenolate) Lewis base. In another class of embodiments, the present disclosure is directed to polymerization processes to produce polyolefin polymers from catalyst systems including one or more olefin polymerization catalysts, at least one activator, and an optional support. Polyolefin polymers can be polyethylene polymers or polypropylene polymers.

The bis(aryl phenolate) Lewis base tridentate ligand is a class of tridentate ligands that may use heterocycles such as a pyridine group. This class of ligands can include bis(aryl phenolate)heterocycles or bis(aryl phenolate) heterocyclic ligands. These ligands coordinate to a transition metal in a "tridentate" fashion, which means that the ligand forms three different bonds to the metal center. A feature of the bis(aryl phenolate)heterocycle complexes, for example, is that the ligand binds in a tridentate fashion with the formation of two eight-membered metallocycle rings. With the ligand coordinated to the metal in this fashion, the complex is thought to be chiral (i.e. lacking a mirror plane of symmetry). Without being bound by theory, it has been discovered that these complexes are useful as catalyst components for the production of polypropylene and other polymers of $C_3$ and higher alpha olefins because chirality is advantageous for the production of poly(alpha olefins) of high isotacticity.

Catalysts, catalyst systems, and processes of the present disclosure can provide high temperature ethylene polymerization, propylene polymerization, ethylene alpha-olefin (e.g., ethylene-1-octene) copolymerization, or propylene alpha-olefin copolymerization as the bis(aryl phenolate) Lewis Base catalysts are stable at high polymerization temperatures and have good activity at the high polymerization temperatures. The stable catalysts with good activity can provide formation of polymers having high molecular weights and the ability to make an increased amount of polymer in a given reactor, as compared to conventional catalysts, because polymerizations in general occur at a higher rate at higher temperatures.

For the purposes of the present disclosure, the numbering scheme for the Periodic Table Groups is used as described in *Chemical And Engineering News*, v.63(5), pg. 27 (1985). Therefore, a "group 4 metal" is an element from group 4 of the Periodic Table, e.g., Hf, Ti, or Zr.

The following abbreviations may be used herein: Me is methyl, Et is ethyl, Ph is phenyl, tBu is tertiary butyl, MAO is methylalumoxane, NMR is nuclear magnetic resonance, t is time, s is second, h is hour, psi is pounds per square inch, psig is pounds per square inch gauge, equiv is equivalent, RPM is rotation per minute.

The specification describes transition metal complexes. The term complex is used to describe molecules in which an ancillary ligand is coordinated to a central transition metal atom. The ligand is bulky and stably bonded to the transition metal so as to maintain its influence during use of the catalyst, such as polymerization. The ligand may be coordinated to the transition metal by covalent bond and/or electron donation coordination or intermediate bonds. The transition metal complexes are generally subjected to activation to perform their polymerization or oligomerization function using an activator which, without being bound by theory, is believed to create a cation as a result of the removal of an anionic group, often referred to as a leaving group, from the transition metal.

As used herein, "olefin polymerization catalyst(s)" refers to any catalyst, such as an organometallic complex or compound that is capable of coordination polymerization addition where successive monomers are added in a monomer chain at the organometallic active center.

The terms "substituent," "radical," "group," and "moiety" may be used interchangeably.

"Conversion" is the amount of monomer that is converted to polymer product, and is reported as mol % and is calculated based on the polymer yield and the amount of monomer fed into the reactor.

"Catalyst activity" is a measure of how active the catalyst is and is reported as the grams of product polymer (P) produced per millimole of catalyst (cat) used per hour (gP·mmolcat$^{-1}$·h$^{-1}$).

The term "heteroatom" refers to any group 13-17 element, excluding carbon. A heteroatom may include B, Si, Ge, Sn, N, P, As, O, S, Se, Te, F, Cl, Br, and I. The term "heteroatom" may include the aforementioned elements with hydrogens attached, such as BH, BH$_2$, SiH$_2$, OH, NH, NH$_2$, etc. The term "substituted heteroatom" describes a heteroatom that has one or more of these hydrogen atoms replaced by a hydrocarbyl or substituted hydrocarbyl group(s).

An "olefin," alternatively referred to as "alkene," is a linear, branched, or cyclic compound of carbon and hydrogen having at least one double bond. For purposes of this specification and the claims appended thereto, when a polymer or copolymer is referred to as including an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" is used to refer to mer units indicates that the mer units differ from each other by at least one atom or are different isomerically. Accordingly, the definition of copolymer, as used herein, includes terpolymers. An "ethylene polymer" or "ethylene copolymer" is a polymer or copolymer including at least 50 mol % ethylene derived units, a "propylene polymer" or "propylene copolymer" is a polymer or copolymer including at least 50 mol % propylene derived units, and so on. An "ethylene polymer" or "ethylene copolymer" is a polymer or copolymer including at least 50 mol % ethylene derived units, a "propylene polymer" or "propylene copolymer" is a polymer or copolymer including at least 50 mol % propylene derived units, and so on.

The term "alpha-olefin" refers to an olefin having a terminal carbon-to-carbon double bond in the structure thereof ((R$^1$R$^2$)—C=CH$_2$, where R$^1$ and R$^2$ can be independently hydrogen or any hydrocarbyl group; such as R$^1$ is hydrogen and R$^2$ is an alkyl group). A "linear alpha-olefin" is an alpha-olefin defined in this paragraph wherein R$^1$ is hydrogen, and R$^2$ is hydrogen or a linear alkyl group.

For the purposes of the present disclosure, ethylene shall be considered an alpha-olefin.

As used herein, and unless otherwise specified, the term "C$_n$" means hydrocarbon(s) having n carbon atom(s) per molecule, wherein n is a positive integer. The term "hydrocarbon" means a class of compounds containing hydrogen bound to carbon, and encompasses (i) saturated hydrocarbon compounds, (ii) unsaturated hydrocarbon compounds, and (iii) mixtures of hydrocarbon compounds (saturated and/or unsaturated), including mixtures of hydrocarbon compounds having different values of n. Likewise, a "C$_m$-C$_y$" group or compound refers to a group or compound comprising carbon atoms at a total number thereof in the range from m to y. Thus, a C$_1$-C$_{50}$ alkyl group refers to an alkyl group comprising carbon atoms at a total number thereof in the range from 1 to 50.

Unless otherwise indicated, (e.g., the definition of "substituted hydrocarbyl", "substituted aromatic", etc.), the term "substituted" means that at least one hydrogen atom has been replaced with at least one non-hydrogen group, such as a hydrocarbyl group, a heteroatom, or a heteroatom containing group, such as halogen (such as Br, Cl, F or I) or at least one functional group such as —NR*$_2$, —OR*, —SeR*, —TeR*, —PR*$_2$, —AsR*$_2$, —SbR*$_2$, —SR*, —BR*$_2$, —SiR*$_3$, —GeR*$_3$, —SnR*$_3$, —PbR*$_3$, where q is 1 to 10 and each R* is independently a hydrocarbyl or halocarbyl radical, and two or more R* may join together to form a substituted or unsubstituted completely saturated, partially unsaturated, or aromatic cyclic or polycyclic ring structure), or where at least one heteroatom has been inserted within a hydrocarbyl ring.

The term "substituted hydrocarbyl" means a hydrocarbyl radical in which at least one hydrogen atom of the hydrocarbyl radical has been substituted with at least one heteroatom (such as halogen, e.g., Br, Cl, F or I) or heteroatom-containing group (such as a functional group, e.g., —NR*$_2$, —OR*, —SeR*, —TeR*, —PR*$_2$, —AsR*$_2$, —SbR*$_2$, —SR*, —BR*$_2$, —SiR*$_3$, —GeR*$_3$, —SnR*$_3$, —PbR*$_3$, where q is 1 to 10 and each R* is independently a hydrocarbyl or halocarbyl radical, and two or more R* may join together to form a substituted or unsubstituted completely saturated, partially unsaturated, or aromatic cyclic or polycyclic ring structure), or where at least one heteroatom has been inserted within a hydrocarbyl ring. The term "hydrocarbyl substituted phenyl" means a phenyl group having 1, 2, 3, 4 or 5 hydrogen groups replaced by a hydrocarbyl or substituted hydrocarbyl group. For example, the "hydrocarbyl substituted phenyl" group can be represented by the formula:

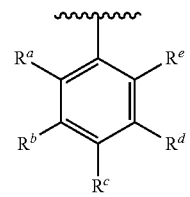

where each of R$^a$, R$^b$, R$^c$, R$^d$, and R$^e$ can be independently selected from hydrogen, C$_1$-C$_{40}$ hydrocarbyl or C$_1$-C$_{40}$ substituted hydrocarbyl, a heteroatom or a heteroatom-containing group (provided that at least one of R$^a$, R$^b$, R$^c$, R$^d$, and R$^e$ is not H), or two or more of R$^a$, R$^b$, R$^c$, R$^d$, and R$^e$ can be joined together to form a C$_4$-C$_{62}$ cyclic or polycyclic hydrocarbyl ring structure, or a combination thereof.

The term "substituted aromatic," means an aromatic group having 1 or more hydrogen groups replaced by a hydrocarbyl, substituted hydrocarbyl, heteroatom or heteroatom containing group.

The term "substituted phenyl," mean a phenyl group having 1 or more hydrogen groups replaced by a hydrocarbyl, substituted hydrocarbyl, heteroatom or heteroatom containing group.

The term "substituted carbazole," means a carbazolyl group having 1 or more hydrogen groups replaced by a hydrocarbyl, substituted hydrocarbyl, heteroatom or heteroatom containing group.

The term "substituted naphthyl," means a naphthyl group having 1 or more hydrogen groups replaced by a hydrocarbyl, substituted hydrocarbyl, heteroatom or heteroatom containing group.

The term "substituted anthracenyl," means an anthracenyl group having 1 or more hydrogen groups replaced by a hydrocarbyl, substituted hydrocarbyl, heteroatom or heteroatom containing group.

The term "substituted fluorenyl" means a fluorenyl group having 1 or more hydrogen groups replaced by a hydrocarbyl, substituted hydrocarbyl, heteroatom or heteroatom containing group.

The term "substituted benzyl" means a benzyl group having 1 or more hydrogen groups replaced by a hydrocarbyl, substituted hydrocarbyl, heteroatom or heteroatom containing group, such as a substituted benzyl group is represented by the formula:

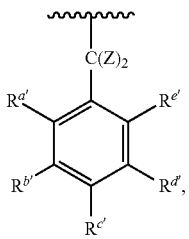

where each of $R^{a'}$, $R^{b'}$, $R^{c'}$, $R^{d'}$, and $R^{e'}$ and Z is independently selected from hydrogen, $C_1$-$C_{40}$ hydrocarbyl or $C_1$-$C_{40}$ substituted hydrocarbyl, a heteroatom or a heteroatom-containing group (provided that at least one of $R^{a'}$, $R^{b'}$, $R^{c'}$, $R^{d'}$, and $R^{e'}$ and Z is not H), or two or more of $R^{a'}$, $R^{b'}$, $R^{c'}$, $R^{d'}$, and $R^{e'}$ and Z are joined together to form a $C_4$-$C_{62}$ cyclic or polycyclic ring structure, or a combination thereof.

The terms "alkoxy" and "alkoxide" mean an alkyl or aryl group bound to an oxygen atom, such as an alkyl ether or aryl ether group/radical connected to an oxygen atom and can include those where the alkyl/aryl group is a $C_1$ to $C_{10}$ hydrocarbyl. The alkyl group may be straight chain, branched, or cyclic. The alkyl group may be saturated or unsaturated. Examples of suitable alkoxy radicals can include methoxy, ethoxy, n-propoxy, iso-propoxy, n-butoxy, iso-butoxy, sec-butoxy, tert-butoxy, phenoxyl.

The term "alkenyl" means a straight-chain, branched-chain, or cyclic hydrocarbon radical having one or more double bonds. These alkenyl radicals may be optionally substituted. Examples of suitable alkenyl radicals can include ethenyl, propentyl, allyl, 1,4-butadienyl cyclopropentyl, cyclobutenyl, cyclopentenyl, cyclohexenyl, cyclooctenyl, including their substituted analogues.

The terms "alkyl radical," and "alkyl" are used interchangeably throughout this disclosure. For purposes of this disclosure, "alkyl radical" is defined to be $C_1$-$C_{100}$ alkyls that may be linear, branched, or cyclic. Examples of such radicals can include methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, including their substituted analogues. Substituted alkyl radicals are radicals in which at least one hydrogen atom of the alkyl radical has been substituted with at least a non-hydrogen group, such as a hydrocarbyl group, a heteroatom, or a heteroatom containing group, such as halogen (such as Br, Cl, F or I) or at least one functional group such as —NR*$_2$, —OR*, —SeR*, —TeR*, —PR*$_2$, —AsR*$_2$, —SbR*$_2$, —SR*, —BR*$_2$, —SiR*$_3$, —GeR*$_3$, —SnR*$_3$, —PbR*$_3$, and each R* is independently a hydrocarbyl or halocarbyl radical, and two or more R* may join together to form a substituted or unsubstituted completely saturated, partially unsaturated, or aromatic cyclic or polycyclic ring structure), or where at least one heteroatom has been inserted within a hydrocarbyl ring.

The term "aryl" or "aryl group" means an aromatic ring and the substituted variants thereof, such as phenyl, 2-methyl-phenyl, xylyl, 4-bromo-xylyl. Likewise, heteroaryl means an aryl group where a ring carbon atom (or two or three ring carbon atoms) has been replaced with a heteroatom, such as N, O, or S. As used herein, the term "aromatic" also refers to pseudoaromatic heterocycles which are heterocyclic substituents that have similar properties and structures (nearly planar) to aromatic heterocyclic ligands, but are not by definition aromatic; likewise the term aromatic also refers to substituted aromatics.

The term "arylalkyl" means an aryl group where a hydrogen has been replaced with an alkyl or substituted alkyl group. For example, 3,5'-di-tert-butyl-phenyl indenyl is an indene substituted with an arylalkyl group. When an arylalkyl group is a substituent on another group, it is bound to that group via the aryl. For example in Formula (AI), the aryl portion is bound to E.

The term "alkylaryl" means an alkyl group where a hydrogen has been replaced with an aryl or substituted aryl group. For example, phenethyl indenyl is an indene substituted with an ethyl group bound to a benzene group. When an alkylaryl group is a substituent on another group, it is bound to that group via the alkyl. For example in Formula (AI), the alkyl portion is bound to E.

Where isomers of a named alkyl, alkenyl, alkoxide, or aryl group exist (e.g., n-butyl, iso-butyl, sec-butyl, and tert-butyl) reference to one member of the group (e.g., n-butyl) shall expressly disclose the remaining isomers (e.g., iso-butyl, sec-butyl, and tert-butyl) in the family. Likewise, reference to an alkyl, alkenyl, alkoxide, or aryl group without specifying a particular isomer (e.g., butyl) expressly discloses all isomers (e.g., n-butyl, iso-butyl, sec-butyl, and tert-butyl).

The term "ring atom" means an atom that is part of a cyclic ring structure. By this definition, a benzyl group has six ring atoms and tetrahydrofuran has 5 ring atoms.

A heterocyclic ring is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom-substituted ring. Other examples of heterocycles may include pyridine, imidazole, and thiazole.

The terms "hydrocarbyl radical," "hydrocarbyl group," or "hydrocarbyl" may be used interchangeably and are defined to mean a group consisting of hydrogen and carbon atoms only. For example, a hydrocarbyl can be a $C_1$-$C_{100}$ radical that may be linear, branched, or cyclic, and when cyclic, aromatic or non-aromatic. Examples of such radicals may include, but are not limited to, alkyl groups such as methyl, ethyl, propyl (such as n-propyl, isopropyl, cyclopropyl), butyl (such as n-butyl, isobutyl, sec-butyl, tert-butyl, cyclobutyl), pentyl (such as iso-amyl, cyclopentyl) hexyl (such as cyclohexyl), octyl (such as cyclooctyl), nonyl, decyl (such as adamantyl), undecyl, dodecyl, tridecyl, tetradecyl, pentadecyl, hexadecyl, heptadecyl, octadecyl, nonadecyl, icosyl, henicosyl, docosyl, tricosyl, tetracosyl, pentacosyl, hexacosyl, heptacosyl, octacosyl, nonacosyl, or tricontyl, and aryl groups, such as phenyl, benzyl, and naphthyl.

Unless otherwise indicated, as used herein, "low comonomer content" is defined as a polyolefin having less than 8 wt % of comonomer based upon the total weight of the polyolefin. As used herein, "high comonomer content" is defined as a polyolefin having greater than or equal to 8 wt % of comonomer based upon the total weight of the polyolefin.

As used herein, Mn is number average molecular weight, Mw is weight average molecular weight, and Mz is z average molecular weight, wt % is weight percent, and mol % is mole percent. Molecular weight distribution (MWD), also referred to as polydispersity index (PDI), is defined to be Mw divided by Mn. Unless otherwise noted, all molecular weight units (e.g., Mw, Mn, Mz) are g/mol.

Unless otherwise indicated, as used herein, "high molecular weight" is defined as a number average molecular weight (Mn) value of 100,000 g/mol or more. "Low molecular weight" is defined as an Mn value of less than 100,000 g/mol.

Unless otherwise noted all melting points (Tm) are differential scanning calorimetry (DSC) second melt.

A "catalyst system" is a combination of at least one catalyst compound, at least one activator, an optional coactivator, and an optional support material. The terms "catalyst compound", "catalyst complex", "transition metal complex", "transition metal compound", "precatalyst compound", and "precatalyst complex" are used interchangeably. When "catalyst system" is used to describe such a pair before activation, it means the unactivated catalyst complex (precatalyst) together with an activator and, optionally, a coactivator. When it is used to describe such a pair after activation, it means the activated complex and the activator or other charge-balancing moiety. The transition metal compound may be neutral as in a precatalyst, or a charged species with a counter ion as in an activated catalyst system. For the purposes of the present disclosure and the claims thereto, when catalyst systems are described as comprising neutral stable forms of the components, it is well understood by one of ordinary skill in the art, that the ionic form of the component is the form that reacts with the monomers to produce polymers. A polymerization catalyst system is a catalyst system that can polymerize monomers to polymer. Furthermore, catalyst compounds and activators represented by formulae herein are intended to embrace both neutral and ionic forms of the catalyst compounds and activators.

In the description herein, the catalyst may be described as a catalyst, a catalyst precursor, a pre-catalyst compound, catalyst compound or a transition metal compound, and these terms are used interchangeably.

An "anionic ligand" is a negatively charged ligand which donates one or more pairs of electrons to a metal ion. A "Lewis base" is a neutrally charged ligand which donates one or more pairs of electrons to a metal ion. Examples of Lewis bases include ethylether, trimethylamine, pyridine, tetrahydrofuran, dimethylsulfide, and triphenylphosphine. The term "heterocyclic Lewis base" refers to Lewis bases that are also heterocycles. Examples of heterocyclic Lewis bases include pyridine, imidazole, thiazole, and furan. The bis(aryl phenolate) Lewis base ligands are tridentate ligands that bind to the metal via two anionic donors (phenolates) and one heterocyclic Lewis base donor (e.g., pyridinyl group). The bis(aryl phenolate)heterocycle ligands are tridentate ligands that bind to the metal via two anionic donors (phenolates) and one heterocyclic Lewis base donor.

A scavenger is a compound that can be added to facilitate polymerization by scavenging impurities. Some scavengers may also act as activators and may be referred to as coactivators. A coactivator, that is not a scavenger, may also be used in conjunction with an activator in order to form an active catalyst. In at least one embodiment, a coactivator can be pre-mixed with the transition metal compound to form an alkylated transition metal compound.

Non-coordinating anion (NCA) is defined to mean an anion either that does not coordinate to the catalyst metal cation or that does coordinate to the metal cation, but only weakly. The term NCA is also defined to include multicomponent NCA-containing activators, such as N,N-dimethylanilinium tetrakis(pentafluorophenyl)borate, that contain an acidic cationic group and the non-coordinating anion. The term NCA is also defined to include neutral Lewis acids, such as tris(pentafluorophenyl)boron, that can react with a catalyst to form an activated species by abstraction of an anionic group. A Lewis acid is defined to be a compound or element that can react with an electron donor to form a bond. An NCA coordinates weakly enough that a Lewis base, such as an olefin monomer can displace it from the catalyst center. Any metal or metalloid that can form a compatible, weakly coordinating complex may be used or contained in the non-coordinating anion. Suitable metals include, but are not limited to, aluminum, gold, and platinum. Suitable metalloids include, but are not limited to, boron, aluminum, phosphorus, and silicon.

The term "continuous" means a system that operates without interruption or cessation. For example a continuous process to produce a polymer would be one where the reactants are continually introduced into one or more reactors and polymer product is continually withdrawn.

A solution polymerization means a polymerization process in which the polymer is dissolved in a liquid polymerization medium, such as an inert solvent or monomer(s) or their blends. A solution polymerization can be homogeneous. A homogeneous polymerization is one where the polymer product is dissolved in the polymerization medium. Suitable systems may be not turbid as described in Oliveira, J. V. et al. (2000) *Ind. Eng. Chem. Res.*, 2000, v.29, p. 4627.

A bulk polymerization means a polymerization process in which the monomers and/or comonomers being polymerized are used as a solvent or diluent using little or no inert solvent as a solvent or diluent. A small fraction of inert solvent might be used as a carrier for catalyst and scavenger. A bulk polymerization system contains less than 25 wt % of inert solvent or diluent, such as less than 10 wt %, such as less than 1 wt %, such as 0 wt %.

Transition Metal Complexes

In at least one embodiment, the present disclosure relates to novel catalyst compounds having a bis(aryl phenolate) Lewis base tridentate ligand which coordinates to a group 3, 4, or 5 transition metal center, forming two eight-membered rings.

A catalyst compound can be represented by Formula (I):

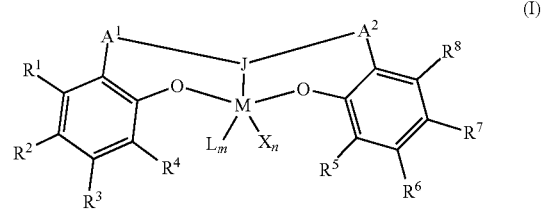

wherein:

M is a group 3, 4, or 5 metal;

$A^1$ and $A^2$ are independently an aromatic group, such as an aromatic hydrocarbyl group;

J is a heterocyclic Lewis base, preferably having six ring atoms;

L is a Lewis base;

X is an anionic ligand;

n is 1, 2 or 3;

m is 0, 1, or 2;

n+m is not greater than 4;

each of $R^1$, $R^2$, $R^3$, $R^4$, $R^5$, $R^6$, $R^7$, and $R^8$ is independently hydrogen, $C_1$-$C_{40}$ hydrocarbyl, $C_1$-$C_{40}$ substituted hydrocarbyl, or a heteroatom or a heteroatom-containing group, or one or more of $R^1$ and $R^2$, $R^2$ and $R^3$, $R^3$ and $R^4$, $R^5$ and $R^6$, $R^6$ and $R^7$, or $R^7$ and $R^8$ may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings;

any two L groups may be joined together to form a bidentate Lewis base;

an X group may be joined to an L group to form a monoanionic bidentate group; and any two X groups may be joined together to form a dianionic ligand.

In at least one embodiment, $A^1$ is represented by the formula:

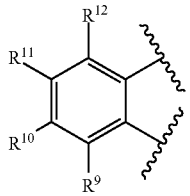

where $\zeta$ indicates a connection to the catalyst compound, and each of $R^9$, $R^{10}$, $R^{11}$, and $R^{12}$ is independently hydrogen, $C_1$-$C_{40}$ hydrocarbyl, $C_1$-$C_{40}$ substituted hydrocarbyl, a heteroatom or a heteroatom-containing group, or one or more of $R^9$ and $R^{10}$, $R^{10}$ and $R^{11}$, or $R^{11}$ and $R^{12}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms. In alternate embodiments, each of $R^9$, $R^{10}$, $R^{11}$, and $R^{12}$ is independently hydrogen or a $C_1$-$C_{40}$ hydrocarbyl.

In at least one embodiment, $A^2$ is represented by the formula:

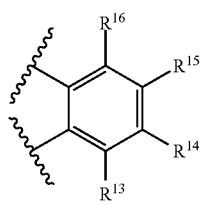

where $\zeta$ indicates a connection to the catalyst compound, and each of $R^{13}$, $R^{14}$, $R^{15}$, and $R^{16}$ is independently hydrogen, $C_1$-$C_{40}$ hydrocarbyl, $C_1$-$C_{40}$ substituted hydrocarbyl, a heteroatom or a heteroatom-containing group, or one or more of $R^{13}$ and $R^{14}$, $R^{14}$ and $R^{15}$ or $R^{15}$ and $R^{16}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms. In alternate embodiments, each of $R^{13}$, $R^{14}$, $R^{15}$, and $R^{16}$ is independently hydrogen or a $C_1$-$C_{40}$ hydrocarbyl. In alternate embodiments, $R^9$, $R^{10}$, $R^{11}$, $R^{12}$, $R^{13}$, $R^{14}$, $R^{15}$, and $R^{16}$ is independently hydrogen or a $C_1$-$C_{40}$ hydrocarbyl, such as a $C_2$ to $C_{20}$ hydrocarbyl.

In embodiments of the invention J is cyclic with 6 ring atoms one of which is a heteroatom.

In at least one embodiment, J is represented by the formula:

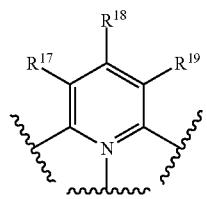

where $\zeta$ indicates a connection to the catalyst compound, and each of $R^{17}$, $R^{18}$, and $R^{19}$ is independently hydrogen, $C_1$-$C_{40}$ hydrocarbyl, $C_1$-$C_{40}$ substituted hydrocarbyl, a heteroatom or a heteroatom-containing group, or one or more of $R^{17}$ and $R^{18}$, $R^{18}$ and $R^{19}$, or $R^{17}$ and $R^{19}$ may be joined to form one or more substituted hydrocarbyl rings, unsubstituted hydrocarbyl rings, substituted heterocyclic rings, or unsubstituted heterocyclic rings each having 5, 6, 7, or 8 ring atom. For example, $R^{17}$, $R^{18}$, and $R^{19}$ can be hydrogen.

In at least one embodiment, the catalyst compound represented by Formula (I) is represented by Formula (II):

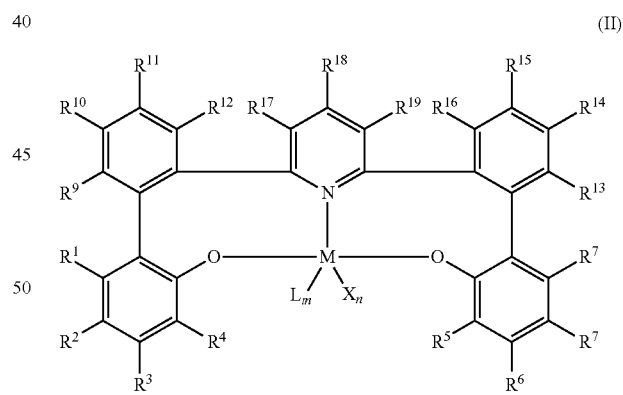

wherein:

M is a group 3, 4, or 5 metal;

L is a Lewis base;

X is an anionic ligand;

n is 1, 2, or 3;

m is 0, 1, or 2;

n+m is not greater than 4;

each of $R^1$, $R^2$, $R^3$, $R^4$, $R^5$, $R^6$, $R^7$, and $R^8$ is independently hydrogen, $C_1$-$C_{40}$ hydrocarbyl, $C_1$-$C_{40}$ substituted hydrocarbyl, a heteroatom or a heteroatom-containing group, or one or more of $R^1$ and $R^2$, $R^2$ and $R^3$, $R^3$ and $R^4$, $R^5$ and $R^6$, $R^6$ and $R^7$, or $R^7$ and $R^8$ may be joined to form one or more substituted hydrocarbyl rings, unsubstituted hydrocarbyl rings, substituted heterocyclic rings, or unsubstituted heterocyclic rings each having 5, 6, 7, or 8 ring atoms;

each of $R^9$, $R^{10}$, $R^{11}$, and $R^{12}$ is independently hydrogen, $C_1$-$C_{40}$ hydrocarbyl, $C_1$-$C_{40}$ substituted hydrocarbyl, a heteroatom or a heteroatom-containing group, or one or more of $R^9$ and $R^{10}$, $R^{10}$ and $R^{11}$, or $R^{11}$ and $R^{12}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms;

each of $R^{13}$, $R^{14}$, $R^{15}$, and $R^{16}$ is independently hydrogen, $C_1$-$C_{40}$ hydrocarbyl, $C_1$-$C_{40}$ substituted hydrocarbyl, a heteroatom or a heteroatom-containing group, or one or more of $R^{13}$ and $R^{14}$, $R^{14}$ and $R^{15}$, or $R^{15}$ and $R^{16}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms;

each of $R^{17}$, $R^{18}$, and $R^{19}$ is independently hydrogen, $C_1$-$C_{40}$ hydrocarbyl, $C_1$-$C_{40}$ substituted hydrocarbyl, a heteroatom or a heteroatom-containing group, or one or more of $R^{17}$ and $R^{18}$, $R^{18}$ and $R^{19}$, or $R^{17}$ and $R^{19}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms;

any two L groups may be joined together to form a bidentate Lewis base;

an X group may be joined to an L group to form a monoanionic bidentate group; and any two X groups may be joined together to form a dianionic ligand group.

For example, M of Formula (I) or Formula (II) can be a group 3, 4 or 5 metal, such as M can be a group 4 metal. Group 4 metals may include zirconium, titanium, and hafnium. In at least one embodiment, M is zirconium or hafnium.

Each L of Formula (I) or Formula (II) can be independently selected from ethers, amines, phosphines, thioethers, esters, $Et_2O$, MeOtBu, $Et_3N$, $PhNMe_2$, $MePh_2N$, tetrahydrofuran, and dimethylsulfide, and each X can be independently selected from methyl, benzyl, trimethylsilyl, neopentyl, ethyl, propyl, butyl, phenyl, hydrido, chloro, fluoro, bromo, iodo, trifluoromethanesulfonate, dimethylamido, diethylamido, dipropylamido, and diisopropylamido. In at least one embodiment, n of Formula (I) or Formula (II) is 2 and each X is independently chloro or methyl.

The Lewis base (J) of Formula (I) can be selected from cyclic Lewis bases. The Lewis base J is a divalent group that bridges the $A^1$ and $A^2$ groups and is coordinated to the metal center M as a neutral 2-electron donor. The Lewis base J may be an aromatic or non-aromatic heterocyclic. The Lewis base J may be a heterocyclic Lewis base having 5 or 6 ring atoms. In at least one embodiment, J is a group 15-containing heterocycle, or a group 16-containing heterocycle, such as J is a nitrogen-containing heterocycle, an oxygen-containing heterocycle, a phosphorus-containing heterocycle, or a sulfur-containing heterocycle, for example. 5-membered heterocyclic Lewis bases may include thiazoles, isothiazoles, 1,2,4-thidiazoles, 1,2,5-thidiazoles, 1,3,4-thidiazoles, thiophenes, oxazoles, isoxazoles, oxazolines (e.g., 2-oxazoline, 3-oxazoline, 4-oxazoline), oxazolidines, imidazoles, furans, thiofurans, pyrroles, pyrazoles, 1,2,3-triazoles, 1,2,4-triazoles, boroles, phospholes, azaphospholes, or isomers thereof, substituted or unsubstituted.

Each of $R^1$, $R^2$, $R^3$, $R^4$, $R^5$, $R^6$, $R^7$, $R^8$ of Formula (I) or Formula (II) can be independently selected from hydrogen, $C_1$-$C_{40}$ hydrocarbyl, $C_1$-$C_{40}$ substituted hydrocarbyl, alkoxy, silyl, amino, aryloxy, halogen, or phosphino, or one or more of $R^1$ and $R^2$, $R^2$ and $R^3$, $R^3$ and $R^4$, $R^5$ and $R^6$, $R^6$ and $R^7$, or $R^7$ and $R^8$ may be joined to form one or more substituted hydrocarbyl rings, unsubstituted hydrocarbyl rings, substituted heterocyclic rings, or unsubstituted heterocyclic rings each having 5, 6, 7, or 8 ring atoms.

In at least one embodiment, one or more of $R^1$, $R^2$, $R^3$, $R^4$, $R^5$, $R^6$, $R^7$, $R^8$ of Formula (I) or Formula (II) is independently selected from methyl, ethyl, propyl, butyl, pentyl, hexyl, heptyl, octyl, nonyl, decyl, undecyl, dodecyl, phenyl, substituted phenyl, biphenyl or an isomer thereof, which may be halogenated (such as perfluoropropyl, perfluorobutyl, perfluoroethyl, perfluoromethyl), substituted hydrocarbyl radicals and all isomers of substituted hydrocarbyl radicals including trimethylsilylpropyl, trimethylsilylmethyl, trimethylsilylethyl, phenyl, or all isomers of hydrocarbyl substituted phenyl including methylphenyl, dimethylphenyl, trimethylphenyl, tetramethylphenyl, pentamethylphenyl, diethylphenyl, triethylphenyl, propylphenyl, dipropylphenyl, tripropylphenyl, dimethylethylphenyl, dimethylpropylphenyl, dimethylbutylphenyl, or dipropylmethylphenyl.

For example, $R^4$ and $R^5$ of Formula (I) or Formula (II) can be independently $C_1$-$C_{10}$ alkyl, such as $R^4$ and $R^5$ can be tert-butyl. In at least one embodiment, $R^4$ and $R^5$ are independently selected from unsubstituted phenyl, substituted phenyl, unsubstituted carbazole, substituted carbazole, unsubstituted naphthyl, substituted naphthyl, unsubstituted anthracenyl, substituted anthracenyl, unsubstituted fluorenyl, or substituted fluorenyl, a heteroatom or a heteroatom-containing group, such as $R^4$ and $R^5$ can be independently unsubstituted phenyl or 3,5-di-tert-butylbenzyl. Furthermore, either (1) $R^4$ can be $C_1$-$C_{10}$ alkyl (e.g., $R^4$ can be tert-butyl) and $R^5$ can be an aryl, or (2) $R^5$ can be $C_1$-$C_{10}$ alkyl (e.g., $R^5$ can be tert-butyl) and $R^4$ can be an aryl. Alternately, $R^4$ and/or $R^5$ can be independently a heteroatom, such as $R^4$ and $R^5$ can be a halogen atom (such as Br, Cl, F, or I). Alternately, $R^4$ and/or $R^5$ can be independently a silyl group, such as $R^4$ and $R^5$ can be a trialkylsilyl or triarylsilyl group, where the alkyl is a $C_1$ to $C_{30}$ alkyl (such methyl, ethyl, propyl (such as n-propyl, isopropyl, cyclopropyl), butyl (such as n-butyl, isobutyl, sec-butyl, tert-butyl, cyclobutyl), pentyl (such as iso-amyl, cyclopentyl) hexyl (such as cyclohexyl), octyl (such as cyclooctyl), nonyl, decyl (such as adamantyl), undecyl, dodecyl, tridecyl, tetradecyl, pentadecyl, hexadecyl, heptadecyl, octadecyl, nonadecyl, icosyl, henicosyl, docosyl, tricosyl, tetracosyl, pentacosyl, hexacosyl, heptacosyl, octacosyl, nonacosyl, or tricontyl, and the aryl is a $C_6$ to $C_{30}$ aryl (such as phenyl, benzyl, and naphthyl). Usefully $R^4$ and $R^5$ can be triethylsilyl. The identity of $R^4$ and $R^5$ can be used to control the molecular weight of the polymer products. For example, when one or both of $R^4$ and $R^5$ are tert-butyl, the catalyst compound may provide high molecular weight polymers. In contrast, when $R^4$, $R^5$, or $R^4$ and $R^5$ are phenyl, the catalyst compound may provide low molecular weight polymers.

In at least one embodiment, each $R^2$ and $R^7$ of Formula (I) or Formula (II) is independently $C_1$-$C_{10}$ alkyl, such as $R^2$ and $R^7$ are independently methyl, ethyl, propyl, butyl, pentyl, hexyl, heptyl, octyl, nonyl, decyl, dimethyl-pentyl, tert-butyl, isopropyl, or isomers thereof.

Each of $R^1$, $R^3$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, and $R^{19}$ of Formula (II) (or Formula (I) where applicable) can be independently hydrogen or $C_1$-$C_{10}$ alkyl, such as $R^1$, $R^3$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, and $R^{19}$ can be independently hydrogen, methyl, ethyl, propyl, or isopropyl. In at least one embodiment, $R^1$, $R^3$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, and $R^{19}$ are hydrogen. Alternately, each of $R^1$, $R^3$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, and $R^{19}$ of Formula (II) (or Formula (I) where applicable) can be independently hydrogen, phenyl, cyclohexyl, fluoro, chloro, methoxy, ethoxy, phenoxy, or trimethylsilyl.

In at least one embodiment, the catalyst compound is one or more of:

1
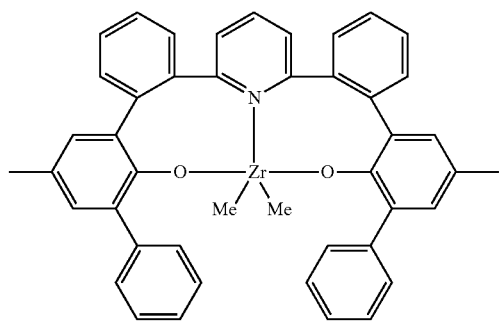

2
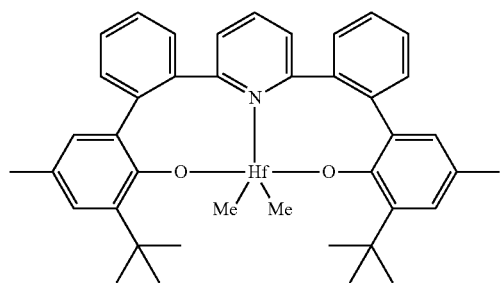

3
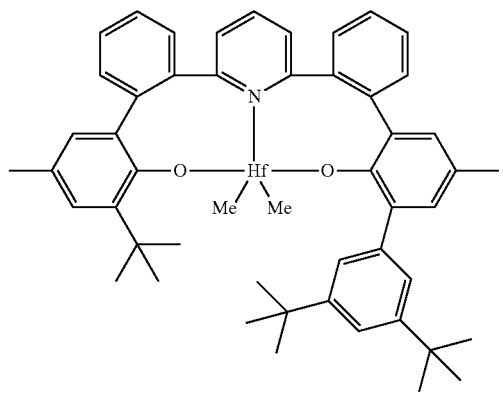

4
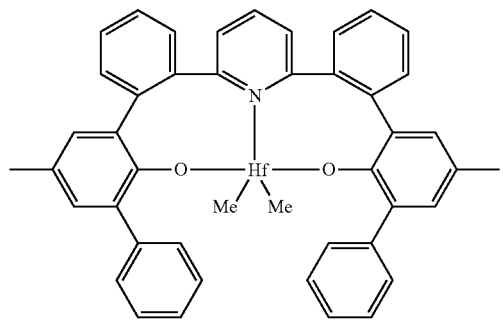

5
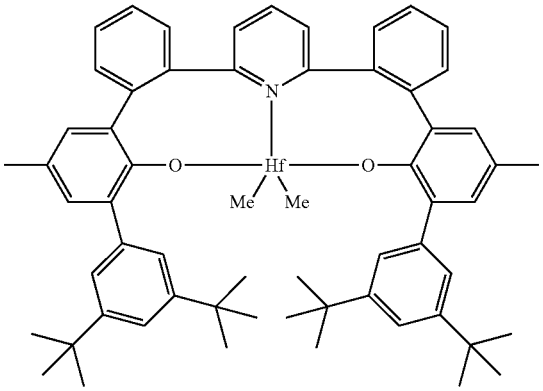

6
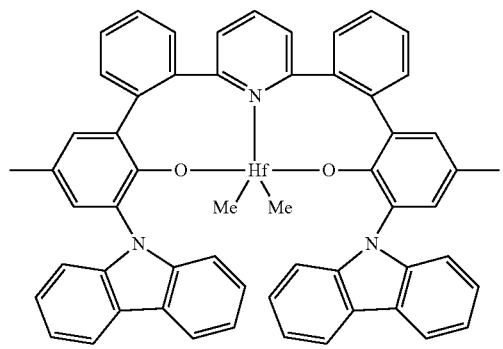

7
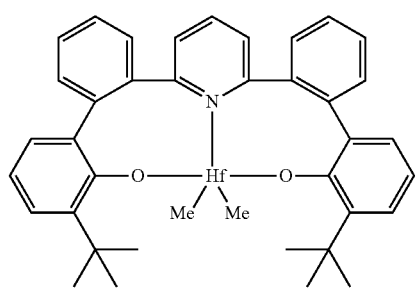

8
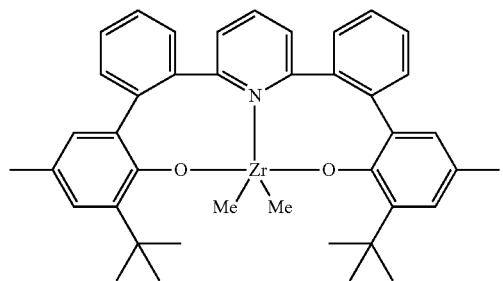

-continued
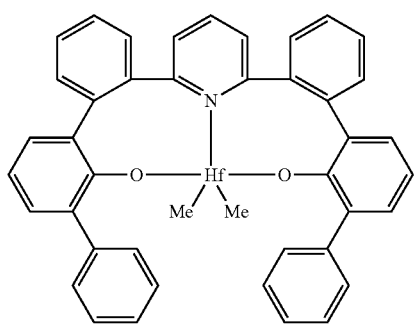
9
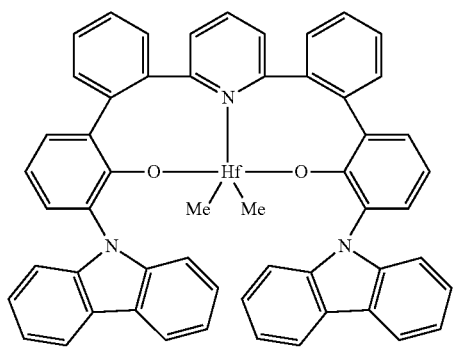
10
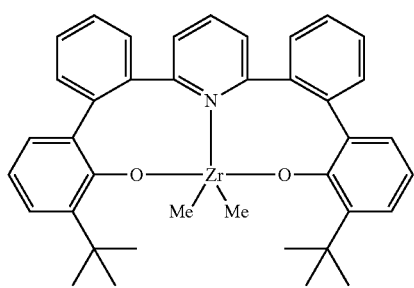
11
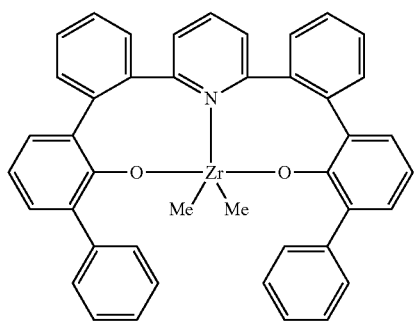
12
-continued
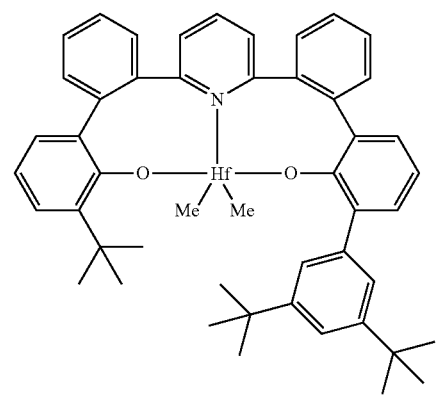
13
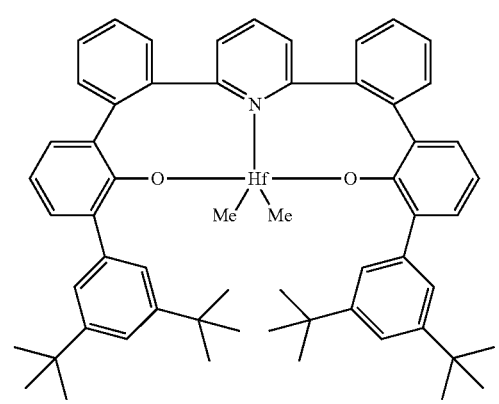
14
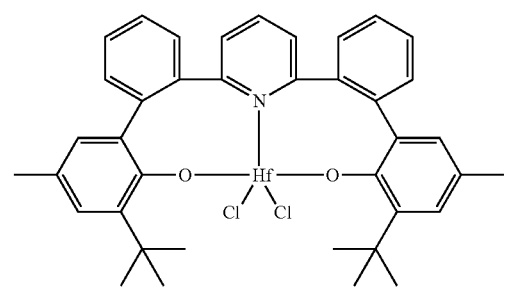
15
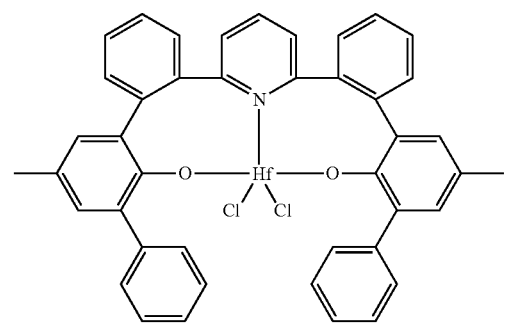
16

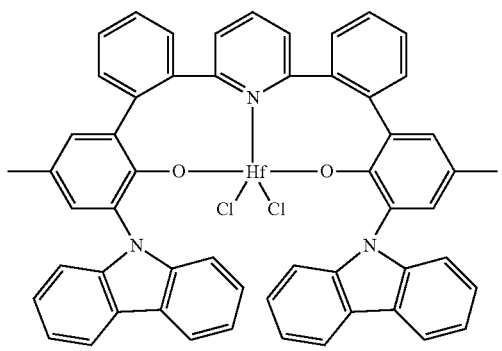
17
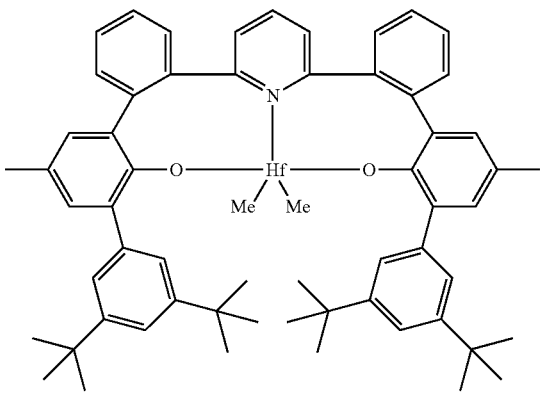
21
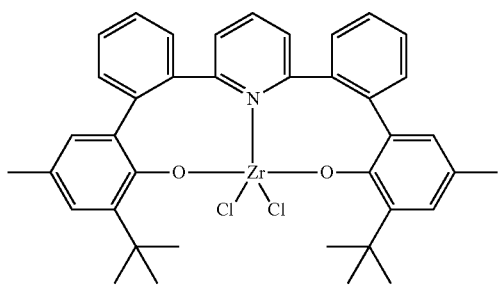
18
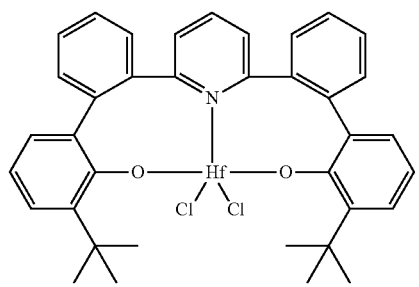
22
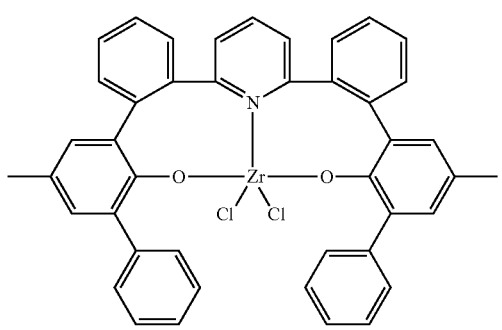
19
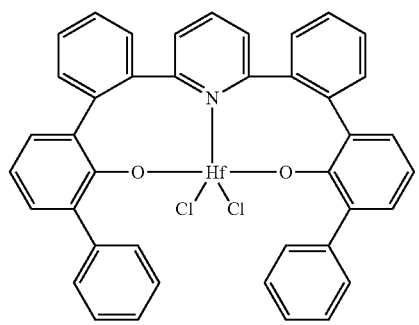
23
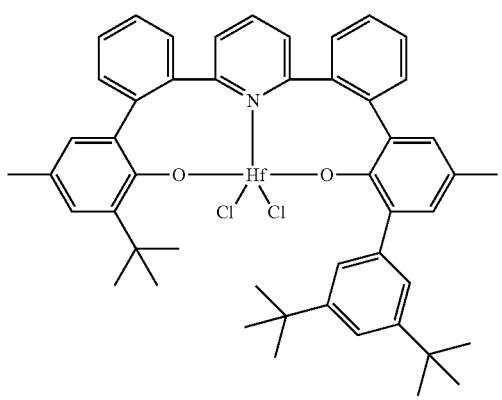
20
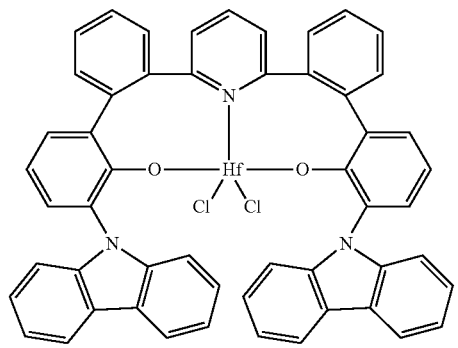
24

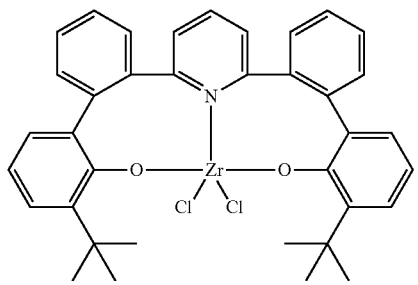

25

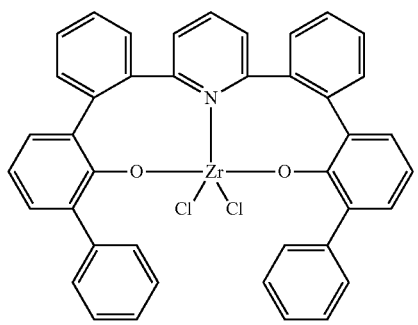

26

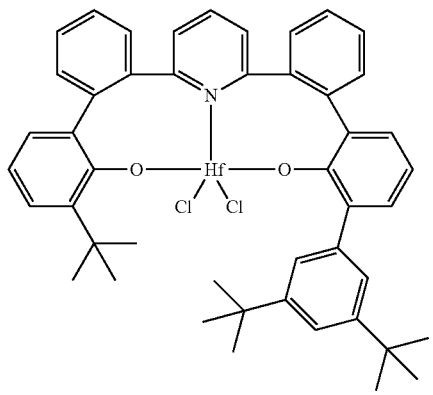

27

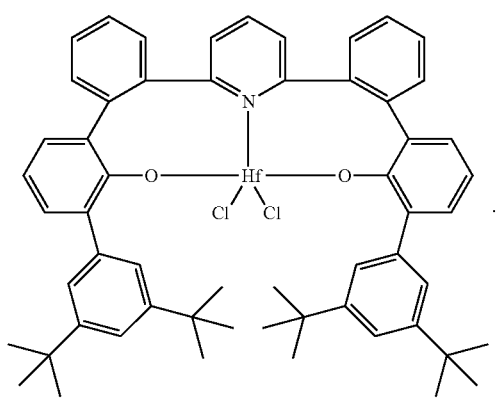

28

In at least one embodiment, the catalyst compound represented by Formula (I) is selected from:

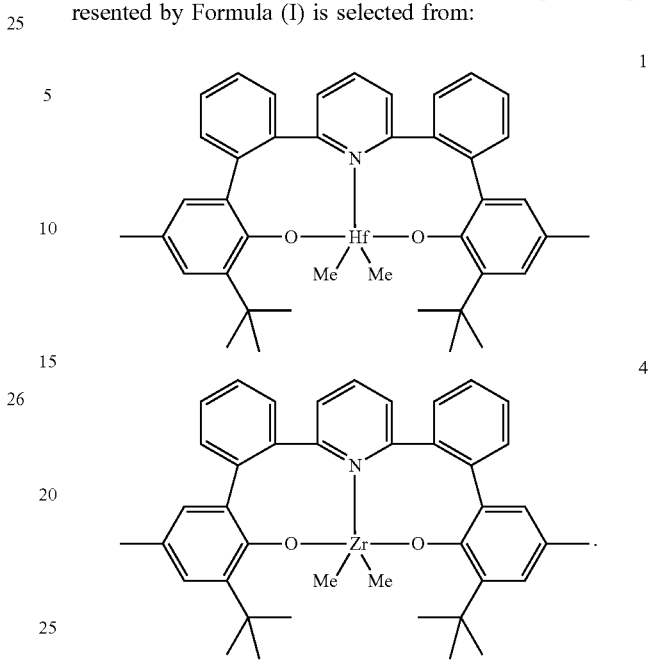

In at least one embodiment, one or more different catalyst compounds are present in a catalyst system. One or more different catalyst compounds can be present in the reaction zone where the process(es) described herein occur. The same activator can be used for the transition metal compounds, however, two different activators, such as a non-coordinating anion activator and an alumoxane, can be used in combination.

The two transition metal compounds (pre-catalysts) may be used in any ratio. Molar ratios of (A) transition metal compound to (B) transition metal compound can be a range of (A:B) of from 1:1000 to 1000:1, alternatively 1:100 to 500:1, alternatively 1:10 to 200:1, alternatively 1:1 to 100:1, alternatively 1:1 to 75:1, and alternatively 5:1 to 50:1. The particular ratio chosen will depend on the exact pre-catalysts chosen, the method of activation, and the end product desired. In at least one embodiment, when using the two pre-catalysts, where both are activated with the same activator, mole percentages, based upon the molecular weight of the pre-catalysts, can be from 10% to 99.9% A to 0.1% to 90% B, alternatively 25% to 99% A to 0.5% to 75% B, alternatively 50% to 99% A to 1% to 50% B, and alternatively 75% to 99% A to 1% to 10% B.

Activators

The terms "cocatalyst" and "activator" are used herein interchangeably.

The catalyst systems described herein may comprise a catalyst complex as described above and an activator such as alumoxane or a non-coordinating anion and may be formed by combining the catalyst components described herein with activators in any manner known from the literature including combining them with supports, such as silica. The catalyst systems may also be added to or generated in solution polymerization or bulk polymerization (in the monomer). Catalyst systems of the present disclosure may have one or more activators and one, two or more catalyst components. Activators are defined to be any compound which can activate any one of the catalyst compounds described above by converting the neutral metal compound to a catalytically active metal compound cation. Non-limiting activators, for example, may include alumoxanes, aluminum alkyls, ionizing activators, which may be neutral or ionic, and conventional-type cocatalysts. Suitable activators may include alumoxane compounds, modified alumoxane compounds, and ionizing anion precursor compounds that abstract a reactive, σ-bound, metal ligand making the metal compound cationic and providing a charge-balancing non-coordinating or weakly coordinating anion, e.g., a non-coordinating anion.

In at least one embodiment, the catalyst system includes an activator and the catalyst compound of Formula (I) or Formula (II).

Alumoxane Activators

Alumoxane activators are utilized as activators in the catalyst systems described herein. Alumoxanes are generally oligomeric compounds containing —Al($R^{a'''}$)—O— subunits, where $R^{a'''}$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. It may be suitable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under patent number U.S. Pat. No. 5,041,584, which is incorporated by reference herein). Another useful alumoxane is solid polymethylaluminoxane as described in U.S. Pat. Nos. 9,340,630, 8,404,880, and 8,975,209, which are incorporated by reference herein.

When the activator is an alumoxane (modified or unmodified), at least one embodiment select the maximum amount of activator at up to a 5,000-fold molar excess Al/M over the catalyst compound (per metal catalytic site). The minimum activator-to-catalyst-compound can be a 1:1 molar ratio. Alternate ranges may include from 1:1 to 500:1, alternately from 1:1 to 200:1, alternately from 1:1 to 100:1, or alternately from 1:1 to 50:1.

In an alternate embodiment, little or no alumoxane is used in the polymerization processes described herein. For example, alumoxane can be present at zero mol %, alternately the alumoxane can be present at a molar ratio of aluminum to catalyst compound transition metal less than 500:1, such as less than 300:1, such as less than 100:1, such as less than 1:1.

Ionizing/Non-Coordinating Anion Activators

The term "non-coordinating anion" (NCA) means an anion which either does not coordinate to a cation or which is only weakly coordinated to a cation thereby remaining sufficiently labile to be displaced by a Lewis base. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with the present disclosure are those that are compatible, stabilize the transition metal cation in the sense of balancing its ionic charge at +1, and yet retain sufficient lability to permit displacement during polymerization. Ionizing activators useful herein typically comprise an NCA, particularly a compatible NCA.

It is within the scope of the present disclosure to use an ionizing activator, neutral or ionic. It is also within the scope of the present disclosure to use neutral or ionic activators alone or in combination with alumoxane or modified alumoxane activators. For descriptions of suitable activators please see U.S. Pat. Nos. 8,658,556 and 6,211,105.

The catalyst systems of the present disclosure can include at least one non-coordinating anion (NCA) activator. In at least one embodiment, boron containing NCA activators represented by the formula below can be used:

where: Z is (L-H) or a reducible Lewis acid; L is a Lewis base; H is hydrogen; (L-H) is a Bronsted acid; $A^{d-}$ is a boron containing non-coordinating anion having the charge d−; d is 1, 2, or 3.

The cation component, $Z_d^+$ may include Bronsted acids such as protons or protonated Lewis bases or reducible Lewis acids capable of protonating or abstracting a moiety, such as an alkyl or aryl, from the bulky ligand transition metal catalyst precursor, resulting in a cationic transition metal species.

The activating cation $Z_d^+$ may also be a moiety such as silver, tropylium, carbeniums, ferroceniums and mixtures, such as carbeniums and ferroceniums. $Z_d^+$ can be triphenyl carbenium. Reducible Lewis acids can be a triaryl carbenium (where the aryl can be substituted or unsubstituted, such as those represented by the formula: ($Ar_3C^+$), where Ar is aryl or aryl substituted with a heteroatom, a $C_1$ to $C_{40}$ hydrocarbyl, or a substituted $C_1$ to $C_{40}$ hydrocarbyl), such as the reducible Lewis acids "Z" may include those represented by the formula: ($Ph_3C$), where Ph is a substituted or unsubstituted phenyl, such as substituted with $C_1$ to $C_{40}$ hydrocarbyls or substituted a $C_1$ to $C_{40}$ hydrocarbyls, such as $C_1$ to $C_{20}$ alkyls or aromatics or substituted $C_1$ to $C_{20}$ alkyls or aromatics, such as Z is a triphenylcarbenium.

When $Z_d^+$ is the activating cation $(L-H)_d^+$, it can be a Bronsted acid, capable of donating a proton to the transition metal catalytic precursor resulting in a transition metal cation, including ammoniums, oxoniums, phosphoniums, silyliums, and mixtures thereof, such as ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, dioctadecylmethylamine, phosphoniums from triethylphosphine, triphenylphosphine, and diphenylphosphine, oxoniums from ethers such as dimethyl ether diethyl ether, tetrahydrofuran and dioxane, sulfoniums from thioethers, such as diethyl thioethers, tetrahydrothiophene, and mixtures thereof.

The anion component $A^{d-}$ includes those having the formula $[M^{k+}Q_n]d^-$ where k is 1, 2, or 3; n is 1, 2, 3, 4, 5, or 6 (such as 1, 2, 3, or 4); n−k=d; M is an element selected from Group 13 of the Periodic Table of the Elements, such as boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Each Q can be a fluorinated hydrocarbyl group having 1 to 20 carbon atoms, such as each Q is a fluorinated aryl group, and such as each Q is a pentafluoryl aryl group. Examples of suitable $A^{d-}$ also include diboron compounds as disclosed in U.S. Pat. No. 5,447,895, which is fully incorporated herein by reference.

Illustrative, but not limiting, examples of boron compounds which may be used as an activating cocatalyst are the compounds described as (and particularly those specifically listed as) activators in U.S. Pat. No. 8,658,556, which is incorporated by reference herein.

The ionic activator $Z_d^+$ ($A^{d-}$) can be one or more of N,N-dimethylanilinium tetrakis(perfluorophenyl)borate, N,N-dimethylanilinium tetrakis(perfluoronaphthyl)borate, dioctadecylmethylammonium tetrakis(perfluorophenyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, or triphenylcarbenium tetra(perfluorophenyl)borate.

Alternately, the activator compounds are represented by Formula (AI):

$$[R^1R^2R^3EH]_d^+[M^{k+}Q_n]^{d-} \quad (AI)$$

wherein:

E is nitrogen or phosphorous, preferably nitrogen;

d is 1, 2 or 3 (preferably 3); k is 1, 2, or 3 (preferably 3); n is 1, 2, 3, 4, 5, or 6 (preferably 4, 5, or 6); n–k=d (preferably d is 1, 2 or 3; k is 3; n is 4, 5, or 6, preferably when M is B, n is 4);

each of $R^1$, $R^2$, and $R^3$ is independently H, optionally substituted $C_1$-$C_{40}$ alkyl (such as branched or linear alkyl), or optionally substituted $C_5$-$C_{50}$-aryl (alternately each of $R^1$, $R^2$, and $R^3$ is independently unsubstituted or substituted with at least one of halide, $C_5$-$C_{50}$ aryl, $C_6$-$C_{35}$ arylalkyl, $C_6$-$C_{35}$ alkylaryl and, in the case of the $C_5$-$C_{50}$-aryl, $C_1$-$C_{50}$ alkyl); wherein $R^1$, $R^2$, and $R^3$ together comprise 15 or more carbon atoms (such as 18 or more carbon atoms, such as 20 or more carbon atoms, such as 22 or more carbon atoms, such as 25 or more carbon atoms, such as 30 or more carbon atoms, such as 35 or more carbon atoms, such as 37 or more carbon atoms, such as 40 or more carbon atoms, such as 45 or more carbon atoms), preferably at least one of $R^1$, $R^2$, and $R^3$ is a $C_3$ to $C_{40}$ hydrocarbyl, (such as a $C_3$-$C_{40}$ alkyl, alternately such as a $C_7$ to $C_{40}$ alkyl);

M is an element selected from group 13 of the Periodic Table of the Elements, preferably B or Al, preferably B; and each Q is independently a hydride, bridged or unbridged dialkylamido, halide, alkoxide, aryloxide, hydrocarbyl, substituted hydrocarbyl, halocarbyl, substituted halocarbyl, or halosubstituted-hydrocarbyl radical, preferably a fluorinated aryl group, such fluoro-phenyl or fluoro-naphthyl, more preferably perfluorophenyl or perfluoronaphthyl.

In any embodiment of Formula (AI), each of $R^1$, $R^2$ and $R^3$ may independently be selected from:

1) optionally substituted linear alkyls (such as methyl, ethyl, n-propyl, n-butyl, n-pentyl, n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-icosyl, n-henicosyl, n-docosyl, n-tricosyl, n-tetracosyl, n-pentacosyl, n-hexacosyl, n-heptacosyl, n-octacosyl, n-nonacosyl, or n-tricontyl);

2) optionally substituted branched alkyls (such as alkyl-butyl, alkyl-pentyl, alkyl-hexyl, alkyl-heptyl, alkyl-octyl, alkyl-nonyl, alkyl-decyl, alkyl-undecyl, alkyl-dodecyl, alkyl-tridecyl, alkyl-butadecyl, alkyl-pentadecyl, alkyl-hexadecyl, alkyl-heptadecyl, alkyl-octadecyl, alkyl-nonadecyl, alkyl-icosyl (including multi-alkyl analogs, i.e, dialkyl-butyl, dialkyl-pentyl, dialkyl-hexyl, dialkyl-heptyl, dialkyl-octyl, dialkyl-nonyl, dialkyl-decyl, dialkyl-undecyl, dialkyl-dodecyl, dialkyl-tridecyl, dialkyl-butadecyl, dialkyl-pentadecyl, dialkyl-hexadecyl, dialkyl-heptadecyl, dialkyl-octadecyl, dialkyl-nonadecyl, dialkyl-icosyl, trialkyl-butyl, trialkyl-pentyl, trialkyl-hexyl, trialkyl-heptyl, trialkyl-octyl, trialkyl-nonyl, trialkyl-decyl, trialkyl-undecyl, trialkyl-dodecyl, trialkyl-tridecyl, trialkyl-butadecyl, trialkyl-pentadecyl, trialkyl-hexadecyl, trialkyl-heptadecyl, trialkyl-octadecyl, trialkyl-nonadecyl, and trialkyl-icosyl, etc.), and isomers thereof wherein each alkyl group is independently a $C_1$ to $C_{40}$, (alternately $C_2$ to $C_{30}$, alterntely $C_3$ to $C_{20}$) linear, branched or cyclic alkyl group), preferably the alkyl group is methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, icosyl, henicosyl, docosyl, tricosyl, tetracosyl, pentacosyl, hexacosyl, heptacosyl, octacosyl, nonacosyl, or tricontyl);

3) optionally substituted arylalkyls, such as (methylphenyl, ethylphenyl, propylphenyl, butylphenyl, pentylphenyl, hexylphenyl, heptylphenyl, octylphenyl, nonylphenyl, decylphenyl, undecylphenyl, dodecylphenyl, tridecylphenyl, tetradecylphenyl, pentadecylphenyl, hexadecylphenyl, heptadecylphenyl, octadecylphenyl, nonadecylphenyl, icosylphenyl, henicosylphenyl, docosylphenyl, tricosylphenyl, tetracosylphenyl, pentacosylphenyl, hexacosylphenyl, heptacosylphenyl, octacosylphenyl, nonacosylphenyl, tricontylphenyl, 3,5,5-trimethylhexylphenyl, dioctylphenyl, 3,3,5-trimethylhexylphenyl, 2,2,3,3,4 pentamethypentylylphenyl, and the like);

4) optionally substituted silyl groups, such as a trialkylsilyl group, where each alkyl is independently an optionally substituted $C_1$ to $C_{20}$ alkyl (such as trimethylsilyl, triethylsilyl, tripropylsilyl, tributylsilyl, trihexylsilyl, triheptylsilyl, trioctylsilyl, trinonylsilyl, tridecylsilyl, triundecylsilyl, tridodecylsilyl, tri-tridecylsilyl, tri-tetradecylsilyl, tri-pentadecylsilyl, tri-hexadecylsilyl, tri-heptadecylsilyl, tri-octadecylsilyl, tri-nonadecylsilyl, tri-icosylsilyl);

5) optionally substituted alkoxy groups (such as —OR*, where R* is an optionally substituted $C_1$ to $C_{20}$ alkyl or aryl (such as methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, icosyl, phenyl, alkylphenyl (such as methyl phenyl, propyl phenyl, etc.), naphthyl, or anthracenyl);

6) halogens (such as Br or Cl); and 7) halogen containing groups (such as bromomethyl, bromophenyl, and the like).

For more information on activators represented by Formula (IA) that are useful herein please see US2019-0330139 and US2019-0330392, which are incorporated by reference herein. Useful activators include N-methyl-4-nonadecyl-N-octadecylanilinium tetrakis(perfluoronaphthalen-2-yl)borate, and N-methyl-4-nonadecyl-N-octadecylanilinium tetrakis(perfluorophenyl)borate.

Bulky activators are also useful herein as NCAs. "Bulky activator" as used herein refers to anionic activators represented by the formula:

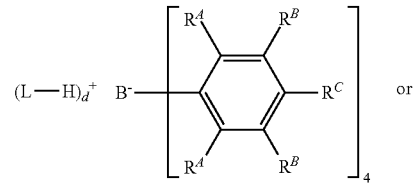

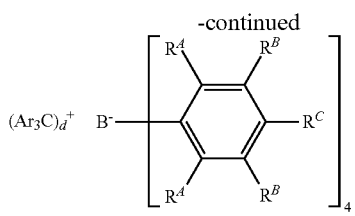

where:

each $R^A$ is independently a halide, such as a fluoride;

Ar is substituted or unsubstituted aryl group (such as a substituted or unsubstituted phenyl), such as substituted with $C_1$ to $C_{40}$ hydrocarbyls, such as $C_1$ to $C_{20}$ alkyls or aromatics;

each $R^B$ is independently a halide, a $C_6$ to $C_{20}$ substituted aromatic hydrocarbyl group or a siloxy group of the formula —O—Si—$R^D$, where $R^D$ is a $C_1$ to $C_{20}$ hydrocarbyl or hydrocarbylsilyl group (such as $R^B$ is a fluoride or a perfluorinated phenyl group);

each $R^C$ is a halide, $C_6$ to $C_{20}$ substituted aromatic hydrocarbyl group or a siloxy group of the formula —O—Si—$R^D$, where $R^D$ is a $C_1$ to $C_{20}$ hydrocarbyl or hydrocarbylsilyl group (such as $R^D$ is a fluoride or a $C_6$ perfluorinated aromatic hydrocarbyl group); where $R^B$ and $R^C$ can form one or more saturated or unsaturated, substituted or unsubstituted rings (such as $R^B$ and $R^C$ form a perfluorinated phenyl ring);

L is a Lewis base; $(L-H)^+$ is a Bronsted acid; d is 1, 2, or 3;

where the anion has a molecular weight of greater than 1,020 g/mol; and where at least three of the substituents on the B atom each have a molecular volume of greater than 250 cubic Å, alternately greater than 300 cubic Å, or alternately greater than 500 cubic Å.

For example, $(Ar_3C)_d^+$ can be $(Ph_3C)_d^+$, where Ph is a substituted or unsubstituted phenyl, such as substituted with $C_1$ to $C_{40}$ hydrocarbyls or substituted $C_1$ to $C_{40}$ hydrocarbyls, such as $C_1$ to $C_{20}$ alkyls or aromatics or substituted $C_1$ to $C_{20}$ alkyls or aromatics.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple "Back of the Envelope" Method for Estimating the Densities and Molecular Volumes of Liquids and Solids," *Journal of Chemical Education*, v.71(11), November 1994, pp. 962-964, which is incorporated by reference herein. Molecular volume (MV), in units of cubic Å, is calculated using the formula: $MV=8.3V_s$, where $V_s$ is the scaled volume. $V_s$ is the sum of the relative volumes of the constituent atoms, and is calculated from the molecular formula of the substituent using the following table of relative volumes. For fused rings, the $V_s$ is decreased by 7.5% per fused ring.

| Element | Relative Volume |
|---|---|
| H | 1 |
| 1st short period, Li to F | 2 |
| 2nd short period, Na to Cl | 4 |
| 1st long period, K to Br | 5 |
| 2nd long period, Rb to I | 7.5 |
| 3rd long period, Cs to Bi | 9 |

For a list of suitable bulky activators please see U.S. Pat. No. 8,658,556, which is incorporated by reference herein.

In another embodiment, one or more of the NCA activators is chosen from the activators described in U.S. Pat. No. 6,211,105.

In a preferred embodiment, the activator is selected from one or more of a triaryl carbenium (such as triphenylcarbenium tetraphenylborate, triphenylcarbenium tetrakis(pentafluorophenyl)borate, triphenylcarbenium tetrakis-(2,3,4,6-tetrafluorophenyl)borate, triphenylcarbenium tetrakis (perfluoronaphthyl)borate, triphenylcarbenium tetrakis (perfluorobiphenyl)borate, triphenylcarbenium tetrakis(3,5-bis(trifluoromethyl)phenyl)borate).

In another embodiment, the activator is selected from one or more of trialkylammonium tetrakis(pentafluorophenyl) borate, N,N-dialkylanilinium tetrakis(pentafluorophenyl) borate, dioctadecylmethylammonium tetrakis(pentafluorophenyl)borate, dioctadecylmethylammonium tetrakis (perfluoronaphthyl)borate, N,N-dimethyl-(2,4,6-trimethylanilinium)tetrakis(pentafluorophenyl)borate, trialkylammonium tetrakis-(2,3,4,6-tetrafluorophenyl) borate, N,N-dialkylanilinium tetrakis-(2,3,4,6-tetrafluorophenyl)borate, trialkylammonium tetrakis(perfluoronaphthyl)borate, N,N-dialkylanilinium tetrakis(perfluoronaphthyl) borate, trialkylammonium tetrakis(perfluorobiphenyl) borate, N,N-dialkylanilinium tetrakis(perfluorobiphenyl) borate, trialkylammonium tetrakis(3,5-bis(trifluoromethyl) phenyl)borate, N,N-dialkylanilinium tetrakis(3,5-bis (trifluoromethyl)phenyl)borate, N,N-dialkyl-(2,4,6-trimethylanilinium) tetrakis(3,5-bis(trifluoromethyl)phenyl) borate, di-(i-propyl)ammonium tetrakis(pentafluorophenyl) borate, (where alkyl is methyl, ethyl, propyl, n-butyl, sec-butyl, or t-butyl).

Suitable activator-to-catalyst ratio, e.g., all NCA activators-to-catalyst ratio may be about a 1:1 molar ratio. Alternate ranges include from 0.1:1 to 100:1, alternately from 0.5:1 to 200:1, alternately from 1:1 to 500:1, alternately from 1:1 to 1000:1. A particularly useful range is from 0.5:1 to 10:1, such as 1:1 to 5:1.

It is also within the scope of the present disclosure that the catalyst compounds can be combined with combinations of alumoxanes and NCA's (see for example, U.S. Pat. Nos. 5,153,157; 5,453,410; EP 0 573 120 B1; WO 1994/007928; and WO 1995/014044 which discuss the use of an alumoxane in combination with an ionizing activator).

Useful chain transfer agents can be hydrogen, alkylalumoxanes, a compound represented by the formula $AlR_3$, $ZnR_2$ (where each R is, independently, a $C_1$-$C_8$ aliphatic radical, such as methyl, ethyl, propyl, butyl, pentyl, hexyl octyl or an isomer thereof) or a combination thereof, such as diethyl zinc, methylalumoxane, trimethylaluminum, triisobutylaluminum, trioctylaluminum, or a combination thereof.

Furthermore, a catalyst system of the present disclosure may include a metal hydrocarbenyl chain transfer agent represented by the formula:

$$Al(R')_{3-v}(R'')_v$$

where each R' can be independently a $C_1$-$C_{30}$ hydrocarbyl group, and/or each R", can be independently a $C_4$-$C_{20}$ hydrocarbenyl group having an end-vinyl group; and v can be from 0.1 to 3.

In embodiments of the invention, the activators described herein have a solubility of more than 10 mM (or more than 20 mM, or more than 50 mM) at 25° C. (stirred 2 hours) in methylcyclohexane and/or a solubility of more than 1 mM (or more than 10 mM, or more than 20 mM) at 25° C. (stirred 2 hours) in isohexane.

The present disclosure relates to a catalyst system comprising a metallocene transition metal compound and an activator compound represented by Formula (IA), to the use of such activator compounds for activating a transition metal compound in a catalyst system for polymerizing olefins, and to processes for polymerizing olefins, the process comprising contacting under polymerization conditions one or more olefins with a catalyst system comprising a metallocene transition metal compound and such activator compounds, where aromatic solvents, such as toluene, are absent (e.g. present at zero mol %, alternately present at less than 1 mol %, preferably the catalyst system, the polymerization reaction and/or the polymer produced are free of detectable aromatic hydrocarbon solvent, such as toluene.

The polyalpha-olefins produced herein preferably contain 0 ppm (alternately less than 1 ppm, alternately less than 5 ppm, alternately less than 10 ppm) of aromatic hydrocarbon. Preferably, the polyalpha-olefins produced herein contain 0 ppm (alternately less than 1 ppm, alternately less than 5 ppm, alternately less than 10 ppm) of toluene.

The catalyst systems used herein preferably contain 0 ppm (alternately less than 1 ppm, alternately less than 5 ppm, alternately less than 10 ppm) of aromatic hydrocarbon. Preferably, the catalyst systems used herein contain 0 ppm (alternately less than 1 ppm, alternately less than 5 ppm, alternately less than 10 ppm) of toluene.

Optional Scavengers or Coactivators

In addition to these activator compounds, scavengers or coactivators may be used. Aluminum alkyl or alumoxane compounds which may be utilized as scavengers or coactivators may include, for example, trimethylaluminum, triethylaluminum, triisobutylaluminum, tri-n-hexylaluminum, tri-n-octylaluminum, diisobutylaluminum hydride, methylalumoxane (MAO), modified methylalumoxane (MMAO), MMAO-3A, and diethyl zinc.

Optional Support Materials

In embodiments herein, the catalyst system may include an inert support material. The supported material can be a porous support material, for example, talc, and inorganic oxides. Other support materials include zeolites, clays, organoclays, or another organic or inorganic support material, or mixtures thereof.

The support material can be an inorganic oxide in a finely divided form. Suitable inorganic oxide materials for use in catalyst systems herein may include groups 2, 4, 13, and 14 metal oxides, such as silica, alumina, and mixtures thereof. Other inorganic oxides that may be employed either alone or in combination with the silica, or alumina can be magnesia, titania, zirconia. Other suitable support materials, however, can be employed, for example, finely divided functionalized polyolefins, such as finely divided polyethylene. Examples of suitable supports may include magnesia, titania, zirconia, montmorillonite, phyllosilicate, zeolites, talc, clays. Also, combinations of these support materials may be used, for example, silica-chromium, silica-alumina, silica-titania. In at least one embodiment, the support material is selected from $Al_2O_3$, $ZrO_2$, $SiO_2$, $SiO_2/Al_2O_3$, $SiO_2/TiO_2$, silica clay, silicon oxide/clay, or mixtures thereof.

The support material, such as an inorganic oxide, can have a surface area in the range of from about 10 $m^2/g$ to about 700 $m^2/g$, pore volume in the range of from about 0.1 $cm^3/g$ to about 4.0 $cm^3/g$ and average particle size in the range of from about 5 μm to about 500 μm. The surface area of the support material can be in the range of from about 50 $m^2/g$ to about 500 $m^2/g$, pore volume of from about 0.5 $cm^3/g$ to about 3.5 $cm^3/g$ and average particle size of from about 10 μm to about 200 μm. For example, the surface area of the support material is in the range is from about 100 $m^2/g$ to about 400 $m^2/g$, pore volume from about 0.8 $cm^3/g$ to about 3.0 $cm^3/g$ and average particle size is from about 5 μm to about 100 μm. The average pore size of the support material useful in the present disclosure is in the range of from 10 Å to 1000 Å, such as 50 Å to about 500 Å, and such as 75 Å to about 350 Å. In at least one embodiment, the support material is a high surface area, amorphous silica (surface area=300 $m^2/gm$; pore volume of 1.65 $cm^3/gm$). For example, suitable silicas can be the silicas marketed under the tradenames of DAVISON™ 952 or DAVISON™ 955 by the Davison Chemical Division of W.R. Grace and Company. In other embodiments, DAVISON™ 948 is used. Alternatively, a silica can be ES70™ silica (PQ Corporation, Malvern, Pa.) that has been calcined, for example (such as at 875° C.).

The support material should be dry, that is, free of absorbed water. Drying of the support material can be effected by heating or calcining at about 100° C. to about 1,000° C., such as at least about 600° C. When the support material is silica, it is heated to at least 200° C., such as about 200° C. to about 850° C., and such as at about 600° C.; and for a time of about 1 minute to about 100 hours, from about 12 hours to about 72 hours, or from about 24 hours to about 60 hours. The calcined support material must have at least some reactive hydroxyl (OH) groups to produce supported catalyst systems of the present disclosure. The calcined support material is then contacted with at least one polymerization catalyst comprising at least one catalyst compound and an activator.

The support material, having reactive surface groups, such as hydroxyl groups, is slurried in a non-polar solvent and the resulting slurry is contacted with a solution of a catalyst compound and an activator. In at least one embodiment, the slurry of the support material is first contacted with the activator for a period of time in the range of from about 0.5 hour to about 24 hours, from about 2 hours to about 16 hours, or from about 4 hours to about 8 hours. The solution of the catalyst compound is then contacted with the isolated support/activator. In at least one embodiment, the supported catalyst system is generated in situ. In alternate embodiment, the slurry of the support material is first contacted with the catalyst compound for a period of time in the range of from about 0.5 hour to about 24 hours, from about 2 hours to about 16 hours, or from about 4 hours to about 8 hours. The slurry of the supported catalyst compound is then contacted with the activator solution.

The mixture of the catalyst, activator and support is heated from about 0° C. to about 70° C., such as from about 23° C. to about 60° C., such as at room temperature. Contact times can be from about 0.5 hours to about 24 hours, such as from about 2 hours to about 16 hours, or from about 4 hours to about 8 hours.

Suitable non-polar solvents are materials in which all of the reactants used herein, e.g., the activator and the catalyst compound, are at least partially soluble and which are liquid at reaction temperatures. Non-polar solvents can be alkanes, such as isopentane, hexane, n-heptane, octane, nonane, and decane, although a variety of other materials including cycloalkanes, such as cyclohexane, aromatics, such as benzene, toluene, and ethylbenzene, may also be employed.

Polymerization Processes

The present disclosure relates to polymerization processes where monomer (e.g., ethylene; propylene), and optionally comonomer, are contacted with a catalyst system including an activator and at least one catalyst compound, as described above. The catalyst compound and activator may be combined in any order. The catalyst compound and activator may be combined prior to contacting with the monomer. Alternatively the catalyst compound and activator may be introduced into the polymerization reactor separately, wherein they subsequently react to form the active catalyst.

Monomers include substituted or unsubstituted $C_2$ to $C_{40}$ alpha olefins, such as $C_2$ to $C_{20}$ alpha olefins, such as $C_2$ to $C_{12}$ alpha olefins, such as ethylene, propylene, butene, pentene, hexene, heptene, octene, nonene, decene, undecene, dodecene and isomers thereof. In at least one embodiment, the monomer includes ethylene and an optional comonomer comprising one or more $C_3$ to $C_{40}$ olefins, such as $C_4$ to $C_{20}$ olefins, such as $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups. In another embodiment, the monomer includes propylene and an optional comonomer comprising one or more ethylene or $C_4$ to $C_{40}$ olefins, such as $C_4$ to $C_{20}$ olefins, such as $C_6$ to $C_{12}$ olefins. The $C_4$ to $C_{40}$ olefin monomers may be linear, branched, or cyclic. The $C_4$ to $C_{20}$ cyclic olefins may be strained or unstrained, monocyclic or polycyclic, and may optionally include heteroatoms and/or one or more functional groups.

Exemplary $C_2$ to $C_{40}$ olefin monomers and optional comonomers may include ethylene, propylene, butene, pentene, hexene, heptene, octene, nonene, decene, undecene, dodecene, norbornene, ethylidenenorbornene, vinylnorbornene, norbomadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, such as hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbomadiene, and their respective homologs and derivatives, such as norbornene, norbomadiene, and dicyclopentadiene.

Polymerization processes of the present disclosure can be carried out in any suitable manner. Any suitable suspension, homogeneous, bulk, solution, slurry, or gas phase polymerization process can be used. Such processes can be run in a batch, semi-batch, or continuous mode. Homogeneous polymerization processes and slurry processes can be used. A bulk homogeneous process can be used. Alternately, no solvent or diluent is present or added in the reaction medium, (except for the small amounts used as the carrier for the catalyst system or other additives, or amounts found with the monomer; e.g., propane in propylene). In another embodiment, the process is a slurry process. As used herein, the term "slurry polymerization process" means a polymerization process performed in a hydrocarbon solvent where a supported catalyst is employed and monomers are polymerized on the supported catalyst particles at a temperature that is below the melting point of the polymer produced. At least 95 wt % of polymer products derived from the supported catalyst are in granular form as solid particles (not dissolved in the diluent).

Suitable diluents/solvents for polymerization may include non-coordinating, inert liquids. Examples of diluents/solvents for polymerization may include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_4$ to $C_{10}$ alkanes, chlorobenzene, and aromatic and alkylsubstituted aromatic compounds, such as benzene, toluene, mesitylene, and xylene. Suitable solvents may also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In at least one embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, such as aromatics are present in the solvent at less than 1 wt %, such as less than 0.5 wt %, such as less than 0 wt % based upon the weight of the solvents.

In at least one embodiment, the feed concentration of the monomers and comonomers for the polymerization is 60 vol % solvent or less, such as 40 vol % or less, such as 20 vol % or less, based on the total volume of the feedstream. In at least one embodiment, the polymerization is run in a bulk process.

Polymerizations can be run at any temperature and/or pressure suitable to obtain the desired polymers. Typical temperatures and/or pressures include a temperature in the range of from about 0° C. to about 300° C., such as about 20° C. to about 200° C., such as about 35° C. to about 160° C., such as from about 80° C. to about 160° C., such as from about 90° C. to about 140° C.; and at a pressure in the range of from about 0.1 MPa to about 25 MPa, such as from about 0.45 MPa to about 6 MPa, or from about 0.5 MPa to about 4 MPa.

In a suitable polymerization, the run time of the reaction is up to 300 minutes, such as from about 5 minutes to 250 minutes, such as from about 10 minutes to 120 minutes, such as from about 20 minutes to 90 minutes, such as from about 30 minutes to 60 minutes. In a continuous process the run time may be the average residence time of the reactor.

In at least one embodiment, hydrogen is present in the polymerization reactor at a partial pressure of 0.001 psig to 50 psig (0.007 kPa to 345 kPa), such as from 0.01 psig to 25 psig (0.07 kPa to 172 kPa), such as from 0.1 psig to 10 psig (0.7 kPa to 70 kPa).

In at least one embodiment, little or no alumoxane is used in the process to produce the polymers. For example, alumoxane can be present at zero mol %, alternately the alumoxane can be present at a molar ratio of aluminum to transition metal less than 500:1, such as less than 300:1, such as less than 100:1, such as less than 1:1.

In at least one embodiment, the polymerization: 1) is conducted at temperatures of 0° C. to 300° C. (such as 25° C. to 250° C., such as 80° C. to 160° C., such as 100° C. to 140° C.); 2) is conducted at a pressure of atmospheric pressure to 10 MPa (such as 0.35 MPa to 10 MPa, such as from 0.45 MPa to 6 MPa, such as from 0.5 MPa to 4 MPa); 3) is conducted in an aliphatic hydrocarbon solvent (such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof; such as where aromatics are present in the solvent at less than 1 wt %, such as less than 0.5 wt %, such as at 0 wt % based upon the weight of the solvents); 4) wherein the catalyst system used in the polymerization comprises less than 0.5 mol %, such as 0 mol % alumoxane, alternately the alumoxane is present at a molar ratio of aluminum to transition metal less than 500:1, such as less than 300:1, such as less than 100:1, such as less than 1:1; 5) the polymerization occurs in one reaction zone; 6) optionally scavengers (such as trialkyl aluminum compounds) are absent (e.g., present at zero mol %, alternately the scavenger is present at a molar ratio of scavenger metal to transition metal of less than 100:1, such as less than 50:1, such as less than 15:1, such as less than 10:1); and 7) optionally hydrogen is present in the polymerization reactor at a partial pressure of 0.001 psig to 50 psig (0.007 kPa to 345 kPa) (such as from 0.01 psig to 25 psig (0.07 kPa to 172 kPa), such as 0.1 psig to 10 psig (0.7 kPa to 70 kPa)). In at least one embodiment, the catalyst system used in the polymerization includes no more than one catalyst compound. A "reaction zone" also referred to as a "polymerization zone" is a vessel where polymerization takes place, for example a stirred-tank reactor or a loop reactor. When multiple reactors are used in a continuous polymerization process, each reactor is considered as a separate polymerization zone. For a multi-stage polymerization in a batch polymerization process, each polymerization stage is considered as a separate polymerization zone. In at least one embodiment, the polymerization occurs in one reaction zone. Room temperature is 23° C. unless otherwise noted.

In at least one embodiment, the present disclosure provides a process for the production of an ethylene based polymer comprising: polymerizing ethylene by contacting the ethylene with the catalyst system of the present disclosure described above in one or more continuous stirred tank reactors or loop reactors, in series or in parallel, at a reactor pressure of from 0.05 MPa to 1,500 MPa and a reactor temperature of from 30° C. to 230° C. to form an ethylene based polymer. In at least one embodiment, hydrogen is present in the polymerization reactor at a partial pressure of from about 5 psig to about 300 psig, such as from about 10 psig to about 250 psig, such as from about 30 psig to about 200 psig, such as from about 20 psig to about 150 psig, such as from about 50 psig to about 100 psig (e.g., 75 psig). In at least one embodiment, the activity of the catalyst is at least 5,000 gP·mmolcat$^{-1}$·h$^{-1}$, such as from about 5,000 gP·mmolcat$^{-1}$·h$^{-1}$ to 1,000,000 gP·mmolcat$^{-1}$·h$^{-1}$, such as from about 7,500 gP·mmolcat$^{-1}$·h$^{-1}$ to 900,000 gP·mmolcat$^{-1}$·h$^{-1}$, such as from about 10,000 gP·mmolcat$^{-1}$·h$^{-1}$ to 750,000 gP·mmolcat$^{-1}$·h$^{-1}$, such as from about 12,500 gP·mmolcat$^{-1}$·h$^{-1}$ to 600,000 gP·mmolcat$^{-1}$·h$^{-1}$.

In another embodiment, the present disclosure provides a process for the production of propylene based polymer comprising: polymerizing propylene by contacting the propylene with the catalyst system of the present disclosure described above in one or more continuous stirred tank reactors or loop reactors, in series or in parallel, at a reactor pressure of from 0.5 MPa to 1,500 MPa and a reactor temperature of from 30° C. to 230° C. to form a propylene based polymer. In at least one embodiment, hydrogen is present in the polymerization reactor at a partial pressure of from about 10 psig to about 300 psig, such as from about 20 psig to about 250 psig, such as from about 30 psig to about 200 psig, such as from about 40 psig to about 150 psig, such as from about 50 psig to about 100 psig (e.g., 75 psig). In at least one embodiment, the activity of the catalyst is at least 100 gP·mmolcat$^{-1}$·h$^{-1}$, such as from 100 gP·mmolcat$^{-1}$·h$^{-1}$ to 6,000,000 gP·mmolcat$^{-1}$·h$^{-1}$, such as from 200 gP·mmolcat$^{-1}$·h$^{-1}$ to 5,000,000 gP·mmolcat$^{-1}$·h$^{-1}$, alternatively from 300 gP·mmolcat$^{-1}$·h$^{-1}$ to 1,500,000 gP·mmolcat$^{-1}$·h$^{-1}$.

In another embodiment, the present disclosure provides a process for the production of an ethylene alpha-olefin copolymer comprising: polymerizing ethylene and at least one $C_3$-$C_{20}$ alpha-olefin by contacting the ethylene and the at least one $C_3$-$C_{20}$ alpha-olefin with a catalyst system described above in one or more continuous stirred tank reactors or loop reactors, in series or in parallel, at a reactor pressure of from 0.05 MPa to 1,500 MPa and a reactor temperature of from 30° C. to 230° C. to form an ethylene alpha-olefin copolymer. In at least one embodiment, hydrogen is present in the polymerization reactor at a partial pressure of from about 10 psig to about 300 psig, such as from about 20 psig to about 250 psig, such as from about 30 psig to about 200 psig, such as from about 40 psig to about 150 psig, such as from about 50 psig to about 100 psig (e.g., 75 psig), alternatively from about 150 psig to about 300 psig (e.g., 200 psig). In at least one embodiment, the activity of the catalyst is at least 1,000 gP·mmolcat$^{-1}$·h$^{-1}$, such as from about 1,000 gP·mmolcat$^{-1}$·h$^{-1}$ to about 10,000,000 gP·mmolcat$^{-1}$·h$^{-1}$, such as from about 1,500 gP·mmolcat$^{-1}$·h$^{-1}$ to about 8,000,000 gP·mmolcat$^{-1}$·h$^{-1}$, such as from about 1,800 gP·mmolcat$^{-1}$·h$^{-1}$ to about 1,000,000 gP·mmolcat$^{-1}$·h$^{-1}$, alternatively from about 10,000 gP·mmolcat$^{-1}$·h$^{-1}$ to about 8,000,000 gP·mmolcat$^{-1}$·h$^{-1}$.

In another embodiment, the present disclosure provides a process for the production of an propylene alpha-olefin copolymer comprising: polymerizing propylene and at least one ethylene and or at least one $C_4$-$C_{20}$ alpha-olefin by contacting the propylene and the at least one ethylene and or at least one $C_3$-$C_{20}$ alpha-olefin with a catalyst system described above in one or more continuous stirred tank reactors or loop reactors, in series or in parallel, at a reactor pressure of from 0.05 MPa to 1,500 MPa and a reactor temperature of from 30° C. to 230° C. to form an ethylene alpha-olefin copolymer. In at least one embodiment, hydrogen is present in the polymerization reactor at a partial pressure of from about 10 psig to about 300 psig, such as from about 20 psig to about 250 psig, such as from about 30 psig to about 200 psig, such as from about 40 psig to about 150 psig, such as from about 50 psig to about 100 psig (e.g., 75 psig), alternatively from about 150 psig to about 300 psig (e.g., 200 psig). In at least one embodiment, the activity of the catalyst is at least 1,000 gP·mmolcat$^{-1}$·h$^{-1}$, such as from about 1,000 gP·mmolcat$^{-1}$·h$^{-1}$ to about 10,000,000 gP·mmolcat$^{-1}$·h$^{-1}$, such as from about 1,500 gP·mmolcat$^{-1}$·h$^{-1}$ to about 8,000,000 gP·mmolcat$^{-1}$·h$^{-1}$, such as from about 1,800 gP·mmolcat$^{-1}$·h$^{-1}$ to about 1,000,000 gP·mmolcat$^{-1}$·h$^{-1}$, alternatively from about 10,000 gP·mmolcat$^{-1}$·h$^{-1}$ to about 500,000 gP·mmolcat$^{-1}$·h$^{-1}$.

In at least one embodiment, the conversion of olefin monomer is at least 10%, based upon polymer yield and the weight of the monomer entering the reaction zone, such as 20% or more, such as 30% or more, such as 50% or more, such as 80% or more.

In at least one embodiment, little or no alumoxane is used in the process to produce the polymers. For example, alumoxane is present at zero mol %, alternately the alumoxane is present at a molar ratio of aluminum to transition metal less than 500:1, such as less than 300:1, such as less than 100:1, such as less than 1:1.

In at least one embodiment, little or no scavenger is used in the process to produce the ethylene polymer. For example, scavenger (such as tri alkyl aluminum) is present at zero mol %, alternately the scavenger is present at a molar ratio of scavenger metal to transition metal of less than 100:1, such as less than 50:1, such as less than 15:1, such as less than 10:1.

Other additives may also be used in the polymerization, as desired, such as one or more scavengers, hydrogen, aluminum alkyls, or chain transfer agents (such as alkylalumoxanes, a compound represented by the formula $AlR_3$ or $ZnR_2$ (where each R is, independently, a $C_1$-$C_8$ aliphatic radical, such as methyl, ethyl, propyl, butyl, pentyl, hexyl octyl or an isomer thereof) or a combination thereof, such as diethyl zinc, methylalumoxane, trimethylaluminum, triisobutylaluminum, trioctylaluminum, or a combination thereof).

Solution Polymerization

In at least one embodiment, the polymerization process with catalyst compounds of the present disclosure is a solution polymerization process.

A solution polymerization is a polymerization process in which the polymer is dissolved in a liquid polymerization medium, such as an inert solvent or monomer(s) or their blends. A solution polymerization is typically homogeneous. A homogeneous polymerization is one where the polymer product is dissolved in the polymerization medium. Such systems are not turbid as described in Oliveira, J. V. (2000) *Ind. Eng, Chem. Res.*, v.29, pg. 4627. Solution polymerization may involve polymerization in a continuous reactor in which the polymer formed, the starting monomer and catalyst materials supplied are agitated to reduce or avoid concentration gradients and in which the monomer acts as a diluent or solvent or in which a hydrocarbon is used as a diluent or solvent. Suitable processes can operate at temperatures from about 0° C. to about 250° C., such as from about 50° C. to about 170° C., such as from about 80° C. to about 150° C., such as from about 100° C. to about 140° C., and/or at pressures of about 0.1 MPa or more, such as 2 MPa or more. The upper pressure limit is not critically constrained but can be about 200 MPa or less, such as 120 MPa or less, such as 30 MPa or less. Temperature control in the reactor can generally be obtained by balancing the heat of polymerization and with reactor cooling by reactor jackets or cooling coils to cool the contents of the reactor, auto refrigeration, pre-chilled feeds, vaporization of liquid medium (diluent, monomers or solvent) or combinations of all three. Adiabatic reactors with pre-chilled feeds can also be used. The purity, type, and amount of solvent can be optimized for the maximum catalyst productivity for a particular type of polymerization. The solvent can be also introduced as a catalyst carrier. The solvent can be introduced as a gas phase or as a liquid phase depending on the pressure and temperature. Advantageously, the solvent can be kept in the liquid phase and introduced as a liquid. Solvent can be introduced in the feed to the polymerization reactors.

A process described herein can be a solution polymerization process that may be performed in a batchwise fashion (e.g., batch; semi-batch) or in a continuous process. Suitable reactors may include tank, loop, and tube designs. In at least one embodiment, the process is performed in a continuous fashion and dual loop reactors in a series configuration are used. In at least one embodiment, the process is performed in a continuous fashion and dual continuous stirred-tank reactors (CSTRs) in a series configuration are used. Furthermore, the process can be performed in a continuous fashion and a tube reactor can be used. In another embodiment, the process is performed in a continuous fashion and one loop reactor and one CSTR are used in a series configuration. The process can also be performed in a batchwise fashion and a single stirred tank reactor can be used.

Polyolefin Products

The present disclosure relates to compositions of matter produced by the methods described herein.

In at least one embodiment, a process described herein produces $C_2$ to $C_{20}$ olefin homopolymers (e.g., polyethylene; polypropylene), or $C_2$ to $C_{20}$ olefin copolymers (e.g., ethylene-octene, ethylene-propylene) and/or propylene-alpha-olefin copolymers, such as $C_3$ to $C_{20}$ copolymers (such as propylene-hexene copolymers or propylene-octene copolymers). In at least one embodiment, a process described herein produces $C_3$ to $C_{20}$ isotactic olefin homopolymers, such as isotactic polypropylene, such as highly isotactic polypropylene.

The term "isotactic" is defined as having at least 20% or more isotactic pentads according to analysis by $^{13}C$ NMR. The term "highly isotactic" is defined as having 50% or more isotactic pentads according to analysis by $^{13}C$ NMR.

In at least one embodiment, an ethylene or propylene based polymer (homopolymer) has one or more of: an Mw value of 1,000 g/mol or greater, such as from about 1,000 g/mol to about 3,000,000 g/mol, such as from about 25,000 g/mol to about 2,000,000 g/mol, alternately from about 3,000,000 g/mol to about 10,000,000 g/mol, such as from about 5,000,000 g/mol to about 7,500,000 g/mol; an Mn value of 1,000 g/mol or greater, such as from about 1,000 g/mol to about 2,000,000 g/mol, such as from about 100,000 g/mol to about 1,200,000 g/mol, alternately from about 2,000,000 g/mol to about 10,000,000 g/mol, such as from about 5,000,000 g/mol to about 7,500,000 g/mol; an Mz value of 5,000 g/mol or greater, such as from about 1,000 g/mol to about 10,000,000 g/mol, such as from about 100,000 to about 6,000,000 g/mol, alternately from about 10,000,000 g/mol to about 25,000,000 g/mol.

In at least one embodiment, the ethylene or propylene based polymer has an Mw/Mn (PDI) value of from 1 to 20, such as from 5 to 20, such as from 10 to 20, alternatively from 1 to 5, such as from 1.5 to about 3.

In at least one embodiment, the ethylene or propylene based polymer has a melting point (Tm) of at least 100° C., such as from about 100° C. to about 150° C., such as from about 100° C. to about 140° C.

In at least one embodiment, the ethylene or propylene based polymer has a melting point (Tm) of less than 100° C., such as from about 30° C. to about 80° C., such as from about 40° C. to about 70° C.

In at least one embodiment, a propylene based polymer has one or more of: an Mw value of about 500 g/mol or greater, such as from about 500 g/mol to about 200,000 g/mol, such as from about 2,000 g/mol to about 100,000 g/mol, alternately such as from about 1,000 g/mol to about 400,000 g/mol; an Mn value of 500 g/mol or greater, such as from about 500 g/mol to about 250,000 g/mol, such as from about 10,000 g/mol to about 100,000, alternately 1,000 g/mol to about 500,000; an Mz value of 2,000 g/mol or greater, such as from about 2,000 g/mol to about 400,000 g/mol, such as from about 10,000 g/mol to about 200,000 g/mol, alternately from about 1,000 g/mol to about 750,000 g/mol.

In at least one embodiment, a propylene based polymer has an Mw/Mn (PDI) value of from 1 to 3, such as from 1 to 2.5.

In at least one embodiment, a propylene based polymer has a melting point (Tm) of at least 50° C., such as from 100° C. to 170° C., such as from 120° C. to 150° C.

In at least one embodiment, an ethylene or propylene based polymer is an ethylene alpha-olefin copolymer or propylene alpha-olefin copolymer having one or more of: an Mw value of 1,000 g/mol or greater, such as from about 1,000 g/mol to about 1,500,000 g/mol, such as from about 15,000 g/mol to about 750,000 g/mol, alternately from about 500,000 g/mol to about 10,000,000 g/mol, such as from about 3,500,000 g/mol to about 7,500,000 g/mol; an Mn value of 2,000 g/mol or greater, such as from about 2,000 g/mol to about 1,000,000 g/mol, such as from about 50,000 g/mol to about 750,000 g/mol, such as from about 100,000 g/mol to about 500,000 g/mol, alternately from about 250,000 g/mol to about 5,000,000 g/mol; an Mz value of 5,000 g/mol or greater, such as from about 5,000 g/mol to about 10,000,000 g/mol, such as from about 20,000 g/mol to about 4,000,000 g/mol, alternately from about 4,000,000 g/mol to about 7,500,000 g/mol.

In at least one embodiment, the ethylene alpha-olefin copolymer or propylene alpha-olefin copolymer has a comonomer content of from 0.1 wt % to 99 wt %, such as from 1 wt % to 40 wt %, such as from 40 wt % to 95 wt %, such as from 20 wt % to 50 wt %, such as from 15 wt % to 30 wt %.

In at least one embodiment, the ethylene alpha-olefin copolymer or propylene alpha-olefin copolymer has an Mw/Mn (PDI) value of from about 1 to about 40, such as from about 1 to about 30, such as from about 1 to about 20, such as from about 1 to about 10, such as from about 1 to about 5, alternatively from 20 to 40.

In at least one embodiment, the ethylene alpha-olefin copolymer or propylene alpha-olefin copolymer has a melting point (Tm) of at least 40° C., such as from about 40° C. to about 140° C., such as from about 90° C. to about 120° C.

GPC 4-D

For purposes of the claims, and unless otherwise indicated, the distribution and the moments of molecular weight (Mw, Mn, Mz, Mw/Mn, etc.), the comonomer content and the branching index (g') are determined by using a high temperature Gel Permeation Chromatography (Polymer Char GPC-IR) equipped with a multiple-channel band-filter based Infrared detector IR5 with a multiple-channel band filter based infrared detector ensemble IR5 with band region covering from about 2,700 cm$^{-1}$ to about 3,000 cm$^{-1}$ (representing saturated C—H stretching vibration), an 18-angle light scattering detector and a viscometer. Three Agilent PLgel 10-μm Mixed-B LS columns are used to provide polymer separation. Reagent grade 1,2,4-trichlorobenzene (TCB) (from Sigma-Aldrich) comprising ~300 ppm antioxidant BHT can be used as the mobile phase at a nominal flow rate of ~1.0 mL/min and a nominal injection volume of ~200 μL. The whole system including transfer lines, columns, and detectors can be contained in an oven maintained at ~145° C. A given amount of sample can be weighed and sealed in a standard vial with ~10 μL flow marker (heptane) added thereto. After loading the vial in the auto-sampler, the oligomer or polymer may automatically be dissolved in the instrument with ~8 mL added TCB solvent at ~160° C. with continuous shaking. The sample solution concentration can be from ~0.2 to ~2.0 mg/ml, with lower concentrations used for higher molecular weight samples. The concentration, c, at each point in the chromatogram can be calculated from the baseline-subtracted IR5 broadband signal, I, using the equation: c=αI, where α is the mass constant determined with polyethylene or polypropylene standards. The mass recovery can be calculated from the ratio of the integrated area of the concentration chromatography over elution volume and the injection mass which is equal to the predetermined concentration multiplied by injection loop volume. The conventional molecular weight (IR MW) is determined by combining universal calibration relationship with the column calibration which is performed with a series of monodispersed polystyrene (PS) standards ranging from 700 to 10 M gm/mole. The MW at each elution volume is calculated with following equation:

$$\log M = \frac{\log(K_{PS}/K)}{\alpha+1} + \frac{\alpha_{PS}+1}{\alpha+1}\log M_{PS}$$

where the variables with subscript "PS" stand for polystyrene while those without a subscript are for the test samples. In this method, $\alpha_{PS}$=0.67 and $K_{PS}$=0.000175, a and K for other materials are as calculated and published in literature (Sun, T. et al. *Macromolecules* 2001, v.34, pg. 6812), except that for purposes of this invention and claims thereto, α=0.695+(0.01*(wt. fraction propylene)) and K=0.000579−(0.0003502*(wt. fraction propylene)) for ethylene-propylene copolymers and ethylene-propylene-diene terpolymers, α=0.705 and K=0.0002288 for linear propylene polymers, α=0.695 and K=0.000181 for linear butene polymers, α is 0.695 and K is 0.000579*(1−0.0087*w2b+0.000018*(w2b)^2) for ethylene-butene copolymer where w2b is a bulk weight percent of butene comonomer, a is 0.695 and K is 0.000579*(1-0.0075*w2b) for ethylene-hexene copolymer where w2b is a bulk weight percent of hexene comonomer, a is 0.695 and K is 0.000579*(1-0.0077*w2b) for ethylene-octene copolymer where w2b is a bulk weight percent of octene comonomer, and α=0.695 and K=0.000579 for all other linear ethylene polymers. Concentrations are expressed in g/cm$^3$, molecular weight is expressed in g/mole, and intrinsic viscosity (hence K in the Mark-Houwink equation) is expressed in dL/g unless otherwise noted.

The comonomer composition is determined by the ratio of the IR5 detector intensity corresponding to CH$_2$ and CH$_3$ channel calibrated with a series of PE and PP homo/copolymer standards whose nominal value are predetermined by NMR or FTIR. In particular, this provides the methyls per 1,000 total carbons (CH$_3$/1000TC) as a function of molecular weight. The short-chain branch (SCB) content per 1000TC (SCB/1000TC) is then computed as a function of molecular weight by applying a chain-end correction to the CH$_3$/1000TC function, assuming each chain to be linear and terminated by a methyl group at each end. The weight % comonomer is then obtained from the following expression in which f is 0.3, 0.4, 0.6, 0.8, and so on for C$_3$, C$_4$, C$_6$, C$_8$, and so on co-monomers, respectively:

$$w2=f*SCB/1000TC.$$

The bulk composition of the polymer from the GPC-IR and GPC-4D analyses is obtained by considering the entire signals of the CH$_3$ and CH$_2$ channels between the integration limits of the concentration chromatogram. First, the following ratio is obtained $$\text{Bulk IR ratio} = \frac{\text{Area of } CH_3 \text{ signal within integration limits}}{\text{Area of } CH_2 \text{ signal within integration limits}}.$$

Then the same calibration of the $CH_3$ and $CH_2$ signal ratio, as mentioned previously in obtaining the $CH_3/1000TC$ as a function of molecular weight, is applied to obtain the bulk $CH_3/1000TC$. A bulk methyl chain ends per 1000TC (bulk $CH_3end/1000TC$) is obtained by weight-averaging the chain-end correction over the molecular-weight range. Then $$w2b = f \cdot \text{bulk } CH3/1000TC$$

$$\text{bulk } SCB/1000TC = \text{bulk } CH3/1000TC - \text{bulk } CH3end/1000TC$$

and bulk $SCB/1000TC$ is converted to bulk w2 in the same manner as described above.

The LS detector is the 18-angle Wyatt Technology High Temperature DAWN HELEOSII. The LS molecular weight (M) at each point in the chromatogram is determined by analyzing the LS output using the Zimm model for static light scattering (*Light Scattering from Polymer Solutions*; Huglin, M. B., Ed.; Academic Press, 1972):

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle $\theta$, c is the polymer concentration determined from the IR5 analysis, $A_2$ is the second virial coefficient, $P(\theta)$ is the form factor for a monodisperse random coil, and $K_O$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 145° C. and $\lambda$=665 nm. For analyzing polyethylene homopolymers, ethylene-hexene copolymers, and ethylene-octene copolymers, dn/dc=0.1048 ml/mg and $A_2$=0.0015; for analyzing ethylene-butene copolymers, dn/dc=0.1048*(1−0.00126*w2) ml/mg and $A_2$=0.0015 where w2 is weight percent butene comonomer.

A high temperature Agilent (or Viscotek Corporation) viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_S$, for the solution flowing through the viscometer is calculated from their outputs. The intrinsic viscosity, $[\eta]$, at each point in the chromatogram is calculated from the equation $[\eta]=\eta_S/c$, where c is concentration and is determined from the IR5 broadband channel output. The viscosity MW at each point is calculated as $M=K_{PS}M^{\alpha_{PS}+1}/[\eta]$, where $\alpha_{ps}$ is 0.67 and $K_{ps}$ is 0.000175.

The branching index ($g'_{vis}$) is calculated using the output of the GPC-IR5-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits. The branching index $g'_{vis}$ is defined as $$g'_{vis} = \frac{[\eta]_{avg}}{KM_v^\alpha},$$

where $M_V$ is the viscosity-average molecular weight based on molecular weights determined by LS analysis and the K and $\alpha$ are for the reference linear polymer, which are, for purposes of this invention and claims thereto, $\alpha$=0.700 and K=0.0003931 for ethylene, propylene, diene monomer copolymers, $\alpha$=0.705 and K=0.0002288 for linear propylene polymers, $\alpha$=0.695 and K=0.000181 for linear butene polymers, $\alpha$ is 0.695 and K is 0.000579*(1−0.0087*w2b+ 0.000018*(w2b)$^\wedge$2) for ethylene-butene copolymer where w2b is a bulk weight percent of butene comonomer, $\alpha$ is 0.695 and K is 0.000579*(1−0.0075*w2b) for ethylene-hexene copolymer where w2b is a bulk weight percent of hexene comonomer, $\alpha$ is 0.695 and K is 0.000579*(1−0.0077*w2b) for ethylene-octene copolymer where w2b is a bulk weight percent of octene comonomer, and $\alpha$=0.695 and K=0.000579 for all other linear ethylene polymers. Concentrations are expressed in g/cm$^3$, molecular weight is expressed in g/mole, and intrinsic viscosity (hence K in the Mark-Houwink equation) is expressed in dL/g unless otherwise noted. Calculation of the w2b values is as discussed above.

Blends

In another embodiment, the polymer (such as the polyethylene or polypropylene) produced herein is combined with one or more additional polymers prior to being formed into a film, molded part or other article. Other useful polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

In at least one embodiment, the polymer (such as the polyethylene or polypropylene) is present in the above blends, at from 10 wt % to 99 wt %, based upon the weight of the polymers in the blend, such as 20 wt % to 95 wt %, such as at least 30 wt % to 90 wt %, such as at least 40 wt % to 90 wt %, such as at least 50 wt % to 90 wt %, such as at least 60 wt % to 90 wt %, such as at least 70 to 90 wt %.

The blends described above may be produced by mixing the polymers of the present disclosure with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc.

Films

Any of the foregoing polymers, such as the foregoing polypropylenes or blends thereof, may be used in a variety of end-use applications. Such applications include, for example, mono- or multi-layer blown, extruded, and/or shrink films. These films may be formed by any number of well-known extrusion or coextrusion techniques, such as a blown bubble film processing technique, wherein the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents. One or more of the layers of the film may be oriented in the transverse and/or longitudinal directions to the same or different extents. The uniaxially orientation can be accomplished using typical cold drawing or hot drawing methods. Biaxial orientation can be accomplished using tenter frame equipment or a double bubble processes and may occur before or after the individual layers are brought together. For example, a polyethylene layer can be extrusion coated or laminated onto an oriented polypropylene layer or the polyethylene and polypropylene can be coextruded together into a film then oriented. Likewise, oriented polypropylene could be laminated to oriented polyethylene or oriented polyethylene could be coated onto polypropylene then optionally the combination could be oriented even further. For example, the films can be oriented in the Machine Direction (MD) at a ratio of up to 15, such as from about 5 to about 7, and in the Transverse Direction (TD) at a ratio of up to 15, such as from about 7 to about 9. However, in another embodiment the film is oriented to the same extent in both the MD and TD directions.

The films may vary in thickness depending on the intended application; however, films of a thickness from 1 μm to 50 μm can be suitable. Films intended for packaging can be from 10 μm to 50 μm thick. The thickness of the sealing layer can be from 0.2 μm to 50 μm. There may be a sealing layer on both the inner and outer surfaces of the film or the sealing layer may be present on only the inner or the outer surface.

In another embodiment, one or more layers may be modified by corona treatment, electron beam irradiation, gamma irradiation, flame treatment, or microwave. In a preferred embodiment, one or both of the surface layers is modified by corona treatment.

ASPECTS LISTING

The present disclosure provides, among others, the following aspects, each of which may be considered as optionally including any alternate aspects.

Clause 1. A catalyst compound represented by Formula (I):

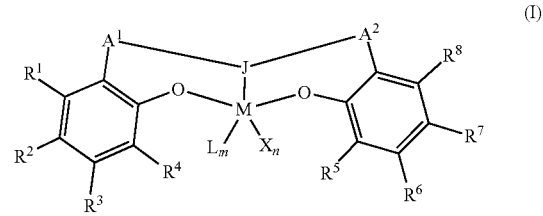

wherein:

M is a group 3, 4, or 5 metal;

$A^1$ and $A^2$ are independently an aromatic group, such as an aromatic hydrocarbyl group;

J is a heterocyclic Lewis base, such as a 6 membered heterocyclic ring;

L is a Lewis base;

X is an anionic ligand;

n is 1, 2 or 3;

m is 0, 1, or 2;

n+m is not greater than 4;

each of $R^1$, $R^2$, $R^3$, $R^4$, $R^5$, $R^6$, $R^7$, and $R^8$ is independently hydrogen, $C_1$-$C_{40}$ hydrocarbyl, $C_1$-$C_{40}$ substituted hydrocarbyl, a heteroatom or a heteroatom-containing group, or one or more of $R^1$ and $R^2$, $R^2$ and $R^3$, $R^3$ and $R^4$, $R^5$ and $R^6$, $R^6$ and $R^7$, or $R^7$ and $R^8$ may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings;

any two L groups may be joined together to form a bidentate Lewis base;

an X group may be joined to an L group to form a monoanionic bidentate group; and any two X groups may be joined together to form a dianionic ligand group.

Clause 2. The catalyst compound of clause 1, wherein $A^1$ is represented by the formula:

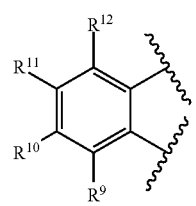

wherein ⁒ indicates a connection to the catalyst compound, and each of $R^9$, $R^{10}$, $R^{11}$, and $R^{12}$ is independently hydrogen, $C_1$-$C_{40}$ hydrocarbyl, $C_1$-$C_{40}$ substituted hydrocarbyl, a heteroatom or a heteroatom-containing group, or one or more of $R^9$ and $R^{10}$, $R^{10}$ and $R^{11}$, or $R^{11}$ and $R^{12}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms.

Clause 3. The catalyst compound of clauses 1 or 2, wherein $A^2$ is represented by the formula:

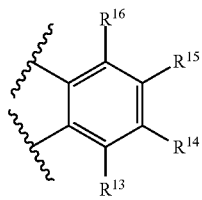

wherein ⁒ indicates a connection to the catalyst compound, and each of $R^{13}$, $R^{14}$, $R^{15}$, and $R^{16}$ is independently hydrogen, $C_1$-$C_{40}$ hydrocarbyl, $C_1$-$C_{40}$ substituted hydrocarbyl, a heteroatom or a heteroatom-containing group, or one or more of $R^{13}$ and $R^{14}$, $R^{14}$ and $R^{15}$, or $R^{15}$ and $R^{16}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms.

Clause 4. The catalyst compound of any of Clauses 1 to 3, wherein J is selected from a pyridine, a thiazole, an oxazole, an oxazoline, an imidazole, a furan, or a thiofuran.

Clause 5. The catalyst compound of any of clauses 1 to 4, wherein J is represented by the formula:

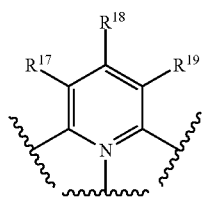

wherein ⁒ indicates a connection to the catalyst compound, and each of $R^{17}$, $R^{18}$, and $R^{19}$ is independently hydrogen, $C_1$-$C_{40}$ hydrocarbyl, $C_1$-$C_{40}$ substituted hydrocarbyl, a heteroatom or a heteroatom-containing group, or one or more of $R^{17}$ and $R^{18}$, $R^{18}$ and $R^{19}$, or $R^{17}$ and $R^{19}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms.

Clause 6. The catalyst compound of any of clauses 1 to 5, wherein J is represented by the formula:

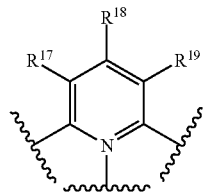

wherein ⁒ indicates a connection to the catalyst compound, and $R^{17}$, $R^{18}$, and $R^{19}$ are hydrogen.

Clause 7. The catalyst compound of any of clauses 1 to 6, wherein the complex is represented by Formula (II):

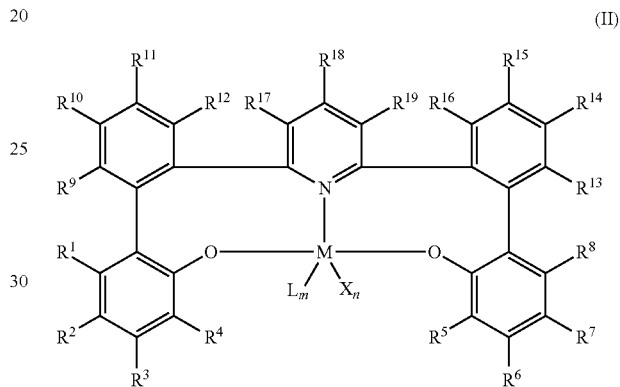

(II)

wherein M, L, X, m, n, are as defined in Clause 1;

each of $R^1$, $R^2$, $R^3$, $R^4$, $R^5$, $R^6$, $R^7$, and $R^8$ is independently hydrogen, $C_1$-$C_{40}$ hydrocarbyl, $C_1$-$C_{40}$ substituted hydrocarbyl, a heteroatom or a heteroatom-containing group, or one or more of $R^1$ and $R^2$, $R^2$ and $R^3$, $R^3$ and $R^4$, $R^5$ and $R^6$, $R^6$ and $R^7$, or $R^7$ and $R^8$ may be joined to form one or more substituted hydrocarbyl rings, unsubstituted hydrocarbyl rings, substituted heterocyclic rings, or unsubstituted heterocyclic rings each having 5, 6, 7, or 8 ring atoms;

each of $R^9$, $R^{10}$, $R^{11}$, and $R^{12}$ is independently hydrogen, $C_1$-$C_{40}$ hydrocarbyl, $C_1$-$C_{40}$ substituted hydrocarbyl, a heteroatom or a heteroatom-containing group, or one or more of $R^9$ and $R^{10}$, $R^{10}$ and $R^{11}$, or $R^{11}$ and $R^{12}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms;

each of $R^{13}$, $R^{14}$, $R^{15}$, and $R^{16}$ is independently hydrogen, $C_1$-$C_{40}$ hydrocarbyl, $C_1$-$C_{40}$ substituted hydrocarbyl, a heteroatom or a heteroatom-containing group, or one or more of $R^{13}$ and $R^{14}$, $R^{14}$ and $R^{15}$, or $R^{15}$ and $R^{16}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms; and each of $R^{17}$, $R^{18}$, and $R^{19}$ is independently hydrogen, $C_1$-$C_{40}$ hydrocarbyl, $C_1$-$C_{40}$ substituted hydrocarbyl, a heteroatom or a heteroatom-containing group, or one or more of $R^{17}$ and $R^{18}$, $R^{18}$ and $R^{19}$, or $R^{17}$ and $R^{19}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms.

Clause 8. The catalyst compound of any of clauses 1-7, wherein M is zirconium or hafnium.
Clause 9. The catalyst compound of any of clauses 1-8, wherein m=0, n=2, and X is selected from halogens and hydrocarbyl groups containing 1 to 8 carbons.
Clause 10. The catalyst compound of any of clauses 1-9, wherein each of $R^1$, $R^2$, $R^3$, $R^4$, $R^5$, $R^6$, $R^7$, $R^8$ are independently selected from hydrogen, $C_1$-$C_{40}$ hydrocarbyl, $C_1$-$C_{40}$ substituted hydrocarbyl, alkoxy, silyl, amino, aryloxy, halogen, phosphino, or one or more of $R^1$ and $R^2$, $R^2$ and $R^3$, $R^3$ and $R^4$, $R^5$ and $R^6$, $R^6$ and $R^7$, or $R^7$ and $R^8$ may be joined to form one or more substituted hydrocarbyl rings, unsubstituted hydrocarbyl rings, substituted heterocyclic rings, or unsubstituted heterocyclic rings each having 5, 6, 7, or 8 ring atoms.
Clause 11. The catalyst compound of any of clauses 1-10, wherein $R^4$ and $R^5$ are independently $C_1$-$C_{10}$ alkyl.
Clause 12. The catalyst compound of clause 11, wherein $R^4$ and $R^5$ are tert-butyl.
Clause 13. The catalyst compound of any of clauses 1-10, wherein $R^4$ and $R^5$ are aryl.
Clause 14. The catalyst compound of clause 13, wherein $R^4$ and $R^5$ are phenyl or carbazole.
Clause 15. The catalyst compound of clause 13, wherein $R^4$ and $R^5$ are $Et_3Si$.
Clause 16. The catalyst compound of clause 13, wherein $R^4$ and $R^5$ are 3,5-di-tert-butylbenzyl.
Clause 17. The catalyst compound of any of clauses 1-10, wherein $R^2$ and $R^7$ are independently $C_1$-$C_{10}$ alkyl.
Clause 18. The catalyst compound of any of clauses 1-10, wherein $R^2$ and $R^7$ are methyl.
Clause 19. The catalyst compound of any of clauses 1-18, wherein each of $R^1$, $R^3$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, and $R^{19}$ is independently hydrogen or $C_1$-$C_{10}$ alkyl.
Clause 20. The catalyst compound of any of clauses 1-19, wherein each of $R^1$, $R^3$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, and $R^{19}$ is independently hydrogen, methyl, ethyl, propyl, isopropyl, phenyl, cyclohexyl, fluoro, chloro, methoxy, ethoxy, phenoxy, or trimethylsilyl.
Clause 21. The catalyst compound of any of clauses 1-20, wherein $R^1$, $R^3$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, and $R^{19}$ are hydrogen.
Clause 22. The catalyst compound of any of clauses 1-21, wherein n is 2 and each X is independently chloro, benzyl, or methyl.
Clause 23. The catalyst compound of any of clauses 1-22, wherein the catalyst compound is selected from:

Catalyst 8

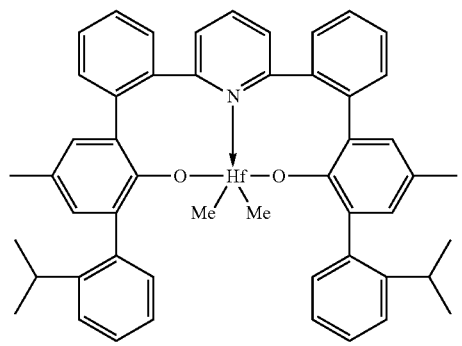

-continued

Catalyst 9

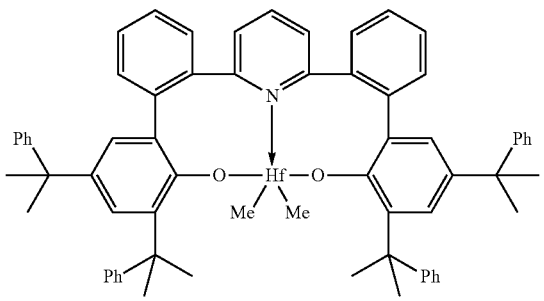

Catalyst 10

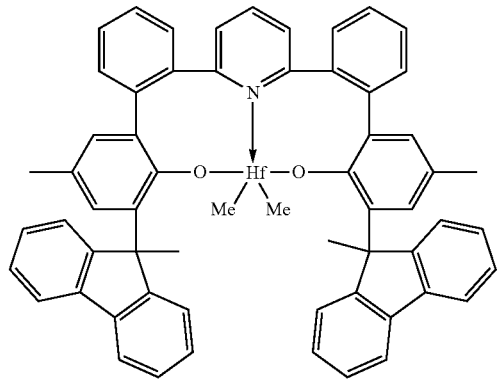

Catalyst 11

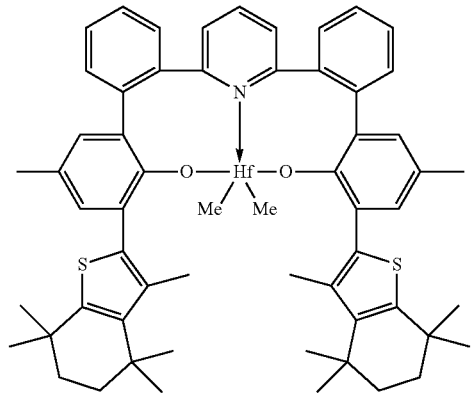

Catalyst 12

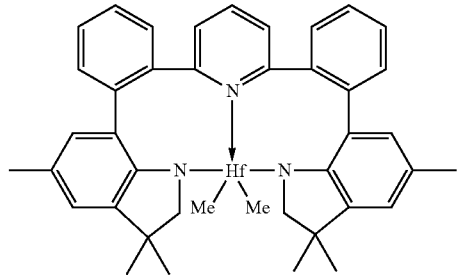

Catalyst 13
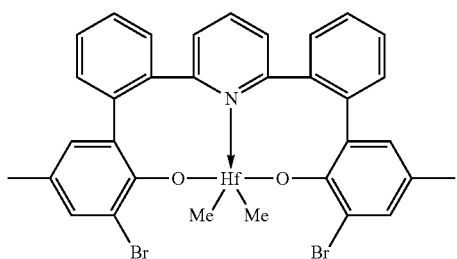
Catalyst 14
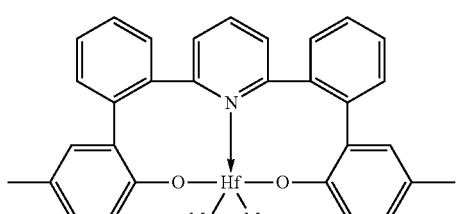
Catalyst 15
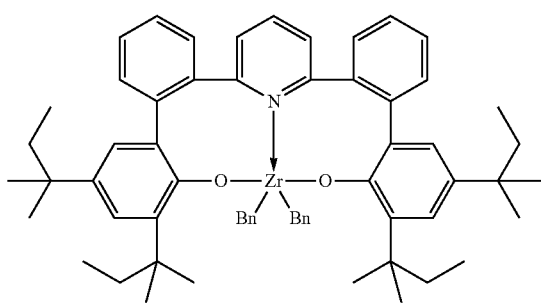
Catalyst 16
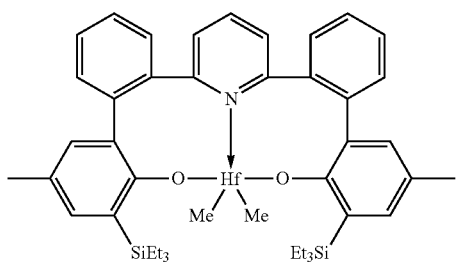
Catalyst 17
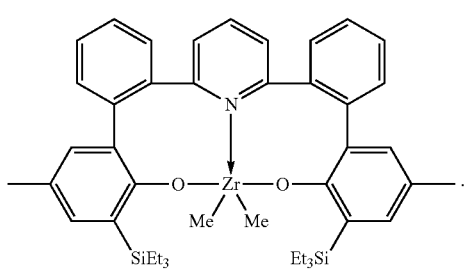
Clause 24. The catalyst compound of clause 1, wherein the catalyst compound is selected from:
1
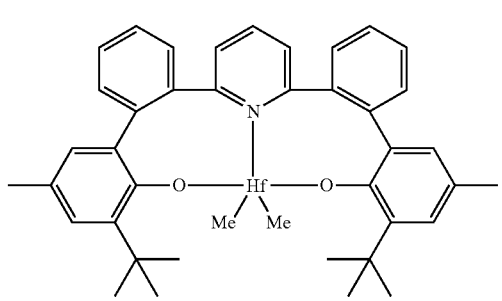
2
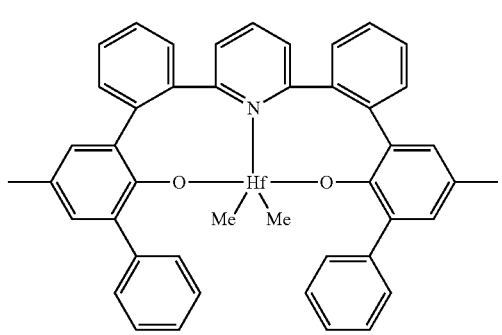
3
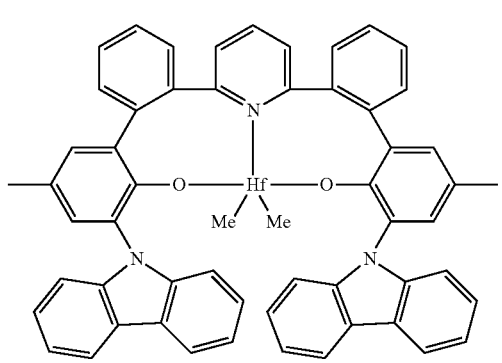
4
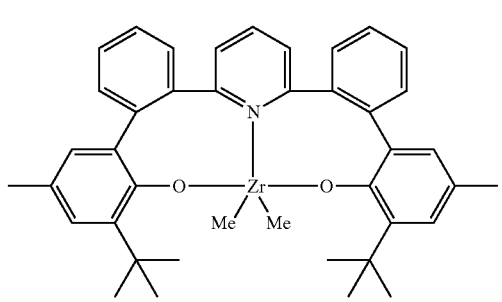
5
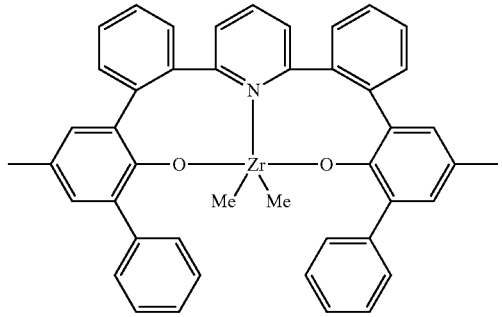

6
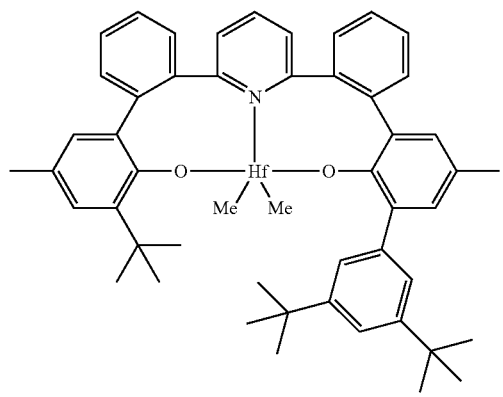
7
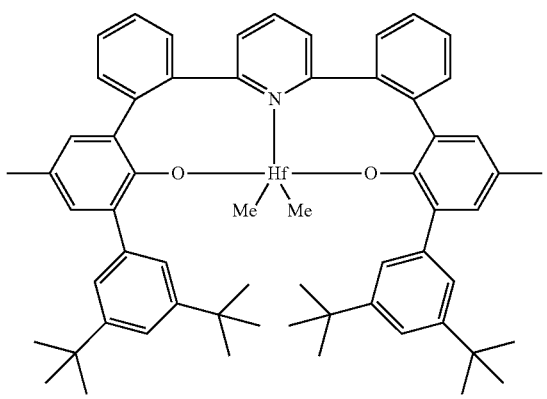
8
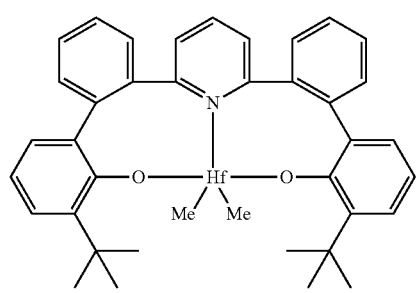
9
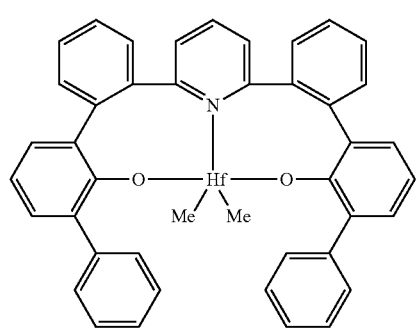
10
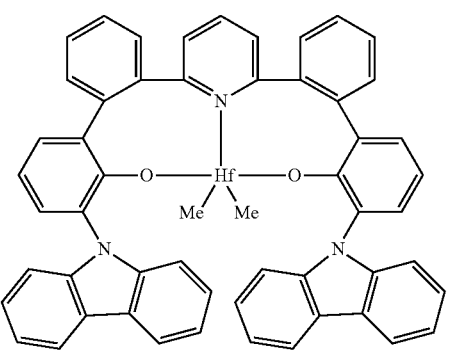
11
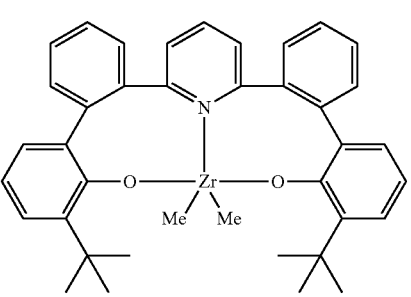
12
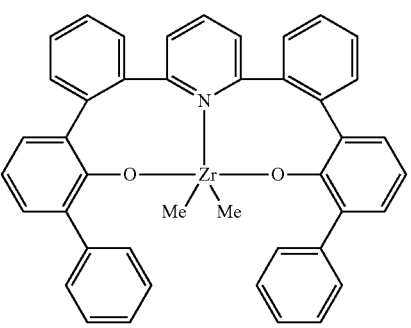
13
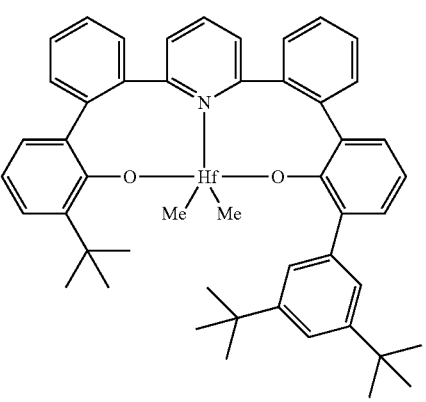

14
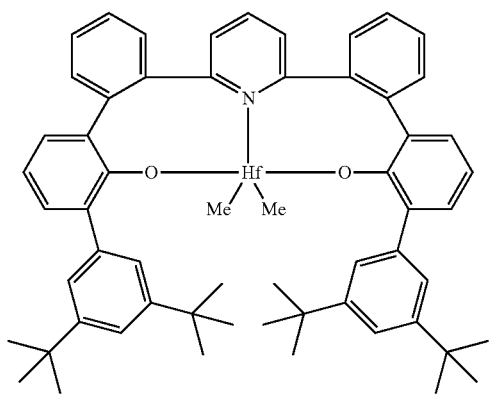
15
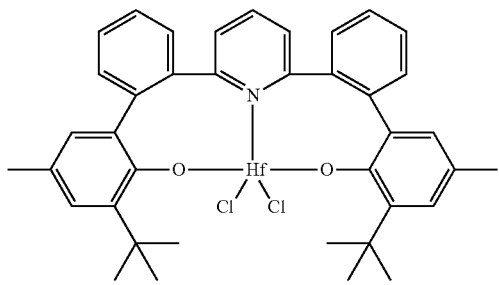
16
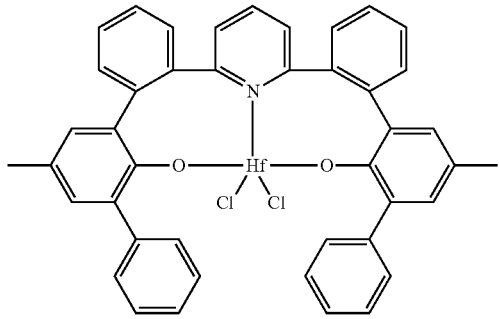
17
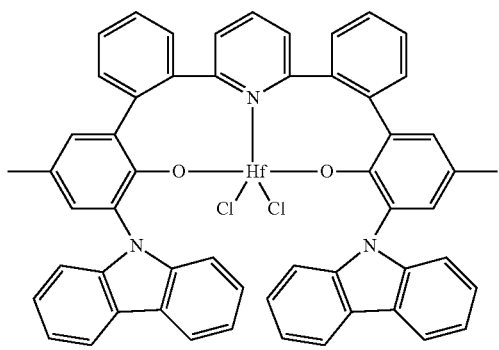
18
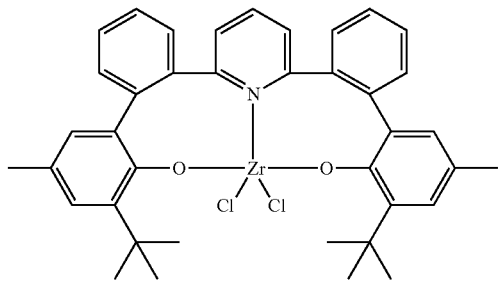
19
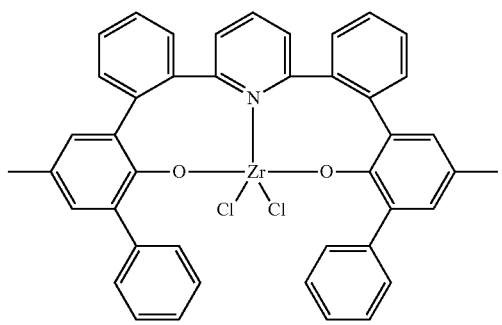
20
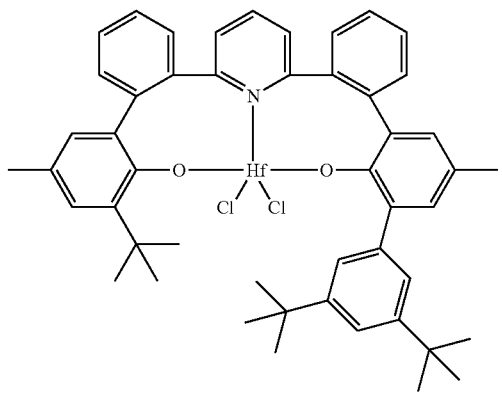
21
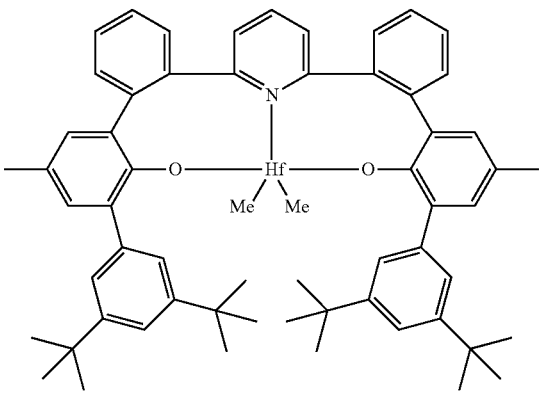

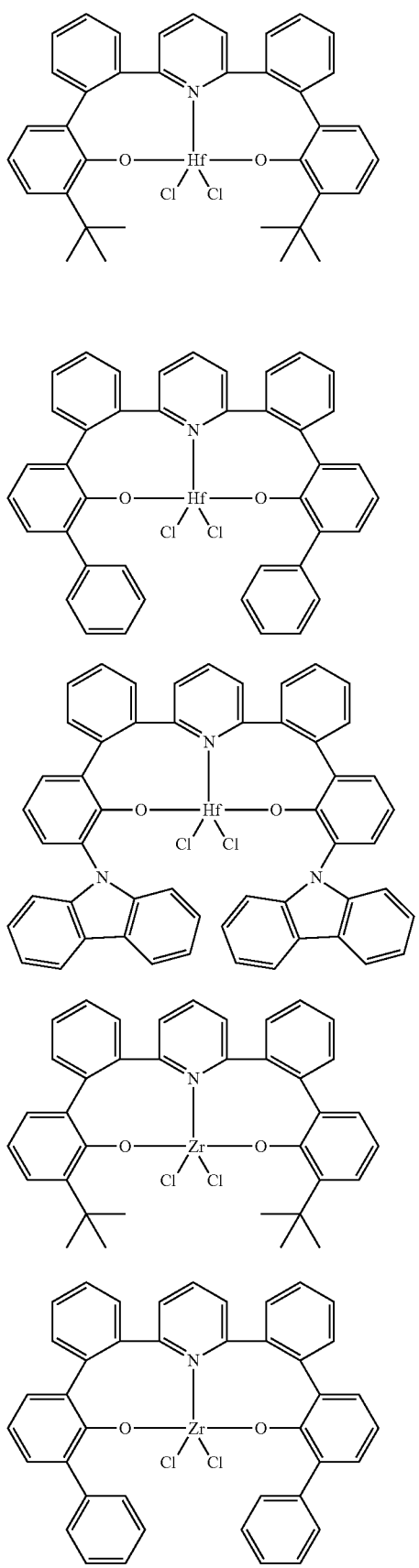
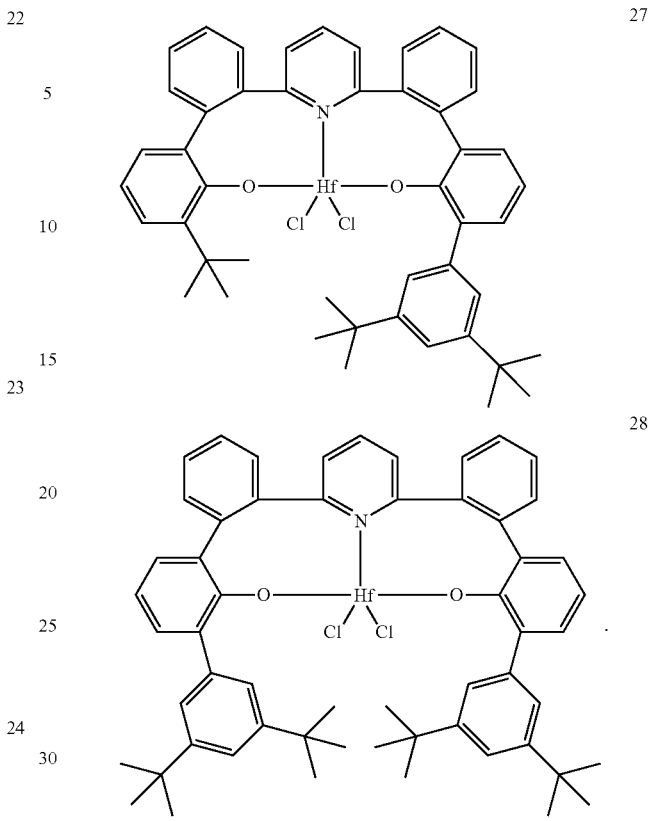
Clause 25. The catalyst compound of clause 1, wherein the catalyst compound is selected from:
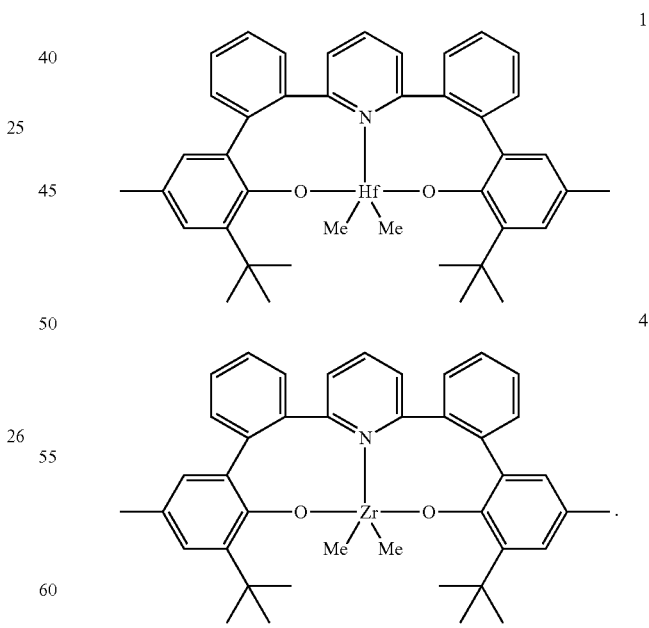
Clause 26. A catalyst system comprising an activator and the catalyst compound of any of clauses 1 to 25.
Clause 27. The catalyst system of clause 26, further comprising a support material.

Clause 28. The catalyst system of clauses 26 or 27, wherein the support material is selected from $Al_2O_3$, $ZrO_2$, $SiO_2$, $SiO_2/Al_2O_3$, $SiO_2/TiO_2$, silica clay, silicon oxide/clay, or mixtures thereof.

Clause 29. The catalyst system of any of clauses 26 to 28, wherein the activator comprises a non-coordinating anion activator.

Clause 30. The catalyst system of any of clauses 26 to 29, wherein the activator is represented by the formula:

$$(Z)_d^+(A^{d-})$$

wherein Z is (L-H) or a reducible Lewis Acid, L is an Lewis base; H is hydrogen; (L-H)$^+$ is a Bronsted acid; $A^{d-}$ is a non-coordinating anion having the charge d−; and d is an integer from 1 to 3.

Clause 31. The catalyst system of any of clauses 26 to 29, wherein the activator compound is represented by Formula (AI):

$$[R^1R^2R^3EH]_d^+[M^{k+}Q_n]^{d-} \quad (AI)$$

wherein:
E is nitrogen or phosphorous, preferably nitrogen;
d is 1, 2 or 3 (preferably 3); k is 1, 2, or 3 (preferably 3); n is 1, 2, 3, 4, 5, or 6 (preferably 4, 5, or 6); n−k=d (preferably d is 1, 2 or 3; k is 3; n is 4, 5, or 6, preferably when M is B, n is 4);
each of $R^1$, $R^2$, and $R^3$ is independently H, optionally substituted $C_1$-$C_{40}$ alkyl (such as branched or linear alkyl), or optionally substituted $C_5$-$C_{50}$-aryl (alternately each of $R^1$, $R^2$, and $R^3$ is independently unsubstituted or substituted with at least one of halide, $C_5$-$C_{50}$ aryl, $C_6$-$C_{35}$ arylalkyl, $C_6$-$C_{35}$ alkylaryl and, in the case of the $C_5$-$C_{50}$-aryl, $C_1$-$C_{50}$ alkyl); wherein $R^1$, $R^2$, and $R^3$ together comprise 15 or more carbon atoms (such as 18 or more carbon atoms, such as 20 or more carbon atoms, such as 22 or more carbon atoms, such as 25 or more carbon atoms, such as 30 or more carbon atoms, such as 35 or more carbon atoms, such as 37 or more carbon atoms, such as 40 or more carbon atoms, such as 45 or more carbon atoms), preferably at least one of $R^1$, $R^2$, and $R^3$ is a $C_3$ to $C_{40}$ hydrocarbyl, (such as a $C_3$-$C_{40}$ alkyl, alternately such as a $C_7$ to $C_{40}$ alkyl);
M is an element selected from group 13 of the Periodic Table of the Elements, preferably B or Al, preferably B; and
each Q is independently a hydride, bridged or unbridged dialkylamido, halide, alkoxide, aryloxide, hydrocarbyl, substituted hydrocarbyl, halocarbyl, substituted halocarbyl, or halosubstituted-hydrocarbyl radical, preferably a fluorinated aryl group, such fluoro-phenyl or fluoro-naphthyl, more preferably perfluorophenyl or perfluoronaphthyl.

Clause 32. The catalyst system of any of clauses 26 to 31, wherein the activator is one or more of:
N-methyl-4-nonadecyl-N-octadecylanilinium tetrakis(perfluoronaphthalen-2-yl)borate,
N-methyl-4-nonadecyl-N-octadecylanilinium tetrakis(perfluorophenyl)borate,
N,N-dimethylanilinium tetrakis(pentafluorophenyl)borate,
dioctadecylmethylammonium tetrakis(pentafluorophenyl) borate,
dioctadecylmethylammonium tetrakis(perfluoronaphthyl) borate,
triphenylcarbenium tetrakis(pentafluorophenyl)borate,
trimethylammonium tetrakis(perfluoronaphthyl)borate,
triethylammonium tetrakis(perfluoronaphthyl)borate,
tripropylammonium tetrakis(perfluoronaphthyl)borate,
tri(n-butyl)ammonium tetrakis(perfluoronaphthyl)borate,
tri(t-butyl)ammonium tetrakis(perfluoronaphthyl)borate,
N,N-dimethylanilinium tetrakis(perfluoronaphthyl)borate,
N,N-diethylanilinium tetrakis(perfluoronaphthyl)borate,
N,N-dimethyl-(2,4,6-trimethylanilinium) tetrakis(perfluoronaphthyl)borate,
tropillium tetrakis(perfluoronaphthyl)borate,
triphenylcarbenium tetrakis(perfluoronaphthyl)borate,
triphenylphosphonium tetrakis(perfluoronaphthyl)borate,
triethylsilylium tetrakis(perfluoronaphthyl)borate,
benzene(diazonium) tetrakis(perfluoronaphthyl)borate,
trimethylammonium tetrakis(perfluorobiphenyl)borate,
triethylammonium tetrakis(perfluorobiphenyl)borate,
tripropylammonium tetrakis(perfluorobiphenyl)borate,
tri(n-butyl)ammonium tetrakis(perfluorobiphenyl)borate,
tri(t-butyl)ammonium tetrakis(perfluorobiphenyl)borate,
N,N-dimethylanilinium tetrakis(perfluorobiphenyl)borate,
N,N-diethylanilinium tetrakis(perfluorobiphenyl)borate,
N,N-dimethyl-(2,4,6-trimethylanilinium) tetrakis(perfluorobiphenyl)borate,
tropillium tetrakis(perfluorobiphenyl)borate,
triphenylcarbenium tetrakis(perfluorobiphenyl)borate,
triphenylphosphonium tetrakis(perfluorobiphenyl)borate,
triethylsilylium tetrakis(perfluorobiphenyl)borate,
benzene(diazonium) tetrakis(perfluorobiphenyl)borate,
[4-t-butyl-PhNMe$_2$H][(C$_6$F$_3$(C$_6$F$_5$)$_2$)$_4$B],
trimethylammonium tetraphenylborate,
triethylammonium tetraphenylborate,
tripropylammonium tetraphenylborate,
tri(n-butyl)ammonium tetraphenylborate,
tri(t-butyl)ammonium tetraphenylborate,
N,N-dimethylanilinium tetraphenylborate,
N,N-diethylanilinium tetraphenylborate,
N,N-dimethyl-(2,4,6-trimethylanilinium) tetraphenylborate,
tropillium tetraphenylborate,
triphenylcarbenium tetraphenylborate,
triphenylphosphonium tetraphenylborate,
triethylsilylium tetraphenylborate,
benzene(diazonium)tetraphenylborate,
trimethylammonium tetrakis(pentafluorophenyl)borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
tri(sec-butyl)ammonium tetrakis(pentafluorophenyl)borate,
N,N-dimethylanilinium tetrakis(pentafluorophenyl)borate,
N,N-diethylanilinium tetrakis(pentafluorophenyl)borate,
N,N-dimethyl-(2,4,6-trimethylanilinium) tetrakis(pentafluorophenyl)borate,
tropillium tetrakis(pentafluorophenyl)borate,
triphenylcarbenium tetrakis(pentafluorophenyl)borate,
triphenylphosphonium tetrakis(pentafluorophenyl)borate,
triethylsilylium tetrakis(pentafluorophenyl)borate,
benzene(diazonium) tetrakis(pentafluorophenyl)borate,
trimethylammonium tetrakis-(2,3,4,6-tetrafluorophenyl) borate,
triethylammonium tetrakis-(2,3,4,6-tetrafluorophenyl)borate,
tripropylammonium tetrakis-(2,3,4,6-tetrafluorophenyl)borate,
tri(n-butyl)ammonium tetrakis-(2,3,4,6-tetrafluoro-phenyl) borate,
dimethyl(t-butyl)ammonium tetrakis-(2,3,4,6-tetrafluoro-phenyl)borate,
N,N-dimethylanilinium tetrakis-(2,3,4,6-tetrafluorophenyl) borate,
N,N-diethylanilinium tetrakis-(2,3,4,6-tetrafluorophenyl) borate,
N,N-dimethyl-(2,4,6-trimethylanilinium) tetrakis-(2,3,4,6-tetrafluorophenyl)borate,
tropillium tetrakis-(2,3,4,6-tetrafluorophenyl)borate, triphenylcarbenium tetrakis-(2,3,4,6-tetrafluorophenyl)borate,
triphenylphosphonium tetrakis-(2,3,4,6-tetrafluorophenyl)borate,
triethylsilylium tetrakis-(2,3,4,6-tetrafluorophenyl)borate,
benzene(diazonium) tetrakis-(2,3,4,6-tetrafluorophenyl)borate,
trimethylammonium tetrakis(3,5-bis(trifluoromethyl)phenyl)borate,
triethylammonium tetrakis(3,5-bis(trifluoromethyl)phenyl)borate,
tripropylammonium tetrakis(3,5-bis(trifluoromethyl)phenyl)borate,
tri(n-butyl)ammonium tetrakis(3,5-bis(trifluoromethyl)phenyl)borate,
tri(t-butyl)ammonium tetrakis(3,5-bis(trifluoromethyl)phenyl)borate,
N,N-dimethylanilinium tetrakis(3,5-bis(trifluoromethyl)phenyl)borate,
N,N-diethylanilinium tetrakis(3,5-bis(trifluoromethyl)phenyl)borate,
N,N-dimethyl-(2,4,6-trimethylanilinium) tetrakis(3,5-bis(trifluoromethyl)phenyl)borate,
tropillium tetrakis(3,5-bis(trifluoromethyl)phenyl)borate,
triphenylcarbenium tetrakis(3,5-bis(trifluoromethyl)phenyl)borate,
triphenylphosphonium tetrakis(3,5-bis(trifluoromethyl)phenyl)borate,
triethylsilylium tetrakis(3,5-bis(trifluoromethyl)phenyl)borate,
benzene(diazonium) tetrakis(3,5-bis(trifluoromethyl)phenyl)borate,
di-(i-propyl)ammonium tetrakis(pentafluorophenyl)borate,
dicyclohexylammonium tetrakis(pentafluorophenyl)borate,
tri(o-tolyl)phosphonium tetrakis(pentafluorophenyl)borate,
tri(2,6-dimethylphenyl)phosphonium tetrakis(pentafluorophenyl)borate,
triphenylcarbenium tetrakis(perfluorophenyl)borate,
1-(4-(tris(pentafluorophenyOborate)-2,3,5,6-tetrafluorophenyl)pyrrolidinium,
tetrakis(pentafluorophenyOborate,
4-(tris(pentafluorophenyl)borate)-2,3,5,6-tetrafluoropyridine, and
triphenylcarbenium tetrakis(3,5-bis(trifluoromethyl)phenyl)borate).

Clause 33. The catalyst system of any of clauses 26 to 32, further comprising a metal hydrocarbenyl chain transfer agent represented by the formula:

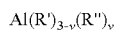

wherein each R' independently is a $C_1$-$C_{30}$ hydrocarbyl group; each R", independently, is a $C_4$-$C_{20}$ hydrocarbenyl group having an end-vinyl group; and v is from 0.1 to 3.

Clause 34. The catalyst system of any of clauses 26 to 33, wherein the activator comprises an alkylalumoxane.

Clause 35. The catalyst system of any of clauses 26 to 34, wherein the alumoxane is present at a molar ratio of aluminum to catalyst compound transition metal of 100:1 or more.

Clause 36. A process for the production of an ethylene based polymer comprising: polymerizing ethylene by contacting the ethylene with a catalyst system of any of clauses 26 to 35, in one or more continuous stirred tank reactors or loop reactors, in series or in parallel, at a reactor pressure of from 0.05 MPa to 1,500 MPa and a reactor temperature of from 30° C. to 230° C.

Clause 37. The process of clause 36, wherein the catalyst has an activity from 5,000 gP·mmolcat$^{-1}$·h$^{-1}$ to 1,000,000 gP·mmolcat$^{-1}$·h$^{-1}$.

Clause 38. The process of clauses 36 or 37, wherein the ethylene based polymer has an Mw value of from 1,000 to 3,000,000, Mn value of from 1,000 to 2,000,000, Mz value of from 1,000 to 10,000,000, and a PDI of from 1 to 20.

Clause 39. The process of any of clauses 36 to 38, wherein the ethylene based polymer has a PDI of from 1 to 5.

Clause 40. The process of any of clauses 36 to 39, wherein the ethylene based polymer has a PDI of from 10 to 20.

Clause 41. The process of any of clauses 36 to 40, wherein the ethylene based polymer has a melting point of from 100° C. to 150° C.

Clause 42. A process for the production of a propylene based polymer comprising: polymerizing propylene by contacting the propylene with a catalyst system of any of clauses 26 to 35, in one or more continuous stirred tank reactors or loop reactors, in series or in parallel, at a reactor pressure of from 0.05 MPa to 1,500 MPa and a reactor temperature of from 30° C. to 230° C. to form a propylene based polymer.

Clause 43. The process of clause 42, wherein the catalyst has an activity from 100 gP·mmolcat$^{-1}$·h$^{-1}$ to 6,000,000 gP·mmolcat$^{-1}$·h$^{-1}$.

Clause 44. The process of clauses 42 or 43, wherein the propylene based polymer has an Mw value of from 500 to 150,000, Mn value of from 500 to 100,000, Mz value of from 2,000 to 400,000, and a PDI of from 1 to 3.

Clause 45. The process of any of clauses 42 to 44, wherein the propylene based polymer has a melting point of from 50° C. to 170° C.

Clause 46. A process for the production of an ethylene alpha-olefin copolymer comprising: polymerizing ethylene and at least one $C_3$-$C_{20}$ alpha-olefin by contacting the ethylene and the at least one $C_3$-$C_{20}$ alpha-olefin with a catalyst system of any of clauses 25 to 34, in one or more continuous stirred tank reactors or loop reactors, in series or in parallel, at a reactor pressure of from 0.05 MPa to 1,500 MPa and a reactor temperature of from 30° C. to 230° C. to form an ethylene alpha-olefin copolymer.

Clause 47. The process of clause 46, wherein the catalyst has an activity from 1,000 gP·mmolcat$^{-1}$·h$^{-1}$ to 10,000,000 gP·mmolcat$^{-1}$·h$^{-1}$.

Clause 48. The process of clauses 46 or 47, wherein the ethylene alpha-olefin copolymer has an Mw value of from 5,000 to 1,500,000, and Mz value of from 5,000 to 10,000,000, an Mn value of from 2,000 to 400,000, and a PDI of from 1 to 40.

Clause 49. The process of any of clauses 46 to 48, wherein the ethylene alpha-olefin copolymer has a PDI of from 1 to 5.

Clause 50. The process of any of clauses 46 to 48, wherein the ethylene alpha-olefin copolymer has a PDI of from 20 to 40.

Clause 51. The process of any of clauses 46 to 50, wherein the ethylene alpha-olefin copolymer has a melting point of from 40° C. to 140° C.

Clause 52. A transition metal compound formed by chelation of a tridentate dianionic bis(aryl phenolate) heterocyclic ligand to a group 3, 4, or 5 transition metal, where the tridentate ligand coordinates to the metal forming a pair of eight-membered metallocycle rings.

Clause 53. The transition metal compound of clause 52, wherein the bis(aryl phenolate) heterocyclic ligand is coordinated to the metal center with the formation of a pair of eight-membered metallocycle rings.

Clause 54. The catalyst compound of clause 1 formed by chelation of a tridentate dianionic ligand to a group 4 transition metal, where the tridentate ligand coordinates to the metal to form a pair of eight-membered metallocycle rings.

Clause 55. A catalyst system comprising an activator and the transition metal compound of clause 54.

EXAMPLES

General Considerations for Synthesis

All reagents were purchased from commercial vendors (Sigma Aldrich) and used as received unless otherwise noted. Solvents were sparged with $N_2$ and dried over 3 Å molecular sieves. All chemical manipulations were performed in a nitrogen environment unless otherwise stated. Flash column chromatography was carried out with Sigma Aldrich silica gel 60 Å (70 Mesh-230 Mesh) using solvent systems specified. All anhydrous solvents were purchased from Fisher Chemical and were degassed and dried over molecular sieves prior to use. Deutrated solvents were purchased from Cambridge Isotope Laboratories and were degassed and dried over molecular sieves prior to use. $^1$H NMR spectroscopic data were acquired at 250 MHz, 400 MHz, or 500 MHz using solutions prepared by dissolving approximately 10 mg of a sample in either $C_6D_6$, $CD_2Cl_2$, $CDCl_3$, $D_8$-toluene, or other deuterated solvent. The chemical shifts (δ) presented are relative to the residual protium in the deuterated solvent at 7.15 ppm, 5.32 ppm, 7.24 ppm, and 2.09 ppm for $C_6D_6$, $CD_2Cl_2$, $CDCl_3$, $D_8$-toluene, respectively.

Synthesis of Ligands and Catalysts (or Complexes)

2-(3'-(tert-Butyl)-2'-(methoxymethoxy)-5'-methyl-[1,1'-biphenyl]-2-yl)-4,4,5,5-tetramethyl-1,3,2-dioxaborolane

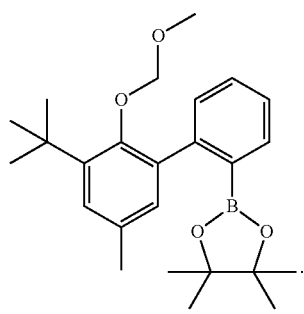 [SMILES: COCOc1c(-c2ccccc2B2OC(C)(C)C(C)(C)O2)cc(C)cc1C(C)(C)C]

To 4.23 g (174 mmol) of a vacuum dried magnesium powder were added 150 mL of dry THF and 10.0 g (34.8 mmol) of 1-bromo-3-(tert-butyl)-2-(methoxymethoxy)-5-methylbenzene. The reaction mixture was stirred overnight at 55° C., then a solution of 6.99 g (36.5 mmol) of 1-bromo-2-chlorobenzene in 100 mL of THF was added dropwise over 3 hours. The suspension obtained was stirred overnight at 55° C., then the solution was cooled to 0° C. followed by the addition of 9.70 g (52.2 mmol) of 2-isopropoxy-4,4,5,5-tetramethyl-1,3,2-dioxaborolane. The resulting mixture was stirred overnight at room temperature, then the mixture was poured into 500 mL of water. The crude product was extracted with 3×100 mL of dichloromethane. The combined organic extract was dried over $Na_2SO_4$ and evaporated to near dryness. The residue was purified by flash chromatography on silica gel 60 (40 μm-63 μm; eluent:hexane-ethyl acetate=15:1, vol.). Yield 7.20 g (50%) of a yellow oil. $^1$H NMR ($CDCl_3$, 400 MHz): δ 7.75 (dd, J=0.9, 7.4 Hz, 1H), 7.49-7.20 (m, 4H), 7.11 (d, J=1.9 Hz, 1H), 6.85 (d, J=1.7 Hz, 1H), 4.44 (d, J=15.0 Hz, 2H), 3.21 (s, 3H), 2.30 (s, 3H), 1.47 (s, 9H), 1.15 (s, 6H), 1.20 (s, 6H).

2-Methyl-4-phenyl-6H-dibenzo[c,e][1,2]oxaborinin-6-ol

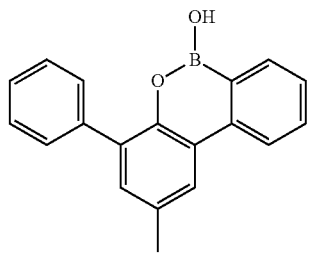 [SMILES: Cc1cc(-c2ccccc2)c2c(c1)-c1ccccc1B(O)O2]

To 2.70 g (111 mmol) of a vacuum dried magnesium powder were added 150 mL of dry THF and 6.84 g (22.3 mmol) of 1-bromo-3-phenyl-2-(methoxymethoxy)-5-methylbenzene. The reaction mixture was stirred overnight at 55° C., then a solution of 4.35 g (22.7 mmol) of 1-bromo-2-chlorobenzene in 50 mL of THF was added dropwise over 3 hours. The suspension obtained was stirred overnight at 55° C., then the suspension was cooled to 0° C. followed by the addition of 6.22 g (33.4 mmol) of 2-isopropoxy-4,4,5,5-tetramethyl-1,3,2-dioxaborolane. The resulting mixture was stirred overnight at room temperature, then the mixture was poured into 100 mL of water. The crude product was extracted with 3×100 mL of dichloromethane. The combined organic extract was dried over $Na_2SO_4$ and evaporated to near dryness. The residue was purified by flash chromatography on silica gel 60 (40 μm-63 μm; eluent:hexane-ethyl acetate=10:1, vol.). Yield 3.10 g (46%) of a beige powder. $^1$H NMR ($CDCl_3$, 400 MHz): δ 8.13-8.32 (m, 1H), 7.98-8.13 (m, 1H), 7.95 (dd, J=1.83, 6.04 Hz, 1H), 7.56-7.79 (m, 2H), 7.33-7.50 (m, 4H), 7.21-7.29 (m, 1H), 7.02-7.14 (m, 1H), 4.53 (s, 1H), 2.44-2.54 (m, 3H).

4-(9H-Carbazol-9-yl)-2-methyl-6H-dibenzo[c,e][1,2]oxaborinin-6-ol

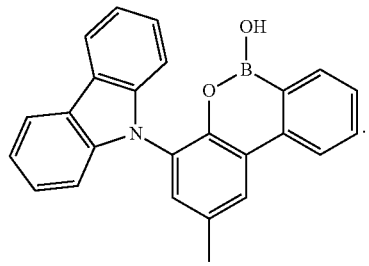 [SMILES: Cc1cc2c(c(-n3c4ccccc4c4ccccc43)c1)OB(O)c1ccccc1-2]

To 900 mg (37.1 mmol) of a vacuum dried magnesium powder were added 50 mL of dry THF and 2.94 g (7.42 mmol) of 1-bromo-3-(9H-carbazol-9-yl)-2-(methoxymethoxy)-5-methylbenzene. The reaction mixture was stirred overnight at 55° C., then a solution of 1.49 g (7.79 mmol) of 1-bromo-2-chlorobenzene in 20 mL of THF was added dropwise for 3 hours. The suspension obtained was stirred overnight at 5° C., then the suspension was cooled to 0° C. followed by an addition of 2.07 g (11.1 mmol) of 2-isopropoxy-4,4,5,5-tetramethyl-1,3,2-dioxaborolane. The resulting mixture was stirred overnight at room temperature, then the mixture was poured into 100 mL of water. The crude product was extracted with 3×100 mL of dichloromethane. The combined organic extract was dried over Na$_2$SO$_4$ and evaporated to near dryness. The residue was purified by flash chromatography on silica gel 60 (40 μm-63 μm; eluent:hexane-ethyl acetate=10:1, vol.). Yield 1.05 g (36%) of a dark red oil. $^1$H NMR (CDCl$_3$, 400 MHz): δ 8.26 (d, J=8.32 Hz, 1H), 8.12-8.17 (m, 2H), 8.11 (d, J=2.11 Hz, 1H), 8.06 (dd, J=0.94, 7.49 Hz, 1H), 7.73-7.80 (m, 1H), 7.49 (dt, J=0.89, 7.37 Hz, 1H), 7.35-7.40 (m, 3H), 7.24-7.30 (m, 2H), 7.17 (td, J=0.79, 8.18 Hz, 2H), 4.29 (s, 1H), 2.53 (s, 3H).

3',5'-Di-tert-butyl-2-(methoxymethoxy)-5-methyl-1,1'-biphenyl

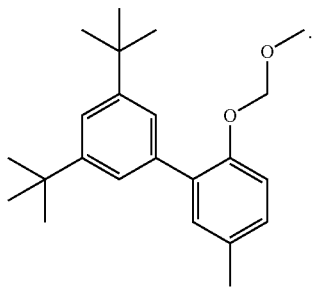 [SMILES: COCOc1ccc(C)cc1-c1cc(C(C)(C)C)cc(C(C)(C)C)c1]

A solution of 69.8 g (259 mmol) of a 3,5-di-tert-butyl-bromobenzene in 400 mL of dry THF was added dropwise to 6.30 g (259 mmol) of a vacuum dried magnesium turnings in 100 mL of dry THF over 30 minutes at 60° C. The resulting solution was heated to reflux for 1 hour and then cooled to room temperature. Then 50.0 g (216 mmol) of 2-bromo-1-(methoxymethoxy)-4-methylbenzene and 0.7 g (1.3 mmol) of Pd(P$^t$Bu$_3$)$_2$ were subsequently added. The resulting mixture was stirred overnight at 60° C., then the mixture was poured into 500 mL of water. The crude product was extracted with 3×400 mL of dichloromethane. The combined organic extract was dried over Na$_2$SO$_4$ and evaporated to near dryness. The residue was distilled using Kugelrohr apparatus (90° C., 0.3 mbar) yielding 73.0 g (99%) of the title product as a colorless oil. $^1$H NMR (CDCl$_3$, 400 MHz): δ 7.40-7.47 (m, 3H), 7.22 (d, J=1.65 Hz, 1H), 7.11-7.19 (m, 2H), 5.11 (s, 2H), 3.43 (s, 3H), 2.40 (s, 3H), 1.42 (s, 18H).

2-(3',5'-Di-tert-butyl-2-(methoxymethoxy)-5-methyl-[1,1'-biphenyl]-3-yl)-4,4,5,5-tetramethyl-1,3,2-dioxaborolane

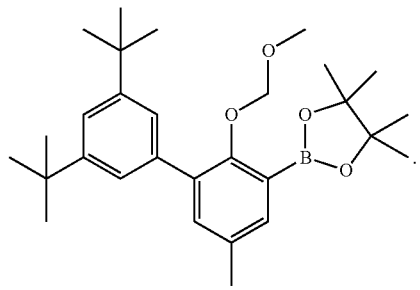 [SMILES: COCOc1c(B2OC(C)(C)C(C)(C)O2)cc(C)cc1-c1cc(C(C)(C)C)cc(C(C)(C)C)c1]

To a solution of 30.0 g (88.1 mmol) of 3',5'-di-tert-butyl-2-(methoxymethoxy)-5-methyl-1,1'-biphenyl in 1000 mL of diethyl ether was added 70.5 mL (176 mmol, 2.5 M) of $^n$BuLi in hexanes dropwise at 0° C. The resulting suspension was stirred for 3 hours at room temperature, then 53.9 mL (264 mmol) of 2-isopropoxy-4,4,5,5-tetramethyl-1,3,2-dioxaborolane was added in one portion at −50° C. The resulting mixture was stirred overnight at room temperature, then the mixture was poured into 1,000 mL of water. The crude product was extracted with 3×500 mL of dichloromethane. The combined organic extract was dried over Na$_2$SO$_4$ and evaporated to near dryness. The residue was triturated with 30 mL of methanol, and the obtained precipitate was filtered and then washed with 30 mL of methanol. This precipitate was dried under reduced pressure yielding 26.1 g (64%) of the title product (2-(3',5'-Di-tert-butyl-2-(methoxymethoxy)-5-methyl-[1,1'-biphenyl]-3-yl)-4,4,5,5-tetramethyl-1,3,2-dioxaborolane) as a white powder. $^1$H NMR (CDCl$_3$, 400 MHz): δ 7.61 (s, 1H), 7.34-7.44 (m, 3H), 7.26-7.31 (m, 1H), 4.82 (s, 2H), 2.81 (s, 3H), 2.38 (s, 3H), 1.39 (m, 30H).

2-Bromo-3",5"-di-tert-butyl-2'-(methoxymethoxy)-5'-methyl-1,1':3',1"-terphenyl

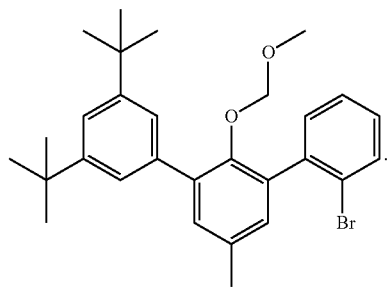 [SMILES: COCOc1c(-c2cc(C(C)(C)C)cc(C(C)(C)C)c2)cc(C)cc1-c1ccccc1Br]

To a solution of 13.0 g (27.9 mmol) of 2-(3',5'-di-tert-butyl-2-(methoxymethoxy)-5-methyl-[1,1'-biphenyl]-3-yl)-4,4,5,5-tetramethyl-1,3,2-dioxaborolane in 100 mL of 1,4-dioxane were added 8.69 g (30.7 mmol) of 1-bromo-2-iodobenzene, 9.63 g (69.7 mmol) of potassium carbonate, and 50 mL of water. The mixture obtained was sparged with argon for 10 minutes followed by the addition of 1.61 g (1.39 mmol) of Pd(PPh$_3$)$_4$. This mixture was stirred for 12 hours at 90° C., then the mixture was cooled to room temperature and diluted with 50 mL of water. The obtained mixture was extracted with dichloromethane (3×100 mL). The combined organic extract was dried over Na$_2$SO$_4$ and then evaporated to dryness. The residue was purified by flash chromatography on silica gel 60 (40 μm-63 μm, eluent: hexane). Yield 12.0 g (87%) of a colorless glassy solid. $^1$H NMR (CDCl$_3$, 400 MHz): δ 7.72 (d, J=7.98 Hz, 1H), 7.47-7.54 (m, 3H), 7.33-7.47 (m, 2H), 7.19-7.31 (m, 2H), 7.09 (d, J=1.65 Hz, 1H), 4.29-4.42 (m, 2H), 2.63 (s, 3H), 2.44 (s, 3H), 1.41 (s, 18H).

2',2'''-(Pyridine-2,6-diyl)bis(3-(tert-butyl)-5-methyl-[1,1'-biphenyl]-2-ol)

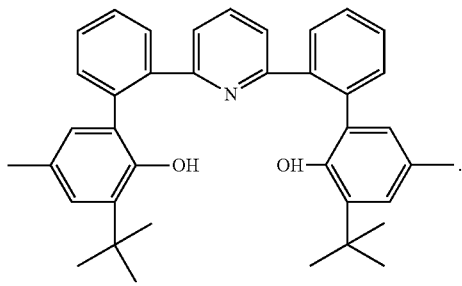

To a solution of 3.00 g (7.31 mmol) of 2-(3'-(tert-butyl)-2'-(methoxymethoxy)-5'-methyl-[1,1'-biphenyl]-2-yl)-4,4,5,5-tetramethyl-1,3,2-dioxaborolane in 70 mL of toluene were added 866 mg (3.65 mmol) of 2,6-dibromopyridine, 1.94 g (18.3 mmol) of sodium carbonate, 50 mL of water, and 10 mL of methanol. The mixture obtained was sparged with argon for 10 minutes followed the addition of 0.42 g (0.365 mmol) of Pd(PPh$_3$)$_4$. This mixture was stirred for 12 hours at 90° C., then cooled to room temperature and diluted with 50 mL of water. The obtained mixture was extracted with dichloromethane (3×50 mL), the combined organic extract was dried over Na$_2$SO$_4$ and then evaporated to dryness. To the resulting oil were added 50 mL of THF, 50 mL of methanol and 1 mL of 12 N hydrochloric acid. The reaction mixture was stirred overnight at 60° C. and then the mixture was poured into 200 mL of water. The obtained mixture was extracted with dichloromethane (3×50 mL), the combined organic extract was dried over Na$_2$SO$_4$ and then evaporated to dryness. The residue was purified by flash chromatography on silica gel 60 (40 μm-63 μm, eluent:hexane-ethyl acetate=10:1, vol.). Yield 1.50 g (74%) of a mixture of two isomers as a white foam. $^1$H NMR (CDCl$_3$, 400 MHz): δ 7.29-7.55 (m, 9H), 6.24-7.19 (m, 8H), 2.24+1.99 (s, 6H), 1.17+0.94 (s, 18H).

2,2'''-(Pyridine-2,6-diyl)bis(5'-methyl-[1,1':3',1''-terphenyl]-2'-ol)

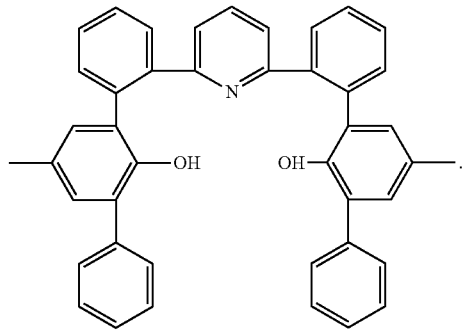

To a solution of 1.50 g (5.24 mmol) of 2-methyl-4-phenyl-6H-dibenzo[c,e][1,2]oxaborinin-6-ol in 30 mL of toluene were added 620 mg (2.62 mmol) of 2,6-dibromopyridine, 1.39 g (13.1 mmol) of sodium carbonate, 28 mL of water and 10 mL of methanol. The mixture obtained was sparged with argon for 10 minutes followed by an addition of 0.30 g (0.262 mmol) of Pd(PPh$_3$)$_4$. This mixture was stirred for 12 hours at 90° C., then the mixture was cooled to room temperature, and diluted with 50 mL of water. The obtained mixture was extracted with dichloromethane (3×50 mL), and the combined organic extract was dried over Na$_2$SO$_4$ and then evaporated to dryness. To the resulting oil were added 50 mL of THF, 50 mL of methanol and 1 mL of 12 N hydrochloric acid. The reaction mixture was stirred overnight at 60° C. and then poured into 200 mL of water. The obtained mixture was extracted with dichloromethane (3×50 mL), and the combined organic extract was dried over Na$_2$SO$_4$ and then evaporated to dryness. The residue was purified by flash chromatography on silica gel 60 (40 μm-63 μm, eluent:hexane-ethyl acetate=10:1, vol.). Yield 910 mg (58%) of a white foam. $^1$H NMR (CDCl$_3$, 400 MHz): δ 7.46-7.58 (m, 6H), 7.38 (br.s, 4H), 7.12-7.28 (br.s, 8H), 7.09 (d, 2H, J=7.87 Hz), 6.88 (br. s, 6H), 6.40 (br.s, 1H), 2.05 (br.s, 6H).

2',2'''-(Pyridine-2,6-diyl)bis(3-(9H-carbazol-9-yl)-5-methyl-[1,1'-biphenyl]-2-ol)

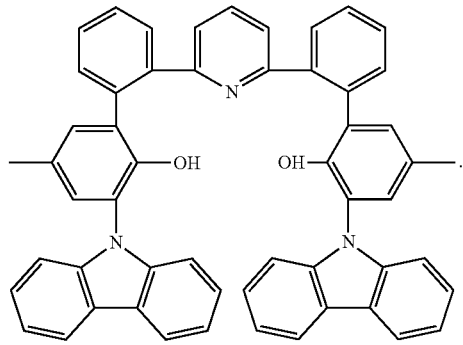

To a solution of 730 mg (1.95 mmol) of 4-(9H-carbazol-9-yl)-2-methyl-6H-dibenzo[c,e][1,2]oxaborinin-6-ol in 10 mL of toluene was added 184 mg (0.80 mmol) of 2,6-dibromopyridine, 424 mg (4.00 mmol) of sodium carbonate, 10 mL of water and 5 mL of methanol. The mixture obtained was sparged with argon for 10 minutes followed by the addition of 100 mg (0.08 mmol) of Pd(PPh$_3$)$_4$. This mixture was stirred for 12 hours at 90° C., then the mixture was cooled to room temperature and diluted with 50 mL of water. The obtained mixture was extracted with dichloromethane (3×50 mL). The combined organic extract was dried over Na$_2$SO$_4$ and then evaporated to dryness. To the resulting oil were added 50 mL of THF, 50 mL of methanol and 1 mL of 12 N hydrochloric acid. The reaction mixture was stirred overnight at 60° C. and then poured into 200 mL of water. The obtained mixture was extracted with dichloromethane (3×50 mL). The combined organic extract was dried over Na$_2$SO$_4$ and then evaporated to dryness. The residue was purified by flash chromatography on silica gel 60 (40 μm-63 μm, eluent:hexane-ethyl acetate=10:1, vol.). Yield 400 mg (53%) of a white foam. $^1$H NMR (CDCl$_3$, 400 MHz): δ 8.08 (d, J=8.65 Hz, 4H), 7.64-7.71 (m, 1H), 7.09-7.38 (m, 21H), 7.04 (br. s., 3H), 6.92 (br. s., 4H), 2.17 (br. s., 6H).

2",2""'-(Pyridine-2,6-diyl)bis(3,5-di-tert-butyl-5'-methyl-[1,1':3',1"-terphenyl]-2'-ol)

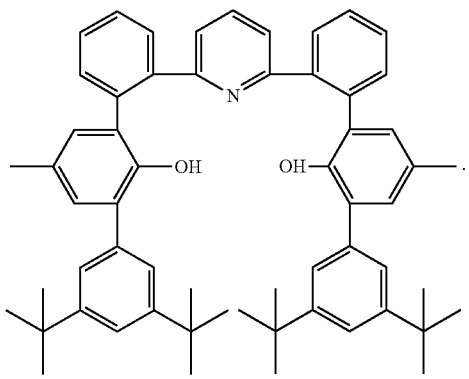 [SMILES: Cc1cc(-c2cc(C(C)(C)C)cc(C(C)(C)C)c2)c(O)c(-c2ccccc2-c2cccc(-c3ccccc3-c3cc(C)cc(-c4cc(C(C)(C)C)cc(C(C)(C)C)c4)c3O)n2)c1]

To a solution of 3.34 g (6.74 mmol) of 2-bromo-3",5"-di-tert-butyl-2'-(methoxymethoxy)-5'-methyl-1,1':3',1"-terphenyl in 120 mL of dry THF was added dropwise at −78° C. 2.96 mL (7.41 mmol, 2.5 M) of $^n$BuLi in hexanes. The reaction mixture was stirred for 1 hour at this temperature, then 1.38 g (10.1 mmol) of zinc chloride was added. The obtained solution was warmed to room temperature and evaporated to near dryness. Then, to the residue 100 mL of THF was added followed by the addition of 800 mg (3.37 mmol) of 2,6-dibromopyridine, 120 mg (1.35 mmol) of Pd$_2$(dba)$_3$ and 0.9 mL of 0.3M $^t$Bu$_3$P (2.7 mmol) in toluene. This mixture was stirred for 12 hours at 60° C., then cooled to room temperature and diluted with 50 mL of water. The obtained mixture was extracted with dichloromethane (3×50 mL). The combined organic extract was dried over Na$_2$SO$_4$, and then evaporated to dryness. The residue was purified by flash chromatography on silica gel 60 (40 μm-63 μm, eluent:hexane-ethyl acetate=10:1, vol.) yielding 0.8 g of an intermediate A (2,6-bis(3",5"-di-tert-butyl-2'-(methoxymethoxy)-5'-methyl-[1,1':3',1"-terphenyl]-2-yl)pyridine) and 1.21 g (34%) of a monoarylated product B (2-bromo-6-(3",5"-di-tert-butyl-2'-(methoxymethoxy)-5'-methyl-[1,1':3',1"-terphenyl]-2-yl)pyridine) as a side product. To the intermediate A were added 20 mL of THF, 20 mL of methanol and 1 mL of 12 N hydrochloric acid. The reaction mixture was stirred overnight at 60° C. and then poured into 200 mL of water. The obtained mixture was extracted with dichloromethane (3×50 mL). The combined organic extract was dried over Na$_2$SO$_4$ and then evaporated to dryness. The residue was purified by flash chromatography on silica gel 60 (40 μm-63 μm, eluent:hexane-ethyl acetate=10:1, vol.). Yield 620 mg (10%) of product A as a white foam. $^1$H NMR (CDCl$_3$, 400 MHz, product A): δ 7.36-7.46 (m, 7H), 7.33 (br. s., 2H), 7.26 (br. s., 4H), 7.14 (t, J=7.38 Hz, 2H), 7.05-7.12 (m, 4H), 6.76-6.95 (m, 2H), 6.52 (br. s., 1H), 6.12 (br. s., 1H), 2.28 (br. s., 6H), 1.35 (s, 36H). $^1$H NMR (CDCl$_3$, 400 MHz, product B): δ 7.76-7.85 (m, 1H), 7.43-7.55 (m, 3H), 7.33-7.38 (m, 1H), 7.27-7.33 (m, 2H), 7.11-7.18 (m, 2H), 7.05 (d, J=1.19 Hz, 2H), 7.00 (d, J=7.61 Hz, 1H), 4.15 (s, 2H), 2.47 (s, 3H), 2.39 (s, 3H), 1.32 (s, 18H).

3",5"-Di-tert-butyl-2-(6-(3'-(tert-butyl)-2'-hydroxy-5'-methyl-[1,1'-biphenyl]-2-yl)pyridin-2-yl)-5'-methyl-[1,1':3',1"-terphenyl]-2'-ol

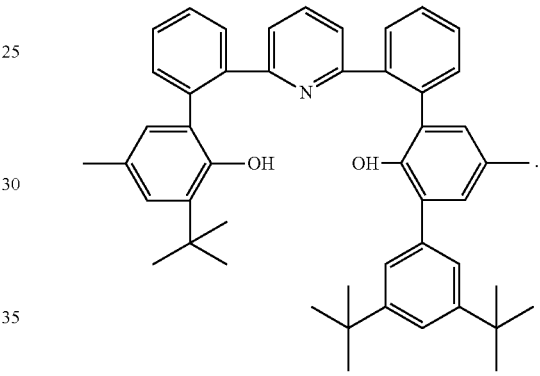

To a solution of 1.14 g (1.99 mmol) of 2-bromo-6-(3",5"-di-tert-butyl-2'-(methoxymethoxy)-5'-methyl-[1,1':3',1"-terphenyl]-2-yl)pyridine in 10 mL of toluene were added 817 mg (1.99 mmol) of 2-(3'-(tert-butyl)-2'-(methoxymethoxy)-5'-methyl-[1,1'-biphenyl]-2-yl)-4,4,5,5-tetramethyl-1,3,2-dioxaborolane, 530 mg (5.00 mmol) of sodium carbonate, 10 mL of water and 5 mL of methanol. The mixture obtained was sparged with argon for 10 minutes followed by the addition of 115 mg (0.10 mmol) of Pd(PPh$_3$)$_4$. This mixture was stirred for 12 hours at 90° C., then the mixture was cooled to room temperature and diluted with 50 mL of water. The obtained mixture was extracted with dichloromethane (3×50 mL). The combined organic extract was dried over Na$_2$SO$_4$ and then evaporated to dryness. To the resulting oil were added 50 mL of THF, 50 mL of methanol and 1 mL of 12 N hydrochloric acid. The reaction mixture was stirred overnight at 60° C. and then poured into 200 mL of water. The obtained mixture was extracted with dichloromethane (3×50 mL). The combined organic extract was dried over Na$_2$SO$_4$ and then evaporated to dryness. The residue was purified by flash chromatography on silica gel 60 (40 μm-63 μm, eluent:hexane-ethyl acetate=10:1, vol.). Yield 750 mg (55%) of a mixture of two isomers as a white foam. $^1$H NMR (CDCl$_3$, 400 MHz): δ 7.39-7.57 (m, 6H), 7.33 (br. s., 3H), 7.16-7.23 (m, 2H), 7.00-7.16 (m, 4H), 6.97 (br. s., 1H), 6.91 (br. s., 1H), 6.86 (m, 1H), 6.70 (s, 1H), 6.32 (br. s., 1H), 2.02-2.32 (m, 6H), 1.35 (br. s., 9H), 1.30 (br.s 9H), 1.10 (br. s., 9H).

Dimethylhafnium[2',2'''-(pyridine-2,6-diyl)bis(3-(tert-butyl)-5-methyl-[1,1'-biphenyl]-2-olate)] (Catalyst 1)

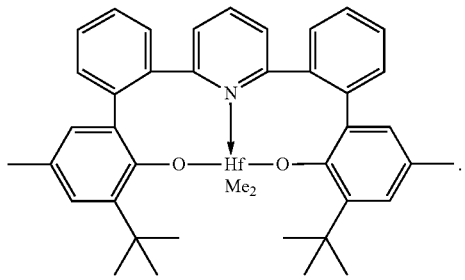

To a suspension of 115 mg (0.360 mmol) of hafnium tetrachloride in 30 mL of dry toluene was added in one portion at room temperature 0.600 mL (1.62 mmol, 2.7 M) of MeMgBr in diethyl ether. The resulting suspension was stirred for 20 minutes. Then a solution of 200 mg (0.360 mmol) of 2',2'''-(pyridine-2,6-diyl)bis(3-(tert-butyl)-5-methyl-[1,1'-biphenyl]-2-ol) in 10 mL of dry toluene was added dropwise over 5 minutes. The reaction mixture was stirred overnight at room temperature and then the mixture was evaporated to near dryness. The solids obtained were extracted with 2×20 mL of hot methylcyclohexane, and the combined organic extract was filtered through a thin pad of Celite 503. The filtrate was evaporated to dryness. The resulting solid was washed with 5 mL of n-pentane and then dried under reduced pressure. Yield 170 mg (62%) of a white solid. Anal. Calc. for $C_{41}H_{45}HfNO_2$: C, 64.60; H, 5.95; N, 1.84. Found: C, 64.95; H, 6.22; N, 1.62. $^1$H NMR (CDCl$_3$, 400 MHz): (δ 7.70 (t, J=7.82 Hz, 1H), 7.54 (dt, J=1.33, 7.60 Hz, 2H), 7.28-7.35 (m, 4H), 7.14 (d, J=7.76 Hz, 2H), 7.03-7.10 (m, 4H), 6.78 (d, J=1.77 Hz, 2H), 2.26 (s, 6H), 1.44 (s, 18H), −0.78 (s, 6H). $^{13}$C NMR (CDCl$_3$, 100 MHz): δ 158.28, 157.65, 142.01, 139.54, 137.72, 132.70, 132.28, 132.14, 131.22, 130.76, 129.02, 128.50, 128.21, 127.37, 127.26, 126.32, 125.22, 48.46, 34.90, 30.12, 20.79.

Dimethylhafnium[2,2'''-(pyridine-2,6-diyl)bis(5'-methyl-[1,1':3',1''-terphenyl]-2'-olate)] (Catalyst 2)

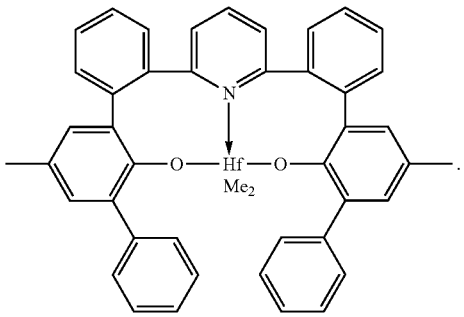

To a suspension of 269 mg (0.839 mmol) of hafnium tetrachloride in 30 mL of dry toluene was added in one portion at room temperature 1.40 mL (3.78 mmol, 2.7M) of MeMgBr in diethyl ether. The resulting suspension was stirred for 20 minutes. Then a solution of 500 mg (0.839 mmol) of 2,2'''-(pyridine-2,6-diyl)bis(5'-methyl-[1,1':3',1''-terphenyl]-2'-ol) in 10 mL of dry toluene was added to the suspension dropwise over 5 minutes. The reaction mixture was stirred overnight at room temperature and then the mixture was evaporated to near dryness. The solids obtained were extracted with 2×20 mL of hot methylcyclohexane, and the combined organic extract was filtered through a thin pad of Celite 503. The filtrate was evaporated to dryness. The resulting solid was washed with 5 mL of n-pentane and then dried under reduced pressure. Yield 310 mg (46%) of a white solid. Anal. Calc. for $C_{45}H_{37}HfNO_2$: C, 67.37; H, 4.65; N, 1.75. Found: C, 67.65; H, 4.90; N, 1.63. $^1$H NMR (CDCl$_3$, 400 MHz): δ 7.83-7.91 (m, 4H), 7.30-7.38 (m, 5H), 7.01-7.26 (m, 7H), 6.87 (dd, J=0.61, 2.38 Hz, 2H), 6.83 (dt, J=1.39, 7.57 Hz, 2H), 6.55 (dd, J=1.11, 7.76 Hz, 2H), 6.21-6.32 (m, 3H), 2.13 (s, 6H), −0.40 (s, 6H). $^{13}$C NMR (CDCl$_3$, 100 MHz): δ 141.23, 139.20, 138.95, 131.93, 131.84, 131.11, 130.77, 130.58, 129.79, 129.58, 129.03, 128.95, 127.82, 127.37, 126.22, 124.69, 47.50, 20.55.

Dimethylhafnium[2',2'''-(pyridine-2,6-diyl)bis(3-(9H-carbazol-9-yl)-5-methyl-[1,1'-biphenyl]-2-olate)] (Catalyst 3)

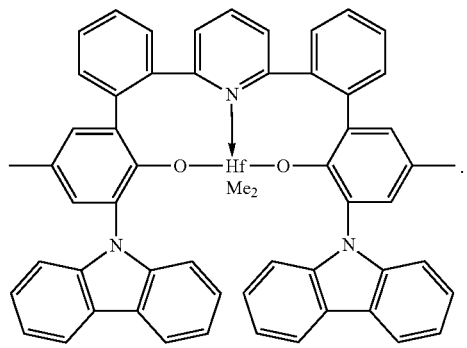

To a suspension of 165 mg (0.517 mmol) of hafnium tetrachloride in 30 mL of dry toluene was added in one portion at room temperature 0.860 mL (2.33 mmol, 2.7M) of MeMgBr in diethyl ether. The resulting suspension was stirred for 20 minutes. Then a solution of 400 mg (0.517 mmol) of 2',2'''-(pyridine-2,6-diyl)bis(3-(9H-carbazol-9-yl)-5-methyl-[1,1'-biphenyl]-2-ol) in 10 mL of dry toluene was added dropwise over 5 minutes. The reaction mixture was stirred overnight at room temperature and then the mixture was evaporated to near dryness. The solids obtained were extracted with 2×20 mL of hot toluene, and the combined organic extract was filtered through a thin pad of Celite 503. Next, the filtrate was evaporated to dryness. The resulting solid was washed with 5 mL of n-pentane and then dried under reduced pressure. Yield 276 mg (54%) of a white solid. Anal. Calc. for $C_{57}H_{43}HfN_3O_2$: C, 69.83; H, 4.42; N, 4.29. Found: C, 70.07; H, 4.57; N, 4.10. $^1$H NMR (C$_6$D$_6$, 400 MHz): δ 8.19-8.34 (m, 2H), 8.05 (d, J=7.65 Hz, 2H), 7.42-7.48 (m, J=8.21 Hz, 2H), 7.33-7.42 (m, 4H), 7.24 (ddd, J=1.16, 7.12, 8.23 Hz, 2H), 6.87-7.15 (m, 12H), 6.33-6.40 (m, 1H), 6.26 (dt, J=1.22, 7.60 Hz, 2H), 6.17-6.24 (m, 2H), 5.91 (dd, J=0.94, 7.60 Hz, 2H), 2.02 (s, 6H), −1.48 (s, 6H). $^{13}$C NMR (CDCl$_3$, 100 MHz): δ 156.54, 154.89, 140.95, 140.73, 139.38, 138.83, 132.98, 132.04, 130.76, 130.65, 129.98, 128.99, 128.63, 128.19, 127.95, 127.43, 125.59, 125.48, 125.26, 125.16, 124.93, 123.88, 122.33, 120.29, 119.61, 119.07, 119.01, 112.31, 109.11, 45.72, 20.53.

Dimethylzirconium[2',2'''-(pyridine-2,6-diyl)bis(3-(tert-butyl)-5-methyl-[1,1'-biphenyl]-2-olate)] (Catalyst 4)

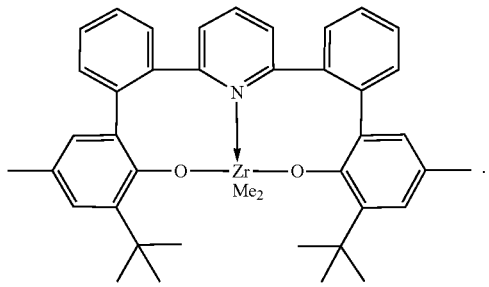

To a suspension of 80 mg (0.342 mmol) of zirconium tetrachloride in 30 mL of dry toluene was added in one portion at −35° C., 0.570 mL (1.54 mmol, 2.7M) of MeMgBr in diethyl ether. The resulting suspension was stirred for 30 minutes. Then a solution of 190 mg (0.342 mmol) of 2',2'''-(pyridine-2,6-diyl)bis(3-(tert-butyl)-5-methyl-[1,1'-biphenyl]-2-ol) in 10 mL of dry toluene was added dropwise over 5 minutes. The reaction mixture was stirred overnight at room temperature and then evaporated to near dryness. The solids obtained were extracted with 2×20 mL of hot methylcyclohexane, and the combined organic extract was filtered through a thin pad of Celite 503. Next, the filtrate was evaporated to dryness. The resulting solid was washed with 5 mL of n-pentane and then dried under reduced pressure. Yield 110 mg (47%) of a white solid. Anal. Calc. for $C_{41}H_{45}ZrNO_2$: C, 72.95; H, 6.72; N, 2.07. Found: C, 73.23; H, 6.94; N, 1.82. $^1$H NMR (CDCl$_3$, 400 MHz): δ 7.69 (t, J=7.76 Hz, 1H), 7.45-7.56 (m, 2H), 7.21-7.34 (m, 4H), 7.11 (d, J=7.76 Hz, 2H), 6.96-7.07 (m, 4H), 6.70-6.79 (m, 2H), 2.24 (s, 6H), 1.43 (s, 18H), −0.57 (s, 6H).

Dimethylzirconium[2,2'''-(pyridine-2,6-diyl)bis(5'-methyl-[1,1':3',1''-terphenyl]-2'-olate)] (Catalyst 5)

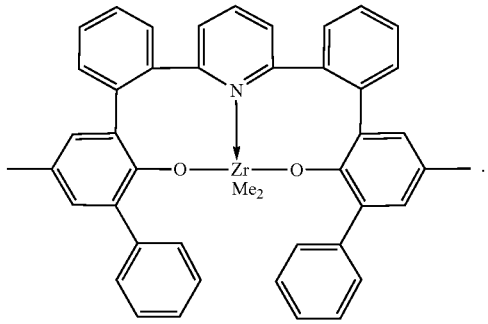

To a suspension of 200 mg (0.335 mmol) of zirconium tetrachloride in 30 mL of dry toluene was added in one portion at −35° C. 0.560 mL (1.51 mmol, 2.7M) of MeMgBr in diethyl ether. The resulting suspension was stirred for 30 minutes. Then a solution of 200 mg (0.335 mmol) of 2,2'''-(pyridine-2,6-diyl)bis(5'-methyl-[1,1':3',1''-terphenyl]-2'-ol) in 10 mL of dry toluene was added dropwise over 5 minutes. The reaction mixture was stirred overnight at room temperature and then evaporated to near dryness. The solids obtained were extracted with 2×20 mL of hot methylcyclohexane, and the combined organic extract was filtered through a thin pad of Celite 503. The filtrate was evaporated to dryness. The resulting solid was washed with 5 mL of n-pentane and then dried under reduced pressure. Yield 46 mg (19%) of a white solid. Anal. Calc. for $C_{45}H_{37}ZrNO_2$: C, 75.59; H, 5.22; N, 1.96. Found: C, 75.71; H, 5.43; N, 1.73. $^1$H NMR (CDCl$_3$, 400 MHz): δ 7.69 (d, J=7.21 Hz, 4H), 7.52-7.57 (m, 1H), 7.34-7.42 (m, 8H), 7.28-7.34 (m, 2H), 7.09 (d, J=2.11 Hz, 2H), 6.88 (d, J=7.76 Hz, 2H), 6.83 (d, J=2.22 Hz, 2H), 6.72-6.78 (m, 2H), 6.33 (d, J=7.54 Hz, 2H), 2.24 (s, 6H), −0.83 (s, 6H).

Dimethylhafnium[3'',5''-di-tert-butyl-2-(6-(3'-(tert-butyl)-5'-methyl-2'-oxido-[1,1'-biphenyl]-2-yl)pyridin-2-yl)-5'-methyl-[1,1':3',1''-terphenyl]-2'-olate] (Catalyst 6)

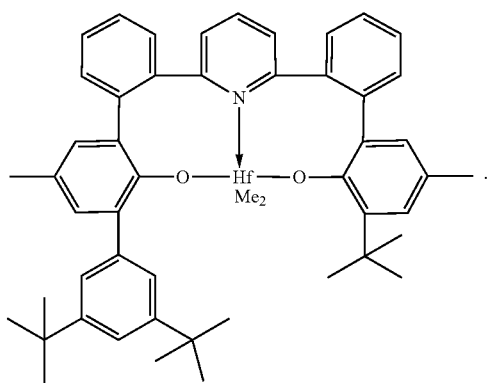

To a suspension of 139 mg (0.436 mmol) of hafnium tetrachloride in 30 mL of dry toluene was added in one portion at room temperature 0.676 mL (1.96 mmol, 2.9M) of MeMgBr in diethyl ether. The resulting suspension was stirred for 20 minutes. Then a solution of 300 mg (0.436 mmol) of 3'',5''-di-tert-butyl-2-(6-(3'-(tert-butyl)-2'-hydroxy-5'-methyl-[1,1'-biphenyl]-2-yl)pyridin-2-yl)-5'-methyl-[1,1':3',1''-terphenyl]-2'-ol in 10 mL of dry toluene was added dropwise over 5 minutes. The reaction mixture was stirred overnight at room temperature and then evaporated to near dryness. The solids obtained were extracted with 2×20 mL of toluene, and the combined organic extract was filtered through a thin pad of Celite 503. Next, the filtrate was evaporated to dryness. The resulting solid was washed with 5 mL of n-pentane and then dried under reduced pressure. Yield 293 mg (75%) of a white solid. Anal. Calc. for $C_{51}H_{57}HfNO_2$: C, 68.48; H, 6.42; N, 1.57. Found: C, 68.75; H, 6.64; N, 1.39. $^1$HNMR (C$_6$D$_6$, 400 MHz): δ 8.01 (br. s., 2H), 7.66 (br. s., 1H), 7.41 (br. s., 1H), 7.37 (br. s., 1H), 7.25 (br. s., 1H), 7.13 (br. s., 4H), 7.05 (br. s., 1H), 6.90-7.03 (m, 2H), 6.76 (br. s., 1H), 6.56-6.67 (m, 1H), 6.53 (br. s., 1H), 6.39 (br. s., 1H), 6.25 (br. s., 1H), 2.23 (br. s., 3H), 1.46 (br. s., 27H), −0.10 (br. s., 3H), −0.48 (br. s., 3H). $^{13}$C NMR (CDCl$_3$, 100 MHz): δ 159.30, 158.22, 157.94, 157.59, 150.85, 143.35, 142.37, 140.73, 139.40, 138.84, 135.15, 133.55, 133.35, 132.83, 132.39, 131.83, 131.36, 130.98, 130.80, 130.71, 130.62, 129.66, 127.92, 127.27, 126.04, 125.38, 124.77, 124.08, 122.14, 49.69, 49.48, 35.53, 32.28, 30.56, 23.07, 21.43, 20.95, 14.64.

Dimethylhafnium[2'',2''''-(pyridine-2,6-diyl)bis(3,5-di-tert-butyl-5'-methyl-[1,1':3',1''-terphenyl]-2'-olate)] (Catalyst 7)

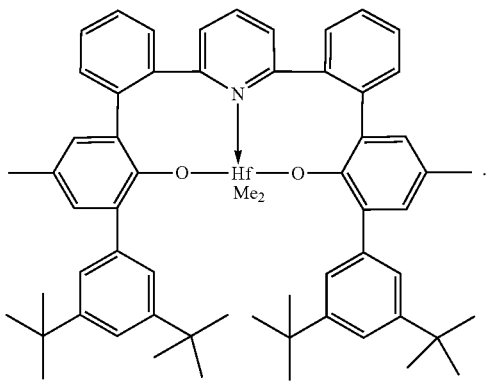

To a suspension of 152 mg (0.475 mmol) of hafnium tetrachloride in 30 mL of dry toluene was added in one portion at room temperature 0.740 mL (2.14 mmol, 2.9M) of MeMgBr in diethyl ether. The resulting suspension was stirred for 20 minutes. Then a solution of 390 mg (0.475 mmol) of 2'',2''''-(pyridine-2,6-diyl)bis(3,5-di-tert-butyl-5'-methyl-[1,1':3',1''-terphenyl]-2'-ol) in 10 mL of dry toluene was added dropwise over 5 minutes. The reaction mixture was stirred overnight at room temperature and then the mixture was evaporated to near dryness. The solids obtained were extracted with 2×20 mL of boiling toluene, and the combined organic extract was filtered through a thin pad of Celite 503. Next, the filtrate was evaporated to dryness. The resulting solid was washed with 5 mL of n-pentane and then dried under reduced pressure. Yield 358 mg (74%) of a white solid. Anal. Calc. for $C_{61}H_{69}HfNO_2$: C, 71.36; H, 6.77; N, 1.36. Found: C, 71.55; H, 6.94; N, 1.32. $^1$H NMR ($C_6D_6$, 400 MHz, 70° C.): δ 7.68 (d, J=1.65 Hz, 4H), 7.62 (t, J=1.51 Hz, 2H), 7.28 (d, J=7.61 Hz, 2H), 7.08-7.15 (m, 5H), 6.98-7.07 (m, 2H), 6.81-6.87 (m, 4H), 6.67 (d, J=7.52 Hz, 2H), 6.47 (t, J=7.66 Hz, 1H), 6.34 (d, J=7.70 Hz, 2H), 2.16 (s, 6H), 1.44 (s, 36H), −0.52 (s, 6H). $^{13}$C NMR (CDCl$_3$, 100 MHz, 70° C.): δ 158.12, 156.99, 150.79, 143.00, 140.77, 138.94, 133.12, 132.91, 132.18, 131.53, 130.44, 129.66, 129.40, 128.88, 128.68, 127.69, 124.75, 124.69, 121.92, 49.09, 35.54, 32.32, 20.90.

((4-(Methoxymethoxy)-1,3-phenylene)bis(propane-2,2-diyl))dibenzene

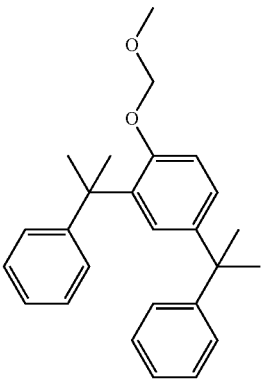 [SMILES: COCOc1ccc(C(C)(C)c2ccccc2)cc1C(C)(C)c1ccccc1]

To a solution of 30.0 g (90.8 mmol) of 2,4-bis(2-phenylpropan-2-yl)phenol in 500 mL of THF 3.81 g (95.3 mmol, 60% wt. in mineral oil) of sodium hydride was added portionwise at room temperature. To the resulting suspension 7.60 mL (99.9 mmol) of methoxymethyl chloride was added dropwise for 10 minutes at room temperature. The obtained mixture was stirred overnight, then poured into 500 mL of water. The product was extracted with dichloromethane (3×300 mL), the combined organic extract was washed with 5% NaHCO$_3$, dried over Na$_2$SO$_4$, and then evaporated to dryness. Yield 34.0 g (quant.) of a light-yellow oil. $^1$H NMR (CDCl$_3$, 400 MHz): δ 7.49 (d, J=2.3 Hz, 1H), 7.37-7.42 (m, 4H), 7.25-7.32 (m, 5H), 7.15-7.19 (m, 2H), 7.00 (d, J=8.5 Hz, 1H), 4.68 (s, 2H), 3.06 (s, 3H), 1.84 (s, 6H), 1.74 (s, 6H). $^{13}$C NMR (CDCl$_3$, 100 MHz): δ 153.09, 151.59, 150.96, 143.14, 137.65, 127.90, 127.58, 126.72, 125.63, 125.49, 125.41, 124.75, 114.23, 93.75, 55.28, 42.59, 42.04, 30.99, 29.55.

2-(2-(Methoxymethoxy)-3,5-bis(2-phenylpropan-2-yl)phenyl)-4,4,5,5-tetramethyl-1,3,2-dioxaborolane

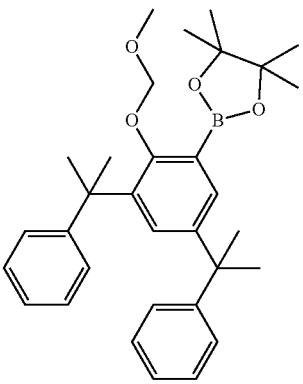 [SMILES: COCOc1c(B2OC(C)(C)C(C)(C)O2)cc(C(C)(C)c2ccccc2)cc1C(C)(C)c1ccccc1]

To a solution of 15.0 g (40.1 mmol) of 44-(methoxymethoxy)-1,3-phenylene)bis(propane-2,2-diyl)) dibenzene in 400 mL of dry diethyl ether 32.0 mL (80.2 mmol) of 2.5 M ''BuLi in hexanes was added dropwise for 20 minutes at 0° C. The reaction mixture was stirred for 3 hours at room temperature, then cooled to −80° C., followed by an addition of 24.5 mL (120 mmol) of 2-isopropoxy-4,4,5,5-tetramethyl-1,3,2-dioxaborolane. The obtained suspension was stirred for 1 hours at room temperature, then poured into 400 mL of water. The obtained mixture was extracted with dichloromethane (3×300 mL), the combined organic extract was dried over Na$_2$SO$_4$ and then evaporated to dryness. Yield 20.0 g (quant.) of a colorless viscous oil. $^1$H NMR (CDCl$_3$, 400 MHz): δ 7.49 (d, J=2.4 Hz, 1H), 7.34 (d, J=2.5 Hz, 1H), 7.29 (d, J=4.7 Hz, 4H), 7.06-7.22 (m, 6H), 4.13 (s, 2H), 3.10 (s, 3H), 1.74 (s, 6H), 1.61 (s, 6H), 1.32 (s, 12H). $^{13}$C NMR (CDCl$_3$, 100 MHz): δ 156.94, 151.72, 150.92, 143.88, 140.51, 131.17, 129.39, 127.81, 127.70, 126.74, 125.82, 125.41, 124.95, 98.10, 83.57, 82.74, 56.52, 42.66, 42.22, 30.88, 30.11, 26.15, 25.36, 24.76, 13.85.

2'-Bromo-2-(methoxymethoxy)-3,5-bis(2-phenylpropan-2-yl)-1,1'-biphenyl

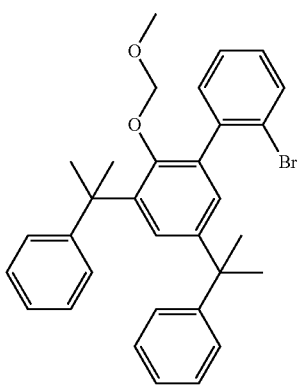 [SMILES: COCOc1c(-c2ccccc2Br)cc(C(C)(C)c2ccccc2)cc1C(C)(C)c1ccccc1]

To a solution of 20.0 g (40.0 mmol) of 2-(2-(methoxymethoxy)-3,5-bis(2-phenylpropan-2-yl)phenyl)-4,4,5,5-tetramethyl-1,3,2-dioxaborolane in 200 mL of 1,4-dioxane 12.5 g (44.0 mmol) of 2-bromoiodobenzene, 13.8 g (100 mmol) of potassium carbonate, and 100 mL of water were subsequently added. The mixture obtained was purged with argon for 10 minutes followed by addition of 2.30 g (2.00 mmol) of Pd(PPh$_3$)$_4$. This mixture was stirred for 12 hours at 100° C., cooled to room temperature, and then diluted with 100 mL of water. The obtained mixture was extracted with dichloromethane (3×200 mL), the combined organic extract was dried over Na$_2$SO$_4$ and then evaporated to dryness. The residue was purified by flash chromatography on silica gel 60 (40-63 um, eluent:hexane-dichloromethane=10:1, vol.). Yield 15.6 g (74%) of a yellow viscous oil. $^1$H NMR (CDCl$_3$, 400 MHz): δ 7.62 (dd, J=7.9, 1.1 Hz, 1H), 7.49 (d, J=2.4 Hz, 1H), 7.35-7.39 (m, 7H), 7.30 (d, J=4.4 Hz, 4H), 7.22-7.26 (m, 1H), 7.13-7.18 (m, 1H), 7.08 (d, J=2.4 Hz, 1H), 3.51 (d, J=4.7 Hz, 1H), 3.44 (d, J=4.7 Hz, 1H), 2.73 (s, 3H), 1.82 (s, 3H), 1.80 (s, 3H), 1.76 (s, 3H), 1.75 (s, 3H). $^{13}$C NMR (CDCl$_3$, 100 MHz): δ 151.47, 150.67, 150.48, 144.76, 142.49, 140.96, 134.66, 132.53, 132.15, 128.72, 128.45, 127.93, 127.89, 126.75, 125.94, 125.58, 125.53, 125.23, 124.33, 97.59, 56.12, 42.82, 42.41, 31.08, 30.85, 30.22, 30.06.

2-(2'-(Methoxymethoxy)-3',5'-bis(2-phenylpropan-2-yl)-[1,1'-biphenyl]-2-yl)-4,4,5,5-tetramethyl-1,3,2-dioxaborolane

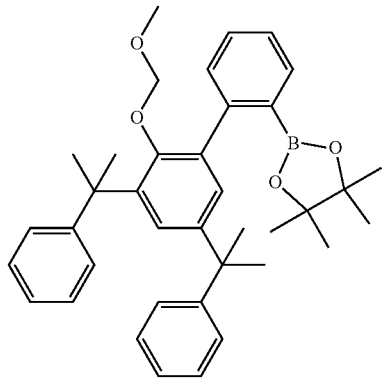 [SMILES: COCOc1c(-c2ccccc2B2OC(C)(C)C(C)(C)O2)cc(C(C)(C)c2ccccc2)cc1C(C)(C)c1ccccc1]

To a solution of 15.6 g (29.5 mmol) of 2'-bromo-2-(methoxymethoxy)-3,5-bis(2-phenylpropan-2-yl)-1,1'-biphenyl in 250 mL of dry THF 15.4 mL (38.4 mmol) of 2.5 M "BuLi in hexanes was added dropwise for 20 minutes at −80° C. The reaction mixture was stirred for 1 hour at this temperature followed by an addition of 10.8 mL (53.1 mmol) of 2-isopropoxy-4,4,5,5-tetramethyl-1,3,2-dioxaborolane. The obtained suspension was stirred for 1 hour at room temperature, then poured into 300 mL of water. Thus obtained mixture was extracted with dichloromethane (3×300 mL), the combined organic extract was dried over Na$_2$SO$_4$ and then evaporated to dryness. The residue was purified by flash chromatography on silica gel 60 (40-63 um, eluent:hexane-diethyl ether=10:1, vol.). Yield 9.90 g (58%) of a colorless glassy solid. $^1$H NMR (CDCl$_3$, 400 MHz): δ 7.82 (d, J=7.2 Hz, 1H), 7.30-7.43 (m, 8H), 7.20-7.27 (m, 5H), 7.12-7.17 (m, 1H), 7.08 (d, J=2.4 Hz, 1H), 3.57 (d, J=4.1 Hz, 1H), 3.27 (d, J=4.1 Hz, 1H), 2.70 (s, 3H), 1.81 (s, 3H), 1.79 (s, 3H), 1.78 (s, 3H), 1.69 (s, 3H), 1.22 (s, 12H). $^{13}$C NMR (CDCl$_3$, 100 MHz): δ 152.03, 151.10, 149.74, 146.07, 143.65, 141.71, 137.16, 134.63, 130.40, 129.69, 128.49, 127.79, 127.69, 126.73, 126.05, 125.99, 125.41, 125.31, 125.12, 96.52, 83.13, 56.13, 42.70, 42.38, 31.27, 31.02, 29.42, 24.80, 24.58.

2',2'''-(Pyridine-2,6-diyl)bis(3,5-bis(2-phenylpropan-2-yl)-[1,1'-biphenyl]-2-ol)

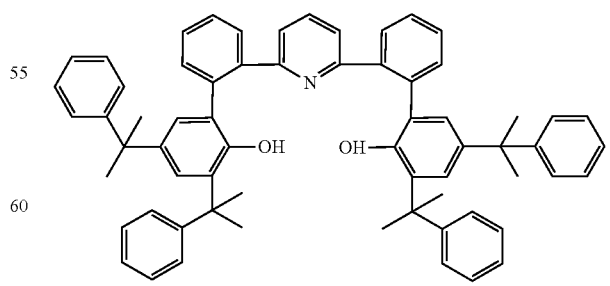

To a solution of 3.63 g (6.30 mmol) of 2-(2'-(methoxymethoxy)-3',5'-bis(2-phenylpropan-2-yl)-[1,1'-biphenyl]-2-yl)-4,4,5,5-tetramethyl-1,3,2-dioxaborolane in 14 mL of 1,4-dioxane 745 mg (3.15 mmol) of 2,6-dibromopyridine, 5.13 g (15.8 mmol) of cesium carbonate, and 7 mL of water were subsequently added. The mixture obtained was purged with argon for 10 minutes followed by addition of 315 mg (0.315 mmol) of Pd(PPh$_3$)$_4$. This mixture was stirred for 12 hours at 100° C., then cooled to room temperature, and diluted with 50 mL of water. The obtained mixture was extracted with dichloromethane (3×50 mL), the combined organic extract was dried over Na$_2$SO$_4$ and then evaporated to dryness. To the resulting oil 30 mL of THF, 30 mL of methanol, and 2 mL of 12N HCl were subsequently added. The reaction mixture was stirred overnight at 60° C. and then poured into 500 mL of water. The crude product was extracted with dichloromethane (3×35 mL), the combined organic extract was washed with 5% NaHCO$_3$, dried over Na$_2$SO$_4$, and then evaporated to dryness. The residue was purified by flash chromatography on silica gel 60 (40-63 um, eluent:hexane-ethyl acetate=10:1, vol.). Yield 2.22 g (79%) of a mixture of two isomers as a white foam. $^1$H NMR (CDCl$_3$, 400 MHz): δ 7.05-7.40 (m, 29H), 6.82-6.90 (m, 2H), 6.73 (d, J=7.8 Hz, 2H), 4.85+5.52 (s, 2H), 1.31-1.65 (m, 24H). $^{13}$C NMR (CDCl$_3$, 100 MHz) δ 158.02, 151.02 (broad), 149.77 (broad), 148.46 (broad), 141.56, 140.17 (broad), 136.75 (broad), 134.89 (broad), 131.31 (broad), 130.62 (broad), 128.32, 128.23, 127.78, 127.72, 126.57, 125.71, 125.61, 125.33, 124.68 (broad), 122.22 (broad), 42.39 (broad), 41.99, 30.97 (broad), 30.77 (broad), 29.53 (broad), 29.34 (broad).

Dimethylhafnium[2',2'''-(pyridine-2,6-diyl)bis(3,5-bis(2-phenylpropan-2-yl)-[1,1'-biphenyl]-2-olate)] (Catalyst 9)

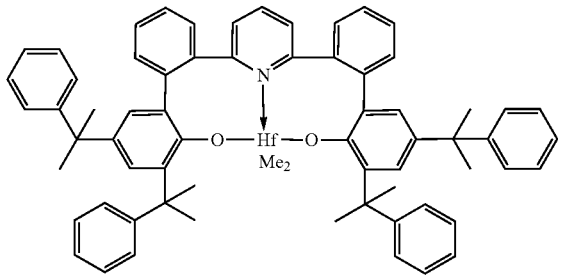

To a suspension of 144 mg (0.450 mmol) of hafnium tetrachloride in 50 mL of dry toluene 698 ul (2.03 mmol) of 2.9 M MeMgBr in diethyl ether was added in one portion via syringe at 0° C. To the resulting suspension 400 mg (0.450 mmol) of 2',2'''-(pyridine-2,6-diyl)bis(3,5-bis(2-phenylpropan-2-yl)-[1,1'-biphenyl]-2-ol) was immediately added in one portion. The reaction mixture was stirred for 4 hours at room temperature and then evaporated to near dryness. The solid obtained was extracted with 2×20 mL of hot toluene, and the combined organic extract was filtered through a thin pad of Celite 503. Next, the filtrate was evaporated to dryness. The residue was triturated with 5 mL of n-hexane, the obtained precipitate was filtered off, washed with 2×5 mL of n-hexane, and then dried in vacuo. Yield 335 mg (68%) of a white-beige solid. Anal. Calc. for C$_{67}$H$_{65}$HfNO$_2$: C, 73.51; H, 5.98; N, 1.28. Found: C, 73.85; H, 6.12; N, 1.13. $^1$H NMR (C$_6$D$_6$, 400 MHz): δ 7.33-7.35 (m, 6H), 7.23-7.24 (m, 4H), 7.03-7.20 (m, 15H), 6.98 (t, J=7.2 Hz, 2H), 6.86 (d, J=7.4 Hz, 2H), 6.58 (t, J=7.6 Hz, 1H), 6.33 (d, J=7.8 Hz, 2H), 1.96 (s, 6H), 1.76 (s, 6H), 1.61 (s, 6H), 1.60 (s, 6H), −0.74 (s, 6H). $^{13}$C NMR (CDCl$_3$, 100 MHz) δ 158.12, 157.62, 151.61, 150.77, 142.27, 138.95, 138.69, 136.28, 132.75, 132.18, 131.68, 130.74, 127.67, 127.40, 126.91, 126.83, 126.65, 126.20, 125.21, 124.88, 48.42, 42.89, 42.32, 32.58, 30.96, 30.84, 28.46.

9-(2-(Methoxymethoxy)-5-methylphenyl)-9-methyl-9H-fluorene

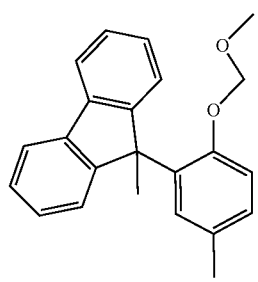 [SMILES: COCOc1ccc(C)cc1C1(C)c2ccccc2-c2ccccc21]

To a solution of 19.1 g (67.0 mmol) of 4-methyl-2-(9-methyl-9H-fluoren-9-yl)phenol in 100 mL of THF 13.9 mL (80.0 mmol) of diisopropylethylamine was added in one portion at room temperature. To the resulting solution 6.10 mL (80.0 mmol) of methoxymethyl chloride was added dropwise for 10 minutes at room temperature. The obtained mixture was stirred overnight at 60° C., then poured into 200 mL of water. The crude product was extracted with dichloromethane (3×150 mL), the combined organic extract was washed with 5% NaHCO$_3$, dried over Na$_2$SO$_4$, and then evaporated to dryness. The residue was purified by flash chromatography on silica gel 60 (40-63 um, eluent:hexane-ethyl acetate=20:1, vol.). Yield 13.3 g (60%) of a white powder. $^1$H NMR (CDCl$_3$, 400 MHz): δ 7.76 (d, J=7.43 Hz, 2H), 7.58 (d, J=2.0 Hz, 1H), 7.28 (td, J=7.4, 1.2 Hz, 2H), 7.17 (td, J=7.4, 1.2 Hz, 2H), 7.11 (m, 2H), 6.99 (ddd, J=8.2, 2.1, 0.7 Hz, 1H), 6.70 (d, J=8.2 Hz, 1H), 4.20 (s, 2H), 2.65 (s, 3H), 2.41 (s, 2H), 1.75 (s, 3H).

2-(2-(Methoxymethoxy)-5-methyl-3-(9-methyl-9H-fluoren-9-yl)phenyl)-4,4,5,5-tetramethyl-1,3,2-dioxaborolane

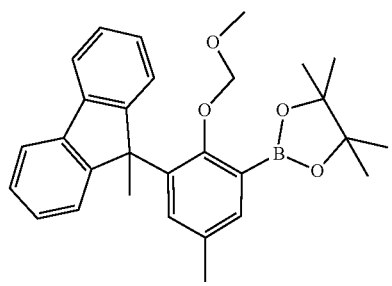 [SMILES: COCOc1c(B2OC(C)(C)C(C)(C)O2)cc(C)cc1C1(C)c2ccccc2-c2ccccc21]

To a solution of 13.3 g (40.0 mmol) of 9-(2-(methoxymethoxy)-5-methylphenyl)-9-methyl-9H-fluorene in 400 mL of dry diethyl ether 32.0 mL (80.2 mmol) of 2.5 M "BuLi in hexanes was added dropwise for 20 minutes at 0° C. The reaction mixture was stirred for 3 hours at room temperature, then cooled to −80° C., followed by an addition of 18.0 mL (88.0 mmol) of 2-isopropoxy-4,4,5,5-tetramethyl-1,3,2-dioxaborolane. The obtained suspension was stirred for 1 hour at room temperature, then poured into 400 mL of water. The crude product was extracted with dichloromethane (3×300 mL), the combined organic extract was dried over $Na_2SO_4$ and then evaporated to dryness. The residue was triturated with 100 mL of methanol, the obtained precipitate was filtered off on a glass frit (G4), washed with 10 mL of methanol, and then dried in vacuum. Yield 13.2 g (72%) of a white solid. $^1$H NMR ($CDCl_3$, 400 MHz): δ 7.75 (d, J=7.5 Hz, 2H), 7.61 (d, J=2.0 Hz, 1H), 7.28 (m, 3H), 7.16 (td, J=7.4, 1.0 Hz, 2H), 7.07 (d, J=7.5 Hz, 2H), 3.93 (s, 2H), 2.78 (s, 3H), 2.39 (s, 3H), 1.71 (s, 3H), 1.24 (s, 12H).

9-(2'-Bromo-2-(methoxymethoxy)-5-methyl-[1,1'-biphenyl]-3-yl)-9-methyl-9H-fluorene

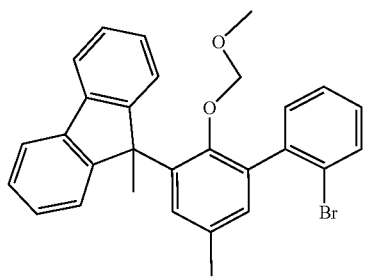 [SMILES: COCOc1c(-c2ccccc2Br)cc(C)cc1C1(C)c2ccccc2-c2ccccc21]

To a solution of 5.06 g (11.1 mmol) of 2-(2-(methoxymethoxy)-5-methyl-3-(9-methyl-9H-fluoren-9-yl)phenyl)-4,4,5,5-tetramethyl-1,3,2-dioxaborolane in 40 mL of 1,4-dioxane 3.45 g (12.2 mmol) of 2-bromoiodobenzene, 3.84 g (27.8 mmol) of potassium carbonate, and 20 mL of water were subsequently added. The mixture obtained was purged with argon for 10 minutes followed by addition of 0.64 g (0.60 mmol) of $Pd(PPh_3)_4$. This mixture was stirred for 12 hours at 100° C., cooled to room temperature, and then diluted with 100 mL of water. The crude product was extracted with dichloromethane (3×200 mL), the combined organic extract was dried over $Na_2SO_4$ and then evaporated to dryness. The residue was purified by flash chromatography on silica gel 60 (40-63 um, eluent:hexane-dichloromethane=10:1, vol.). Yield 5.14 g (95%) of a yellow viscous oil. $^1$H NMR ($CDCl_3$, 400 MHz): δ 7.81 (d, J=7.5 Hz, 2H), 7.70 (br.s, 1H), 7.53 (d, J=8.0 Hz, 1H), 7.17-7.38 (m, 8H), 7.08 (m, 1H), 7.00 (br.s, 1H), 3.31 (m, 2H), 2.51 (s, 3H), 2.39 (s, 3H), 1.85 (s, 3H). $^{13}$C NMR ($CDCl_3$, 100 MHz): δ 150.91, 140.56, 140.03, 139.75, 137.58, 135.15, 132.21, 131.91, 130.96, 129.03, 128.31, 127.11, 126.59, 124.07, 97.94, 55.39, 52.92, 28.26, 21.15.

2-(2'-(Methoxymethoxy)-5'-methyl-3'-(9-methyl-9H-fluoren-9-yl)-[1,1'-biphenyl]-2-yl)-4,4,5,5-tetramethyl-1,3,2-dioxaborolane

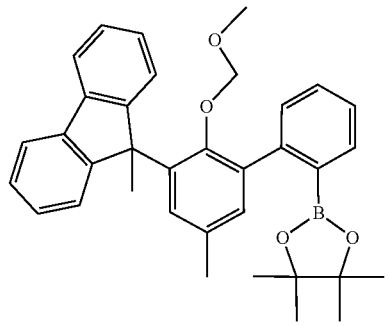 [SMILES: COCOc1c(-c2ccccc2B2OC(C)(C)C(C)(C)O2)cc(C)cc1C1(C)c2ccccc2-c2ccccc21]

To a solution of 5.14 g (10.6 mmol) of 9-(2'-bromo-2-(methoxymethoxy)-5-methyl-[1,1'-biphenyl]-3-yl)-9-methyl-9H-fluorene in 150 mL of dry THF 5.52 mL (13.8 mmol) of 2.5 M "BuLi in hexanes was added dropwise for 20 minutes at −80° C. The reaction mixture was stirred for 1 hours at this temperature followed by an addition of 3.90 mL (19.1 mmol) of 2-isopropoxy-4,4,5,5-tetramethyl-1,3,2-dioxaborolane. The obtained suspension was stirred for 1 hour at room temperature, then poured into 300 mL of water. The crude product was extracted with dichloromethane (3×300 mL), the combined organic extract was dried over $Na_2SO_4$ and then evaporated to dryness. The residue was purified by flash chromatography on silica gel 60 (40-63 um, eluent:hexane-diethyl ether=10:1, vol.). Yield 3.60 g (64%) of a colorless glassy solid. $^1$H NMR ($CDCl_3$, 400 MHz): δ 7.80 (d, J=7.3 Hz, 2H), 7.66 (d, J=6.8 Hz, 1H), 7.58 (s, 1H), 7.20-7.39 (m, 8H), 7.13 (d, J=7.2 Hz, 1H), 6.89 (s, 1H), 3.71 (br.s, 1H), 3.02 (br.s, 1H), 2.48 (s, 3H), 2.43 (s, 3H), 1.84 (s, 3H), 1.19 (br.s, 6H), 1.12 (br.s, 6H). $^{13}$C NMR ($CDCl_3$, 100 MHz): δ 150.12, 145.14, 136.97, 136.66, 133.85, 132.21, 130.95, 130.02, 129.16, 127.91, 125.95, 97.01, 83.20, 55.65, 53.13, 28.63, 24.96, 24.13, 20.97.

2',2'''-(Pyridine-2,6-diyl)bis(5-methyl-3-(9-methyl-9H-fluoren-9-yl)-[1,1'-biphenyl]-2-ol)

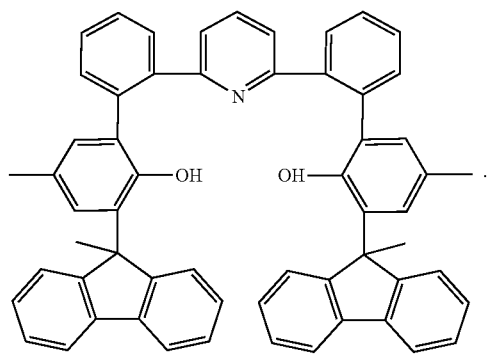

To a solution of 3.60 g (6.76 mmol) of 2-(2'-(methoxymethoxy)-5'-methyl-3'-(9-methyl-9H-fluoren-9-yl)-[1,1'-biphenyl]-2-yl)-4,4,5,5-tetramethyl-1,3,2-dioxaborolane in 20 mL of 1,4-dioxane 800 mg (3.38 mmol) of 2,6-dibromopyridine, 5.51 g (17.0 mmol) of cesium carbonate, and 10 mL of water were subsequently added. The mixture obtained was purged with argon for 10 minutes followed by addition of 390 mg (0.338 mmol) of Pd(PPh$_3$)$_4$. This mixture was stirred for 12 hours at 100° C., then cooled to room temperature, and diluted with 50 mL of water. The obtained mixture was extracted with dichloromethane (3×50 mL), the combined organic extract was dried over Na$_2$SO$_4$ and then evaporated to dryness. To the resulting oil 30 mL of THF, 30 mL of methanol, and 2 mL of 12N HCl were subsequently added. The reaction mixture was stirred overnight at 60° C. and then poured into 500 mL of water. The crude product was extracted with dichloromethane (3×35 mL), the combined organic extract was washed with 5% NaHCO$_3$, dried over Na$_2$SO$_4$, and then evaporated to dryness. The residue was purified by flash chromatography on silica gel 60 (40-63 um, eluent: hexane-ethyl acetate=10:1, vol.). Yield 2.30 g (85%) of a mixture of two isomers as a white foam. $^1$H NMR (CDCl$_3$, 400 MHz): δ 7.60-7.79 (m, 4H), 6.85-7.46 (m, 25H), 6.67 (d, J=7.8 Hz, 2H), 4.77+4.40 (2 br.s, 2H), 2.33-2.46 (m, 6H), 1.70 (br.s, 6H). $^{13}$C NMR (CDCl$_3$, 100 MHz) δ 157.25, 152.29, 149.04, 148.66, 139.96, 138.99, 136.35, 135.23, 131.16, 131.02, 130.40, 130.25, 130.08, 129.66, 128.71, 128.19, 128.06, 127.95, 127.63, 127.21, 126.99, 126.79, 123.72, 123.29, 121.57, 120.14, 119.96, 53.37, 53.11, 27.48, 20.83.

Dimethylhafnium[2',2'''-(pyridine-2,6-diyl)bis(5-methyl-3-(9-methyl-9H-fluoren-9-yl)-[1,1'-biphenyl]-2-olate)] (Catalyst 10)

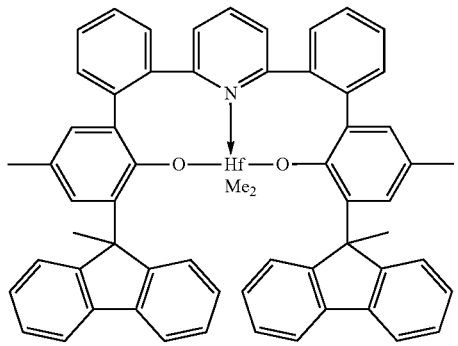

To a suspension of 160 mg (0.500 mmol) of hafnium tetrachloride in 50 mL of dry toluene 775 ul (2.25 mmol) of 2.9 M MeMgBr in diethyl ether was added in one portion via syringe at 0° C. To the resulting suspension 400 mg (0.500 mmol) of 2',2'''-(pyridine-2,6-diyl)bis(5-methyl-3-(9-methyl-9H-fluoren-9-yl)-[1,1'-biphenyl]-2-ol) was immediately added in one portion. The reaction mixture was stirred for 4 hours at room temperature and then evaporated to near dryness. The solids obtained were extracted with 2×20 mL of hot toluene, and the combined organic extract was filtered through a thin pad of Celite 503. Next, the filtrate was evaporated to dryness. The residue was triturated with 5 mL of n-hexane, the obtained precipitate was filtered off, washed with 2×5 mL of n-hexane, and then dried in vacuo. Yield 212 mg (42%) of a white-beige solid. Anal. Calc. for C$_{61}$H$_{49}$HfNO$_2$: C, 72.79; H, 4.91; N, 1.39. Found: C, 73.05; H, 5.14; N, 1.22. $^1$H NMR (C$_6$D$_6$, 400 MHz): δ 8.87 (d, J=7.3 Hz, 2H), 7.81 (m, 2H), 7.70 (d, J=7.7 Hz, 2H), 7.68 (m, 2H), 7.30-7.45 (m, 8H), 7.14-7.25 (m, 8H), 6.97 (br.s, 2H), 6.78 (d, J=2.3 Hz, 2H), 6.56-6.66 (m, 3H), 2.52 (s, 6H), 1.86 (s, 6H), 0.08 (s, 6H). $^{13}$C NMR (C$_6$D$_6$, 100 MHz) δ 159.60, 157.61, 154.95, 154.49, 142.23, 140.12, 139.92, 138.24, 133.25, 132.00, 131.70, 131.14, 130.83, 129.97, 129.79, 127.90, 127.83, 127.09, 126.89, 126.84, 126.65, 125.16, 124.98, 120.18, 119.52, 56.53, 50.23, 20.44.

3,4,4,7,7-Pentamethyl-4,5,6,7-tetrahydrobenzo[b]thiophene

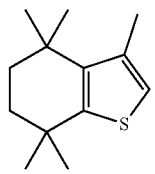

To a solution of 55.3 g (563 mmol) of 3-methylthiophene 103 g (563 mmol) of 2,5-dichloro-2,5-dimethylhexane was added. To the resulting solution 75.0 g (563 mmol) of aluminum trichloride was added portionwise at 0° C. for 1 hour. The obtained suspension was stirred overnight at room temperature, then this mixture was poured into 500 mL of the crushed ice. The crude product was extracted with dichloromethane (3×300 mL), the combined organic extract was dried over Na$_2$SO$_4$ and then evaporated to dryness. The residue was recrystallized twice from methanol. Yield 23.5 g (20%) of a white solid. $^1$H NMR (CDCl$_3$, 400 MHz): δ 6.71 (d, J=0.9 Hz, 1H), 2.34 (d, J=0.9 Hz, 3H), 1.71 (s, 4H), 1.34 (s, 6H), 1.31 (s, 6H).

2-(2-(Methoxymethoxy)-5-methylphenyl)-3,4,4,7,7-pentamethyl-4,5,6,7-tetrahydrobenzo[b]thiophene

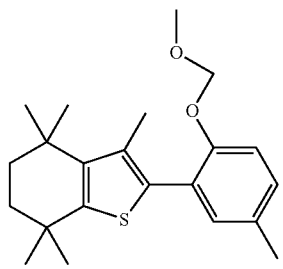 [SMILES: COCOc1ccc(C)cc1-c1sc2c(c1C)C(C)(C)CCC2(C)C]

To a solution of 10.0 g (48.0 mmol) of 3,4,4,7,7-pentamethyl-4,5,6,7-tetrahydrobenzo[b]thiophene in 200 mL of THF 19.2 mL (48.0 mmol) of 2.5 M $^n$BuLi in hexanes was added dropwise for 20 minutes at −80° C. The resulting solution was stirred for 1 hour at 0° C., followed by addition of 9.80 g (72.0 mmol) of ZnCl$_2$. Further on, 880 mg (0.96 mmol) of Pd$_2$(dba)3, 390 mg (1.92 mmol) of $^t$Bu$_3$P, and 11.1 g (48.0 mmol) of 2-bromo-1-(methoxymethoxy)-4-methylbenzene were subsequently added. The resulting solution was stirred overnight at 60° C., then this mixture was poured into 500 mL of water. The crude product was extracted with dichloromethane (3×300 mL), the combined organic extract was dried over Na$_2$SO$_4$ and then evaporated to dryness. The residue was purified by flash chromatography on silica gel 60 (40-63 um, eluent:hexane). Yield 12.9 g (75%) of a colorless oil. $^1$H NMR (CDCl$_3$, 400 MHz): δ 7.15 (s, 1H), 7.11 (s, 2H), 5.07 (s, 2H), 3.39 (s, 3H), 2.34 (s, 3H), 2.18 (s, 3H), 1.75 (s, 4H), 1.38 (s, 6H), 1.37 (s, 6H). $^{13}$C NMR (CDCl$_3$, 100 MHz): δ 152.94, 146.00, 140.74, 133.37, 133.17, 131.24, 130.72, 129.32, 125.77, 116.40, 95.69, 55.91, 38.48, 35.69, 34.39, 34.29, 32.65, 28.43, 20.43, 16.04.

2-(2'-Bromo-2-(methoxymethoxy)-5-methyl-[1,1'-biphenyl]-3-yl)-3,4,4,7,7-pentamethyl-4,5,6,7-tetrahydrobenzo[b]thiophene

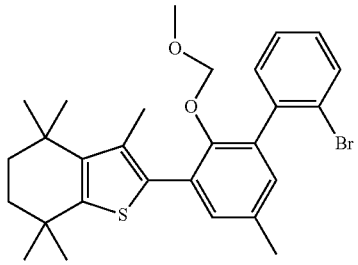 [SMILES: COCOc1c(-c2ccccc2Br)cc(C)cc1-c1sc2c(c1C)C(C)(C)CCC2(C)C]

To a solution of 10.0 g (27.9 mmol) of 2-(2-(methoxymethoxy)-5-methylphenyl)-3,4,4,7,7-pentamethyl-4,5,6,7-tetrahydrobenzo[b]thiophene in 200 mL of THF 11.1 mL (27.9 mmol) of 2.5 M ''BuLi in hexanes was added dropwise for 20 minutes at −80° C. The resulting solution was stirred for 1 hour at 0° C., followed by addition of 4.56 g (33.5 mmol) of ZnCl$_2$. Further on, 511 mg (0.56 mmol) of Pd$_2$(dba)3, 225 mg (1.12 mmol) of $^t$Bu$_3$P, and 8.70 g (30.7 mmol) of 2-bromoiodobenzene were subsequently added. The resulting solution was stirred overnight at 60° C., then this mixture was poured into 500 mL of water. The crude product was extracted with dichloromethane (3×300 mL), the combined organic extract was dried over Na$_2$SO$_4$ and then evaporated to dryness. The residue was purified by flash chromatography on silica gel 60 (40-63 um, eluent: hexane). Yield 2.90 g (20%) of a colorless viscous oil. $^1$H NMR (CDCl$_3$, 400 MHz): δ 7.65 (d, J=7.3 Hz, 1H), 7.39 (dd, J=7.5, 1.8 Hz, 1H), 7.35 (td, J=7.3, 0.9 Hz, 1H), 7.18-7.21 (m, 2H), 7.04 (d, J=1.6 Hz, 1H), 4.38 (m, 2H), 2.71 (s, 3H), 2.37 (s, 3H), 2.23 (s, 3H), 1.70 (m, 4H), 1.33-1.35 (m, 12H). $^{13}$C NMR (CDCl$_3$, 100 MHz): δ 150.32, 146.54, 141.00, 140.07, 135.40, 134.05, 133.00, 132.96, 132.48, 131.98, 131.15, 130.75, 129.37, 128.67, 126.90, 124.20, 98.44, 55.88, 38.43, 35.66, 34.41, 34.31, 32.64, 28.52, 28.29, 20.65, 16.02.

2-(2'-(Methoxymethoxy)-5'-methyl-3'-(3,4,4,7,7-pentamethyl-4,5,6,7-tetrahydrobenzo[b]thiophen-2-yl)-[1,1'-biphenyl]-2-yl)-4,4,5,5-tetramethyl-1,3,2-dioxaborolane

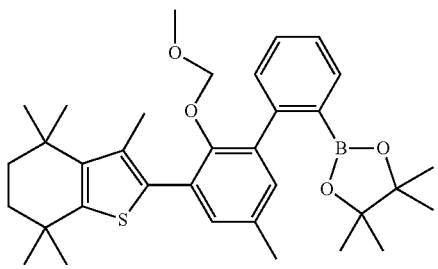 [SMILES: COCOc1c(-c2ccccc2B2OC(C)(C)C(C)(C)O2)cc(C)cc1-c1sc2c(c1C)C(C)(C)CCC2(C)C]

To a solution of 2.90 g (5.61 mmol) of 2-(2'-bromo-2-(methoxymethoxy)-5-methyl-[1,1'-biphenyl]-3-yl)-3,4,4,7,7-pentamethyl-4,5,6,7-tetrahydrobenzo[b]thiophene in 50 mL of dry THF 2.70 mL (6.73 mmol) of 2.5 M ''BuLi in hexanes was added dropwise for 20 minutes at −80° C. The reaction mixture was stirred for 1 hour at this temperature followed by an addition of 1.95 mL (9.53 mmol) of 2-isopropoxy-4,4,5,5-tetramethyl-1,3,2-dioxaborolane. The obtained suspension was stirred for 1 hour at room temperature, then poured into 100 mL of water. The crude product was extracted with dichloromethane (3×300 mL), the combined organic extract was dried over Na$_2$SO$_4$ and then evaporated to dryness. The residue was purified by flash chromatography on silica gel 60 (40-63 um, eluent:hexane-diethyl ether=10:1, vol.). Yield 2.15 g (68%) of a colorless glassy solid. $^1$H NMR (CDCl$_3$, 400 MHz): 7.75 (d, J=7.5 Hz, 1H), 7.42 (m, 2H), 7.30-7.32 (m, 1H), 7.11 (s, 1H), 7.03 (s, 1H), 4.35 (s, 2H), 2.73 (s, 3H), 2.33 (s, 3H), 2.21 (s, 3H), 1.71 (s, 4H), 1.34 (s, 6H), 1.32 (s, 6H), 1.21 (s, 12H). $^{13}$C NMR (CDCl$_3$, 100 MHz): δ 150.40, 146.10, 144.07, 140.58, 137.23, 134.07, 133.48, 132.24, 131.99, 131.44, 130.09, 129.66, 128.79, 126.19, 98.49, 83.40, 56.04, 38.43, 35.66, 34.33, 34.25, 32.66, 28.41, 24.58 (broad), 20.58, 15.94.

2',2'''-(Pyridine-2,6-diyl)bis(5-methyl-3-(3,4,4,7,7-pentamethyl-4,5,6,7-tetrahydrobenzo[b]thiophen-2-yl)-[1,1'-biphenyl]-2-ol)

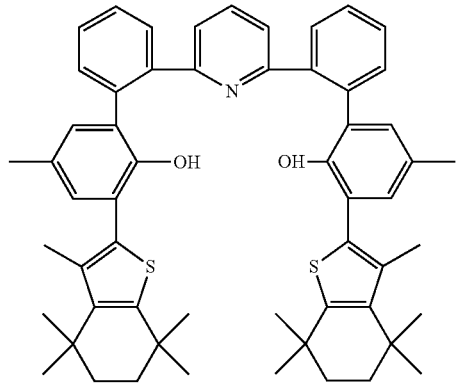

To a solution of 1.24 g (2.21 mmol) of 2-(2'-(methoxymethoxy)-5'-methyl-3'-(3,4,4,7,7-pentamethyl-4,5,6,7-tetrahydrobenzo[b]thiophen-2-yl)-[1,1'-biphenyl]-2-yl)-4,4,5,5-tetramethyl-1,3,2-dioxaborolane in 10 mL of 1,4-dioxane 262 mg (1.11 mmol) of 2,6-dibromopyridine, 1.80 g (5.53 mmol) of cesium carbonate, and 5 mL of water were subsequently added. The mixture obtained was purged with argon for 10 minutes followed by addition of 130 mg (0.110 mmol) of Pd(PPh$_3$)$_4$. This mixture was stirred for 12 hours at 100° C., then cooled to room temperature, and diluted with 50 mL of water. Thus obtained mixture was extracted with dichloromethane (3×50 mL), the combined organic extract was dried over Na$_2$SO$_4$ and then evaporated to dryness. To the resulting oil 30 mL of THF, 30 mL of methanol, and 1 mL of 12N HCl were subsequently added. The reaction mixture was stirred overnight at 60° C. and then poured into 500 mL of water. The crude product was extracted with dichloromethane (3×35 mL), the combined organic extract was washed with 5% NaHCO$_3$, dried over Na$_2$SO$_4$, and then evaporated to dryness. The residue was purified by flash chromatography on silica gel 60 (40-63 um, eluent:hexane-ethyl acetate=10:1, vol.). Yield 0.80 g (84%) of a white foam. $^1$H NMR (CDCl$_3$, 400 MHz): δ 7.28-7.43 (m, 9H), 7.02 (d, J=7.8 Hz, 2H), 6.99 (d, J=2.2 Hz, 2H), 6.89 (br.s, 2H), 2.20 (s, 6H), 1.85 (br.s, 6H), 1.68 (s, 8H), 1.31 (s, 12H), 1.26 (s, 12H). $^{13}$C NMR (CDCl$_3$, 100 MHz) δ 158.51, 148.72, 147.10, 141.29, 139.87, 137.11, 135.81, 134.18, 131.85, 131.53, 131.27, 130.20, 129.56, 129.36, 128.79, 128.30, 127.67, 122.46, 122.04, 38.62, 35.85, 34.53, 34.33, 32.62, 28.47, 20.25, 15.59.

Dimethylhafnium[2',2'''-(pyridine-2,6-diyl)bis(5-methyl-3-(3,4,4,7,7-pentamethyl-4,5,6,7-tetrahydrobenzo[b]thiophen-2-yl)-[1,1'-biphenyl]-2-olate)] (Catalyst 11)

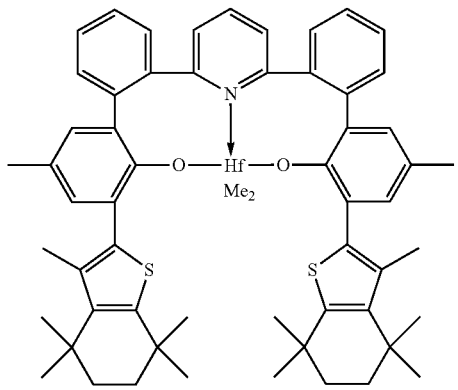

To a suspension of 112 mg (0.350 mmol) of hafnium tetrachloride in 50 mL of dry toluene 540 ul (2.25 mmol) of 2.9 M MeMgBr in diethyl ether was added in one portion via syringe at 0° C. To the resulting suspension 300 mg (0.350 mmol) of 2',2'''-(pyridine-2,6-diyl)bis(5-methyl-3-(3,4,4,7,7-pentamethyl-4,5,6,7-tetrahydrobenzo[b]thiophen-2-yl)-[1,1'-biphenyl]-2-ol) was immediately added in one portion. The reaction mixture was stirred for 4 hours at room temperature and then evaporated to near dryness. The solid obtained was extracted with 2×20 mL of hot toluene, and the combined organic extract was filtered through a thin pad of Celite 503. Next, the filtrate was evaporated to dryness. The residue was triturated with 5 mL of n-hexane, the obtained precipitate was filtered off, washed two times with 5 mL of n-hexane, and then dried in vacuo. Yield 274 mg (71%) of a white-beige solid. Anal. Calc. for C$_{59}$H$_{65}$HfNO$_2$S$_2$: C, 66.68; H, 6.16; N, 1.32. Found: C, 66.92; H, 6.29; N, 1.28. $^1$H NMR (C$_6$D$_6$, 400 MHz): δ 7.42-7.44 (m, 2H), 7.31-7.39 (m, 4H), 7.27 (dd, J=2.3, 0.6 Hz, 2H), 7.20-7.24 (m, 2H), 6.96 (dd, J=2.4, 0.7 Hz, 2H), 6.37-6.43 (m, 3H), 2.56 (s, 6H), 2.15 (s, 6H), 1.69-1.89 (m, 8H), 1.65 (s, 6H), 1.58 (s, 6H), 1.49 (s, 6H), 1.37 (s, 6H), −0.34 (s, 6H). $^{13}$C NMR (C$_6$D$_6$, 100 MHz) δ 157.68, 156.28, 144.77, 141.87, 141.56, 138.56, 133.86, 133.45, 132.70, 132.61, 132.20, 131.69, 130.79, 130.19, 129.37, 129.08, 126.68, 125.02, 124.29, 47.74, 38.91, 36.09, 34.56, 34.42, 33.37, 32.69, 29.20, 28.11, 20.23, 16.69.

2'-Isopropyl-2-(methoxymethoxy)-5-methyl-1,1'-biphenyl

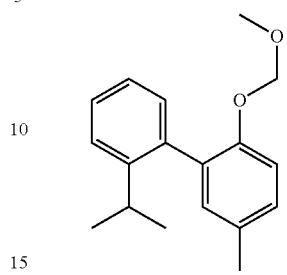

To a 4.06 g (167 mmol) of vacuum dried magnesium turnings 500 mL of dry THF was added. Next, to the reaction mixture 30.0 g (151 mmol) of 2-isopropylbromobenzene was added dropwise for 1 hour maintaining a gentle reflux. Further on, 2.21 g (4.32 mmol) of ($^t$Bu$_3$P)$_2$Pd and 25.0 g (108 mmol) of 2-bromo-1-(methoxymethoxy)-4-methylbenzene were subsequently added. The resulting solution was stirred overnight at 60° C., then this mixture was poured into 500 mL of water. The crude product was extracted with dichloromethane (3×300 mL), the combined organic extract was dried over Na$_2$SO$_4$ and then evaporated to dryness. The residue was purified by flash chromatography on silica gel 60 (40-63 um, eluent: hexane). Yield 19.9 g (68%) of a colorless oil. $^1$H NMR (CDCl$_3$, 400 MHz): δ 7.41-7.49 (m, 2H), 7.28 (td, J=7.5, 1.8 Hz, 1H), 7.20-7.23 (m, 3H), 7.07 (s, 1H), 5.09 (m, 2H), 3.39 (s, 3H), 2.96 (sept, J=6.9 Hz, 1H), 2.42 (s, 3H), 1.31 (d, J=6.9 Hz, 3H), 1.17 (d, J=6.9 Hz, 3H). $^{13}$C NMR (CDCl$_3$, 100 MHz): δ 152.30, 147.24, 137.49, 131.88, 131.68, 130.92, 130.09, 128.80, 127.58, 125.05, 124.89, 115.04, 94.93, 55.72, 30.01, 24.66, 23.28, 20.50.

2-(2'-Isopropyl-2-(methoxymethoxy)-5-methyl-[1,1'-biphenyl]-3-yl)-4,4,5,5-tetramethyl-1,3,2-dioxaborolane

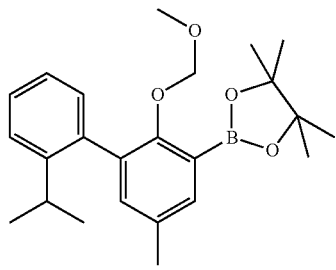 [SMILES: COCOc1c(B2OC(C)(C)C(C)(C)O2)cc(C)cc1-c1ccccc1C(C)C]

To a solution of 19.8 g (73.2 mmol) of 2'-isopropyl-2-(methoxymethoxy)-5-methyl-1,1'-biphenyl in 400 mL of dry diethyl ether 44.0 mL (109 mmol) of 2.5 M $^n$BuLi in hexanes was added dropwise for 20 minutes at 0° C. The reaction mixture was stirred for 3 hours at room temperature, then cooled to −80° C., followed by an addition of 29.6 mL (146 mmol) of 2-isopropoxy-4,4,5,5-tetramethyl-1,3,2-dioxaborolane. The obtained suspension was stirred for 1 hour at room temperature, then poured into 400 mL of water. The crude product was extracted with dichloromethane (3×300 mL), the combined organic extract was dried over Na$_2$SO$_4$ and then evaporated to dryness. The residue was purified using Kugelrohr apparatus (0.1 mbar, 150° C.). Yield 16.5 g (57%) of a colorless viscous oil. $^1$H NMR (CDCl$_3$, 400 MHz): δ 7.61 (d, J=2.1 Hz, 1H), 7.37 (d, J=7.8 Hz, 1H), 7.31 (td, J=7.1, 1.5 Hz, 1H), 7.23 (m, 1H), 7.17 (td, J=7.2, 1.2 Hz, 1H), 7.13 (d, J=2.4 Hz, 1H), 4.82 (s, 2H), 2.95 (sept., J=6.9 Hz, 1H), 2.76 (s, 3H), 2.35 (s, 3H), 1.38 (s, 12H), 1.25 (d, J=6.9 Hz, 3H), 1.12 (d, J=6.9 Hz, 3H). $^{13}$C NMR (CDCl$_3$, 100 MHz): δ 157.73, 147.18, 137.83, 136.57, 135.35, 135.20, 132.37, 131.05, 127.37, 125.00, 124.71, 100.47, 83.55, 55.94, 29.82, 25.15, 24.78, 24.75, 23.00, 20.52.

2-Bromo-2"-isopropyl-2'-(methoxymethoxy)-5'-methyl-1,1':3',1"-terphenyl

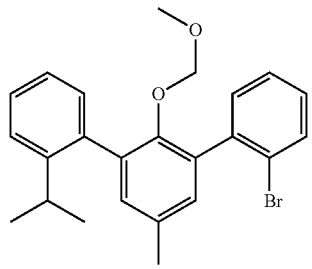 [SMILES: COCOc1c(-c2ccccc2Br)cc(C)cc1-c1ccccc1C(C)C]

To a solution of 16.4 g (41.5 mmol) of 2-(2'-sopropyl-2-(methoxymethoxy)-5-methyl-[1,1'-biphenyl]-3-yl)-4,4,5,5-tetramethyl-1,3,2-dioxaborolane in 100 mL of 1,4-dioxane 11.7 g (41.5 mmol) of 2-bromoiodobenzene, 14.4 g (104 mmol) of potassium carbonate, and 50 mL of water were subsequently added. The mixture obtained was purged with argon for 10 minutes followed by addition of 2.40 g (2.10 mmol) of Pd(PPh$_3$)$_4$. This mixture was stirred for 12 hours at 100° C., cooled to room temperature, and then diluted with 100 mL of water. The crude product was extracted with dichloromethane (3×200 mL), the combined organic extract was dried over Na$_2$SO$_4$ and then evaporated to dryness. The residue was purified by flash chromatography on silica gel 60 (40-63 um, eluent:hexane-dichloromethane=10:1, vol.). Yield 11.9 g (68%) of a mixture of two isomers as a yellow viscous oil. $^1$H NMR (CDCl$_3$, 400 MHz): δ 7.66-7.69 (m, 1H), 7.30-7.43 (m, 5H), 7.19-7.26 (m, 2H), 7.04-7.14 (m, 2H), 4.25-4.33 (m, 2H), 3.16+3.04 (2 sept, J=6.9 Hz, 1H), 2.57+2.54 (2s, 3H), 2.40 (s, 3H), 1.33+1.30 (2d, J=6.9 Hz, 3H), 1.18+1.07 (2d, J=6.9 Hz, 3H). $^{13}$C NMR (CDCl$_3$, 100 MHz, resonances attributed to the minor isomer are marked with asterisk): δ 152.61, 152.53*, 150.84, 150.11*, 143.52, 142.90*, 140.42, 140.34*, 138.78, 138.65*, 138.27, 137.99*, 136.33, 135.73*, 135.62, 135.35, 135.09, 134.90, 134.76, 134.00, 133.63, 131.64, 130.78, 130.71*, 129.90, 129.84*, 127.58, 126.93*, 101.49*, 101.37, 58.89*, 58.82, 33.13*, 32.94, 28.13, 26.21*, 26.12, 23.78.

2-(2"-Isopropyl-2'-(methoxymethoxy)-5'-methyl-[1,1':3',1"-terphenyl]-2-yl)-4,4,5,5-tetramethyl-1,3,2-dioxaborolane

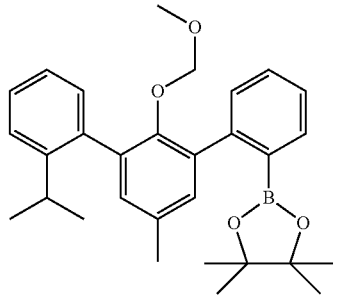 [SMILES: COCOc1c(-c2ccccc2B2OC(C)(C)C(C)(C)O2)cc(C)cc1-c1ccccc1C(C)C]

To a solution of 7.0 g (16.5 mmol) of 2-bromo-2"-isopropyl-2'-(methoxymethoxy)-5'-methyl-1,1':3',1"-terphenyl in 150 mL of dry THF 7.90 mL (19.7 mmol) of 2.5 M $^n$BuLi in hexanes was added dropwise for 20 minutes at −80° C. The reaction mixture was stirred for 1 hour at this temperature followed by an addition of 5.72 mL (28.1 mmol) of 2-isopropoxy-4,4,5,5-tetramethyl-1,3,2-dioxaborolane. The obtained suspension was stirred for 1 hour at room temperature, then poured into 300 mL of water. The crude product was extracted with dichloromethane (3×200 mL), the combined organic extract was dried over Na$_2$SO$_4$ and then evaporated to dryness. The residue was purified by flash chromatography on silica gel 60 (40-63 um, eluent: hexane-diethyl ether=10:1, vol.). Yield 5.20 g (67%) of a colorless glassy solid. $^1$H NMR (CDCl$_3$, 400 MHz): δ 7.75 (d, J=7.3 Hz, 1H), 7.44 (m, 2H), 7.39 (d, J=7.9 Hz, 1H), 7.32 (m, 3H), 7.19 (t, J=7.4 Hz, 1H), 7.02 (br.s, 1H), 6.99 (s, 1H), 4.29 (br.s, 2H), 3.05 (sept, J=6.8 Hz, 1H), 2.54 (s, 3H), 2.34 (s, 3H), 1.20 (s, 12H), 1.18-1.24 (br.s, 6H). $^{13}$C NMR (CDCl$_3$, 100 MHz): δ 149.34, 135.10, 134.09, 131.61, 130.77, 130.15, 129.61, 127.48, 126.19, 125.28, 124.76, 98.27, 83.35, 55.88, 29.91, 25.30, 24.48 (broad), 23.14, 20.70.

2",2""'-(Pyridine-2,6-diyl)bis(2-isopropyl-5'-methyl-[1,1':3',1"-terphenyl]-2'-ol)

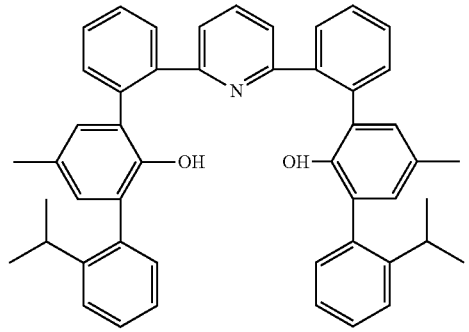 [SMILES: Cc1cc(-c2ccccc2-c2cccc(-c3ccccc3-c3cc(C)cc(-c4ccccc4C(C)C)c3O)n2)c(O)c(-c2ccccc2C(C)C)c1]

To a solution of 1.50 g (3.18 mmol) of 2-(2"-isopropyl-2'-(methoxymethoxy)-5'-methyl-[1,1':3',1"-terphenyl]-2-yl)-4,4,5,5-tetramethyl-1,3,2-dioxaborolanein 8 mL of 1,4-dioxane, 376 mg (1.59 mmol) of 2,6-dibromopyridine, 2.61 g (8.00 mmol) of cesium carbonate, and 4 mL of water were subsequently added. The mixture obtained was purged with argon for 10 minutes followed by addition of 180 mg (0.159 mmol) of Pd(PPh$_3$)$_4$. This mixture was stirred for 12 hours at 100° C., then cooled to room temperature, and diluted with 50 mL of water. The obtained mixture was extracted with dichloromethane (3×100 mL), the combined organic extract was dried over Na$_2$SO$_4$ and then evaporated to dryness. To the resulting oil 20 mL of THF, 20 mL of methanol, and 1 mL of 12N HCl were subsequently added. The reaction mixture was stirred overnight at 60° C. and then poured into 50 mL of water. The crude product was extracted with dichloromethane (3×30 mL), the combined organic extract was washed with 5% NaHCO$_3$, dried over Na$_2$SO$_4$, and then evaporated to dryness. The residue was purified by flash chromatography on silica gel 60 (40-63 um, eluent:hexane-ethyl acetate=1:1, vol.). Yield 0.75 g (70%) of a mixture of two isomers as a white foam. $^1$H NMR (CDCl$_3$, 400 MHz): δ 7.30-7.50 (m, 14H), 6.85-7.18 (m, 9H), 2.69 (br.s, 2H), 2.25 (br.s, 6H), 1.06 (br.s, 12H). $^{13}$C NMR (CDCl$_3$, 100 MHz) δ 158.32, 148.05 (broad), 147.71, 139.75, 137.07 (broad), 136.07, 135.68, 131.47, 130.92, 130.59, 130.53, 130.39, 130.22, 128.88 (broad), 128.58, 128.00, 127.84, 125.58, 125.39, 121.97, 29.76, 24.38, 23.47, 20.35.

Dimethylhafnium[2",2""'-(pyridine-2,6-diyl)bis(2-isopropyl-5'-methyl-[1,1:3',1"-terphenyl]-2'-olate)] (Catalyst 8)

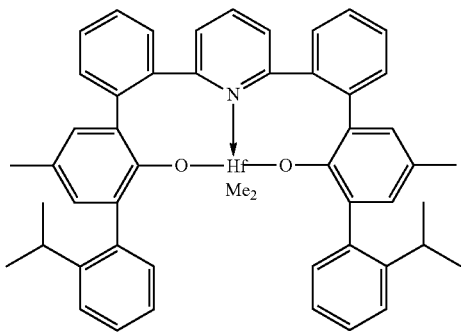

To a suspension of 141 mg (0.441 mmol) of hafnium tetrachloride in 50 mL of dry toluene 684 ul (1.99 mmol) of 2.9 M MeMgBr in diethyl ether was added in one portion via syringe at 0° C. To the resulting suspension 300 mg (0.441 mmol) of 2",2"-(pyridine-2,6-diyl)bis(2-isopropyl-5'-methyl-[1,1':3',1"-terphenyl]-2'-ol) was immediately added in one portion. The reaction mixture was stirred for 4 hours at room temperature and then evaporated to near dryness. The solid obtained was extracted with 2×20 mL of hot toluene, and the combined organic extract was filtered through a thin pad of Celite 503. Next, the filtrate was evaporated to dryness. The residue was triturated with 5 mL of n-hexane, the obtained precipitate was filtered off, washed with 2×5 mL of n-hexane, and then dried in vacuo. Yield 271 mg (69%) of a white-beige solid. Anal. Calc. for C$_{51}$H$_{49}$HfNO$_2$: C, 69.10; H, 5.57; N, 1.58. Found: C, 69.42; H, 6.79; N, 1.40. $^1$H NMR (C$_6$D$_6$, 400 MHz): δ 7.33-7.44 (m, 9H), 7.05-7.23 (m, 11H), 6.48-6.56 (m, 3H), 3.55 (sept., J=6.8 Hz, 2H), 2.23 (s, 6H), 1.50 (d, J=6.9 Hz, 6H), 1.10 (d, J=6.9 Hz, 6H), −0.75 (s, 6H). $^{13}$C NMR (C$_6$D$_6$, 100 MHz) δ 157.61, 157.53, 149.22, 141.74, 139.87, 139.14, 133.34, 133.00, 132.35, 131.99, 131.44, 131.04, 130.53, 129.66, 129.31, 128.90, 127.64, 126.04, 125.78, 125.39, 125.29, 47.37, 31.06, 26.24, 22.68, 21.78, 21.07.

2'-Bromo-2-(methoxymethoxy)-5-methyl-1,1'-biphenyl

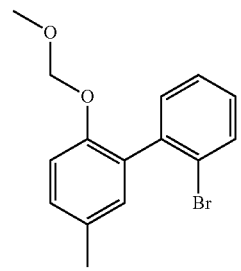 [SMILES: COCOc1ccc(C)cc1-c1ccccc1Br]

To a solution of 19.5 g (70.0 mmol) of 2-(2-(methoxymethoxy)-5-methylphenyl)-4,4,5,5-tetramethyl-1,3,2-dioxaborolane in 200 mL of 1,4-dioxane 21.8 g (77.0 mmol) of 2-bromoiodobenzene, 24.2 g (175 mmol) of potassium carbonate, and 100 mL of water were subsequently added. The mixture obtained was purged with argon for 10 minutes followed by addition of 2.03 g (1.80 mmol) of Pd(PPh$_3$)$_4$. This mixture was stirred for 12 hours at 100° C., cooled to room temperature, and then diluted with 100 mL of water. The crude product was extracted with dichloromethane (3×200 mL), the combined organic extract was dried over Na$_2$SO$_4$ and then evaporated to dryness. The residue was purified by flash chromatography on silica gel 60 (40-63 um, eluent:hexane-dichloromethane=10:1, vol.). Yield 11.1 g (52%) of a yellow viscous oil. $^1$H NMR (CDCl$_3$, 400 MHz): δ 7.65 (dd, J=8.0, 1.2 Hz, 1H), 7.28-7.37 (m, 2H), 7.12-7.23 (m, 3H), 5.07 (m, 2H), 3.37 (s, 3H), 2.35 (s, 3H). $^{13}$C NMR (CDCl$_3$, 100 MHz): δ 152.19, 140.01, 132.31, 131.49, 131.33, 131.15, 130.95, 129.72, 128.59, 126.90, 124.16, 115.14, 95.13, 55.94, 20.51.

2-(2'-(Methoxymethoxy)-5'-methyl-[1,1'-biphenyl]-2-yl)-4,4,5,5-tetramethyl-1,3,2-dioxaborolane

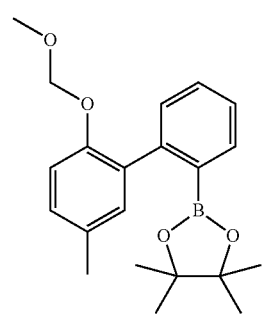

To a solution of 11.1 g (36.1 mmol) of 2'-bromo-2-(methoxymethoxy)-5-methyl-1,1'-biphenyl in 250 mL of dry THF 12.5 mL (36.1 mmol) of 2.5 M "BuLi in hexanes was added dropwise for 20 minutes at −80° C. The reaction mixture was stirred for 1 hour at this temperature followed by an addition of 12.5 mL (61.4 mmol) of 2-isopropoxy-4,4,5,5-tetramethyl-1,3,2-dioxaborolane. The obtained suspension was stirred for 1 hour at room temperature, then poured into 300 mL of water. The crude product was extracted with dichloromethane (3×200 mL), the combined organic extract was dried over Na$_2$SO$_4$ and then evaporated to dryness. The residue was purified by flash chromatography on silica gel 60 (40-63 um, eluent:hexane-diethyl ether=10:1, vol.). Yield 10.9 g (86%) of a colorless glassy solid. $^1$H NMR (CDCl$_3$, 400 MHz): δ 7.73 (d, J=7.5 Hz, 1H), 7.43 (m, 1H), 7.25-7.34 (m, 2H), 6.98-7.08 (m, 3H). $^{13}$C NMR (CDCl$_3$, 100 MHz): δ 152.03, 143.76, 133.88, 131.79, 131.30, 129.76, 129.65, 128.56, 126.11, 116.81, 95.79, 83.34, 55.96, 24.57, 20.62.

2',2'''-(Pyridine-2,6-diyl)bis(5-methyl-[1,1'-biphenyl]-2-ol)

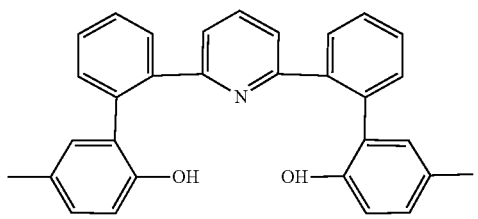

To a solution of 10.9 g (30.9 mmol) of 2-(2'-(methoxymethoxy)-5'-methyl-[1,1'-biphenyl]-2-yl)-4,4,5,5-tetramethyl-1,3,2-dioxaborolane in 200 mL of 1,4-dioxane 3.66 g (15.5 mmol) of 2,6-dibromopyridine, 25.2 g (77.3 mmol) of cesium carbonate, and 100 mL of water were subsequently added. The mixture obtained was purged with argon for 10 minutes followed by addition of 1.79 g (1.55 mmol) of Pd(PPh$_3$)$_4$. This mixture was stirred for 12 hours at 100° C., then cooled to room temperature, and diluted with 50 mL of water. The obtained mixture was extracted with dichloromethane (3×100 mL), the combined organic extract was dried over Na$_2$SO$_4$ and then evaporated to dryness. To the resulting oil 200 mL of THF, 200 mL of methanol, and 10 mL of 12N HCl were subsequently added. The reaction mixture was stirred overnight at 60° C. and then poured into 500 mL of water. The crude product was extracted with dichloromethane (3×130 mL), the combined organic extract was washed with 5% NaHCO$_3$, dried over Na$_2$SO$_4$, and then evaporated to dryness. The residue was purified by flash chromatography on silica gel 60 (40-63 um, eluent:hexane-ethyl acetate=1:1, vol.). Yield 2.02 g (29%) of a mixture of two isomers as a white foam. $^1$H NMR (CDCl$_3$, 400 MHz): δ 7.34-7.53 (m, 9H), 6.66-6.97 (m, 8H), 2.13 (br.s, 6H). $^{13}$C NMR (CDCl$_3$, 100 MHz) 157.94, 151.19, 139.18, 136.68, 136.49, 132.07, 132.01, 131.97, 131.51, 131.44, 130.09, 129.41, 129.39, 129.31, 128.85, 128.54, 128.42, 127.88, 122.59, 117.16, 20.29.

2',2'''-(Pyridine-2,6-diyl)bis(3-bromo-5-methyl-[1,1'-biphenyl]-2-ol)

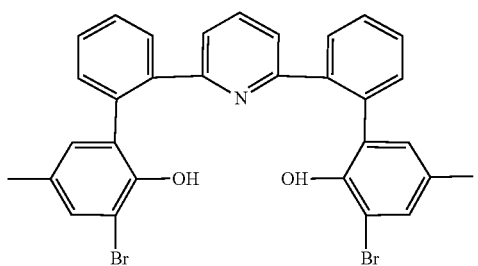

To a solution of 400 mg (0.902 mmol) of 2',2'''-(pyridine-2,6-diyl)bis(5-methyl-[1,1'-biphenyl]-2-ol) in 50 mL of dichloromethane a solution of 320 mg (1.804 mmol) of NBS in 50 mL of dichloromethane was added dropwise for 1 hour at room temperature. The reaction mixture was stirred overnight at room temperature, then cooled to room temperature, and diluted with 50 mL of water. The crude product was extracted with dichloromethane (3×20 mL), the combined organic extract was washed with 5% NaHCO$_3$, dried over Na$_2$SO$_4$, and then evaporated to dryness. Yield 502 mg (99%) of a red foam. $^1$H NMR (CDCl$_3$, 400 MHz): 7.45-7.56 (m, 7H), 7.35 (m, 2H), 7.19 (m, 2H), 7.04 (m, 2H), 6.58 (br.s, 2H), 2.09 (br.s, 6H). $^{13}$C NMR (CDCl$_3$, 100 MHz) δ 157.95, 148.41, 138.75, 136.89, 136.60, 132.01, 131.32, 131.26, 131.13, 130.65, 129.91, 128.74, 128.29, 122.62, 112.28, 20.05.

Dimethylhafnium[2',2'''-(pyridine-2,6-diyl)bis(3-bromo-5-methyl-[1,1'-biphenyl]-2-olate)] (Catalyst 13)

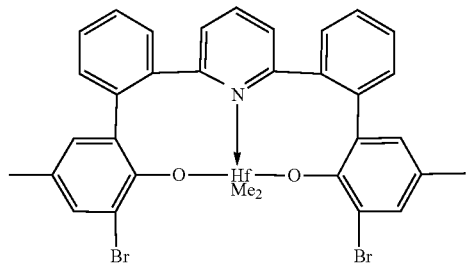

To a suspension of 266 mg (0.831 mmol) of hafnium tetrachloride in 60 mL of dry toluene 1.30 mL (3.73 mmol) of 2.9 M MeMgBr in diethyl ether was added in one portion via syringe at 0° C. To the resulting suspension 500 mg (0.831 mmol) of 2',2'''-(pyridine-2,6-diyl)bis(3-bromo-5-methyl-[1,1'-biphenyl]-2-ol) was immediately added in one portion. The reaction mixture was stirred for 4 hours at room temperature and then evaporated to near dryness. The solid obtained was extracted with 2×20 mL of hot toluene, and the combined organic extract was filtered through a thin pad of Celite 503. Next, the filtrate was evaporated to dryness. The residue was triturated with 5 mL of n-hexane, the obtained precipitate was filtered off, washed with 2×5 mL of n-hexane, and then dried in vacuo. Yield 429 mg (64%) of a white-beige solid. Anal. Calc. for C$_{33}$H$_{27}$Br$_2$HfNO$_2$: C, 49.06; H, 3.37; N, 1.73. Found: C, 49.36; H, 3.58; N, 1.55. $^1$H NMR (CD$_2$Cl$_2$, 400 MHz): δ 7.67 (t, J=7.8 Hz, 1H), 7.64 (td, J=7.6, 1.4 Hz, 2H), 7.52 (td, J=7.6, 1.3 Hz, 2H), 7.39 (dd, J=7.6, 0.8 Hz, 2H), 7.29 (dd, J=7.6, 0.9 Hz, 2H), 7.27 (dd, J=2.1, 0.6 Hz, 2H), 7.06 (d, J=7.8 Hz, 2H), 6.91 (dd, J=2.1, 0.6 Hz, 2H), 2.23 (s, 6H), −0.76 (s, 6H). $^{13}$C NMR (CD$_2$Cl$_2$, 100 MHz) δ 157.09, 156.58, 140.93, 140.04, 133.35, 132.97, 132.56, 131.81, 131.57, 131.33, 129.60, 129.54, 129.45, 129.13, 128.73, 126.05, 113.69, 48.48, 20.52.

Dimethylhafnium[2',2'''-(pyridine-2,6-diyl)bis(5-methyl-[1,1'-biphenyl]-2-olate)] (Catalyst 14)

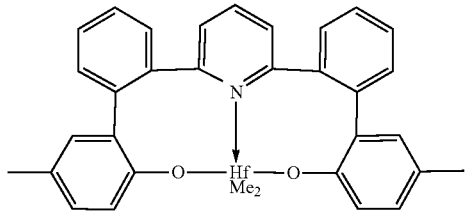

To a suspension of 144 mg (0.451 mmol) of hafnium tetrachloride in 40 mL of dry toluene 700 ul (2.01 mmol) of 2.9 M MeMgBr in diethyl ether was added in one portion via syringe at 0° C. To the resulting suspension 200 mg (0.451 mmol) of 2',2'''-(pyridine-2,6-diyl)bis(5-methyl-[1,1'-biphenyl]-2-ol) was immediately added in one portion. The reaction mixture was stirred for 4 hours at room temperature and then evaporated to near dryness. The solid obtained was extracted with 2×20 mL of hot toluene, and the combined organic extract was filtered through a thin pad of Celite 503. Next, the filtrate was evaporated to dryness. The residue was triturated with 5 mL of n-hexane, the obtained precipitate was filtered off, washed with 2×5 mL of n-hexane, and then dried in vacuo. Yield 110 mg (37%) of a white-beige solid. Anal. Calc. for $C_{33}H_{29}HfNO_2$: C, 60.97; H, 4.50; N, 2.15. Found: C, 61.28; H, 4.77; N, 2.02. $^1$H NMR (CD$_2$Cl$_2$, 400 MHz): δ 7.60 (td, J=7.6, 1.3 Hz, 2H), 7.57 (t, J=7.8 Hz, 1H), 7.47 (td, J=7.5, 1.2 Hz, 2H), 7.42 (d, J=7.6 Hz, 2H), 7.18 (dd, J=7.6, 1.1 Hz, 2H), 6.98 (d, J=7.8 Hz, 2H), 6.96 (dd, J=8.5, 2.2 Hz, 2H), 6.89 (d, J=2.1 Hz, 2H), 6.67 (d, J=8.1 Hz, 2H), 2.23 (s, 6H), −0.86 (s, 6H). $^{13}$C NMR (CDCl$_3$, 100 MHz) δ 159.53, 156.61, 141.39, 139.02, 133.13, 131.51, 131.13, 130.97, 129.88, 129.37, 129.30, 127.89, 127.42, 124.96, 118.42, 45.88, 20.51.

N-(2-Methylallyl)-N-(p-tolyl)acetamide

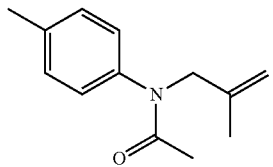

To a suspension of 7.05 g (176 mmol, 60% wt. in mineral oil) of sodium hydride in 500 mL of THF 25.0 g (168 mmol) of N-p-tolylacetamide was added portionwise at 0° C. The resulting suspension was stirred for 2 hours at room temperature. Next, the reaction mixture was cooled to 0° C., and 18.3 g (201 mmol) of 3-chloro-2-methylprop-1-ene was added in one portion, followed by addition of 8 mL of HMPA. The resulting suspension was stirred at 55° C. overnight, then poured into 200 mL of water. The crude product was extracted with toluene (3×100 mL), the combined organic extract was dried over Na$_2$SO$_4$ and then evaporated to dryness. The residue was purified using Kugelrohr apparatus (0.35 mbar, 130° C.). Yield 32.9 g (97%) of a colorless oil. $^1$H NMR (CDCl$_3$, 400 MHz): δ 7.06 (m, 2H), 6.92 (m, 2H), 4.67 (m, 1H), 4.57 (m, 1H), 4.14 (s, 2H), 2.23 (s, 3H), 1.76 (s, 3H), 1.63 (s, 3H). $^{13}$C NMR (CDCl$_3$, 100 MHz) δ 169.91, 140.42, 140.14, 137.14, 129.68, 127.09, 112.69, 54.52, 22.26, 20.62, 19.88.

1-(3,3,5-Trimethylindolin-1-yl)ethan-1-one

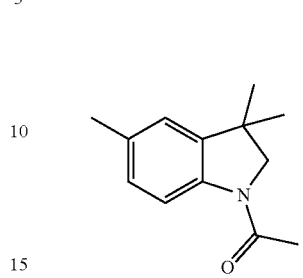

To a suspension of 36.1 g (271 mmol) of aluminum trichloride in 35 mL of chlorobenzene 25.0 g (123 mmol) of N-(2-methylallyl)-N-(p-tolyl)acetamide was added dropwise for 1 hour at 115° C. The resulting mixture was stirred for 1 hour at 115° C., then diluted with 100 mL of toluene and poured into 200 mL of a crushed ice. The organic layer was separated, washed subsequently with 100 mL of 2 M HCl and 100 mL of water, dried over Na$_2$SO$_4$, and then evaporated to dryness. The residue was triturated with 100 mL of n-pentane, the precipitate obtained was filtered off (G4), washed with 50 mL of n-pentane, and then dried in vacuum. Yield 18.4 g (74%) of a light-pink solid. $^1$H NMR (CDCl$_3$, 400 MHz): δ 8.04 (d, J=8.2 Hz, 1H), 6.99 (d, J=7.5 Hz, 1H), 6.91 (s, 1H), 3.74 (s, 2H), 2.30 (s, 3H), 2.19 (s, 3H), 1.33 (s, 6H). $^{13}$C NMR (CDCl$_3$, 100 MHz) δ 168.31, 140.42, 139.17, 133.39, 128.09, 122.34, 116.60, 63.72, 40.09, 28.55, 23.96, 21.03.

1-(7-Bromo-3,3,5-trimethylindolin-1-yl)ethan-1-one

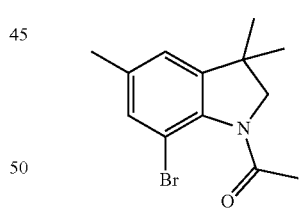

To a solution of 18.4 g (90.7 mmol) of 1-(3,3,5-trimethylindolin-1-yl)ethan-1-one in 370 mL of DMF a solution of 16.9 g (95.3 mmol) of NBS in 100 mL of DMF was added dropwise for 1 hour at 0° C. The resulting solution was stirred overnight at room temperature, then poured into 2 liter of water. The crude product was extracted with diethyl ether (3×150 mL), the combined organic extract was washed with 3×100 mL of water, dried over Na$_2$SO$_4$, and then evaporated to dryness. Yield 23.6 g (92%) of a colorless solid. $^1$H NMR (CDCl$_3$, 400 MHz): δ 7.18 (s, 1H), 6.86 (s, 1H), 3.82 (br.s, 2H), 2.28 (s, 3H), 2.27 (s, 3H), 1.23 (s, 6H). $^{13}$C NMR (CDCl$_3$, 100 MHz) δ 146.48, 138.99, 136.94, 132.12, 121.64, 112.27, 65.22, 42.15, 28.54, 25.84, 23.47, 20.73.

7-Bromo-3,3,5-trimethylindoline

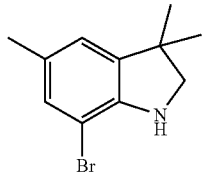

To a suspension of 23.6 g of 1-(7-bromo-3,3,5-trimethylindolin-1-yl)ethan-1-one in 500 mL of 4 M HCl 10 mL of methanol was added, and the resulting mixture was refluxed for 6 hours. Further on, to the reaction mixture 250 mL of 25% aqueous ammonia was carefully added at 0° C. The crude product was extracted with diethyl ether (3×150 mL), the combined organic extract was washed with 3×100 mL of water, dried over $Na_2SO_4$ and then evaporated to dryness. The residue was purified by vacuum distillation, b.p. 94° C./1 mbar. Yield 18.0 g (82%) of a yellow oil. $^1$H NMR (CDCl$_3$, 400 MHz): δ 7.02 (s, 1H), 6.79 (s, 1H), 3.49 (br.s, 1H), 3.35 (d, J=0.9 Hz, 2H), 2.27 (s, 3H), 1.32 (d, J=0.9 Hz, 6H). $^{13}$C NMR (CDCl$_3$, 100 MHz) δ 146.27, 139.68, 129.76, 129.48, 121.66, 102.99, 61.15, 43.13, 27.50, 20.52.

7-Bromo-1-(4-methoxybenzyl)-3,3,5-trimethylindoline

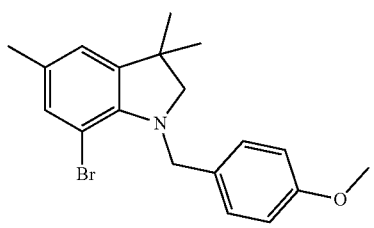

To a solution of 7.0 g (29.2 mmol) of 7-bromo-3,3,5-trimethylindoline in 100 mL of DMF 1.40 g (34.5 mmol, 60% wt. in mineral oil) of sodium hydride was added in one portion, followed by addition of 8.03 g (51.5 mmol) of 4-methoxybenzylchloride. The reaction mixture was stirred overnight at room temperature, then poured into 300 mL of water. The crude product was extracted with diethyl ether (3×150 mL), the combined organic extract was washed with 3×100 mL of water, dried over $Na_2SO_4$, and then evaporated to dryness. An excess of 4-methoxybenzylchloride was distilled off using Kugelrohr apparatus. Yield 10.7 g (quant.) of a light-yellow oil. $^1$H NMR (CDCl$_3$, 400 MHz): δ 7.30 (d, J=8.5 Hz, 2H), 7.08 (s, 1H), 6.88 (d, J=8.5 Hz, 2H), 6.76 (s, 1H), 4.72 (s, 2H), 3.81 (s, 3H), 3.10 (s, 2H), 2.25 (s, 3H), 1.21 (s, 6H). $^{13}$C NMR (CDCl$_3$, 100 MHz) δ 158.61, 145.14, 143.24, 132.76, 131.17, 129.73, 129.69, 129.17, 122.09, 113.69, 103.06, 67.91, 55.21, 53.89, 40.28, 28.52, 20.24.

1-(4-Methoxybenzyl)-3,3,5-trimethyl-7-(4,4,5,5-tetramethyl-1,3,2-dioxaborolan-2-yl)indoline

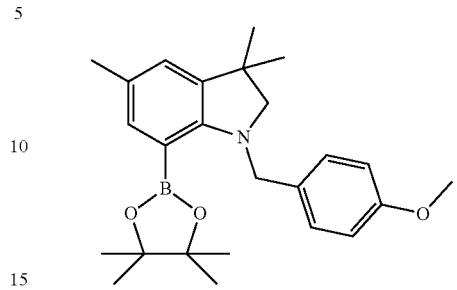

To a solution of 10.7 g (29.2 mmol) of 7-bromo-1-(4-methoxybenzyl)-3,3,5-trimethylindoline in 200 mL of dry THF 12.5 mL (31.3 mmol) of 2.5 M $^n$BuLi in hexanes was added dropwise for 20 minutes at −80° C. The reaction mixture was stirred for 1 hour at this temperature, then 9.02 mL (44.7 mmol) of 2-isopropoxy-4,4,5,5-tetramethyl-1,3,2-dioxaborolane. The obtained suspension was stirred for 1 hour at room temperature, then poured into 200 mL of water. The crude product was extracted with dichloromethane (3×100 mL), the combined organic extract was dried over $Na_2SO_4$ and then evaporated to dryness. Yield 7.67 g (63%) of a colorless viscous oil. $^1$H NMR (CDCl$_3$, 400 MHz): δ 7.31 (d, J=8.5 Hz, 2H), 7.28 (d, J=1.4 Hz, 1H), 6.88 (d, J=1.4 Hz, 1H), 6.85 (d, J=8.5 Hz, 2H), 4.48 (s, 2H), 3.80 (s, 3H), 2.99 (s, 2H), 2.25 (s, 3H), 1.24 (s, 12H), 1.21 (s, 6H). $^{13}$C NMR (CDCl$_3$, 100 MHz): δ 158.44, 139.83, 134.95, 131.57, 129.38, 126.39, 125.62, 113.79, 113.41, 83.46, 67.95, 56.46, 55.19, 39.51, 28.55, 24.62, 20.57.

7-(2-Bromophenyl)-1-(4-methoxybenzyl)-3,3,5-trimethylindoline

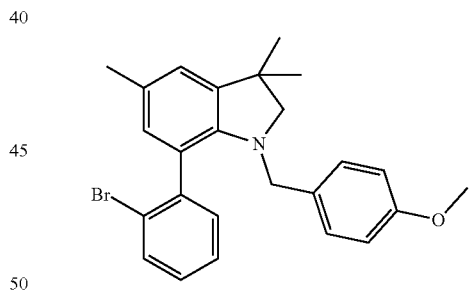

To a solution of 7.67 g (18.8 mmol) of 1-(4-methoxybenzyl)-3,3,5-trimethyl-7-(4,4,5,5-tetramethyl-1,3,2-dioxaborolan-2-yl)indoline in 40 mL of 1,4-dioxane 6.93 g (24.5 mmol) of 2-bromoiodobenzene, 15.4 g (47.1 mmol) of cesium carbonate, and 20 mL of water were subsequently added. The mixture obtained was purged with argon for 10 minutes followed by addition of 1.10 g (0.94 mmol) of Pd(PPh$_3$)$_4$. This mixture was stirred for 12 hour at 100° C., cooled to room temperature, and then diluted with 100 mL of water. The crude product was extracted with dichloromethane (3×200 mL), the combined organic extract was dried over $Na_2SO_4$ and then evaporated to dryness. The residue was purified by flash chromatography on silica gel 60 (40-63 um, eluent:hexane-dichloromethane=10:1, vol.). Yield 5.66 g (70%) of a yellow viscous oil. $^1$H NMR (CDCl$_3$, 400 MHz): δ 7.61 (dd, J=8.0, 1.0 Hz, 1H), 7.40 (dd, J=7.6, 1.6 Hz, 1H), 7.28 (td, J=7.5, 1.1 Hz, 1H), 7.12 (td, J=7.8, 1.7 Hz, 1H), 7.10 (d, J=8.4 Hz, 2H), 6.91 (d, J=1.5 Hz, 1H), 6.80 (d, J=8.4 Hz, 2H), 6.73 (d, J=0.9 Hz, 1H), 3.79 (m, 2H), 3.79 (s, 3H), 3.56 (m, 2H), 2.93 (m, 2H), 2.32 (s, 3H), 1.31 (s, 3H), 1.28 (s, 3H). $^{13}$C NMR (CDCl$_3$, 100 MHz): δ 158.41, 145.65, 141.74, 140.57, 132.37, 131.58, 131.09, 130.27, 129.24, 128.56, 127.06, 126.98, 124.54, 122.93, 122.34, 113.47, 68.23, 55.18, 54.26, 39.61, 28.22, 27.38, 20.63.

1-(4-Methoxybenzyl)-3,3,5-trimethyl-7-(2-(4,4,5,5-tetramethyl-1,3,2-dioxaborolan-2-yl)phenyl)indoline

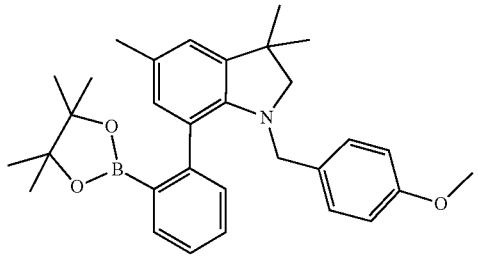

To a solution of 5.66 g (13.0 mmol) of 7-(2-bromophenyl)-1-(4-methoxybenzyl)-3,3,5-trimethylindoline in 100 mL of dry THF 5.45 mL (13.6 mmol) of 2.5 M "BuLi in hexanes was added dropwise for 20 minutes at −80° C. The reaction mixture was stirred for 1 hour at this temperature followed by addition of 4.05 mL (19.5 mmol) of 2-isopropoxy-4,4,5,5-tetramethyl-1,3,2-dioxaborolane. The obtained suspension was stirred for 1 hour at room temperature, then poured into 300 mL of water. The crude product was extracted with dichloromethane (3×100 mL), the combined organic extract was dried over Na$_2$SO$_4$ and then evaporated to dryness. The residue was purified by flash chromatography on silica gel 60 (40-63 um, eluent:hexane-diethyl ether=10:1, vol.). Yield 6.10 g (97%) of a colorless glassy solid. $^1$H NMR (CDCl$_3$, 400 MHz): δ 7.68 (d, J=7.3 Hz, 1H), 7.41 (d, J=7.6 Hz, 1H), 7.32 (t, J=7.6 Hz, 1H), 7.21 (t, J=7.3 Hz, 1H), 7.01 (d, J=8.5 Hz, 2H), 6.76 (s, 1H), 6.72 (s, 1H), 6.72 (d, J=8.5 Hz, 2H), 3.74 (s, 3H), 3.69 (br.s, 2H), 2.95 (s, 2H), 2.25 (s, 3H), 1.19 (br.s, 24H). $^{13}$C NMR (CDCl$_3$, 100 MHz): δ 158.39, 145.60, 145.49, 140.50, 134.04, 131.39, 130.73, 129.66, 129.47, 129.12, 127.39, 126.09, 125.83, 121.33, 113.27, 83.12, 67.43, 55.14, 55.03, 39.86, 28.55, 24.84, 20.65.

2,6-Bis(2-(3,3,5-trimethylindolin-7-yl)phenyl)pyridine

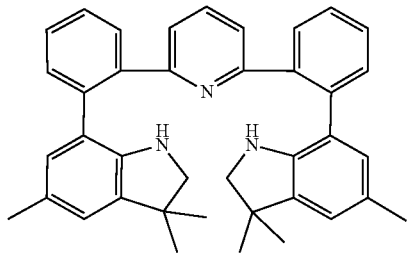

To a solution of 6.00 g (12.4 mmol) of 1-(4-methoxybenzyl)-3,3,5-trimethyl-7-(2-(4,4,5,5-tetramethyl-1,3,2-dioxaborolan-2-yl)phenyl)indoline in 30 mL of 1,4-dioxane 1.34 g (5.64 mmol) of 2,6-dibromopyridine, 11.0 g (33.9 mmol) of cesium carbonate, and 15 mL of water were subsequently added. The mixture obtained was purged with argon for 10 minutes followed by addition of 651 mg (0.564 mmol) of Pd(PPh$_3$)$_4$. This mixture was stirred for 12 hours at 100° C., then cooled to room temperature, and diluted with 50 mL of water. The obtained mixture was extracted with dichloromethane (3×50 mL), the combined organic extract was dried over Na$_2$SO$_4$ and then evaporated to dryness. To the resulting oil 64 mL of trifluoroacetic acid and 9.60 g of p-toluenesulfonic acid were subsequently added. The reaction mixture was stirred overnight at 70° C. and then poured into 500 mL of saturated K$_2$CO$_3$. The crude product was extracted with dichloromethane (3×100 mL), the combined organic extract was washed with 5% NaHCO$_3$, dried over Na$_2$SO$_4$, and then evaporated to dryness. The residue was purified by flash chromatography on silica gel 60 (40-63 um, eluent:hexane-ethyl acetate=10:1, vol.). Yield 2.13 g (70%) of a mixture of two isomers as a white foam. $^1$H NMR (CDCl$_3$, 400 MHz): δ 7.25-7.42 (m, 9H), 6.96 (m, 2H), 6.76 (m, 4H), 3.43 (br.s, 2H), 2.80 (br.s, 4H), 2.25 (br.s, 6H), 1.09 (br.s, 12H). $^{13}$C NMR (CDCl$_3$, 100 MHz) δ 158.65, 145.74, 139.59, 138.44, 138.09, 130.80, 130.32, 128.82, 128.59, 127.63, 127.37, 123.04, 121.56, 61.33, 46.17, 41.56, 31.57, 27.31, 22.64, 20.87, 14.11, 11.51.

Dimethylhafnium[2,6-bis(2-(3,3,5-trimethylindolinidide)phenyl)pyridine] (Catalyst 12)

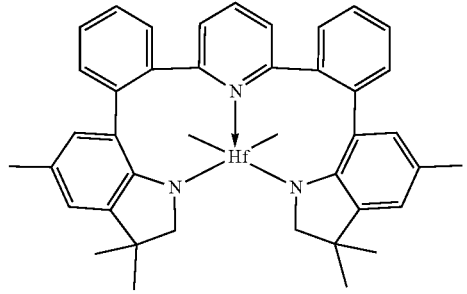

To a suspension of 233 mg (0.727 mmol) of hafnium tetrachloride in 60 mL of dry toluene 1.12 mL (3.27 mmol) of 2.9 M MeMgBr in diethyl ether was added in one portion via syringe at 0° C. To the resulting suspension 400 mg (0.727 mmol) of 2,6-bis(2-(3,3,5-trimethylindolin-7-yl)phenyl)pyridine was immediately added in one portion. The reaction mixture was stirred for 4 hours at room temperature and then evaporated to near dryness. The solids obtained were extracted with 2×20 mL of hot toluene, and the combined organic extract was filtered through a thin pad of Celite 503. Next, the filtrate was evaporated to dryness. The residue was triturated with 5 mL of n-hexane, the obtained precipitate was filtered off, washed with 2×5 mL of n-hexane, and then dried in vacuo. Yield 252 mg (46%) of an orange solid. Anal. Calc. for C$_{41}$H$_{43}$HfN$_3$: C, 65.11; H, 5.73; N, 5.56. Found: C, 65.35; H, 5.94; N, 5.32. $^1$H NMR (C$_6$D$_6$, 400 MHz): δ 7.19-7.29 (m, 8H), 6.79 (s, 2H), 6.65 (s, 2H), 6.44 (m, 3H), 4.11 (d, J=10.8 Hz, 2H), 3.87 (d, J=10.8 Hz, 2H), 2.24 (s, 6H), 1.29 (s, 6H), 1.25 (s, 6H), −0.04 (s, 6H). $^{13}$C NMR (C$_6$D$_6$, 100 MHz) δ 157.24, 157.02, 145.91, 142.26, 139.06, 134.35, 133.01, 131.84, 131.26, 129.98, 127.97, 125.09, 124.55, 124.07, 122.92, 68.87, 58.30, 42.81, 30.91, 29.59, 21.19.

2-Bromo-4,6-di-tert-pentylphenol

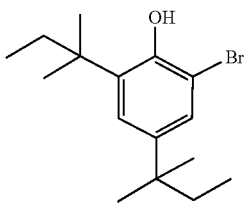 [SMILES: CCC(C)(C)c1cc(Br)c(O)c(C(C)(C)CC)c1]

Dichloromethane (120 mL) and 2,4-di-tert-pentylphenol (14.1 g, 60.1 mmol) were combined in a round-bottomed flask. Under nitrogen a solution of dichloromethane (3 mL) and bromine (9.60 g, 60.1 mmol) was added dropwise over 5 minutes. At the end of the addition a pale yellow solution had formed. The mixture was stirred for 15 minutes then extracted with water (3×150 mL) and brine (50 mL). The separated organics were then dried over MgSO4 and filtered. The volatiles were removed to afford the product as a nearly colorless oil. Yield: 18.1 g, 95.9%.

1-Bromo-2-(methoxymethoxy)-3,5-di-tert-pentyl-benzene

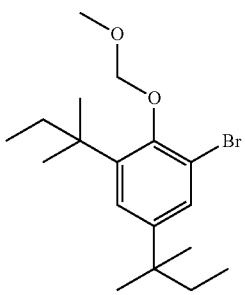 [SMILES: CCC(C)(C)c1cc(Br)c(OCOC)c(C(C)(C)CC)c1]

2-Bromo-4,6-di-tert-pentylphenol (18.1 g, 57.7 mmol) was dissolved in THF (200 mL) and NaH (1.66 g, 69.2 mmol) was added in small portions over 10 minutes. After 30 minutes chloromethyl methyl ether (5.57 g, 69.2 mmol) was added dropwise. The mixture was stirred overnight then evaporated to a residue that was further dried under reduced pressure. Ethyl ether (100 mL) and water (100 mL) were added to the residue. The organics were separated and then dried over Na$_2$SO$_4$. Evaporation of the volatiles afforded the product as nearly colorless oil. Yield: 12.8 g, 62.1%.

2'-Bromo-2-(methoxymethoxy)-3,5-di-tert-pentyl-1,1'-biphenyl

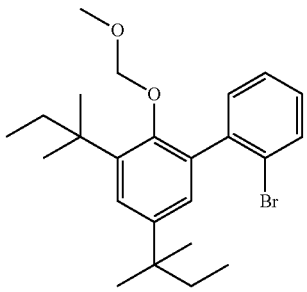 [SMILES: CCC(C)(C)c1cc(-c2ccccc2Br)c(OCOC)c(C(C)(C)CC)c1]

Hexane (15 mL) was added to 1-bromo-2-(methoxymethoxy)-3,5-di-tert-pentylbenzene (1.63 g, 4.55 mmol) to form a clear solution. A hexane solution of BuLi (2.85 mL, 4.55 mmol) was added dropwise over a minute. The mixture was stirred for 10 minutes then warmed to 45° C. Then a hexane (3 mL) solution of 1-bromo-2-chlorobenzene (0.532 g, 4.55 mmol) was added dropwise over 50 minutes. After an hour the volatiles were evaporated and the residue was dried under reduced pressure. The residue was extracted with ethyl ether (15 mL) and filtered through Celite on a fritted disk. Evaporation of the volatiles afforded the product as a yellow oil. Yield: 1.73 g, 87.7%.

(2'-(Methoxymethoxy)-3',5'-di-tert-pentyl-[1,1'-biphenyl]-2-yl)lithium

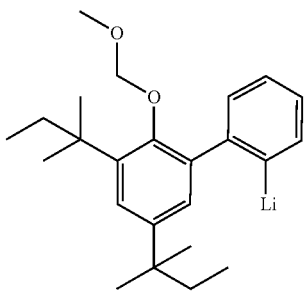

Hexane (45 mL) and 2'-bromo-2-(methoxymethoxy)-3,5-di-tert-pentyl-1,1'-biphenyl (1.71 g, 3.95 mmol) were combined to form a clear colorless solution. At −20° C. a hexane solution of BuLi (2.47 mL, 3.95 mmol) was added dropwise over several minutes. The mixture was stirred for 3 hours at this temperature then the colorless solid was collected on a fritted disk, washed with cold hexane (2×15 mL), and dried under reduced pressure. Yield: 1.15 g, 80.9%.

2',2'''-(Pyridine-2,6-diyl)bis(3,5-di-tert-pentyl-[1,1'-biphenyl]-2-ol)

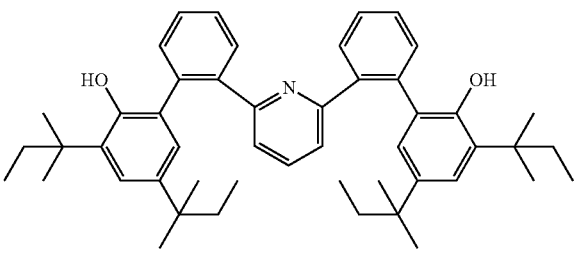 [SMILES: CCC(C)(C)c1cc(-c2ccccc2-c2cccc(-c3ccccc3-c3cc(C(C)(C)CC)cc(C(C)(C)CC)c3O)n2)c(O)c(C(C)(C)CC)c1]

Tetrahydrofuran (15 mL) was added to ZnCl₂ (0.481 g, 3.53 mmol) and the mixture was stirred to form a clear colorless solution. At −20° C. solid (2'-(methoxymethoxy)-3',5'-di-tert-pentyl-[1,1'-biphenyl]-2-yl)lithium (1.16 g, 3.21 mmol) and a little tetrahydrofuran (2 mL) were added to the solution. The solution was allowed to warm to ambient temperature and was stirred for 2 hours. Then 2,6-dibromopyridine (0.365 g, 1.54 mmol) and Pd(P(t-Bu)₃)₂ (0.024 g, 0.047 mmol) were added, and the mixture was warmed to 60° C. After 17 hours the volatiles were evaporated on a rotary evaporator and the residue was extracted with ether (40 mL) and water (20 mL). The aqueous layer was removed and the organics were washed with additional water (2×20 mL), then brine. The organics were dried over Na₂SO₄ and filtered. Removal of the volatiles afforded a yellow oil that was mixed with tetrahydrofuran (15 ml), methanol (15 mL), and concentrated HCl (0.7 mL). The mixture was heated to 60° C. After 5 hours the volatiles were evaporated and the residue was extracted with ether (40 mL). The organics were washed with water (2×40 mL), then brine. The organics were dried over Na₂SO₄ and evaporated to a yellow oil. The crude product was purified by chromatography on SiO₂, eluted with 2-6% EtOAc in hexanes. Yield: 0.757 g, 70.7%.

Dibenzylzirconium[2',2'''-(pyridine-2,6-diyl)bis(3,5-di-tert-pentyl-[1,1'-biphenyl]-2-olate)] (Catalyst 15)

Benzene (3 mL) was added to tetrabenzylzirconium (0.0614 g, 0.135 mmol) and 2',2''-(pyridine-2,6-diyl)bis(3,5-di-tert-pentyl-[1,1'-biphenyl]-2-ol) (0.0937 g, 0.135 mmol) to form a clear orange solution. After 30 minutes the volatiles were evaporated with a stream of nitrogen to near dryness to afford an orange oil. Hexane (1.5 mL) was added. A solution formed from which crystals began to form immediately. After a couple hours the crystalline solid was isolated and washed with cold hexane (2×1 mL) to afford a colorless solid that was dried under reduced pressure. Yield: 59 mg, 45%.

Triethyl(5-methyl-2-((tetrahydro-2H-pyran-2-yl)oxy)phenyl)silane

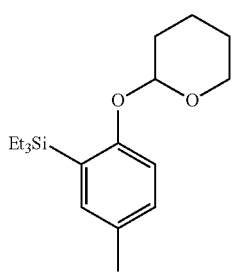

Chlorotriethylsilane (1.885 g, 12.5 mmol) was added to 11.9 mmol of (5-methyl-2-((tetrahydro-2H-pyran-2-yl)oxy)phenyl)lithium in 50 mL of THF. The reaction was stirred overnight at 40° C. The reaction was concentrated to remove the THF. The resulting mixture was extracted with pentane and filtered to remove all solids. The crude product was purified by chromatography on silica gel, eluted with 10-15% dichloromethane in pentane. Yield: 3.20 g (88%).

¹H NMR (C₆D₆, 400 MHz): δ 7.11 (m, 2H), 7.03 (d, 1H), 5.39 (t, 1H), 3.88 (td, 1H), 3.62 (dt, 1H), 2.28 (s, 3H), 1.58-2.05 (m, 5H), 1.56 (s, 1H), 0.95 (t, 9H), 0.85 (m, 6H).

(5-methyl-2-((tetrahydro-2H-pyran-2-yl)oxy)-3-(triethylsilyl)phenyl)lithium

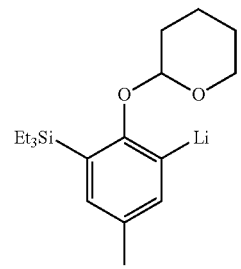

To a solution of 2.30 g (7.5 mmol) of triethyl(5-methyl-2-((tetrahydro-2H-pyran-2-yl)oxy)phenyl)silane in 8 mL of diethyl ether was added 3.0 mL of a 2.5 M solution of n-butyllithium in hexanes. The reaction was stirred for 2 hours at ambient temperature, then concentrated to a solid. The resulting solid was suspended in pentane and collected by filtration. The solid was washed with pentane and dried under vacuum to give a white powder. Yield 1.77 g (76%).

(2'-bromo-5-methyl-2-((tetrahydro-2H-pyran-2-yl)oxy)-[1,1'-biphenyl]-3-yl)triethylsilane

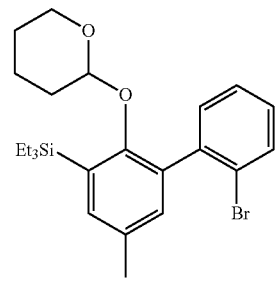

To a slurry of 1.5 g (4.8 mmol) of (5-methyl-2-((tetrahydro-2H-pyran-2-yl)oxy)-3-(triethylsilyl)phenyl)lithium in diethyl ether (ca. 50 mL) at ambient temperature was added dropwise a solution of 0.965 g (5.0 mmol) of 1-bromo-2-chlorobenzene in 20 mL of diethyl ether. The reaction was stirred at ambient temperature for 1 hour, then at 40° C. overnight. The reaction was then filtered to remove all solids. The crude product was purified by chromatography on silica gel, eluted with 10-16% dichloromethane in hexanes. Yield: 0.649 g (29%). ¹H NMR (C₆D₆, 400 MHz): δ 7.48 (dd, 1H), 7.37 (d, 1H), 7.26 (dd, 1H), 6.86-7.09 (m, 2H), 6.74 (m, 1H), 4.44 (dd, 1H), 3.62 (dd, 1H), 2.96 (dt, 1H), 2.16 (d, 3H), 1.34-1.49 (m, 3H), 1.18 (m, 16H), 0.88 (m, 2H).

(5'-methyl-2'-((tetrahydro-2H-pyran-2-yl)oxy)-3'-(triethylsilyl)-[1,1'-biphenyl]-2-yl)lithium

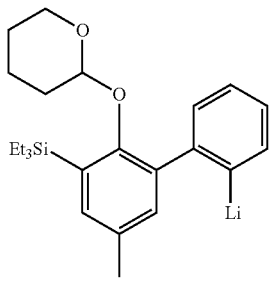

To a solution of 0.649 g (1.4 mmol) of (2'-bromo-5-methyl-2-((tetrahydro-2H-pyran-2-yl)oxy)-[1,1'-biphenyl]-3-yl)triethylsilane in 10 mL of pentane at 0° C. was added dropwise 0.59 mL of a 2.5 M solution of n-butyllithium in hexanes. The reaction was stirred for 20 minutes, then diluted with additional pentane. The resulting mixture was filtered through a glass fritted funnel. The filtride was washed with pentane and dried under vacuum to give a white powder. Yield 0.453 g (83%).

2',2'''-(pyridine-2,6-diyl)bis(5-methyl-3-(triethylsilyl)-[1,1'-biphenyl]-2-ol)

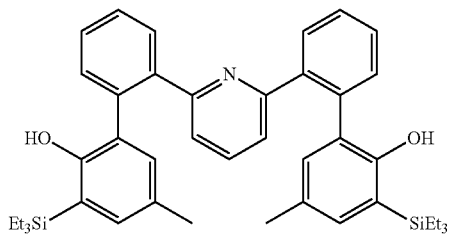

To 0.453 g (1.17 mmol) of (5'-methyl-2'-((tetrahydro-2H-pyran-2-yl)oxy)-3'-(triethylsilyl)-[1,1'-biphenyl]-2-yl) and 0.167 g (1.22 mmol) of zinc chloride was added THF (ca. 10 mL). The resulting mixture was stirred until all solids were dissolved (ca. 10 minutes). To the solution was added 0.189 g (0.57 mmol) of 2,6-diiodopyridine and 2.6 mg (0.003 mmol) of Chloro[2-(dicyclohexylphosphino)-3,6-dimethoxy-2',4',6'-tri-i-propyl-1,1'-biphenyl][2-(2-aminoethyl)phenyl]palladium(II). The resulting mixture was stirred overnight at 50° C., then filtered through alumina and exposed to air. The reaction was diluted with 5 mL of methanol and 0.1 mL of 10% HCl was added. The reaction was stirred at ambient temperature for 4 hours. The reaction was concentrated under nitrogen and the crude product was purified by chromatography on silica gel, eluted with 10% dichloromethane in hexanes. Yield 135 mg (38%).

Dimethylhafnium[2',2'''-(pyridine-2,6-diyl)bis(5-methyl-3-(triethylsilyl)-[1,1'-biphenyl]-2-olate)] (Catalyst 16)

To a suspension of 24 mg (0.074 mmol) of hafnium tetrachloride in 1.5 mL of toluene, 0.1 mL of a 3.0 M solution of MeMgBr in diethyl ether was added dropwise at 0° C., followed by dropwise addition of a solution of 50 mg (0.074 mmol) of 2',2'''-(pyridine-2,6-diyl)bis(5-methyl-3-(triethylsilyl)-[1,1'-biphenyl]-2-ol) in 3 mL of toluene. The reaction mixture was stirred for 35 minutes at ambient temperature, then concentrated under vacuum. Pentane was added to the resulting residue and subsequently removed under vacuum. The resulting solid was extracted with toluene. The combined extracts were filtered through a glass fiber plug. The filtrate was concentrated under vacuum; pentane was added to the resulting residue and subsequently removed under vacuum to give an off-white solid. Yield 40 mg (62%).

Dimethylzirconium[2',2'''-(pyridine-2,6-diyl)bis(5-methyl-3-(triethylsilyl)-[1,1'-biphenyl]-2-olate)] (Catalyst 17)

To a suspension of 17 mg (0.074 mmol) of zirconium tetrachloride in 1.5 mL of toluene, 0.1 mL of a 3.0 M solution of MeMgBr in diethyl ether was added dropwise at 0° C., followed by dropwise addition of a solution of 50 mg (0.074 mmol) of 2',2'''-(pyridine-2,6-diyl)bis(5-methyl-3-(triethylsilyl)-[1,1'-biphenyl]-2-ol) in 3 mL of toluene. The reaction mixture was stirred for 35 minutes at ambient temperature, then concentrated under vacuum. Pentane was added to the resulting residue and subsequently removed under vacuum. The resulting solid was extracted with toluene. The combined extracts were filtered through a glass fiber plug. The filtrate was concentrated under vacuum; pentane was added to the resulting residue and subsequently removed under vacuum to give a tan solid. Yield 29 mg (49%).

Hexene Polymerization with Borate Activator and Catalyst 15.

A tared vial was loaded with isopar E (3 mL) and 1-hexene (1 mL). The vial was heated to 50° C. An toluene solution (0.100 mL) of bis(hydrogenated tallow)methylammonium tetrakis(pentafluorophenyl)borate (550 nmol) was then added. Then a toluene solution (0.100 mL) of catalyst 15 (500 nmol) was added and the mixture was shaken. The mixture became viscous within seconds. After 45 minutes the volatiles were evaporated at 120° C. under reduced pressure to afford poly(hexene) as a clear viscous oil. Yield 0.7 g. This example demonstrates that a mixture of catalyst 15 and bis(hydrogenated tallow)methylammonium tetrakis(pentafluorophenyl)borate activator is effective for the polymerization of 1-hexene.

Hexene Polymerization with Borate Activator and Tetrabenzylzirconium.

A tared vial was loaded with isopar E (3 mL) and 1-hexene (1 mL). The vial was heated to 50° C. An toluene solution (0.100 mL) of bis(hydrogenated tallow)methylammonium tetrakis(pentafluorophenyl)borate (550 nmol) was then added. Then a toluene solution (0.100 mL) of tetrabenzylzirconium (500 nmol) was added and the mixture was shaken. The mixture did not become viscous. After 45 minutes the volatiles were evaporated at 120° C. under reduced pressure to afford only a trace amount of residue without any poly(hexene) observed. Yield 0.0 g. This example demonstrates that a mixture of tetrabenzylzirconium and bis(hydrogenated tallow)methylammonium tetrakis(pentafluorophenyl)borate activator is not effective for the polymerization of 1-hexene.

Hexene Polymerization with Borate Activator and Catalyst Formed In Situ.

A tared vial was loaded with isopar E (3 mL) and 1-hexene (1 mL). The vial was heated to 50° C. An toluene solution (0.100 mL) of bis(hydrogenated tallow)methylammonium tetrakis(pentafluorophenyl)borate (550 nmol) was then added. Then a toluene solution (0.100 mL) of 2',2'''-(pyridine-2,6-diyl)bis(3,5-di-tert-pentyl-[1,1'-biphenyl]-2-ol) (500 nmol) was added. Lastly a toluene solution (0.100 mL) of tetrabenzylzirconium (500 nmol) was added and the mixture was shaken. The mixture became viscous within seconds. After 45 minutes the volatiles were evaporated at 120° C. under reduced pressure to afford poly(hexene) as a clear viscous oil. Yield 0.7 g. This example demonstrates that a mixture of bis(hydrogenated tallow)methylammonium tetrakis(pentafluorophenyl)borate activator, 2',2'''-(pyridine-2,6-diyl)bis(3,5-di-tert-pentyl-[1,1'-biphenyl]-2-ol), and tetrabenzylzirconinum is effective for the polymerization of 1-hexene.

The three hexene polymerization experiments above demonstrate that an active olefin polymerization catalyst may be formed in situ by reaction of a bis(phenol) ligand with a suitable transition metal reagent. In this example tetrabenzylzirconium was used as the transition metal reagent, but other transition metal compounds (preferably of group 4) containing alkyl or hydrido groups would be suitable. Mixtures of group 4 halides (e.g. $ZrCl_4$, $HfCl_4$) with main-group organometallics (e.g. alkyllithiums, Grignard reagents, organoaluminums, organozincs) may also be used as the transition metal reagent to form an active catalyst mixture by reaction with a bis(phenol) ligand. Bis(phenol) ligands that feature a neutral Lewis base donor that bridges a pair of phenol groups may be suitable for the formation of active polymerization catalyst by reaction with transition metal reagents.

Catalyst 1

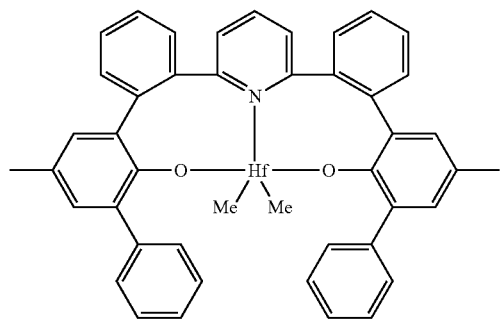

Catalyst 2

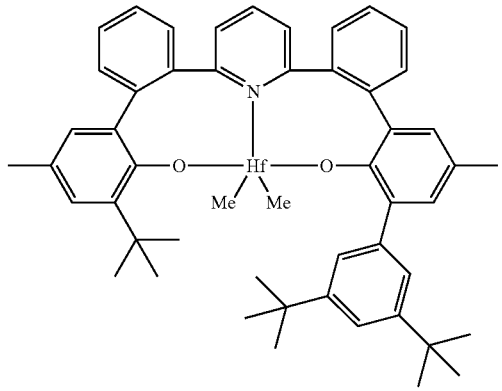

Catalyst 3

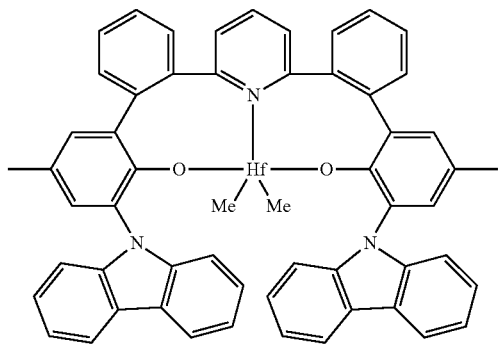

Catalyst 4

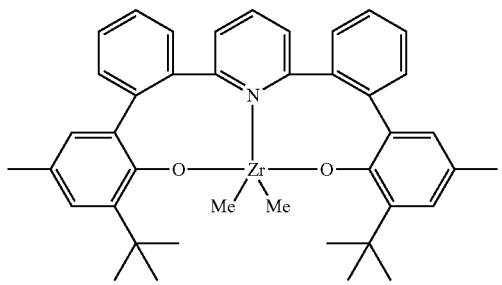

Catalyst 5

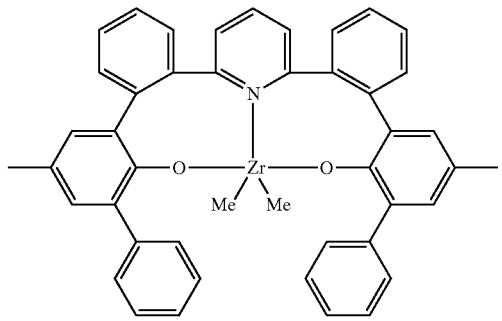

Catalyst 6

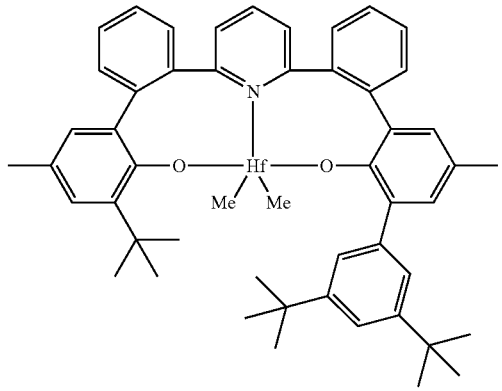

Catalyst 7
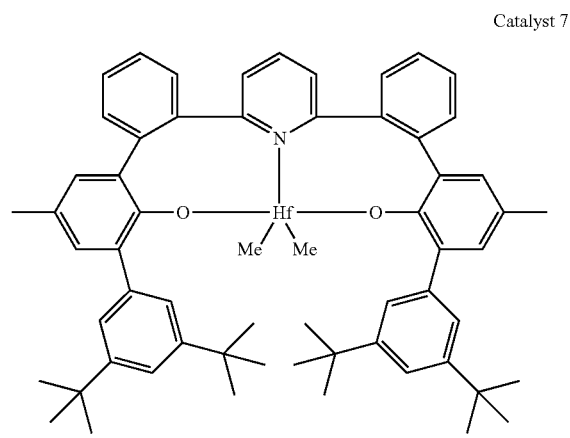
Catalyst 8
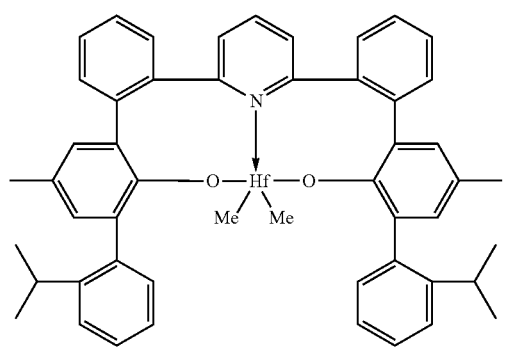
Catalyst 9
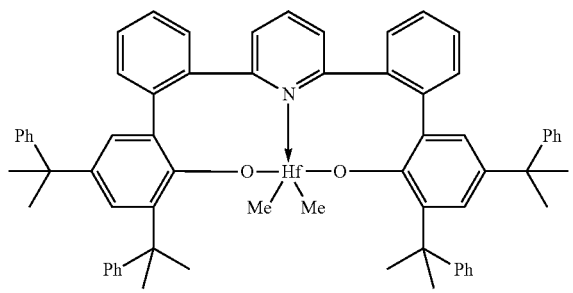
Catalyst 10
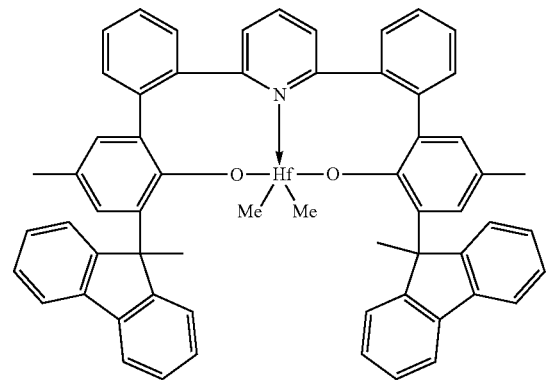
Catalyst 11
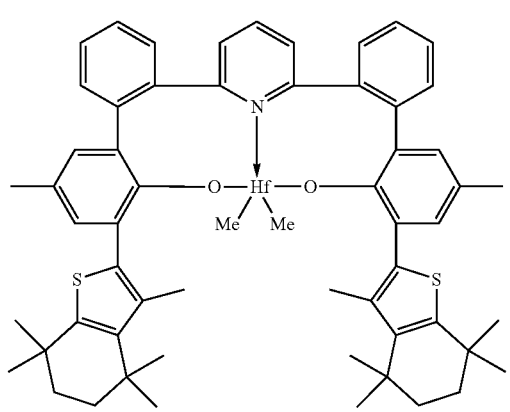
Catalyst 12
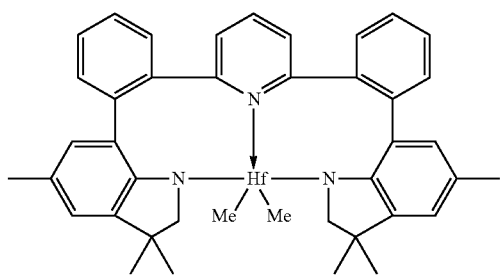
Catalyst 13
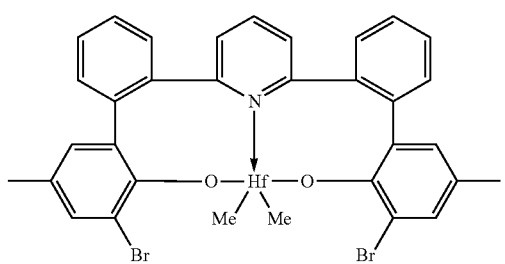
Catalyst 14
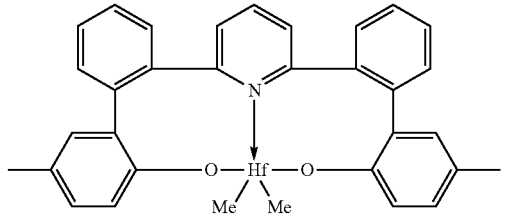
Catalyst 15
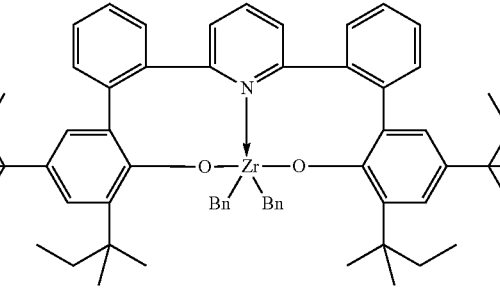

Catalyst 16

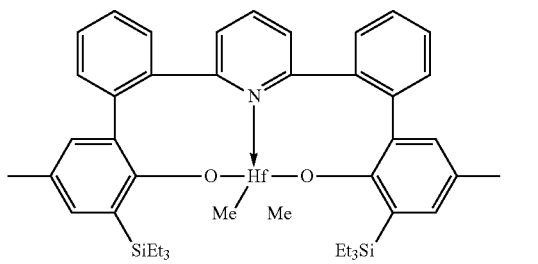

Catalyst 17

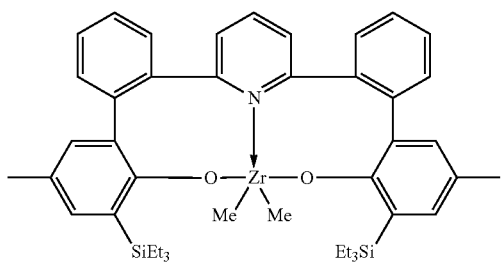

POLYMERIZATION EXAMPLES

Solvents, polymerization grade toluene and/or isohexanes were supplied by ExxonMobil Chemical Co. and were purified by passing through a series of columns: two 500 cm$^3$ Oxyclear cylinders in series from Labclear (Oakland, Calif.), followed by two 500 cm$^3$ columns in series packed with dried 3 Å molecular sieves (8 mesh-12 mesh; Aldrich Chemical Company), and two 500 cm$^3$ columns in series packed with dried 5 Å molecular sieves (8-12 mesh; Aldrich Chemical Company).

1-Octene (98%) (Aldrich Chemical Company) was dried by stirring over Na—K alloy overnight followed by filtration through basic alumina (Aldrich Chemical Company, Brockman Basic 1). Tri-(n-octyl)aluminum (TNOA) was purchased from either Aldrich Chemical Company or Akzo Nobel and used as received.

Polymerization grade ethylene was further purified by passing it through a series of columns: 500 cm$^3$ Oxyclear cylinder from Labclear (Oakland, Calif.) followed by a 500 cm$^3$ column packed with dried 3 Å molecular sieves (8 mesh-12 mesh; Aldrich Chemical Company), and a 500 cm$^3$ column packed with dried 5 Å molecular sieves (8 mesh-12 mesh; Aldrich Chemical Company).

Polymerization grade propylene was further purified by passing it through a series of columns: 2,250 cm$^3$ Oxyclear cylinder from Labclear followed by a 2,250 cm$^3$ column packed with 3 Å molecular sieves (8 mesh-12 mesh; Aldrich Chemical Company), then two 500 cm$^3$ columns in series packed with 5 Å molecular sieves (8 mesh-12 mesh; Aldrich Chemical Company), a 500 cm$^3$ column packed with Selexsorb CD (BASF), and finally a 500 cm$^3$ column packed with Selexsorb COS (BASF).

Methylalumoxane (MAO) was purchased from Albemarle Corporation as a 10 wt % in toluene. N,N-Dimethyanilinium tetrakis(pentafluorophenyl)borate was purchased from Albemarle Corporation. All complexes and the activators were added to the reactor as dilute solutions in toluene. The concentrations of the solutions of activator, scavenger, and complexes that were added to the reactor were chosen so that between 40 microliters-200 microliters of the solution were added to the reactor to ensure accurate delivery.

Reactor Description and Preparation. Polymerizations were conducted in an inert atmosphere (N$_2$) drybox using autoclaves equipped with an external heater for temperature control, glass inserts (internal volume of reactor=23.5 mL for C$_2$ and C$_2$/C$_8$ runs; 22.5 mL for C$_3$ runs), septum inlets, regulated supply of nitrogen, ethylene and propylene, and equipped with disposable polyether ether ketone mechanical stirrers (800 RPM). The autoclaves were prepared by purging with dry nitrogen at 110° C. or 115° C. for 5 hours and then at 25° C. for 5 hours.

Ethylene Polymerization (PE) or Ethylene/1-Octene Copolymerization (EO)

The reactor was prepared as described above, and then purged with ethylene. Toluene (solvent unless stated otherwise), optional 1-octene (0.1 mL when used), and optional MAO were added via syringe at room temperature and atmospheric pressure. The reactor was then brought to process temperature (typically 80° C.) and charged with ethylene to process pressure (typically 75 psig=618.5 kPa or 200 psig=1480.3 kPa) while stirring at 800 RPM. An optional scavenger solution (e.g., TNOA in isohexane) was then added via syringe to the reactor at process conditions. An optional non-coordinating activator (e.g., N,N-dimethylanilinium tetrakis(pentafluorophenyl)borate) solution (in toluene) was added via syringe to the reactor at process conditions, followed by a pre-catalyst (i.e., complex or catalyst) solution (in toluene) via syringe to the reactor at process conditions. Ethylene was allowed to enter (through the use of computer controlled solenoid valves) the autoclaves during polymerization to maintain reactor gauge pressure (+/−2 psi). Reactor temperature was monitored and typically maintained within +/−1° C. Polymerizations were halted by addition of approximately 50 psi O$_2$/Ar (5 mol % O$_2$) gas mixture to the autoclaves for approximately 30 seconds. The polymerizations were quenched after a predetermined cumulative amount of ethylene had been added or for a maximum of 30 minutes polymerization time. The reactors were cooled and vented. The polymer was isolated after the solvent was removed in-vacuo. Yields reported include total weight of polymer and residual catalyst. Catalyst activity is reported as grams of polymer per mmol transition metal compound per hour of reaction time (g/mmol/hr).

Propylene Polymerization

The reactor was prepared as described above, then heated to 40° C. and purged with propylene gas at atmospheric pressure. Toluene (solvent unless stated otherwise), optional MAO, and liquid propylene (1.0 mL) were added via syringe. The reactor was then heated to process temperature (70° C. or 100° C.) while stirring at 800 RPM. Then optional scavenger solution (e.g., TNOA in isohexane) was added via syringe to the reactor at process conditions. Optional non-coordinating activator (e.g., N,N-dimethylanilinium tetrakis (pentafluorophenyl)borate) solution (in toluene) was then added via syringe to the reactor at process conditions, followed by a pre-catalyst (i.e., complex or catalyst) solution (in toluene) via syringe to the reactor at process conditions. Reactor temperature was monitored and typically maintained within +/−1° C. Polymerizations were halted by addition of approximately 50 psi O$_2$/Ar (5 mol % O$_2$) gas mixture to the autoclaves for approximately 30 seconds. The polymerizations were quenched based on a predetermined pressure loss of approximately 8 psi or for a maximum of 30 minutes polymerization time. The reactors were cooled and vented. The polymer was isolated after the solvent was removed in-vacuo. Yields reported include total weight of polymer and residual catalyst. Catalyst activities are typically reported as grams of polymer per mmol transition metal compound per hour of reaction time (g/mmol/hr).

Polymer Characterization

For analytical testing, polymer sample solutions were prepared by dissolving the polymer in 1,2,4-trichlorobenzene (TCB, 99+% purity from Sigma-Aldrich) containing 2,6-di-tert-butyl-4-methylphenol (BHT, 99% from Aldrich) at 165° C. in a shaker oven for approximately 3 hours. The typical concentration of polymer in solution was between 0.1 to 0.9 mg/mL with a BHT concentration of 1.25 mg BHT/mL of TCB. Samples were cooled to 135° C. for testing.

High temperature size exclusion chromatography was performed using an automated "Rapid GPC" system as described in U.S. Pat. Nos. 6,491,816; 6,491,823; 6,475,391; 6,461,515; 6,436,292; 6,406,632; 6,175,409; 6,454,947; 6,260,407; and 6,294,388; each of which is incorporated herein by reference. Molecular weights (weight average molecular weight (Mw) and number average molecular weight (Mn)) and molecular weight distribution (MWD=Mw/Mn), which is also sometimes referred to as the polydispersity (PDI) of the polymer, were measured by Gel Permeation Chromatography using a Symyx Technology GPC equipped with evaporative light scattering detector and calibrated using polystyrene standards (Polymer Laboratories: Polystyrene Calibration Kit S-M-10: Mp (peak Mw) between 5,000 and 3,390,000). Samples (250 µL of a polymer solution in TCB were injected into the system) were run at an eluent flow rate of 2.0 mL/minute (135° C. sample temperatures, 165° C. oven/columns) using three Polymer Laboratories: PLgel 10 µm Mixed-B 300×7.5 mm columns in series. No column spreading corrections were employed. Numerical analyses were performed using Epoch® software available from Symyx Technologies or Automation Studio software available from Freeslate. The molecular weights obtained are relative to linear polystyrene standards.

Differential Scanning calorimetry (DSC) measurements were performed on a TA-Q100 instrument to determine the melting point of the polymers. Samples were pre-annealed at 220° C. for 15 minutes and then allowed to cool to room temperature overnight. The samples were then heated to 220° C. at a rate of 100° C./minute and then cooled at a rate of 50° C./minute. Melting points were collected during the heating period.

Samples for infrared analysis were prepared by depositing the stabilized polymer solution onto a silanized wafer (Part number S10860, Symyx). By this method, approximately between 0.12 mg and 0.24 mg of polymer was deposited on the wafer cell. The samples were subsequently analyzed on a Bruker Equinox 55 FTIR spectrometer equipped with Pikes' MappIR specular reflectance sample accessory. Spectra, covering a spectral range of 5,000 $cm^{-1}$ to 500 $cm^{-1}$, were collected at a 2 $cm^{-1}$ resolution with 32 scans.

For ethylene-1-octene copolymers, the wt % copolymer was determined via measurement of the methyl deformation band at ~1,375 $cm^{-1}$. The peak height of this band was normalized by the combination and overtone band at ~4,321 $cm^{-1}$, which corrects for path length differences. The normalized peak height was correlated to individual calibration curves from $^1$H NMR data to predict the wt % copolymer content within a concentration range of ~2 wt % to 35 wt % for octene. Typically, $R^2$ correlations of 0.98 or greater were achieved. Reported values below 4.1 wt % are outside the calibration range.

Tables 1 to 6 illustrate results obtained for Catalysts 1, 2, 3, 4, 5, 6, and 7. All catalysts were found to be active catalysts for olefin polymerization upon activation with N,N-dimethylanilinium tetrakis(pentafluorophenyl)borate or MAO, respectively.

Table 1 illustrates ethylene polymerization results obtained using Catalysts 1, 2, 3, 4, and 5. General conditions: catalyst complex=25 nmol, N,N-dimethylanilinium tetrakis(pentafluorophenyl)borate activator=1.1 equiv, 75 psig ethylene, Al(n-octyl)$_3$=500 nmol, temperature=80° C., total volume=5 mL. In all cases, narrow PDI was obtained (from 1.6 to 3.4). Catalysts 1 and 4 were found to be the most active catalysts for olefin polymerization upon activation with N,N-dimethylanilinium tetrakis(pentafluorophenyl)borate, with Catalysts 1 and 4 only differing from their metal groups, Hf and Zr, respectively. The polymerization process was performed using 25 nmol of the catalyst with 1.1 equivalents of N,N-dimethylanilinium tetrakis(pentafluorophenyl)borate in the presence of 500 nmol TNOA as a scavenger. Even though Catalyst 5 exhibited the highest catalyst activity (Run 16, 573,257 gP·mmolcat$^{-1}$·h$^{-1}$), both Catalysts 1 and 4 provided polyethylenes with the highest Mw (up to 1,630,381 g/mol), Mn (up to 482,351 g/mol), and Mz (up to 5,817,836). The highest melting points for polyethylenes were obtained when Catalyst 1 or Catalyst 4 were employed (e.g., Tm of from 135° C. to 136° C.), whereas the lowest melting point for polyethylene was obtained when Catalyst 3 was employed (e.g., Tm of 107° C.). Catalyst 3 was the least active (Run 8, 13,083 gP·mmolcat$^{-1}$·h$^{-1}$).

TABLE 1

| Run | Catalyst | Quench t (s) | Yield (g) | Activity (gP · mmolcat$^{-1}$ · h$^{-1}$) |
| --- | --- | --- | --- | --- |
| 1 | CATALYST 1 | 222 | 0.085 | 55,135 |
| 2 | CATALYST 1 | 147 | 0.0843 | 82,580 |
| 3 | CATALYST 1 | 182 | 0.0824 | 65,196 |
| 4 | CATALYST 2 | 54 | 0.0536 | 142,933 |
| 5 | CATALYST 2 | 57 | 0.0549 | 138,695 |
| 6 | CATALYST 2 | 51 | 0.0519 | 146,541 |
| 7 | CATALYST 3 | 273 | 0.0269 | 14,189 |
| 8 | CATALYST 3 | 317 | 0.0288 | 13,083 |
| 9 | CATALYST 3 | 325 | 0.0296 | 13,115 |
| 10 | CATALYST 4 | 79 | 0.0475 | 86,582 |
| 11 | CATALYST 4 | 70 | 0.0484 | 99,566 |
| 12 | CATALYST 4 | 81 | 0.0482 | 85,689 |
| 13 | CATALYST 4 | 59 | 0.0975 | 237,966 |
| 14 | CATALYST 4 | 61 | 0.0971 | 229,220 |
| 15 | CATALYST 4 | 70 | 0.0928 | 190,903 |
| 16 | CATALYST 5 | 21 | 0.0836 | 573,257 |
| 17 | CATALYST 5 | 20 | 0.0514 | 370,080 |

TABLE 1-continued

| Run | Example | Mn (g/mol) | Mw (g/mol) | Mz (g/mol) | PDI | Tm (° C.) |
|---|---|---|---|---|---|---|
| 18 | CATALYST 5 | 23 | 0.0826 | 517,148 | | |

| Run | Example | Mn (g/mol) | Mw (g/mol) | Mz (g/mol) | PDI | Tm (° C.) |
|---|---|---|---|---|---|---|
| 1 | CATALYST 1 | 424,576 | 738,862 | 1,501,676 | 1.7 | 135 |
| 2 | CATALYST 1 | 384,811 | 716,872 | 1,520,234 | 1.9 | 136 |
| 3 | CATALYST 1 | 362,746 | 683,326 | 1,499,750 | 1.9 | 135 |
| 4 | CATALYST 2 | 22,261 | 36,616 | 74,315 | 1.6 | 130 |
| 5 | CATALYST 2 | 21,207 | 37,436 | 84,528 | 1.8 | 130 |
| 6 | CATALYST 2 | 21,297 | 35,742 | 70,372 | 1.7 | 130 |
| 7 | CATALYST 3 | 27,349 | 45,456 | 87,038 | 1.7 | 107 |
| 8 | CATALYST 3 | 26,853 | 45,067 | 89,900 | 1.7 | 107 |
| 9 | CATALYST 3 | 27,371 | 45,233 | 87,282 | 1.7 | 107 |
| 10 | CATALYST 4 | 6,142 | 10,480 | 22,004 | 1.7 | 122 |
| 11 | CATALYST 4 | 4,886 | 9,159 | 20,469 | 1.9 | 122 |
| 12 | CATALYST 4 | 5,889 | 9,989 | 21,047 | 1.7 | 122 |
| 13 | CATALYST 4 | 482,351 | 1,630,381 | 5,817,836 | 3.4 | 135 |
| 14 | CATALYST 4 | 403,487 | 1,139,043 | 4,215,676 | 2.8 | 135 |
| 15 | CATALYST 4 | 363,411 | 1,043,056 | 3,990,190 | 2.9 | 135 |
| 16 | CATALYST 5 | 35,956 | 65,773 | 134,411 | 1.8 | 129 |
| 17 | CATALYST 5 | 31,157 | 62,633 | 147,430 | 2.0 | 129 |
| 18 | CATALYST 5 | 31,642 | 64,252 | 154,031 | 2.0 | 129 |

Table 2 illustrates an ethylene polymerization results obtained using Catalysts 1, 2, 3, 4, and 5. General conditions: catalyst complex=25 nmol, MAO activator=500 equiv, 75 psig ethylene, temperature=80° C., total volume=5 mL. When using MAO as the activator, higher molecular weight polymers were obtained with Catalysts 1, 2, and 3. Even though Catalyst 3 exhibited in general the lowest catalyst activity (Runs 7 through 9, from 15,671 gP·mmolcat$^{-1}$·h$^{-1}$ to 20,566 gP·mmolcat$^{-1}$·h$^{-1}$), Catalyst 3 also provided the highest molecular weight polymers (e.g., Run 8), with the highest melting point (Tm of 136° C.), and a narrow PDI (1.8 to 1.9). Catalyst 1 exhibited similar results as Catalyst 3. However, Mn values of polyethylenes formed by Catalyst 1 were lower (from 223,959 g/mol to 366,904 g/mol) than polyethylenes formed by Catalyst 3. Catalyst 2 exhibited similar results as Catalyst 3 as well. However, PDI values of polyethylenes formed by Catalyst 2 were the highest observed, from 11.3 to 15.2. When Catalyst 5 was employed (Runs 13 through 15), polyethylenes were obtained with the lowest Mn, Mw, Mz, PDI and Tm, even though Catalyst 5 exhibited the highest catalyst activity observed.

TABLE 2

| Run | Example | Quench t (s) | Yield (g) | Activity (gP · mmolcat$^{-1}$ · h$^{-1}$) |
|---|---|---|---|---|
| 1 | CATALYST 1 | 401 | 0.0739 | 26,538 |
| 2 | CATALYST 1 | 403 | 0.0745 | 26,620 |
| 3 | CATALYST 1 | 443 | 0.0734 | 23,859 |
| 4 | CATALYST 2 | 379 | 0.0542 | 20,593 |
| 5 | CATALYST 2 | 369 | 0.0508 | 19,824 |
| 6 | CATALYST 2 | 402 | 0.056 | 20,060 |
| 7 | CATALYST 3 | 441 | 0.0547 | 17,861 |
| 8 | CATALYST 3 | 369 | 0.0527 | 20,566 |
| 9 | CATALYST 3 | 578 | 0.0629 | 15,671 |
| 10 | CATALYST 4 | 188 | 0.0882 | 67,557 |
| 11 | CATALYST 4 | 182 | 0.0883 | 69,864 |
| 12 | CATALYST 4 | 179 | 0.084 | 67,575 |
| 13 | CATALYST 5 | 107 | 0.0646 | 86,938 |
| 14 | CATALYST 5 | 109 | 0.0632 | 83,494 |
| 15 | CATALYST 5 | 94 | 0.0592 | 90,689 |

TABLE 2-continued

| Run | Example | Mn (g/mol) | Mw (g/mol) | Mz (g/mol) | PDI | Tm (° C.) |
|---|---|---|---|---|---|---|
| 1 | CATALYST 1 | 366,904 | 1,227,206 | 3,646,845 | 3.3 | 136 |
| 2 | CATALYST 1 | 408,220 | 1,317,968 | 4,242,800 | 3.2 | 136 |
| 3 | CATALYST 1 | 223,959 | 1,128,903 | 3,777,970 | 5.0 | 136 |
| 4 | CATALYST 2 | 88,742 | 1,349,585 | 4,580,364 | 15.2 | 135 |
| 5 | CATALYST 2 | 102,674 | 1,266,222 | 3,696,253 | 12.3 | 135 |
| 6 | CATALYST 2 | 126,520 | 1,427,439 | 4,986,160 | 11.3 | 135 |
| 7 | CATALYST 3 | 991,360 | 1,887,052 | 4,473,873 | 1.9 | 136 |
| 8 | CATALYST 3 | 1,113,726 | 2,112,589 | 5,700,015 | 1.9 | 136 |
| 9 | CATALYST 3 | 944,668 | 1,728,247 | 3,687,880 | 1.8 | 136 |
| 10 | CATALYST 4 | 312,606 | 795,998 | 2,035,520 | 2.6 | 134 |
| 11 | CATALYST 4 | 466,537 | 841,960 | 1,789,479 | 1.8 | 134 |
| 12 | CATALYST 4 | 403,631 | 892,409 | 2,934,811 | 2.2 | 135 |
| 13 | CATALYST 5 | 51,000 | 99,521 | 213,693 | 2.0 | 130 |
| 14 | CATALYST 5 | 65,355 | 103,204 | 204,800 | 1.6 | 130 |
| 15 | CATALYST 5 | 64,453 | 106,088 | 222,814 | 1.7 | 130 |

Table 3 illustrates ethylene-octene copolymerization results obtained using Catalysts 1, 2, 3, 4, and 5. General conditions: catalyst complex=25 nmol, N,N-dimethylanilinium tetrakis(pentafluorophenyl)borate activator=27.5 nmol, 0.1 mL octene, Al(n-octyl)$_3$=500 nmol, temperature=80° C., total volume=5 mL. In all cases, the melting points of the ethylene-octene copolymers (from 45° C. to 120° C.) were lower than that of the polyethylene homopolymers. In general, the lowest melting points were obtained for the copolymers produced using catalysts including aryl substituents (such as Catalysts 2, 3, and 5) at the positions adjacent to the phenolate oxygens, and the highest melting points were obtained with Catalysts 1 and 4, with Catalyst 4 exhibiting the highest Mn, Mw and Mz (Runs 18 through 23).

TABLE 3

| Run | Example | P (psig) | Quench t (s) | Yield (g) | Activity (gP · mmolcat$^{-1}$ · h$^{-1}$) |
|---|---|---|---|---|---|
| 1 | CATALYST 1 | 75 | 59 | 0.1443 | 352,190 |
| 2 | CATALYST 1 | 75 | 78 | 0.1472 | 271,754 |

TABLE 3-continued

| | | | | | |
|---|---|---|---|---|---|
| 3 | CATALYST 1 | 75 | 72 | 0.147 | 294,000 |
| 4 | CATALYST 1 | 200 | 45 | 0.2215 | 708,800 |
| 5 | CATALYST 1 | 200 | 43 | 0.2162 | 724,019 |
| 6 | CATALYST 2 | 75 | 51 | 0.0661 | 186,635 |
| 7 | CATALYST 2 | 75 | 55 | 0.0677 | 177,251 |
| 8 | CATALYST 2 | 75 | 54 | 0.0687 | 183,200 |
| 9 | CATALYST 2 | 200 | 20 | 0.1158 | 833,760 |
| 10 | CATALYST 2 | 200 | 20 | 0.1203 | 866,160 |
| 11 | CATALYST 2 | 200 | 19 | 0.1185 | 898,105 |
| 12 | CATALYST 3 | 75 | 339 | 0.0418 | 17,756 |
| 13 | CATALYST 3 | 75 | 313 | 0.0418 | 19,231 |
| 14 | CATALYST 3 | 75 | 316 | 0.0409 | 18,638 |
| 15 | CATALYST 3 | 200 | 78 | 0.0356 | 65,723 |
| 16 | CATALYST 3 | 200 | 83 | 0.0371 | 64,366 |
| 17 | CATALYST 3 | 200 | 85 | 0.0379 | 64,207 |
| 18 | CATALYST 4 | 75 | 68 | 0.1534 | 324,847 |
| 19 | CATALYST 4 | 75 | 64 | 0.1506 | 338,850 |
| 20 | CATALYST 4 | 75 | 81 | 0.1522 | 270,578 |
| 21 | CATALYST 4 | 200 | 23 | 0.2078 | 1,301,009 |
| 22 | CATALYST 4 | 200 | 21 | 0.2131 | 1,461,257 |
| 23 | CATALYST 4 | 200 | 17 | 0.2106 | 1,783,906 |
| 24 | CATALYST 5 | 75 | 17 | 0.1244 | 1,053,741 |
| 25 | CATALYST 5 | 75 | 18 | 0.118 | 944,000 |
| 26 | CATALYST 5 | 75 | 18 | 0.1175 | 940,000 |
| 27 | CATALYST 5 | 200 | 4 | 0.2161 | 7,779,600 |
| 28 | CATALYST 5 | 200 | 4 | 0.2049 | 7,376,400 |
| 29 | CATALYST 5 | 200 | 5 | 0.2023 | 5,826,240 |

| Run | Example | Mn (g/mol) | Mw (g/mol) | Mz (g/mol) | PDI | Tm (° C.) |
|---|---|---|---|---|---|---|
| 1 | CATALYST 1 | 119,232 | 374,399 | 1,040,156 | 3.1 | 109 |
| 2 | CATALYST 1 | 106,030 | 351,569 | 1,001,951 | 3.3 | 110 |
| 3 | CATALYST 1 | 132,265 | 364,947 | 995,808 | 2.8 | 110 |
| 4 | CATALYST 1 | 80,368 | 378,371 | 924,364 | 4.7 | 118 |
| 5 | CATALYST 1 | 43,979 | 344,982 | 1,043,893 | 7.8 | 119 |
| 6 | CATALYST 2 | 7,868 | 14,733 | 31,065 | 1.9 | 96 |
| 7 | CATALYST 2 | 7,423 | 14,162 | 30,351 | 1.9 | 97 |
| 8 | CATALYST 2 | 8,182 | 14,805 | 32,483 | 1.8 | 98 |
| 9 | CATALYST 2 | 10,625 | 19,706 | 40,027 | 1.9 | 117 |
| 10 | CATALYST 2 | 11,531 | 20,889 | 43,266 | 1.8 | 116 |
| 11 | CATALYST 2 | 10,665 | 20,986 | 48,797 | 2.0 | 117 |
| 12 | CATALYST 3 | 7,091 | 14,636 | 31,737 | 2.1 | |
| 13 | CATALYST 3 | 6,655 | 14,235 | 30,713 | 2.1 | |
| 14 | CATALYST 3 | 8,811 | 15,575 | 31,991 | 1.8 | |
| 15 | CATALYST 3 | 12,872 | 22,720 | 46,069 | 1.8 | 89 |
| 16 | CATALYST 3 | 12,078 | 23,076 | 51,530 | 1.9 | 89 |
| 17 | CATALYST 3 | 13,966 | 23,139 | 44,159 | 1.7 | 90 |
| 18 | CATALYST 4 | 161,484 | 393,868 | 938,443 | 2.4 | 109 |
| 19 | CATALYST 4 | 129,637 | 376,574 | 970,116 | 2.9 | 110 |
| 20 | CATALYST 4 | 134,847 | 399,368 | 1,112,636 | 3.0 | 110 |
| 21 | CATALYST 4 | 254,753 | 437,223 | 943,982 | 1.7 | 119 |
| 22 | CATALYST 4 | 238,741 | 444,457 | 1,030,413 | 1.9 | 120 |
| 23 | CATALYST 4 | 208,367 | 409,932 | 900,141 | 2.0 | 119 |
| 24 | CATALYST 5 | 7,511 | 14,267 | 31,762 | 1.9 | 46 |
| 25 | CATALYST 5 | 7,971 | 14,785 | 30,817 | 1.9 | 47 |
| 26 | CATALYST 5 | 7,148 | 14,357 | 32,276 | 2.0 | 45 |
| 27 | CATALYST 5 | 16,271 | 29,806 | 65,359 | 1.8 | 114 |
| 28 | CATALYST 5 | 11,496 | 24,972 | 68,528 | 2.2 | 113 |
| 29 | CATALYST 5 | 15,093 | 28,879 | 62,192 | 1.9 | 114 |

Table 4 illustrates ethylene-octene copolymerization results obtained for Catalysts 1, 2, 3, 4, and 5. General conditions: catalyst complex=25 nmol, MAO activator=500 equiv, 0.1 mL octene, temperature=80° C., total volume=5 mL. With MAO as the activator, Catalyst 3 provided the ethylene-octene copolymer with the highest Mw, Mz, and PDI, as well as a melting point of 122° C., while exhibiting the lowest catalyst activity values observed (Runs 12 through 17). Catalysts 1 and 4 exhibited similar results even though the catalyst activity of Catalyst 4 was about 8 to 10 fold higher than the catalyst activity of Catalyst 1. Copolymers produced using Catalysts 1, 4, and 5 were obtained with narrow PDIs, whereas the copolymers produced using Catalysts 2 and 3 were obtained with PDI values of from 16.6 to 34.7.

TABLE 4

| Run | Example | P (psig) | Quench t (s) | Yield (g) | Activity (gP · mmolcat$^{-1}$ · h$^{-1}$) |
|---|---|---|---|---|---|
| 1 | CATALYST 1 | 75 | 242 | 0.0447 | 26,598 |
| 2 | CATALYST 1 | 75 | 242 | 0.0469 | 27,907 |

TABLE 4-continued

| | | | | | |
|---|---|---|---|---|---|
| 3 | CATALYST 1 | 75 | 253 | 0.0537 | 30,564 |
| 4 | CATALYST 1 | 200 | 134 | 0.0557 | 59,857 |
| 5 | CATALYST 1 | 200 | 133 | 0.0605 | 65,504 |
| 6 | CATALYST 2 | 75 | 609 | 0.0348 | 8,229 |
| 7 | CATALYST 2 | 75 | 692 | 0.0409 | 8,511 |
| 8 | CATALYST 2 | 75 | 634 | 0.0384 | 8,722 |
| 9 | CATALYST 2 | 200 | 261 | 0.0336 | 18,538 |
| 10 | CATALYST 2 | 200 | 205 | 0.0271 | 19,036 |
| 11 | CATALYST 2 | 200 | 267 | 0.0342 | 18,445 |
| 12 | CATALYST 3 | 75 | 1801 | 0.0247 | 1,975 |
| 13 | CATALYST 3 | 75 | 1801 | 0.0257 | 2,055 |
| 14 | CATALYST 3 | 75 | 1800 | 0.0258 | 2,064 |
| 15 | CATALYST 3 | 200 | 483 | 0.0233 | 6,947 |
| 16 | CATALYST 3 | 200 | 481 | 0.0213 | 6,377 |
| 17 | CATALYST 3 | 200 | 523 | 0.025 | 6,883 |
| 18 | CATALYST 4 | 75 | 95 | 0.1373 | 208,118 |
| 19 | CATALYST 4 | 75 | 62 | 0.131 | 304,258 |
| 20 | CATALYST 4 | 75 | 78 | 0.1328 | 245,169 |
| 21 | CATALYST 4 | 200 | 59 | 0.2129 | 519,620 |
| 22 | CATALYST 4 | 200 | 70 | 0.2133 | 438,789 |
| 23 | CATALYST 4 | 200 | 54 | 0.2171 | 578,933 |
| 24 | CATALYST 5 | 75 | 82 | 0.0683 | 119,941 |
| 25 | CATALYST 5 | 75 | 82 | 0.0663 | 116,429 |
| 26 | CATALYST 5 | 75 | 84 | 0.062 | 106,286 |
| 27 | CATALYST 5 | 200 | 49 | 0.0867 | 254,792 |
| 28 | CATALYST 5 | 200 | 46 | 0.0764 | 239,165 |
| 29 | CATALYST 5 | 200 | 50 | 0.0803 | 231,264 |

| Run | Example | Mn (g/mol) | Mw (g/mol) | Mz (g/mol) | PDI | Tm (° C.) |
|---|---|---|---|---|---|---|
| 1 | CATALYST 1 | 186,573 | 476,390 | 1,223,383 | 2.6 | 107 |
| 2 | CATALYST 1 | 165,013 | 449,119 | 1,183,840 | 2.7 | 107 |
| 3 | CATALYST 1 | 168,078 | 441,334 | 1,155,767 | 2.6 | 107 |
| 4 | CATALYST 1 | 256,938 | 554,587 | 1,390,573 | 2.2 | 120 |
| 5 | CATALYST 1 | 238,915 | 574,966 | 1,597,127 | 2.4 | 120 |
| 6 | CATALYST 2 | 8,698 | 14,150 | 26,283 | 1.6 | 85 |
| 7 | CATALYST 2 | 8,230 | 14,700 | 32,201 | 1.8 | 84 |
| 8 | CATALYST 2 | 8,342 | 14,710 | 29,090 | 1.8 | 86 |
| 9 | CATALYST 2 | 17,433 | 312,676 | 2,641,708 | 17.9 | 121 |
| 10 | CATALYST 2 | 17,534 | 291,576 | 2,374,926 | 16.6 | 121 |
| 11 | CATALYST 2 | 20,469 | 370,145 | 3,267,171 | 18.1 | 121 |
| 12 | CATALYST 3 | 11,745 | 290,122 | 3,111,079 | 24.7 | 122 |
| 13 | CATALYST 3 | 10,165 | 16,548 | 32,379 | 1.6 | |
| 14 | CATALYST 3 | 11,890 | 292,920 | 3,201,443 | 24.6 | 122 |
| 15 | CATALYST 3 | 21,259 | 678,000 | 4,290,132 | 31.9 | 122 |
| 16 | CATALYST 3 | 23,781 | 824,298 | 5,312,152 | 34.7 | 122 |
| 17 | CATALYST 3 | 28,640 | 729,161 | 3,872,531 | 25.5 | 122 |
| 18 | CATALYST 4 | 168,255 | 425,459 | 1,135,934 | 2.5 | 104 |
| 19 | CATALYST 4 | 146,403 | 414,770 | 1,155,678 | 2.8 | 103 |
| 20 | CATALYST 4 | 138,355 | 441,258 | 1,715,007 | 3.2 | 104 |
| 21 | CATALYST 4 | 162,611 | 523,159 | 1,821,837 | 3.2 | 116 |
| 22 | CATALYST 4 | 141,824 | 526,186 | 1,818,269 | 3.7 | 116 |
| 23 | CATALYST 4 | 196,715 | 516,430 | 1,319,509 | 2.6 | 116 |
| 24 | CATALYST 5 | 9,676 | 17,854 | 39,120 | 1.9 | 83 |
| 25 | CATALYST 5 | 9,198 | 18,206 | 39,825 | 2.0 | 87 |
| 26 | CATALYST 5 | 9,163 | 18,590 | 54,696 | 2.0 | 85 |
| 27 | CATALYST 5 | 12,995 | 35,293 | 174,914 | 2.7 | 108 |
| 28 | CATALYST 5 | 16,246 | 33,501 | 81,195 | 2.1 | 108 |
| 29 | CATALYST 5 | 15,482 | 92,249 | 2,065,788 | 6.0 | 123 |

Table 5 illustrates propylene polymerization results obtained for Catalysts 1, 2, 3, 4, 5, 6, and 7. General conditions: catalyst complex=25 nmol, N,N-dimethylanilinium tetrakis(pentafluorophenyl)borate activator=27.5 nmol, propylene=1 mL, Al(n-octyl)$_3$=500 nmol, total volume=5 mL. In all cases, narrow PDI was obtained (from 1.6 to 2.2). Catalysts 1 and 4 were found to be the most active catalysts observed for olefin polymerization upon activation with N,N-dimethylanilinium tetrakis(pentafluorophenyl)borate. The highest melting points for polypropylenes were obtained when Catalyst 1 or Catalyst 4 were employed (e.g., Tm of from 149° C. to 151° C.), whereas the lowest melting points for polyethylenes were obtained when Catalysts 3 or Catalyst 5 were employed (e.g., Tm of from 52° C. to 55° C.). Catalyst 3 was the least active (Run 15, 288 gP·mmolcat$^{-1}$·h$^{-1}$) catalyst tested. Catalyst 4 exhibited the highest catalyst activity (Run 19, 4,350,000 gP·mmolcat$^{-1}$·h$^{-1}$) observed.

TABLE 5

| Run | Example | Temperature (° C.) | Quench t (s) | Yield (g) | Activity (gP · mmolcat$^{-1}$ · h$^{-1}$) |
|---|---|---|---|---|---|
| 1 | CATALYST 1 | 70 | 24 | 0.365 | 2,192,400 |
| 2 | CATALYST 1 | 70 | 23 | 0.386 | 2,415,443 |
| 3 | CATALYST 1 | 70 | 22 | 0.384 | 2,514,109 |
| 4 | CATALYST 1 | 100 | 24 | 0.201 | 1,204,200 |
| 5 | CATALYST 1 | 100 | 26 | 0.198 | 1,098,277 |
| 6 | CATALYST 1 | 100 | 20 | 0.215 | 1,548,000 |
| 7 | CATALYST 2 | 70 | 82 | 0.187 | 327,688 |
| 8 | CATALYST 2 | 70 | 101 | 0.207 | 294,986 |
| 9 | CATALYST 2 | 70 | 85 | 0.227 | 384,056 |
| 10 | CATALYST 2 | 100 | 43 | 0.197 | 661,060 |
| 11 | CATALYST 2 | 100 | 42 | 0.217 | 743,314 |
| 12 | CATALYST 2 | 100 | 39 | 0.218 | 806,031 |
| 13 | CATALYST 3 | 70 | 1800 | 0.005 | 376 |
| 14 | CATALYST 3 | 70 | 1802 | 0.004 | 336 |
| 15 | CATALYST 3 | 70 | 1800 | 0.004 | 288 |
| 16 | CATALYST 3 | 100 | 1801 | 0.023 | 1,807 |
| 17 | CATALYST 3 | 100 | 1800 | 0.027 | 2,144 |
| 18 | CATALYST 3 | 100 | 1800 | 0.027 | 2,144 |
| 19 | CATALYST 4 | 70 | 12 | 0.363 | 4,350,000 |
| 20 | CATALYST 4 | 70 | 14 | 0.366 | 3,760,457 |
| 21 | CATALYST 4 | 70 | 14 | 0.377 | 3,877,714 |
| 22 | CATALYST 4 | 100 | 13 | 0.261 | 2,887,754 |
| 23 | CATALYST 4 | 100 | 17 | 0.292 | 2,475,106 |
| 24 | CATALYST 4 | 100 | 17 | 0.291 | 2,464,941 |
| 25 | CATALYST 5 | 70 | 65 | 0.166 | 367,975 |
| 26 | CATALYST 5 | 70 | 73 | 0.179 | 352,504 |
| 27 | CATALYST 5 | 70 | 85 | 0.163 | 275,972 |
| 28 | CATALYST 5 | 100 | 53 | 0.150 | 408,634 |
| 29 | CATALYST 5 | 100 | 70 | 0.156 | 320,503 |
| 30 | CATALYST 5 | 100 | 56 | 0.152 | 389,571 |
| 31 | CATALYST 6 | 70 | 87 | 0.204 | 336,993 |
| 32 | CATALYST 6 | 70 | 86 | 0.205 | 342,753 |
| 33 | CATALYST 6 | 70 | 82 | 0.209 | 367,551 |
| 34 | CATALYST 6 | 100 | 59 | 0.178 | 433,953 |
| 35 | CATALYST 6 | 100 | 52 | 0.199 | 550,800 |
| 36 | CATALYST 6 | 100 | 53 | 0.191 | 518,672 |
| 37 | CATALYST 7 | 70 | 164 | 0.120 | 105,629 |
| 38 | CATALYST 7 | 70 | 167 | 0.121 | 104,077 |
| 39 | CATALYST 7 | 70 | 177 | 0.123 | 99,824 |
| 40 | CATALYST 7 | 100 | 86 | 0.112 | 187,200 |
| 41 | CATALYST 7 | 100 | 93 | 0.122 | 189,368 |
| 42 | CATALYST 7 | 100 | 84 | 0.116 | 199,029 |

| run # | Complex | Mn (g/mol) | Mw (g/mol) | Mz (g/mol) | PDI | Tm (° C.) |
|---|---|---|---|---|---|---|
| 1 | CATALYST 1 | 47,408 | 90,386 | 201,296 | 1.9 | 151 |
| 2 | CATALYST 1 | 45,291 | 92,784 | 221,513 | 2.1 | 151 |
| 3 | CATALYST 1 | 50,123 | 92,438 | 210,009 | 1.8 | 151 |
| 4 | CATALYST 1 | 35,206 | 64,314 | 127,614 | 1.8 | 149 |
| 5 | CATALYST 1 | 36,868 | 67,959 | 152,188 | 1.8 | 149 |
| 6 | CATALYST 1 | 41,257 | 72,399 | 159,327 | 1.8 | 149 |
| 7 | CATALYST 2 | 1,870 | 3,586 | 8,148 | 1.9 | 54 |
| 8 | CATALYST 2 | 2,096 | 3,624 | 7,293 | 1.7 | 55 |
| 9 | CATALYST 2 | 1,802 | 3,365 | 7,528 | 1.9 | 55 |
| 10 | CATALYST 2 | 1,715 | 3,296 | 8,348 | 1.9 | 55 |
| 11 | CATALYST 2 | 1,656 | 3,209 | 7,258 | 1.9 | 54 |
| 12 | CATALYST 2 | 1,633 | 3,080 | 7,111 | 1.9 | 55 |
| 13 | CATALYST 3 | | | | | |
| 14 | CATALYST 3 | | | | | |
| 15 | CATALYST 3 | | | | | |
| 16 | CATALYST 3 | 1,209 | 2,057 | 4,423 | 1.7 | 109 |
| 17 | CATALYST 3 | 1,281 | 2,089 | 4,338 | 1.6 | 109 |
| 18 | CATALYST 3 | 1,192 | 2,028 | 4,332 | 1.7 | 108 |
| 19 | CATALYST 4 | 42,200 | 72,576 | 157,569 | 1.7 | 140 |

TABLE 5-continued

| | | | | | | |
|---|---|---|---|---|---|---|
| 20 | CATALYST 4 | 38,735 | 72,031 | 159,041 | 1.9 | 140 |
| 21 | CATALYST 4 | 40,843 | 72,333 | 149,855 | 1.8 | 140 |
| 22 | CATALYST 4 | 28,319 | 50,903 | 107,353 | 1.8 | 135 |
| 23 | CATALYST 4 | 32,158 | 57,565 | 136,661 | 1.8 | 135 |
| 24 | CATALYST 4 | 22,635 | 50,793 | 125,347 | 2.2 | 135 |
| 25 | CATALYST 5 | 2,079 | 3,355 | 6,902 | 1.6 | |
| 26 | CATALYST 5 | 1,758 | 3,222 | 6,796 | 1.8 | |
| 27 | CATALYST 5 | 1,879 | 3,391 | 7,568 | 1.8 | 52 |
| 28 | CATALYST 5 | 1,739 | 2,971 | 6,183 | 1.7 | |
| 29 | CATALYST 5 | 1,617 | 2,910 | 5,991 | 1.8 | |
| 30 | CATALYST 5 | 1,740 | 2,877 | 5,660 | 1.7 | |
| 31 | CATALYST 6 | 7,739 | 12,251 | 22,793 | 1.6 | 148 |
| 32 | CATALYST 6 | 7,390 | 12,225 | 22,225 | 1.7 | 148 |
| 33 | CATALYST 6 | 8,121 | 13,166 | 27,479 | 1.6 | 147 |
| 34 | CATALYST 6 | 7,214 | 11,208 | 21,132 | 1.6 | 145 |
| 35 | CATALYST 6 | 6,186 | 11,289 | 25,010 | 1.8 | 145 |
| 36 | CATALYST 6 | 5,214 | 10,015 | 20,878 | 1.9 | 143 |
| 37 | CATALYST 7 | 1,436 | 2,589 | 5,512 | 1.8 | 136 |
| 38 | CATALYST 7 | 1,409 | 2,565 | 5,426 | 1.8 | 135 |
| 39 | CATALYST 7 | 1,318 | 2,280 | 4,675 | 1.7 | 135 |
| 40 | CATALYST 7 | 1,309 | 2,219 | 4,240 | 1.7 | 132 |
| 41 | CATALYST 7 | 1,297 | 2,241 | 4,760 | 1.7 | 131 |
| 42 | CATALYST 7 | 1,178 | 2,010 | 4,393 | 1.7 | 126 |

Table 6 illustrates propylene polymerization results obtained for Catalysts 1, 2, 3, 4, and 5. General conditions: catalyst complex=40 nmol, MAO activator=500 equiv, propylene=1 mL, total volume=5 mL.

When MAO was used as the activator, all catalysts provided polypropylene polymers having narrow PDI (from 1.2 to 2.2). Catalysts 1 and 4 were found to be the most active catalysts tested for olefin polymerization upon activation with MAO. The highest melting points for polypropylene polymers were obtained when Catalyst 1 or Catalyst 4 were employed (e.g., Tm of from 133° C. to 149° C.), with Catalyst 4 exhibiting the highest catalyst activity (Run 20, 1,088,156 gP·mmolcat$^{-1}$·h$^{-1}$) observed.

TABLE 6

| Run | Example | Temperature (° C.) | Quench t (s) | Yield (g) | Activity (gP · mmolcat$^{-1}$ · h$^{-1}$) |
|---|---|---|---|---|---|
| 1 | CATALYST 1 | 70 | 445 | 0.089 | 17,939 |
| 2 | CATALYST 1 | 70 | 476 | 0.093 | 17,565 |
| 3 | CATALYST 1 | 70 | 416 | 0.080 | 17,308 |
| 4 | CATALYST 1 | 100 | 341 | 0.067 | 17,789 |
| 5 | CATALYST 1 | 100 | 314 | 0.076 | 21,869 |
| 6 | CATALYST 1 | 100 | 316 | 0.072 | 20,620 |
| 7 | CATALYST 2 | 70 | 648 | 0.084 | 11,708 |
| 8 | CATALYST 2 | 70 | 614 | 0.079 | 11,565 |
| 9 | CATALYST 2 | 70 | 628 | 0.077 | 11,078 |
| 10 | CATALYST 2 | 100 | 246 | 0.079 | 28,793 |
| 11 | CATALYST 2 | 100 | 248 | 0.082 | 29,613 |
| 12 | CATALYST 2 | 100 | 234 | 0.078 | 29,846 |
| 13 | CATALYST 3 | 70 | 1800 | 0.008 | 380 |
| 14 | CATALYST 3 | 70 | 1801 | 0.008 | 375 |
| 15 | CATALYST 3 | 70 | 1800 | 0.007 | 350 |
| 16 | CATALYST 3 | 100 | 1801 | 0.021 | 1,049 |
| 17 | CATALYST 3 | 100 | 1800 | 0.023 | 1,130 |
| 18 | CATALYST 3 | 100 | 1801 | 0.022 | 1,119 |
| 19 | CATALYST 4 | 70 | 32 | 0.370 | 1,040,625 |
| 20 | CATALYST 4 | 70 | 32 | 0.387 | 1,088,156 |
| 21 | CATALYST 4 | 70 | 33 | 0.360 | 980,727 |
| 22 | CATALYST 4 | 100 | 27 | 0.243 | 811,333 |
| 23 | CATALYST 4 | 100 | 25 | 0.268 | 963,720 |
| 24 | CATALYST 4 | 100 | 25 | 0.256 | 921,960 |
| 25 | CATALYST 5 | 70 | 102 | 0.189 | 167,029 |
| 26 | CATALYST 5 | 70 | 110 | 0.181 | 148,255 |
| 27 | CATALYST 5 | 70 | 105 | 0.180 | 154,114 |
| 28 | CATALYST 5 | 100 | 50 | 0.170 | 306,000 |
| 29 | CATALYST 5 | 100 | 45 | 0.169 | 337,200 |
| 30 | CATALYST 5 | 100 | 47 | 0.174 | 333,383 |

| Run | Example | Mn (g/mol) | Mw (g/mol) | Mz (g/mol) | PDI | Tm (° C.) |
|---|---|---|---|---|---|---|
| 1 | CATALYST 1 | 32,098 | 71,005 | 161,619 | 2.2 | 144 |
| 2 | CATALYST 1 | 41,955 | 76,450 | 161,992 | 1.8 | 144 |
| 3 | CATALYST 1 | 40,480 | 76,360 | 171,690 | 1.9 | 144 |
| 4 | CATALYST 1 | 29,210 | 58,239 | 125,850 | 2.0 | 140 |
| 5 | CATALYST 1 | 26,815 | 56,239 | 126,559 | 2.1 | 139 |
| 6 | CATALYST 1 | 27,371 | 56,549 | 122,506 | 2.1 | 139 |

TABLE 6-continued

| | | | | | |
|---|---|---|---|---|---|
| 7 | CATALYST 2 | 2,639 | 4,205 | 7,621 | 1.6 |
| 8 | CATALYST 2 | 2,586 | 4,313 | 8,342 | 1.7 |
| 9 | CATALYST 2 | 2,525 | 4,422 | 9,505 | 1.8 |
| 10 | CATALYST 2 | 2,302 | 3,706 | 7,630 | 1.6 |
| 11 | CATALYST 2 | 1,846 | 3,373 | 7,420 | 1.8 |
| 12 | CATALYST 2 | 1,955 | 3,343 | 6,648 | 1.7 |
| 13 | CATALYST 3 | | | | |
| 14 | CATALYST 3 | | | | |
| 15 | CATALYST 3 | | | | |
| 16 | CATALYST 3 | 1,467 | 2,568 | 5,424 | 1.8 |
| 17 | CATALYST 3 | 1,436 | 2,465 | 5,217 | 1.7 |
| 18 | CATALYST 3 | 1,500 | 2,446 | 4,757 | 1.6 |
| 19 | CATALYST 4 | 39,300 | 68,403 | 146,415 | 1.7 | 136 |
| 20 | CATALYST 4 | 39,075 | 70,139 | 153,931 | 1.8 | 135 |
| 21 | CATALYST 4 | 42,431 | 70,966 | 141,394 | 1.7 | 136 |
| 22 | CATALYST 4 | 31,692 | 56,547 | 118,175 | 1.8 | 133 |
| 23 | CATALYST 4 | 48,435 | 58,765 | 75,969 | 1.2 | 133 |
| 24 | CATALYST 4 | 33,662 | 56,854 | 118,546 | 1.7 | 133 |
| 25 | CATALYST 5 | 1,879 | 3,719 | 7,745 | 2.0 |
| 26 | CATALYST 5 | 2,046 | 3,731 | 7,776 | 1.8 |
| 27 | CATALYST 5 | 2,134 | 3,898 | 8,427 | 1.8 |
| 28 | CATALYST 5 | 1,685 | 3,103 | 6,489 | 1.8 |
| 29 | CATALYST 5 | 1,878 | 3,193 | 6,637 | 1.7 |
| 30 | CATALYST 5 | 1,714 | 3,182 | 6,858 | 1.9 |

Table 7 illustrates ethylene polymerization results obtained using Catalysts 8 through 14. General conditions: catalyst complex=25 nmol, N,N-dimethylanilinium tetrakis(pentafluorophenyl)borate activator=1.1 equiv, 75 psig ethylene, Al(n-octyl)$_3$=500 nmol, temperature=80° C., total volume=5 mL, solvent=toluene.

TABLE 7

| Run | Catalyst | Quench t (s) | Yield (g) | Activity (gP · mmolcat$^{-1}$ · h$^{-1}$) |
|---|---|---|---|---|
| 1 | 8 | 24 | 0.0724 | 434,400 |
| 2 | 8 | 24 | 0.073 | 438,000 |
| 3 | 8 | 24 | 0.0736 | 441,600 |
| 4 | 9 | 150 | 0.0878 | 84,288 |
| 5 | 9 | 243 | 0.0847 | 50,193 |
| 6 | 9 | 148 | 0.086 | 83,676 |
| 7 | 10 | 530 | 0.0386 | 10,488 |
| 8 | 10 | 447 | 0.0373 | 12,016 |
| 9 | 10 | 601 | 0.0423 | 10,135 |
| 10 | 11 | 95 | 0.0362 | 54,872 |
| 11 | 11 | 65 | 0.0445 | 98,585 |
| 12 | 11 | 69 | 0.0426 | 88,904 |
| 13 | 12 | 1801 | 0.0052 | 416 |
| 14 | 12 | 1800 | 0.0047 | 376 |
| 15 | 12 | 1801 | 0.0046 | 368 |
| 16 | 13 | 299 | 0.0317 | 15,267 |
| 17 | 13 | 248 | 0.0328 | 19,045 |
| 18 | 13 | 261 | 0.0307 | 16,938 |
| 19 | 14 | 1800 | −0.0005 | −40 |
| 20 | 14 | 1800 | 0.0001 | 8 |
| 21 | 14 | 1801 | −0.0006 | −48 |

| Run | Mn (g/mol) | Mw (g/mol) | Mz (g/mol) | PDI | Tm (° C.) |
|---|---|---|---|---|---|
| 1 | 4,192 | 8,056 | 22,134 | 1.9 | 120 |
| 2 | 3,727 | 7,488 | 21,142 | 2.0 | 120 |
| 3 | 4,241 | 7,738 | 18,094 | 1.8 | 120 |
| 4 | 472,563 | 1,004,888 | 2,367,847 | 2.1 | |
| 5 | 631,215 | 1,271,980 | 2,854,951 | 2.0 | 134 |
| 6 | 576,558 | 1,152,937 | 2,462,833 | 2.0 | 134 |
| 7 | 1,155,830 | 2,665,716 | 6,406,319 | 2.3 | 133 |
| 8 | 1,091,015 | 2,365,253 | 6,086,947 | 2.2 | 134 |
| 9 | 1,355,708 | 2,651,098 | 6,456,123 | 2.0 | 133 |
| 10 | 1,871 | 3,662 | 9,975 | 2.0 | 99 |
| 11 | 1,962 | 3,608 | 8,228 | 1.8 | 99 |
| 12 | 1,895 | 3,434 | 7,022 | 1.8 | 99 |
| 13 | | | | | |
| 14 | | | | | |
| 15 | | | | | |
| 16 | 4,539 | 10,177 | 22,588 | 2.2 | 124 |
| 17 | 5,366 | 11,048 | 25,934 | 2.1 | 125 |
| 18 | 5,275 | 10,353 | 23,286 | 2.0 | 125 |
| 19 | | | | | |
| 20 | | | | | |
| 21 | | | | | 120 |

Table 8 illustrates an ethylene polymerization results obtained using Catalyst 11. General conditions: catalyst complex=25 nmol, MAO activator=500 equiv, 75 psig ethylene, temperature=80° C., total volume=5 mL, solvent=toluene.

TABLE 8

| Run | Catalyst | Quench t (s) | Yield (g) | Activity (gP · mmolcat$^{-1}$ · h$^{-1}$) |
|---|---|---|---|---|
| 1 | 11 | 894 | 0.0273 | 4,397 |
| 2 | 11 | 886 | 0.0294 | 4,778 |
| 3 | 11 | 813 | 0.0257 | 4,552 |

| Run | Mn (g/mol) | Mw (g/mol) | Mz (g/mol) | PDI | Tm (° C.) |
|---|---|---|---|---|---|
| 1 | 2,490 | 4,807 | 10,027 | 1.9 | 135 |
| 2 | 2,680 | 5,316 | 13,208 | 2.0 | |
| 3 | 2,569 | 4,926 | 10,884 | 1.9 | 135 |

Table 9 illustrates ethylene-octene copolymerization results obtained using Catalysts 8 through 14. General conditions: catalyst complex=25 nmol, N,N-dimethylanilinium tetrakis(pentafluorophenyl)borate activator=27.5 nmol, 0.1 mL octene, Al(n-octyl)$_3$=500 nmol, temperature=80° C., total volume=5 mL, solvent=toluene.

TABLE 9

| Run | Catalyst | P (psig) | Quench t (s) | Yield (g) | Activity (gP · mmolcat$^{-1}$ · h$^{-1}$) |
|---|---|---|---|---|---|
| 1 | 8 | 75 | 25 | 0.0848 | 488,448 |
| 2 | 8 | 75 | 22 | 0.0854 | 558,982 |
| 3 | 8 | 75 | 24 | 0.0964 | 578,400 |

TABLE 9-continued

| Run | | | | | |
|---|---|---|---|---|---|
| 4 | 8 | 200 | 6 | 0.1731 | 4,154,400 |
| 5 | 8 | 200 | 6 | 0.1848 | 4,435,200 |
| 6 | 9 | 75 | 40 | 0.1414 | 509,040 |
| 7 | 9 | 75 | 62 | 0.1436 | 333,523 |
| 8 | 9 | 75 | 62 | 0.1448 | 336,310 |
| 9 | 9 | 200 | 46 | 0.2199 | 688,383 |
| 10 | 9 | 200 | 48 | 0.2205 | 661,500 |
| 11 | 9 | 200 | 48 | 0.2206 | 661,800 |
| 12 | 10 | 75 | 325 | 0.0399 | 17,679 |
| 13 | 10 | 75 | 302 | 0.0376 | 17,928 |
| 14 | 10 | 75 | 377 | 0.0376 | 14,362 |
| 15 | 10 | 200 | 186 | 0.0533 | 41,265 |
| 16 | 10 | 200 | 187 | 0.0553 | 42,584 |
| 17 | 10 | 200 | 184 | 0.0516 | 40,383 |
| 18 | 11 | 75 | 109 | 0.0379 | 50,070 |
| 19 | 11 | 75 | 74 | 0.0457 | 88,930 |
| 20 | 11 | 75 | 80 | 0.0478 | 86,040 |
| 21 | 11 | 200 | 28 | 0.0719 | 369,771 |
| 22 | 11 | 200 | 28 | 0.07 | 360,000 |
| 23 | 11 | 200 | 26 | 0.0655 | 362,769 |
| 24 | 12 | 75 | 1801 | 0.0074 | 592 |
| 25 | 12 | 75 | 1800 | 0.0073 | 584 |
| 26 | 12 | 75 | 1801 | 0.0068 | 544 |
| 27 | 12 | 200 | 1800 | 0.0177 | 1,416 |
| 28 | 12 | 200 | 1801 | 0.0161 | 1,287 |
| 29 | 12 | 200 | 1800 | 0.01 | 800 |
| 30 | 13 | 75 | 241 | 0.038 | 22,705 |
| 31 | 13 | 75 | 236 | 0.0376 | 22,942 |
| 32 | 13 | 75 | 249 | 0.0362 | 20,935 |
| 33 | 13 | 200 | 61 | 0.0448 | 105,757 |
| 34 | 13 | 200 | 59 | 0.044 | 107,390 |
| 35 | 13 | 200 | 59 | 0.0426 | 103,973 |
| 36 | 14 | 75 | 1800 | −0.0006 | −48 |
| 37 | 14 | 75 | 1801 | −0.0005 | −40 |
| 38 | 14 | 75 | 1800 | 0 | 0 |
| 39 | 14 | 200 | 1801 | −0.0004 | −32 |
| 40 | 14 | 200 | 1801 | −0.0005 | −40 |
| 41 | 14 | 200 | 1801 | −0.0005 | −40 |

| Run | Mn (g/mol) | Mw (g/mol) | Mz (g/mol) | PDI | Tm (° C.) |
|---|---|---|---|---|---|
| 1 | 3,811 | 6,804 | 16,349 | 1.8 | 111 |
| 2 | 3,227 | 5,961 | 12,992 | 1.9 | 111 |
| 3 | 2,585 | 5,942 | 17,024 | 2.3 | 99 |
| 4 | 4,179 | 7,045 | 14,718 | 1.7 | 117 |
| 5 | 3,901 | 6,812 | 15,686 | 1.8 | 117 |
| 6 | 85,458 | 265,767 | 898,179 | 3.1 | 95 |
| 7 | 97,630 | 321,471 | 1,202,413 | 3.3 | 96 |
| 8 | 110,467 | 348,885 | 1,109,458 | 3.2 | 98 |
| 9 | 56,857 | 424,729 | 1,350,234 | 7.5 | 112 |
| 10 | 60,860 | 390,325 | 1,239,790 | 6.4 | 112 |
| 11 | 47,445 | 376,399 | 1,107,021 | 7.9 | 112 |
| 12 | 543,483 | 837,234 | 1,598,780 | 1.5 | 115 |
| 13 | 402,276 | 785,054 | 1,723,048 | 2.0 | 115 |
| 14 | 509,853 | 872,971 | 1,859,440 | 1.7 | 115 |
| 15 | 531,538 | 957,146 | 2,237,049 | 1.8 | 122 |
| 16 | 513,315 | 924,155 | 1,819,131 | 1.8 | 122 |
| 17 | 543,594 | 966,108 | 2,081,463 | 1.8 | 122 |
| 18 | 1,475 | 2,455 | 4,817 | 1.7 | 90 |
| 19 | 1,578 | 2,785 | 5,968 | 1.8 | 89 |
| 20 | 1,553 | 2,800 | 6,179 | 1.8 | 90 |
| 21 | 1,669 | 3,022 | 6,729 | 1.8 | 96 |
| 22 | 1,737 | 3,127 | 7,146 | 1.8 | 96 |
| 23 | 1,680 | 2,864 | 5,545 | 1.7 | 96 |
| 24 | | | | | |
| 25 | | | | | |
| 26 | | | | | |
| 27 | 199,989 | 336,133 | 649,514 | 1.7 | 130 |
| 28 | 154,094 | 302,160 | 639,838 | 2.0 | 130 |
| 29 | 175,342 | 300,464 | 622,891 | 1.7 | 130 |
| 30 | 1,384 | 2,983 | 7,107 | 2.2 | 92 |
| 31 | 1,610 | 3,209 | 7,540 | 2.0 | 91 |
| 32 | 1,497 | 3,099 | 7,389 | 2.1 | 92 |
| 33 | 2,506 | 5,336 | 12,386 | 2.1 | 115 |
| 34 | 2,535 | 5,537 | 13,536 | 2.2 | 115 |
| 35 | 3,141 | 5,681 | 12,446 | 1.8 | 115 |
| 36 | | | | | |
| 37 | | | | | |
| 38 | | | | | |
| 39 | | | | | |
| 40 | | | | | |
| 41 | | | | | 111 |

Table 10 illustrates ethylene-octene copolymerization results obtained for Catalyst 11. General conditions: catalyst complex=25 nmol, MAO activator=500 equiv, 0.1 mL octene, temperature=80° C., total volume=5 mL, solvent=toluene.

TABLE 10

| Run | Catalyst | P (psig) | Quench t (s) | Yield (g) | Activity (gP · mmolcat$^{-1}$ · h$^{-1}$) |
|---|---|---|---|---|---|
| 1 | 11 | 75 | 976 | 0.0327 | 4,825 |
| 2 | 11 | 75 | 990 | 0.0345 | 5,018 |
| 3 | 11 | 75 | 749 | 0.0317 | 6,095 |
| 4 | 11 | 200 | 309 | 0.0286 | 13,328 |
| 5 | 11 | 200 | 271 | 0.0254 | 13,497 |
| 6 | 11 | 200 | 276 | 0.0262 | 13,670 |

| Run | Mn (g/mol) | Mw (g/mol) | Mz (g/mol) | PDI | Tm (° C.) |
|---|---|---|---|---|---|
| 1 | 1,885 | 3,483 | 7,385 | 1.9 | 118 |
| 2 | 1,996 | 3,597 | 7,461 | 1.8 | 123 |
| 3 | 1,808 | 3,255 | 6,547 | 1.8 | 119 |
| 4 | 2,323 | 4,347 | 9,412 | 1.9 | 126 |
| 5 | 2,307 | 4,547 | 11,400 | 2.0 | 135 |
| 6 | 2,103 | 3,948 | 8,383 | 1.9 | 125 |

Table 11 illustrates propylene polymerization results obtained for Catalysts 8 through 14. General conditions: catalyst complex=25 nmol, N,N-dimethylanilinium tetrakis(pentafluorophenyl)borate activator=27.5 nmol, propylene=1 mL, Al(n-octyl)$_3$=500 nmol, total volume=5 mL, solvent=isohexane.

TABLE 11

| Run | Catalyst | Temperature (° C.) | Quench t (s) | Yield (g) | Activity (gP · mmolcat$^{-1}$ · h$^{-1}$) |
|---|---|---|---|---|---|
| 1 | 8 | 70 | 1409 | 0.0399 | 4,078 |
| 2 | 8 | 70 | 1435 | 0.0437 | 4,385 |
| 3 | 8 | 70 | 1305 | 0.043 | 4,745 |
| 4 | 8 | 100 | 1801 | 0.0357 | 2,854 |
| 5 | 8 | 100 | 712 | 0.0388 | 7,847 |
| 6 | 9 | 70 | 63 | 0.2557 | 584,457 |
| 7 | 9 | 70 | 68 | 0.2751 | 582,565 |
| 8 | 9 | 70 | 73 | 0.2674 | 527,474 |
| 9 | 9 | 100 | 54 | 0.1932 | 515,200 |
| 10 | 9 | 100 | 60 | 0.2121 | 509,040 |
| 11 | 9 | 100 | 61 | 0.22 | 519,344 |
| 12 | 10 | 70 | 1801 | 0.0718 | 5,741 |

TABLE 11-continued

| | | | | | |
|---|---|---|---|---|---|
| 13 | 10 | 70 | 1801 | 0.0714 | 5,709 |
| 14 | 10 | 70 | 1801 | 0.0675 | 5,397 |
| 15 | 10 | 100 | 1800 | 0.0543 | 4,344 |
| 16 | 10 | 100 | 1802 | 0.0612 | 4,891 |
| 17 | 10 | 100 | 1752 | 0.0627 | 5,153 |
| 18 | 11 | 70 | 1800 | 0.0054 | 432 |
| 19 | 11 | 70 | 1800 | 0.0067 | 536 |
| 20 | 11 | 70 | 1801 | 0.0074 | 592 |
| 21 | 11 | 100 | 1801 | 0.004 | 320 |
| 22 | 11 | 100 | 1801 | 0.0051 | 408 |
| 23 | 11 | 100 | 1801 | 0.0104 | 832 |
| 24 | 12 | 70 | 1802 | 0.0002 | 16 |
| 25 | 12 | 70 | 1800 | 0.0004 | 32 |
| 26 | 12 | 70 | 1801 | −0.0007 | −56 |
| 27 | 12 | 100 | 1801 | 0.0011 | 88 |
| 28 | 12 | 100 | 1801 | 0.0026 | 208 |
| 29 | 12 | 100 | 1801 | 0.0039 | 312 |
| 30 | 13 | 70 | 266 | 0.0902 | 48,830 |
| 31 | 13 | 70 | 263 | 0.0916 | 50,154 |
| 32 | 13 | 100 | 1800 | 0.0137 | 1,096 |
| 33 | 13 | 100 | 1801 | 0.0171 | 1,367 |
| 34 | 13 | 100 | 1801 | 0.0216 | 1,727 |
| 35 | 14 | 70 | 1800 | 0 | 0 |
| 36 | 14 | 70 | 1801 | −0.0005 | −40 |
| 37 | 14 | 70 | 1800 | −0.0005 | −40 |
| 38 | 14 | 100 | 1801 | 0.0033 | 264 |
| 39 | 14 | 100 | 1801 | 0.0003 | 24 |
| 40 | 14 | 100 | 1801 | −0.0003 | −24 |

| run # | Mn (g/mol) | Mw (g/mol) | Mz (g/mol) | PDI | Tm (° C.) |
|---|---|---|---|---|---|
| 1 | 419 | 465 | 575 | 1.1 | 125 |
| 2 | 415 | 469 | 593 | 1.1 | 125 |
| 3 | 402 | 447 | 567 | 1.1 | 124 |
| 4 | 441 | 504 | 656 | 1.1 | 120 |
| 5 | 433 | 510 | 719 | 1.2 | 118 |
| 6 | 67,934 | 123,267 | 259,601 | 1.8 | 150 |
| 7 | 74,940 | 126,229 | 274,709 | 1.7 | 149 |
| 8 | 77,220 | 127,126 | 270,238 | 1.7 | 149 |
| 9 | 41,965 | 67,051 | 126,992 | 1.6 | 145 |
| 10 | 43,070 | 67,982 | 126,466 | 1.6 | 144 |
| 11 | 39,354 | 65,785 | 126,722 | 1.7 | 144 |
| 12 | 44,957 | 73,959 | 136,915 | 1.7 | 146 |
| 13 | 47,079 | 75,250 | 147,993 | 1.6 | 147 |
| 14 | 46,549 | 79,276 | 150,246 | 1.7 | 146 |
| 15 | 16,491 | 33,641 | 74,759 | 2.0 | 138 |
| 16 | 16,240 | 34,782 | 79,209 | 2.1 | 139 |
| 17 | 14,667 | 33,959 | 76,432 | 2.3 | 139 |
| 18 | | | | | |
| 19 | | | | | |
| 20 | | | | | |
| 21 | | | | | |
| 22 | | | | | |
| 23 | 458 | 536 | 749 | 1.2 | |
| 24 | | | | | |
| 25 | | | | | |
| 26 | | | | | |
| 27 | | | | | |
| 28 | | | | | |
| 29 | | | | | |
| 30 | 629 | 941 | 1,647 | 1.5 | |
| 31 | 701 | 1,042 | 1,800 | 1.5 | |
| 32 | 635 | 1,064 | 2,264 | 1.7 | |
| 33 | 667 | 988 | 1,731 | 1.5 | |
| 34 | 637 | 1,025 | 2,064 | 1.6 | |
| 35 | | | | | |
| 36 | | | | | |
| 37 | | | | | |
| 38 | | | | | |
| 39 | | | | | |
| 40 | | | | | |

Table 12 illustrates ethylene polymerization results obtained using Catalysts 16 and 17. General conditions: catalyst complex=25 nmol, N,N-dimethylanilinium tetrakis (pentafluorophenyl)borate activator=1.1 equiv, 75 psig ethylene, Al(n-octyl)$_3$=500 nmol, temperature=80° C., total volume=5 mL, solvent=toluene.

TABLE 12

| Run | Catalyst | Quench t (s) | Yield (g) | Activity (gP · mmolcat$^{-1}$ · h$^{-1}$) |
|---|---|---|---|---|
| 1 | 16 | 32 | 0.0935 | 420,750 |
| 2 | 16 | 35 | 0.0908 | 373,577 |
| 3 | 16 | 33 | 0.0938 | 409,309 |
| 4 | 17 | 29 | 0.098 | 486,621 |
| 5 | 17 | 27 | 0.0918 | 489,600 |
| 6 | 17 | 28 | 0.0978 | 502,971 |

Table 13 illustrates ethylene-octene copolymerization results obtained using Catalysts 16 and 17. General conditions: catalyst complex=25 nmol, N,N-dimethylanilinium tetrakis(pentafluorophenyl)borate activator=27.5 nmol, 0.1 mL octene, Al(n-octyl)$_3$=500 nmol, temperature=80° C., total volume=5 mL, solvent=toluene.

TABLE 13

| Run | Catalyst | P (psig) | Quench t (s) | Yield (g) | Activity (gP · mmolcat$^{-1}$ · h$^{-1}$) |
|---|---|---|---|---|---|
| 1 | 16 | 75 | 33 | 0.1176 | 513,164 |
| 2 | 16 | 75 | 31 | 0.1142 | 530,477 |
| 3 | 16 | 75 | 34 | 0.1152 | 487,906 |
| 4 | 16 | 200 | 23 | 0.2027 | 1,269,078 |
| 5 | 16 | 200 | 21 | 0.2006 | 1,375,543 |
| 6 | 16 | 200 | 22 | 0.2022 | 1,323,491 |
| 7 | 17 | 75 | 23 | 0.1249 | 781,983 |
| 8 | 17 | 75 | 25 | 0.1251 | 720,576 |
| 9 | 17 | 75 | 26 | 0.1307 | 723,877 |
| 10 | 17 | 200 | 16 | 0.2068 | 1,861,200 |
| 11 | 17 | 200 | 16 | 0.2071 | 1,863,900 |
| 12 | 17 | 200 | 19 | 0.2051 | 1,554,442 |

Overall, catalysts, catalyst systems, and processes of the present disclosure can provide high temperature ethylene polymerization, propylene polymerization, or copolymerization as the bis(aryl phenolate) Lewis base catalysts are stable at high polymerization temperatures and have good activity at the high polymerization temperatures. The stable catalysts with good activity can provide formation of polymers having high molecular weights and the ability to make an increased amount of polymer in a given reactor, as compared to conventional catalysts.

Hence, the present disclosure demonstrates highly active catalysts capable of operating at high reactor temperatures while producing polymers with controlled molecular weights and/or robust isotacticity.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the present disclosure, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All documents described herein are incorporated by reference herein, including any priority documents and/or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, the term "comprising" is considered synonymous with the term "including" for purposes of United States law. Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

While the present disclosure has been described with respect to a number of embodiments and examples, those skilled in the art, having benefit of this disclosure, will appreciate that other embodiments can be devised which do not depart from the scope and spirit of the present disclosure.

What is claimed is:

1. A catalyst compound represented by Formula (I):

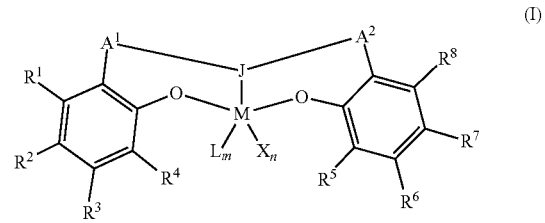

(I)

wherein:
M is a group 3, 4, or 5 metal;
A$^1$ and A$^2$ are independently an aromatic group;
J is a heterocyclic Lewis base;
L is a Lewis base;
X is an anionic ligand;
n is 1, 2 or 3;
m is 0, 1, or 2;
n+m is not greater than 4;
each of R$^1$, R$^2$, R$^3$, R$^4$, R$^5$, R$^6$, R$^7$, and R$^8$ is independently hydrogen, C$_1$-C$_{40}$ hydrocarbyl, C$_1$-C$_{40}$ substituted hydrocarbyl, a heteroatom or a heteroatom-containing group, or one or more of R$^1$ and R$^2$, R$^2$ and R$^3$, R$^3$ and R$^4$, R$^5$ and R$^6$, R$^6$ and R$^7$, or R$^7$ and R$^8$ may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings;

any two L groups may be joined together to form a bidentate Lewis base;
an X group may be joined to an L group to form a monoanionic bidentate group; and
any two X groups may be joined together to form a dianionic ligand group.

2. The catalyst compound of claim 1, wherein $A^1$ is represented by the formula:

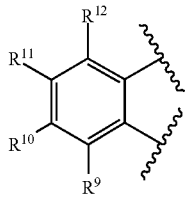

wherein ⸺ indicates a connection to the catalyst compound, and
each of $R^9$, $R^{10}$, $R^{11}$, and $R^{12}$ is independently hydrogen, $C_1$-$C_{40}$ hydrocarbyl, $C_1$-$C_{40}$ substituted hydrocarbyl, a heteroatom or a heteroatom-containing group, or one or more of $R^9$ and $R^{10}$, $R^{10}$, and $R^{11}$, or $R^{11}$ and $R^{12}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms.

3. The catalyst compound of claim 1, wherein $A^2$ is represented by the formula:

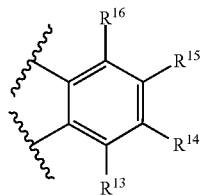

wherein ⸺ indicates a connection to the catalyst compound, and
each of $R^{13}$, $R^{14}$, $R^{15}$, and $R^{16}$ is independently hydrogen, $C_1$-$C_{40}$ hydrocarbyl, $C_1$-$C_{40}$ substituted hydrocarbyl, a heteroatom or a heteroatom-containing group, or one or more of $R^9$ and $R^{14}$, $R^{14}$, and $R^{15}$, or $R^{15}$ and $R^{16}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms.

4. The catalyst compound of claim 1, wherein J is selected from a pyridine, a thiazole, an oxazole, an oxazoline, an imidazole, a furan, or a thiofuran.

5. The catalyst compound of claim 4, wherein J is represented by the formula:

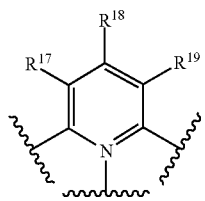

wherein ⸺ indicates a connection to the catalyst compound, and
each of $R^{17}$, $R^{18}$, and $R^{19}$ is independently hydrogen, $C_1$-$C_{40}$ hydrocarbyl, $C_1$-$C_{40}$ substituted hydrocarbyl, a heteroatom or a heteroatom-containing group, or one or more of $R^{17}$ and $R^{18}$, $R^{18}$, and $R^{19}$, or $R^{17}$ and $R^{19}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms.

6. The catalyst compound of claim 5, wherein $R^{17}$, $R^{18}$, and $R^{19}$ are hydrogen.

7. The catalyst compound of claim 1, wherein the complex is represented by Formula (II):

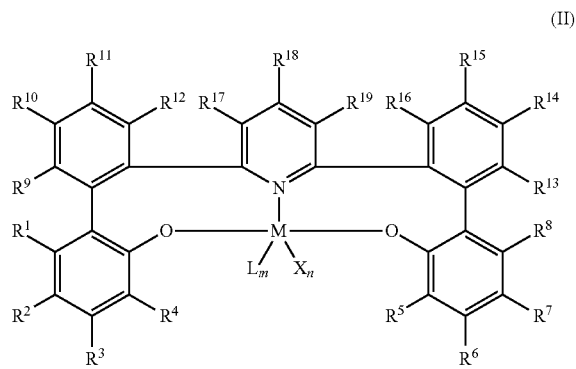

(II)

wherein:
each of $R^1$, $R^2$, $R^3$, $R^4$, $R^5$, $R^6$, $R^7$, and $R^8$ is independently hydrogen, $C_1$-$C_{40}$ hydrocarbyl, $C_1$-$C_{40}$ substituted hydrocarbyl, a heteroatom or a heteroatom-containing group, or one or more of $R^1$ and $R^2$, $R^2$ and $R^3$, $R^3$ and $R^4$, $R^5$ and $R^6$, $R^6$ and $R^7$, or $R^7$ and $R^8$ may be joined to form one or more substituted hydrocarbyl rings, unsubstituted hydrocarbyl rings, substituted heterocyclic rings, or unsubstituted heterocyclic rings each having 5, 6, 7, or 8 ring atoms;
each of $R^9$, $R^{10}$, $R^{11}$, and $R^{12}$ is independently hydrogen, $C_1$-$C_{40}$ hydrocarbyl, $C_1$-$C_{40}$ substituted hydrocarbyl, a heteroatom or a heteroatom-containing group, or one or more of $R^9$ and $R^{10}$, $R^{10}$, and $R^{11}$, and $R^{12}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms;
each of $R^{13}$, $R^{14}$, $R^{15}$, and $R^{16}$ is independently hydrogen, $C_1$-$C_{40}$ hydrocarbyl, $C_1$-$C_{40}$ substituted hydrocarbyl, a heteroatom or a heteroatom-containing group, or one or more of $R^{13}$ and $R^{14}$, $R^{14}$ and $R^{15}$, or $R^{15}$ and $R^{16}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms;
each of $R^{17}$, $R^{18}$, and $R^{19}$ is independently hydrogen, $C_1$-$C_{40}$ hydrocarbyl, $C_1$-$C_{40}$ substituted hydrocarbyl, a heteroatom or a heteroatom-containing group, or one or more of $R^{17}$ and $R^{18}$, $R^{18}$, and $R^{19}$, or $R^{17}$ and $R^{19}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms;

M is a group 3, 4, or 5 metal;

L is a Lewis base;

X is an anionic ligand;

n is 1, 2 or 3;

m is 0, 1, or 2;

n+m is not greater than 4;

any two L groups may be joined together to form a bidentate Lewis base;

an X group may be joined to an L group to form a monoanionic bidentate group; and any two X groups may be joined together to form a dianionic ligand group.

8. The catalyst compound of claim 7, wherein M is zirconium or hafnium.

9. The catalyst compound of claim 8, wherein m=0, n=2, and X is selected from halogens or hydrocarbyl groups containing 1 to 8 carbons.

10. The catalyst compound of claim 9, wherein each of $R^1$, $R^2$, $R^3$, $R^4$, $R^5$, $R^6$, $R^7$, and $R^8$ is independently selected from hydrogen, $C_1$-$C_{40}$ hydrocarbyl, $C_1$-$C_{40}$ substituted hydrocarbyl, alkoxy, silyl, amino, aryloxy, halogen, or phosphino, or one or more of $R^1$ and $R^2$, $R^2$ and $R^3$, $R^3$ and $R^4$, $R^5$ and $R^6$, $R^6$ and $R^7$, or $R^7$ and $R^8$ may be joined to form one or more substituted hydrocarbyl rings, unsubstituted hydrocarbyl rings, substituted heterocyclic rings, or unsubstituted heterocyclic rings each having 5, 6, 7, or 8 ring atoms.

11. The catalyst compound of claim 10, wherein $R^4$ and $R^5$ are independently $C_1$-$C_{10}$ alkyl.

12. The catalyst compound of claim 11, wherein $R^4$ and $R^5$ are tert-butyl.

13. The catalyst compound of claim 10, wherein $R^4$ and $R^5$ are aryl.

14. The catalyst compound of claim 13, wherein $R^4$ and $R^5$ are phenyl or carbazole.

15. The catalyst compound of claim 10, wherein $R^4$ and $R^5$ are $Et_3Si$.

16. The catalyst compound of claim 10, wherein $R^4$ and $R^5$ are 3,5-di-tert-butylbenzyl.

17. The catalyst compound of claim 10, wherein $R^2$ and $R^7$ are independently $C_1$-$C_{10}$ alkyl.

18. The catalyst compound of claim 10, wherein $R^2$ and $R^7$ are methyl.

19. The catalyst compound of claim 10, wherein each of $R^1$, $R^3$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, and $R^{19}$ is independently hydrogen or $C_1$-$C_{10}$ alkyl.

20. The catalyst compound of claim 18, wherein each of $R^1$, $R^3$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, and $R^{19}$ is independently hydrogen, methyl, ethyl, propyl, isopropyl, phenyl, cyclohexyl, fluoro, chloro, methoxy, ethoxy, phenoxy, or trimethylsilyl.

21. The catalyst compound of claim 20, wherein $R^1$, $R^3$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, and $R^{19}$ are hydrogen.

22. The catalyst compound of claim 1, wherein n is 2 and each X is independently chloro, benzyl, or methyl.

23. The catalyst compound of claim 1, wherein the catalyst compound is selected from:

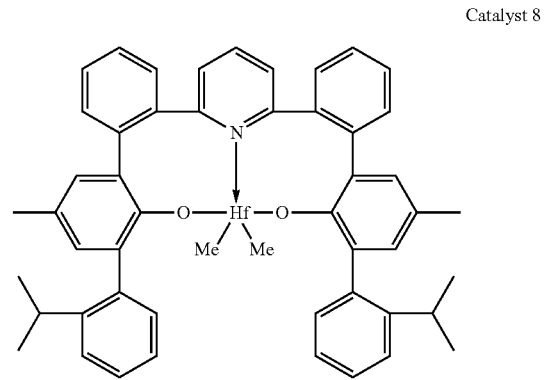

Catalyst 8

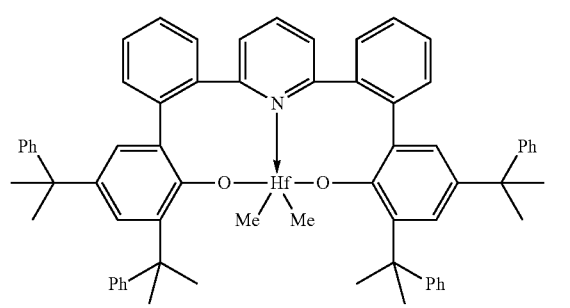

Catalyst 9

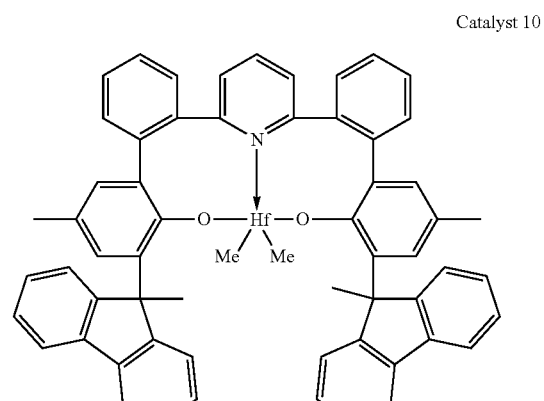

Catalyst 10

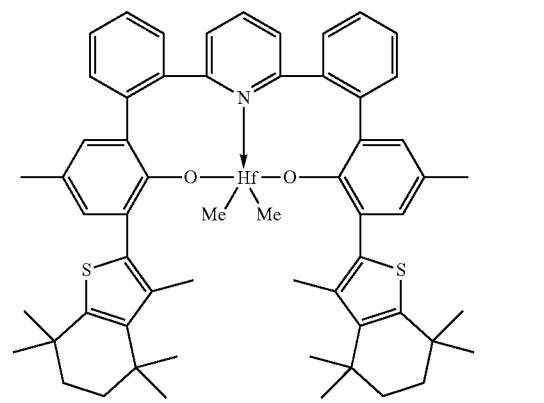

Catalyst 11

-continued
Catalyst 12
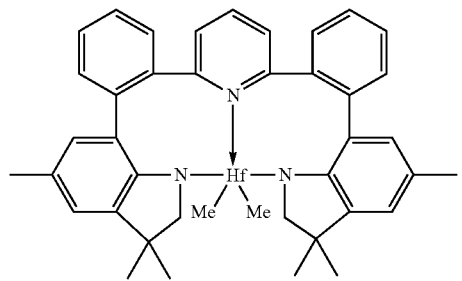
Catalyst 13
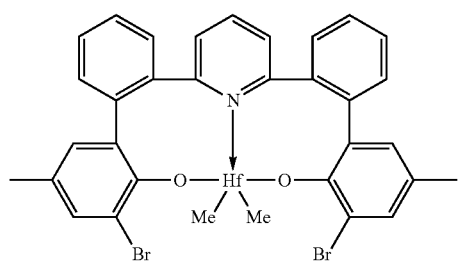
Catalyst 14
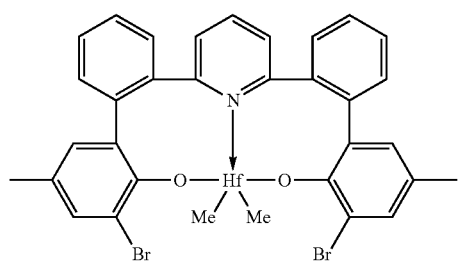
Catalyst 15
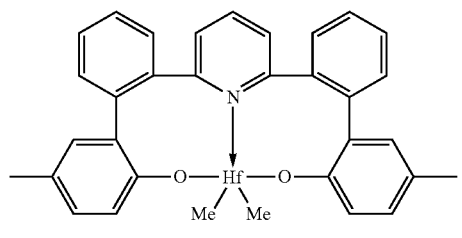
Catalyst 16
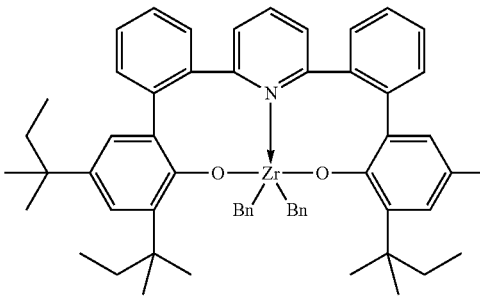 or
-continued
Catalyst 17
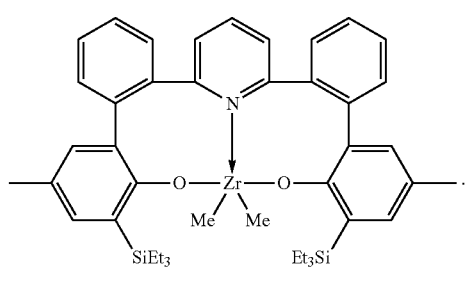
24. The catalyst compound of claim 1, wherein the catalyst compound is selected from:
1
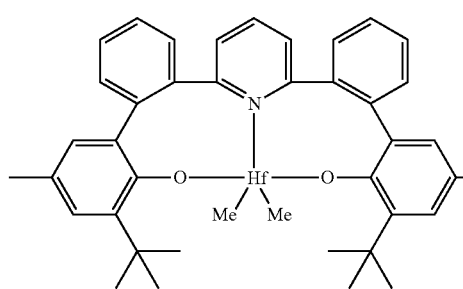
2
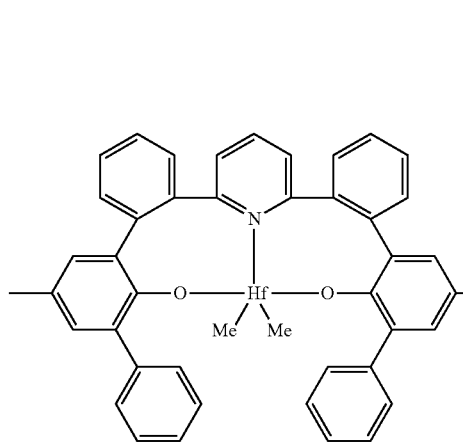
3
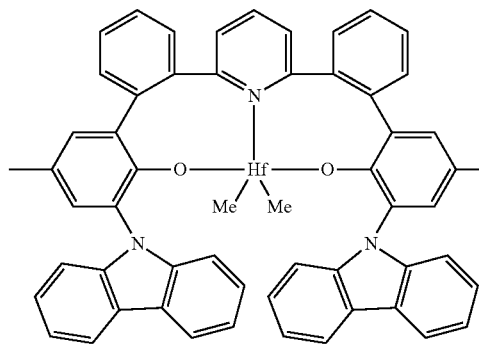

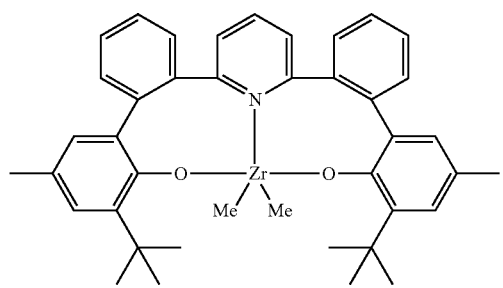
4
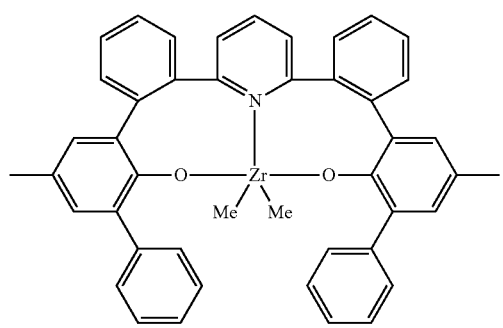
5
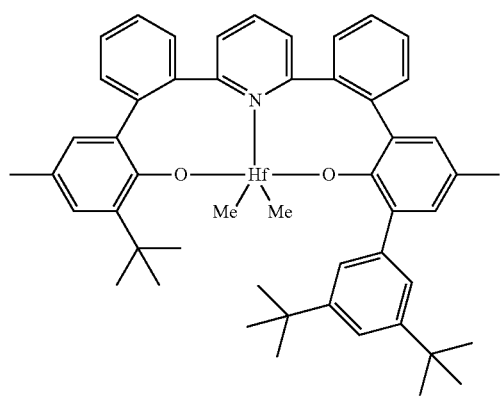
6
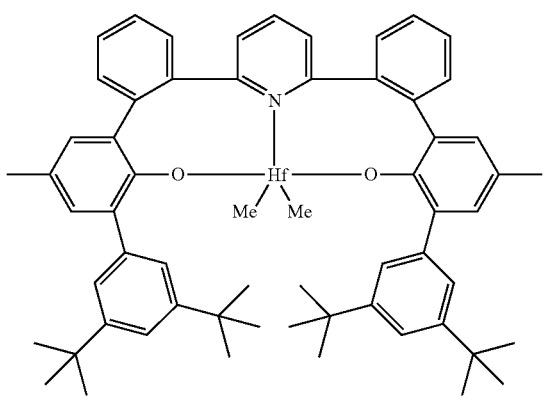
7
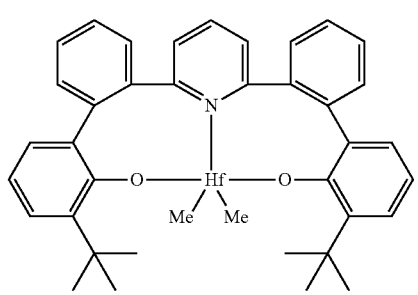
8
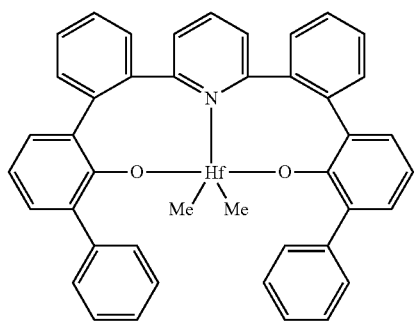
9
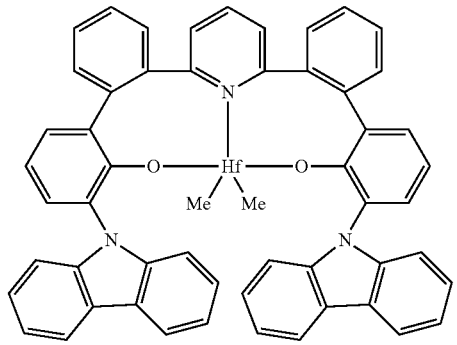
10
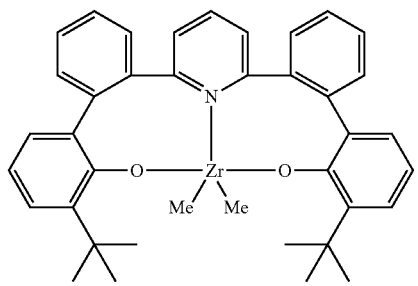
11
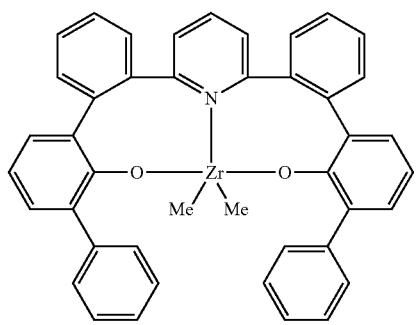
12

13
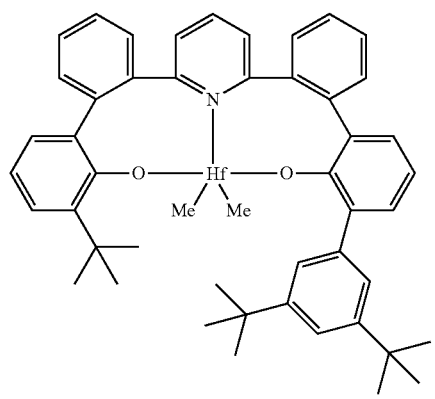
14
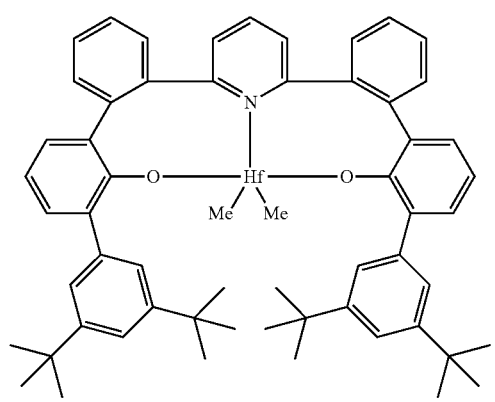
15
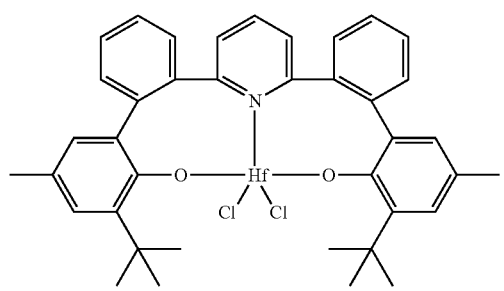
16
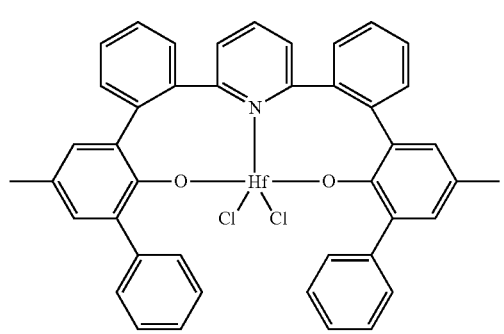
17
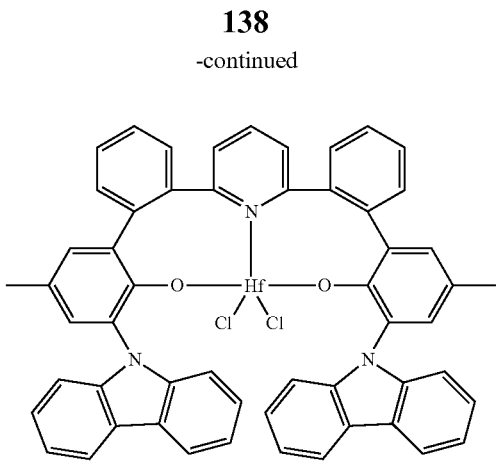
18
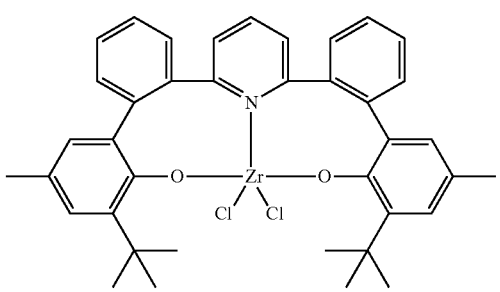
19
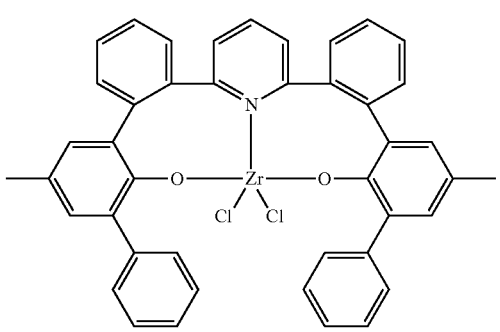
20
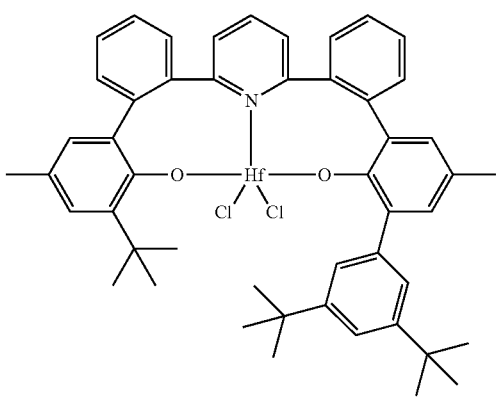

21
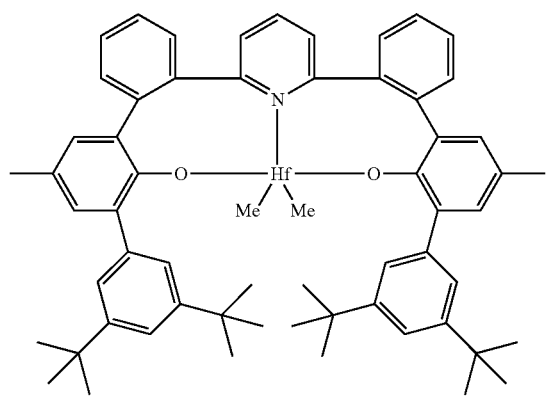
22
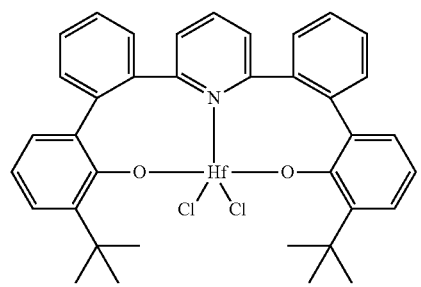
23
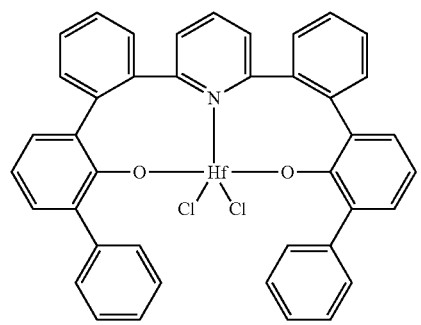
24
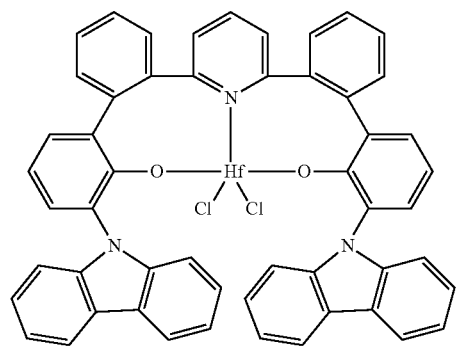
25
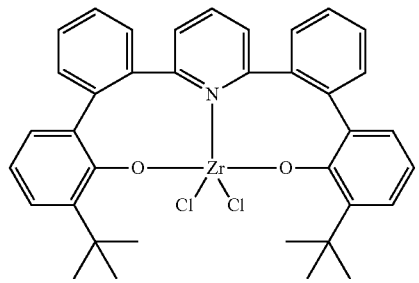
26
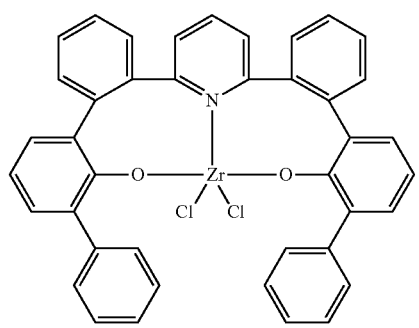
27
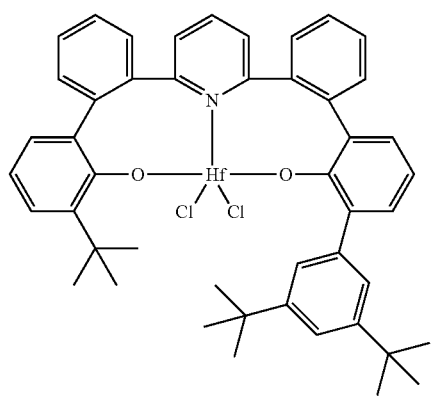
or
28
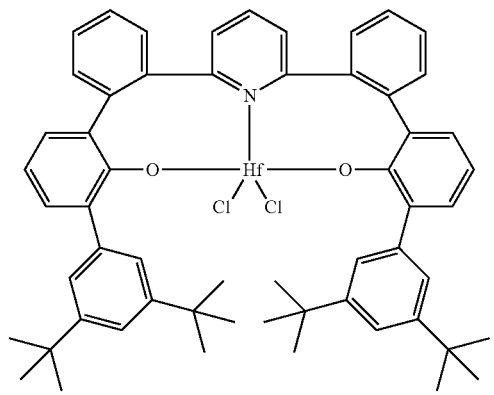

25. The catalyst compound of claim 1, wherein the catalyst compound is selected from:

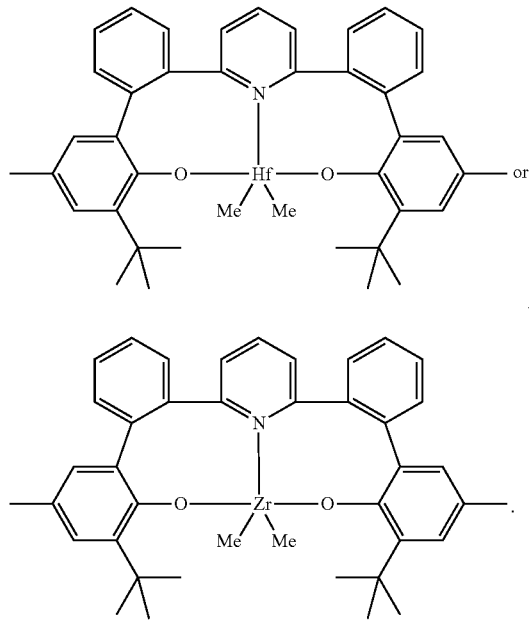

26. A catalyst system comprising an activator and the catalyst compound of claim 1.

27. The catalyst system of claim 26, further comprising a support material.

28. The catalyst system of claim 27, wherein the support material is selected from $Al_2O_3$, $ZrO_2$, $SiO_2$, $SiO_2/Al_2O_3$, $SiO_2/TiO_2$, silica clay, silicon oxide/clay, or mixtures thereof.

29. The catalyst system of claim 28, wherein the activator comprises a non-coordinating anion activator.

30. The catalyst system of claim 29, wherein the activator is represented by the formula:

$$Z_d^+(A^{d-})$$

wherein Z is (L-H) or a reducible Lewis Acid, L is an Lewis base; H is hydrogen; (L-H)+ is a Bronsted acid; $A^{d-}$ is a non-coordinating anion having the charge d−; and d is an integer from 1 to 3.

31. The catalyst system of claim 29, wherein the activator is represented by Formula (AI):

$$[R^1R^2R^3EH]_d^+[M^{k+}Q_n]^{d-} \quad (AI)$$

wherein:
E is nitrogen or phosphorous;
d is 1, 2 or 3; k is 1, 2, or 3; n is 1, 2, 3, 4, 5, or 6; n−k=d;
each of $R^1$, $R^2$, and $R^3$ is independently H, optionally substituted $C_1$-$C_{40}$ alkyl, or optionally substituted $C_5$-$C_{50}$-aryl; wherein $R^1$, $R^2$, and $R^3$ together comprise 15 or more carbon atoms;
M is an element selected from group 13 of the Periodic Table of the Elements; and each Q is independently a hydride, bridged or unbridged dialkylamido, halide, alkoxide, aryloxide, hydrocarbyl, substituted hydrocarbyl, halocarbyl, substituted halocarbyl, or halosubstituted-hydrocarbyl radical.

32. The catalyst system of claim 29, wherein the activator is one or more of:
N-methyl-4-nonadecyl-N-octadecylanilinium tetrakis (perfluoronaphthalen-2-yl)borate,
N-methyl-4-nonadecyl-N-octadecylanilinium tetrakis (perfluorophenyl)borate,
dioctadecylmethylammonium tetrakis(pentafluorophenyl)borate,
dioctadecylmethylammonium tetrakis(perfluoronaphthyl)borate,
trimethylammonium tetrakis(perfluoronaphthyl)borate,
triethylammonium tetrakis(perfluoronaphthyl)borate,
tripropylammonium tetrakis(perfluoronaphthyl)borate,
tri(n-butyl)ammonium tetrakis(perfluoronaphthyl)borate,
tri(t-butyl)ammonium tetrakis(perfluoronaphthyl)borate,
N,N-dimethylanilinium tetrakis(perfluoronaphthyl)borate,
N,N-diethylanilinium tetrakis(perfluoronaphthyl)borate,
N,N-dimethyl-(2,4,6-trimethylanilinium) tetrakis(perfluoronaphthyl)borate,
tropillium tetrakis(perfluoronaphthyl)borate,
triphenylcarbenium tetrakis(perfluoronaphthyl)borate,
triphenylphosphonium tetrakis(perfluoronaphthyl)borate,
triethylsilylium tetrakis(perfluoronaphthyl)borate,
benzene(diazonium) tetrakis(perfluoronaphthyl)borate,
trimethylammonium tetrakis(perfluorobiphenyl)borate,
triethylammonium tetrakis(perfluorobiphenyl)borate,
tripropylammonium tetrakis(perfluorobiphenyl)borate,
tri(n-butyl)ammonium tetrakis(perfluorobiphenyl)borate,
tri(t-butyl)ammonium tetrakis(perfluorobiphenyl)borate,
N,N-dimethylanilinium tetrakis(perfluorobiphenyl)borate,
N,N-diethylanilinium tetrakis(perfluorobiphenyl)borate,
N,N-dimethyl-(2,4,6-trimethylanilinium) tetrakis(perfluorobiphenyl)borate,
tropillium tetrakis(perfluorobiphenyl)borate,
triphenylcarbenium tetrakis(perfluorobiphenyl)borate,
triphenylphosphonium tetrakis(perfluorobiphenyl)borate,
triethylsilylium tetrakis(perfluorobiphenyl)borate,
benzene(diazonium) tetrakis(perfluorobiphenyl)borate,
[4-t-butyl-PhNMe$_2$H][(C$_6$F$_3$(C$_6$F$_5$)2)4B],
trimethylammonium tetraphenylborate,
triethylammonium tetraphenylborate,
tripropylammonium tetraphenylborate,
tri(n-butyl)ammonium tetraphenylborate,
tri(t-butyl)ammonium tetraphenylborate,
N,N-dimethylanilinium tetraphenylborate,
N,N-diethylanilinium tetraphenylborate,
N,N-dimethyl-(2,4,6-trimethylanilinium) tetraphenylborate,
tropillium tetraphenylborate,
triphenylcarbenium tetraphenylborate,
triphenylphosphonium tetraphenylborate,
triethylsilylium tetraphenylborate,
benzene(diazonium)tetraphenylborate,
trimethylammonium tetrakis(pentafluorophenyl)borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
tri(sec-butyl)ammonium tetrakis(pentafluorophenyl)borate,
N,N-dimethylanilinium tetrakis(pentafluorophenyl)borate,
N,N-diethylanilinium tetrakis(pentafluorophenyl)borate,
N,N-dimethyl-(2,4,6-trimethylanilinium) tetrakis(pentafluorophenyl)borate,
tropillium tetrakis(pentafluorophenyl)borate,
triphenylcarbenium tetrakis(pentafluorophenyl)borate,
triphenylphosphonium tetrakis(pentafluorophenyl)borate, triethylsilylium tetrakis(pentafluorophenyl)borate,
benzene(diazonium) tetrakis(pentafluorophenyl)borate,
trimethylammonium tetrakis-(2,3,4,6-tetrafluorophenyl)borate,
triethylammonium tetrakis-(2,3,4,6-tetrafluorophenyl)borate,
tripropylammonium tetrakis-(2,3,4,6-tetrafluorophenyl)borate,
tri(n-butyl)ammonium tetrakis-(2,3,4,6-tetrafluoro-phenyl)borate,
dimethyl(t-butyl)ammonium tetrakis-(2,3,4,6-tetrafluorophenyl)borate,
N,N-dimethylanilinium tetrakis-(2,3,4,6-tetrafluorophenyl)borate,
N,N-diethylanilinium tetrakis-(2,3,4,6-tetrafluorophenyl)borate,
N,N-dimethyl-(2,4,6-trimethylanilinium) tetrakis-(2,3,4,6-tetrafluorophenyl)borate,
tropillium tetrakis-(2,3,4,6-tetrafluorophenyl)borate,
triphenylcarbenium tetrakis-(2,3,4,6-tetrafluorophenyl)borate,
triphenylphosphonium tetrakis-(2,3,4,6-tetrafluorophenyl)borate,
triethylsilylium tetrakis-(2,3,4,6-tetrafluorophenyl)borate,
benzene(diazonium) tetrakis-(2,3,4,6-tetrafluorophenyl)borate,
trimethylammonium tetrakis(3,5-bi s(trifluoromethyl)phenyl)borate,
triethylammonium tetrakis(3,5-bi s(trifluoromethyl)phenyl)borate,
tripropylammonium tetrakis(3,5-bi s(trifluoromethyl)phenyl)borate,
tri(n-butyl)ammonium tetrakis(3,5-bi s(trifluoromethyl)phenyl)borate,
tri(t-butyl)ammonium tetrakis(3,5-bi s(trifluoromethyl)phenyl)borate,
N,N-dimethylanilinium tetrakis(3,5-bi s(trifluoromethyl)phenyl)borate,
N,N-diethylanilinium tetrakis(3,5-bi s(trifluoromethyl)phenyl)borate,
N,N-dimethyl-(2,4,6-trimethylanilinium) tetrakis(3,5-bis(trifluoromethyl)phenyl)borate,
tropillium tetrakis(3,5-bis(trifluoromethyl)phenyl)borate,
triphenylphosphonium tetrakis(3,5-bis(trifluoromethyl)phenyl)borate,
triethylsilylium tetrakis(3,5-bis(trifluoromethyl)phenyl)borate,
benzene(diazonium) tetrakis(3,5-bis(trifluoromethyl)phenyl)borate,
di-(i-propyl)ammonium tetrakis(pentafluorophenyl)borate,
dicyclohexylammonium tetrakis(pentafluorophenyl)borate,
tri(o-tolyl)phosphonium tetrakis(pentafluorophenyl)borate,
tri(2,6-dimethylphenyl)phosphonium tetrakis(pentafluorophenyl)borate,
1-(4-(tris(pentafluorophenyl)borate)-2,3,5,6-tetrafluorophenyl)pyrrolidinium,
tetrakis(pentafluorophenyl)borate,
4-(tris(pentafluorophenyl)borate)-2,3,5,6-tetrafluoropyridine, and
triphenylcarbenium tetrakis(3,5-bis(trifluoromethyl)phenyl)borate).

33. The catalyst system of claim 26, further comprising a metal hydrocarbenyl chain transfer agent represented by the formula:

$$Al(R')_{3-v}(R'')_v$$

wherein each R' independently is a $C_1$-$C_{30}$ hydrocarbyl group; each R", independently, is a $C_4$-$C_{20}$ hydrocarbenyl group having an end-vinyl group; and v is from 0.1 to 3.

34. The catalyst system of any of claim 26, wherein the activator comprises an alkylalumoxane.

35. The catalyst system of claim 34, wherein the alkylalumoxane is present at a molar ratio of aluminum to catalyst compound transition metal of 100:1 or more.

36. A process for the production of an ethylene based polymer comprising: polymerizing ethylene by contacting the ethylene with a catalyst system of claim 26, in one or more continuous stirred tank reactors or loop reactors, in series or in parallel, at a reactor pressure of from 0.05 MPa to 1,500 MPa and a reactor temperature of from 30° C. to 230° C.

37. The process of claim 36, wherein the ethylene based polymer has an Mw value of from 1,000 to 3,000,000 g/mol, Mn value of from 1,000 to 2,000,000 g/mol, Mz value of from 1,000 to 10,000,000 g/mol, and a PDI of from 1 to 20.

38. The process of claim 37, wherein the ethylene based polymer has a PDI of from 1 to 5.

39. The process of claim 37, wherein the ethylene based polymer has a PDI of from 10 to 20.

40. The process of claim 36, wherein the ethylene based polymer has a melting point of from 100° C. to 140° C.

41. A process for the production of a propylene based polymer comprising: polymerizing propylene by contacting the propylene with a catalyst system of claim 26, in one or more continuous stirred tank reactors or loop reactors, in series or in parallel, at a reactor pressure of from 0.05 MPa to 1,500 MPa and a reactor temperature of from 30° C. to 230° C. to form a propylene based polymer.

42. The process of claim 41, wherein the propylene based polymer has an Mw value of from 500 to 150,000 g/mol, Mn value of from 500 to 100,000 g/mol, Mz value of from 2,000 to 400,000 g/mol, and a PDI of from 1 to 3.

43. The process of claim 41, wherein the propylene based polymer has a melting point of from 50° C. to 170° C.

44. A process for the production of an ethylene alpha-olefin copolymer comprising: polymerizing ethylene and at least one $C_3$-$C_{20}$ alpha-olefin by contacting the ethylene and the at least one $C_3$-$C_{20}$ alpha-olefin with a catalyst system of claim 26, in one or more continuous stirred tank reactors or loop reactors, in series or in parallel, at a reactor pressure of from 0.05 MPa to 1,500 MPa and a reactor temperature of from 30° C. to 230° C. to form an ethylene alpha-olefin copolymer.

45. The process of claim 44, wherein the ethylene alpha-olefin copolymer has an Mw value of from 5,000 to 1,500,000 g/mol, and Mz value of from 5,000 to 10,000,000 g/mol, an Mn value of from 2,000 to 400,000 g/mol, and a PDI of from 1 to 40.

46. The process of claim 44, wherein the ethylene alpha-olefin copolymer has a PDI of from 1 to 5.

47. The process of claim 44, wherein the ethylene alpha-olefin copolymer has a PDI of from 20 to 40.

48. The process of claim 44, wherein the ethylene alpha-olefin copolymer has a melting point of from 40° C. to 140° C.

49. A transition metal compound comprising a tridentate dianionic ligand chelated to a group 4 transition metal, wherein the tridentate ligand coordinates to the group 4 transition metal with two anionic oxygen donors and one neutral heterocyclic nitrogen donor to form a pair of eight-membered metallocycle rings.

50. A catalyst system comprising an activator and the transition metal compound of claim 49.

* * * * *